INVENTORS
DAVID W. ANDERSON
ROBERT J. LITWILLER
DON M. POWERS
FRANCIS J. SPARACIO
BY Delbert C. Thomas
ATTORNEY Jan. 13, 1970 D. W. ANDERSON ET AL 3,490,005

INSTRUCTION HANDLING UNIT FOR PROGRAM LOOPS

Filed Sept. 21, 1966 65 Sheets-Sheet 4

INSTRUCTION HANDLING UNIT FOR PROGRAM LOOPS

Filed Sept. 21, 1966

UNCONDITIONAL BRANCH

Jan. 13, 1970 D. W. ANDERSON ET AL 3,490,005

INSTRUCTION HANDLING UNIT FOR PROGRAM LOOPS

Filed Sept. 21, 1966 65 Sheets-Sheet 21

CONDITIONAL BRANCH
(BC, BCR) 1

CONDITIONAL BRANCH (BC, BCR) 2

LOOP MODE

BRANCH ON INDEX
(BXH, BXLE, BCT, BCTR) 1

Jan. 13, 1970 D. W. ANDERSON ET AL 3,490,005

INSTRUCTION HANDLING UNIT FOR PROGRAM LOOPS

Filed Sept. 21, 1966

65 Sheets-Sheet 25

FIG. 21 SET SYSTEM MASK (SSM)

SET PROGRAM MASK (SPM)

FIG. 23 SET STORAGE KEY (SSK)

FIG. 24 INSERT STORAGE KEY (ISR)

Jan. 13, 1970 D. W. ANDERSON ET AL 3,490,005

INSTRUCTION HANDLING UNIT FOR PROGRAM LOOPS

Filed Sept. 21, 1966 65 Sheets-Sheet 33

FIG. 26 TEST AND SET (TS)

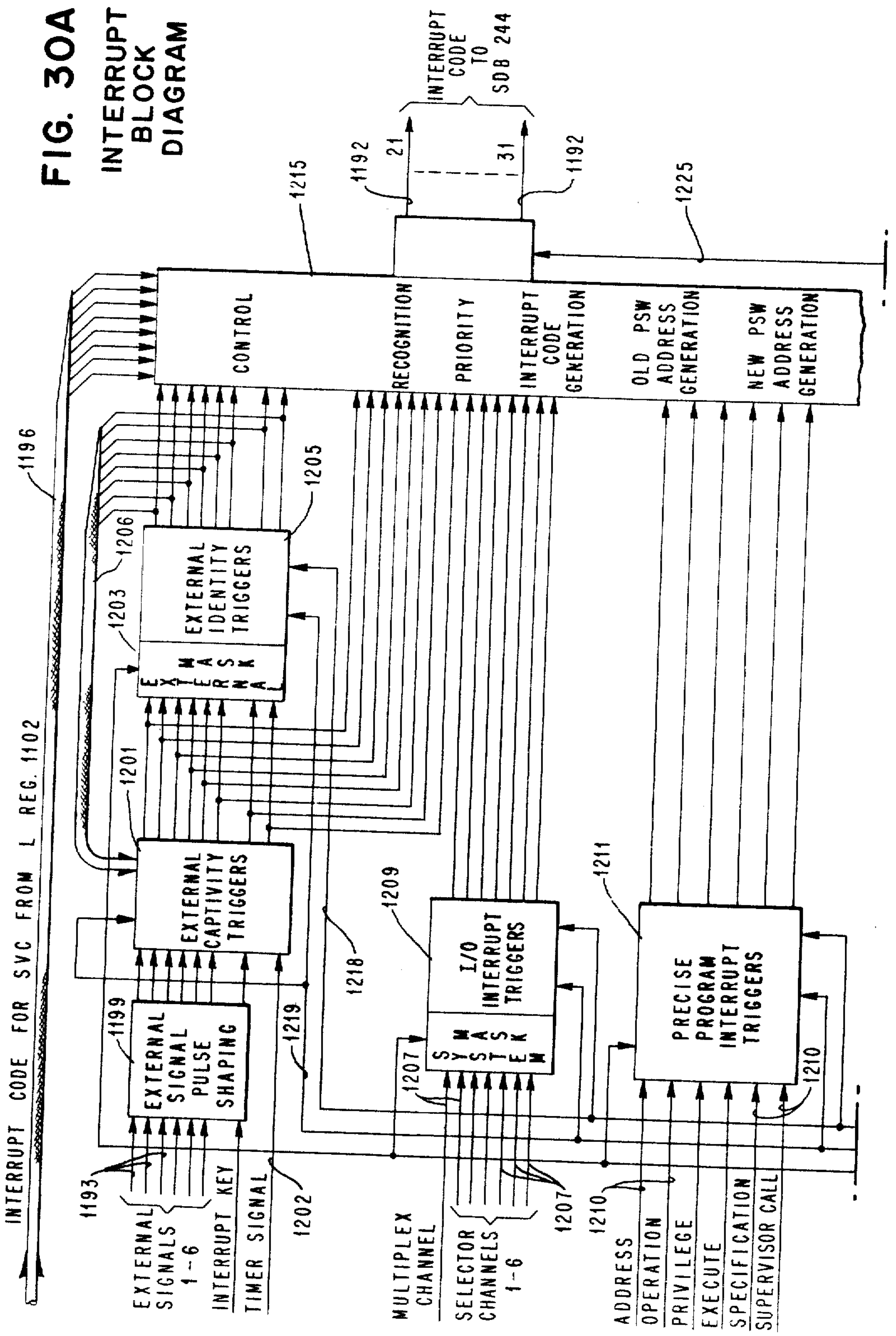
FIG. 30A INTERRUPT BLOCK DIAGRAM

Jan. 13, 1970 D. W. ANDERSON ET AL 3,490,005

INSTRUCTION HANDLING UNIT FOR PROGRAM LOOPS

Filed Sept. 21, 1966 65 Sheets-Sheet 43

Jan. 13, 1970 D. W. ANDERSON ET AL 3,490,005

INSTRUCTION HANDLING UNIT FOR PROGRAM LOOPS

Filed Sept. 21, 1966 65 Sheets-Sheet 47

Jan. 13, 1970 D. W. ANDERSON ET AL 3,490,005

INSTRUCTION HANDLING UNIT FOR PROGRAM LOOPS

Filed Sept. 21, 1966 65 Sheets-Sheet 59

Jan. 13, 1970 D. W. ANDERSON ET AL 3,490,005

INSTRUCTION HANDLING UNIT FOR PROGRAM LOOPS

Filed Sept. 21, 1966 65 Sheets-Sheet 60

United States Patent Office 3,490,005

Patented Jan. 13, 1970

3,490,005
INSTRUCTION HANDLING UNIT FOR PROGRAM LOOPS

David W. Anderson, Poughkeepsie, Robert J. Litwiller, Wappingers Falls, and Don M. Powers and Francis J. Sparacio, Poughkeepsie, N.Y., assignors to International Business Machines Corporation, Armonk, N.Y., a corporation of New York Filed Sept. 21, 1966, Ser. No. 581,052
Int. Cl. G11b *13/00;* G06f *1/00, 7/00*
U.S. Cl. 340—172.5 9 Claims

ABSTRACT OF THE DISCLOSURE

A data processing system has parallel execution units and an instruction unit containing instruction buffer registers. When an instruction loop is containable within these registers, the system automatically operates in a loop mode whereby the instruction loop is repetitively decoded and executed, without refetching any instructions from storage, until the condition creating the loop is no longer satisfied.

TABLE OF CONTENTS

| | Column |
|---|---|
| Specification | 1 |
| General Description | 4 |
| Central Processing Unit | 6 |
| Instruction Unit | 7 |
| Operation of the Instruction Unit | 10 |
| Instruction Issuing | 13 |
| Execution Unit | 15 |
| Floating Point Unit | 15 |
| Operation of Floating Point Unit | 17 |
| Non-Arithmetic FLPU Operations | 18 |
| Fixed Point Unit | 19 |
| Fixed Point Unit Operation | 21 |
| Variable Field Length Operations | 23 |
| Main Storage Control Element | 23 |
| MSCE Controls | 26 |
| Peripheral Storage Control Element | 29 |
| Bus Control | 30 |
| Common Channel Control | 31 |
| Storage Channel | 32 |
| Instruction Unit | 32 |
| Instruction Stream Discontinuities | 35 |
| Instruction Loop Mode | 37 |
| Storing Into Instruction Stream | 39 |
| Instruction Issuing | 41 |
| Flow Charts for Branching Instructions | 46 |
| Status Switching and I/O Instructions | 56 |
| Storage Protection Keys | 59 |
| Multi-System Communications | 61 |
| Input/Output Instructions | 62 |
| Multiple Operation Instructions | 64 |
| Overlapping Operands | 70 |
| Interrupts | 71 |
| Branch and Loop Mode Controls | 77 |
| Output Control Signals | 77 |
| Input Control Signals | 80 |
| Branch Control Triggers | 84 |
| Branch Intercontrol Circuits | 90 |

SPECIFICATION

This invention relates to an element for handling instructions fetched from the addressable memory of a data processing system and more particularly to a data handling element for reducing the access time to instructions of a program loop.

One of the problems encountered in the design of a high performance data processing system is the speed discrepancy between the processor and the storage units. In order to alleviate this situation, a look ahead technique is generally employed whereby instructions are pre-fetched and are stored in a buffer or queue while other earlier instructions are being decoded and/or executed. The existence of a queue of instructions in the processor may, in many instances, be made use of to permit the bypassing of instruction word fetches from storage in the situations where instructions to be decoded are currently available in the buffer. Such a situation arises, for example, when a branch-back instruction appears in an instruction sequence. This gives rise to a string of instructions which will generally be repeated some number of times and which, in the discussion to follow, will be referred to as a "loop." In most computer programs, such loops occur quite frequently and many of these loops are short enough so that the entire loop of instructions may be stored in a group of buffer registers without an unreasonable expenditure of storage and control hardware.

While the branch instruction sometimes specifically includes the address of the instruction which is to be branched to if the condition is satisfied, frequently this instruction address is arrived at by adding a fixed value contained in the instruction, or specified by the instruction, to a value stored in a given index register. Therefore, if the instruction loop is contained in the buffer registers, no time will be lost in fetching instructions during the execution of a loop. However, several cycles may be lost at the branch instruction terminating an instruction loop each time a loop is completed, since it will be necessary to determine the address to be branched to at every branch instruction. These several cycles may be omitted by storing the address of the branch instruction which initiates the instruction loop, and also storing the address branched to and going directly to the stored branch-to address, if the address of a branch instruction being decoded matches the stored branch instruction address. However, this procedure may lead to an error if the branch-to address is changed during the execution of the loop and does not agree with the stored branch-to address. Therefore, the branch instruction must be retained sufficiently to determine if instruction execution after the branch instruction will change any factor of the branch-to address.

It is therefore an object of this invention to provide an improved element for controlling the handling of instruction loops in a data processing system.

A more specific object of the invention is to provide an element for controlling the buffering of an entire instruction loop and the processing of the instructions of the loop directly from the buffer registers without requiring repetitive fetching of the loop of instructions.

A more specific object of this invention is to provide a unit of the type described above which fetches an instruction which is to be executed only if the instruction is not already available in the processor buffer.

A further object of this invention is to provide a control unit of the type described above which, under normal conditions, eliminates the need for recomputing the branch-to address each time a program loop is completed.

In accordance with these objects this invention provides a unit for handling instructions fetched from the addressable storage of a data processing system which unit includes a buffer in the processor for storing a predetermined number of instructions. When it is detected that a branch instruction is being executed, and the branch is to an address which is no more than the predetermined number of addresses back from the address of the branch instruction, the unit is set to operate in a loop mode. After having been set into loop mode, the unit fetches instructions from storage only once more and thereafter executes the instructions directly from the buffer during subsequent executions of the loop. If the branch back is to an instruction which is already available in the buffer, then refetching of the loop of instructions after the element is set into loop mode is not necessary and the element starts executing instructions directly from the buffer immediately. In order to eliminate the need for computing the branch-to address each time the loop is completed, a first register is provided for storing the address of the branch instruction, and a second register is provided for storing the address calculated for the branched-to instruction. Each time a branch instruction is decoded, the address of the instruction is compared with the address stored in the first register and if the addresses are the same, the unit switches for its next instruction to the buffer register storing the instruction from the address indicated in the second register. If any of the registers specified in the branch instruction and used in calculating the address of the branched-to instruction has its contents changed during the processing of the instructions of the loop, the branched to address may be changed so that the instructions no longer form a loop and the loop mode setting is cancelled. Similarly, if the element is in loop mode and during processing of an instruction of the loop an instruction outside the loop is branched to, the loop mode status is also cancelled.

The foregoing and other objects, features and advantages of the invention will be apparent from the following more particular description of a preferred embodiment of the invention as illustrated in the accompanying drawings.

Other features of the herein described preferred embodiment of a data processing system are set out and claimed in the following U.S. patent applications assigned to the assignee of the present application by other inventors.

Ser. No. 580,910, filed Sept. 21, 1966, by D. W. Anderson et al., and tilted, "Instruction Processing Unit for Program Branches."

Ser. No. 579,082, filed Sept. 12, 1966, by R. E. Goldschmidt et al., and titled, "High Speed Adder."

Ser. No. 576,157, filed Aug. 30, 1966, by R. E. Goldschmidt et al., and titled, "Multiplying Apparatus for Performing Division Using Successive Approximate Reciprocals of a Divisor."

Ser. No. 576,401, filed Aug. 31, 1966, by R. E. Goldschmidt et al., and titled, "Apparatus for Accumulating the Sum of a Plurality of Operands."

Ser. No. 582,675, filed Sept. 28, 1966, by R. M. Tomasulo et al., and titled, "Execution Unit With a Common Operand and Result Bussing System."

Ser. No. 578,745, filed Sept. 12, 1966, by L. J. Boland et al., and titled "Control System for Interleave Memory."

Ser. No. 573,360, filed Aug. 18, 1966, by S. A. Calta et al., and titled "Peripheral Data Exchange."

Figure 3:
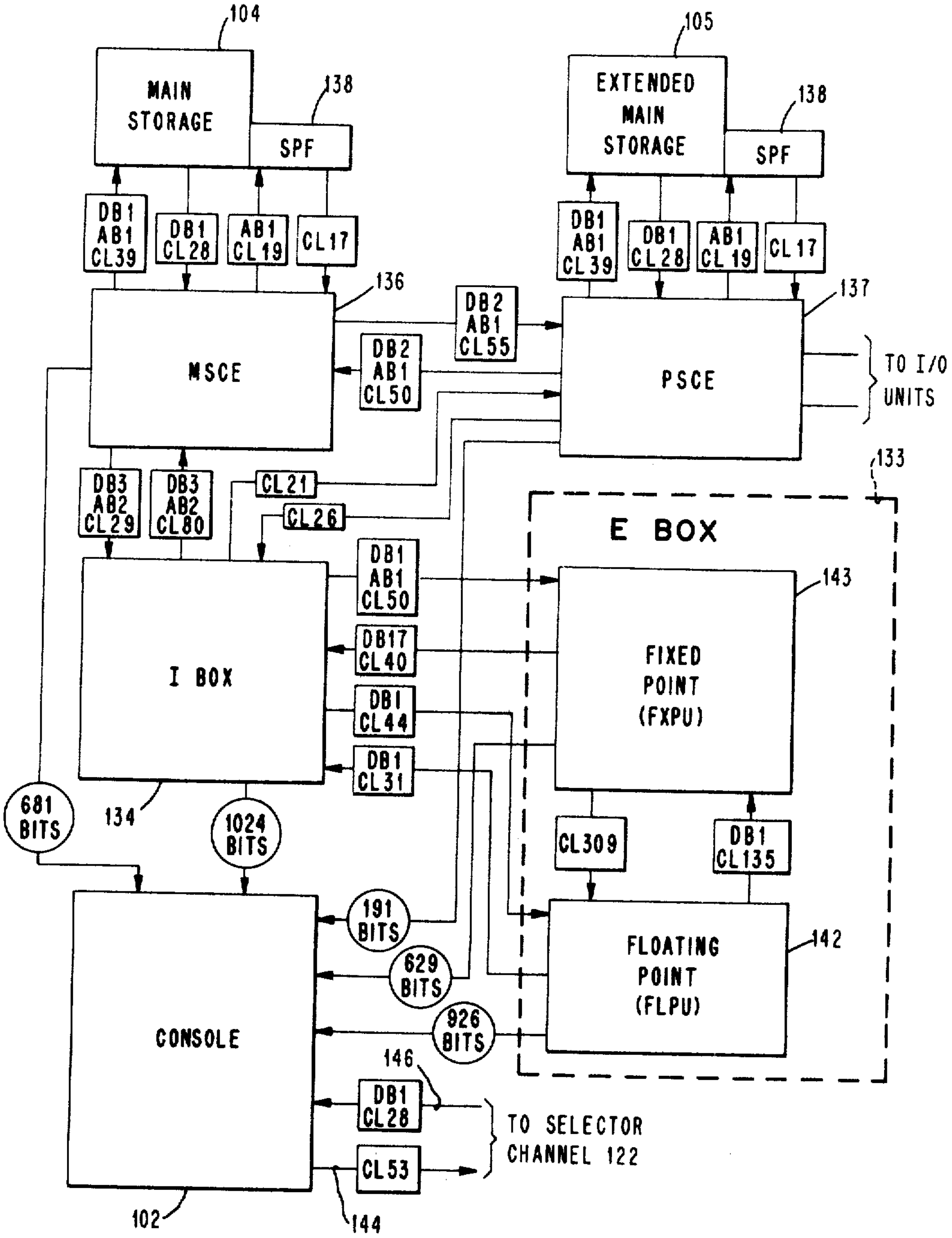
FIG. 3 is a more detailed view of the unit of FIG. 2 showing the functional sections and the interconnections therebetween.
Figure 4A:
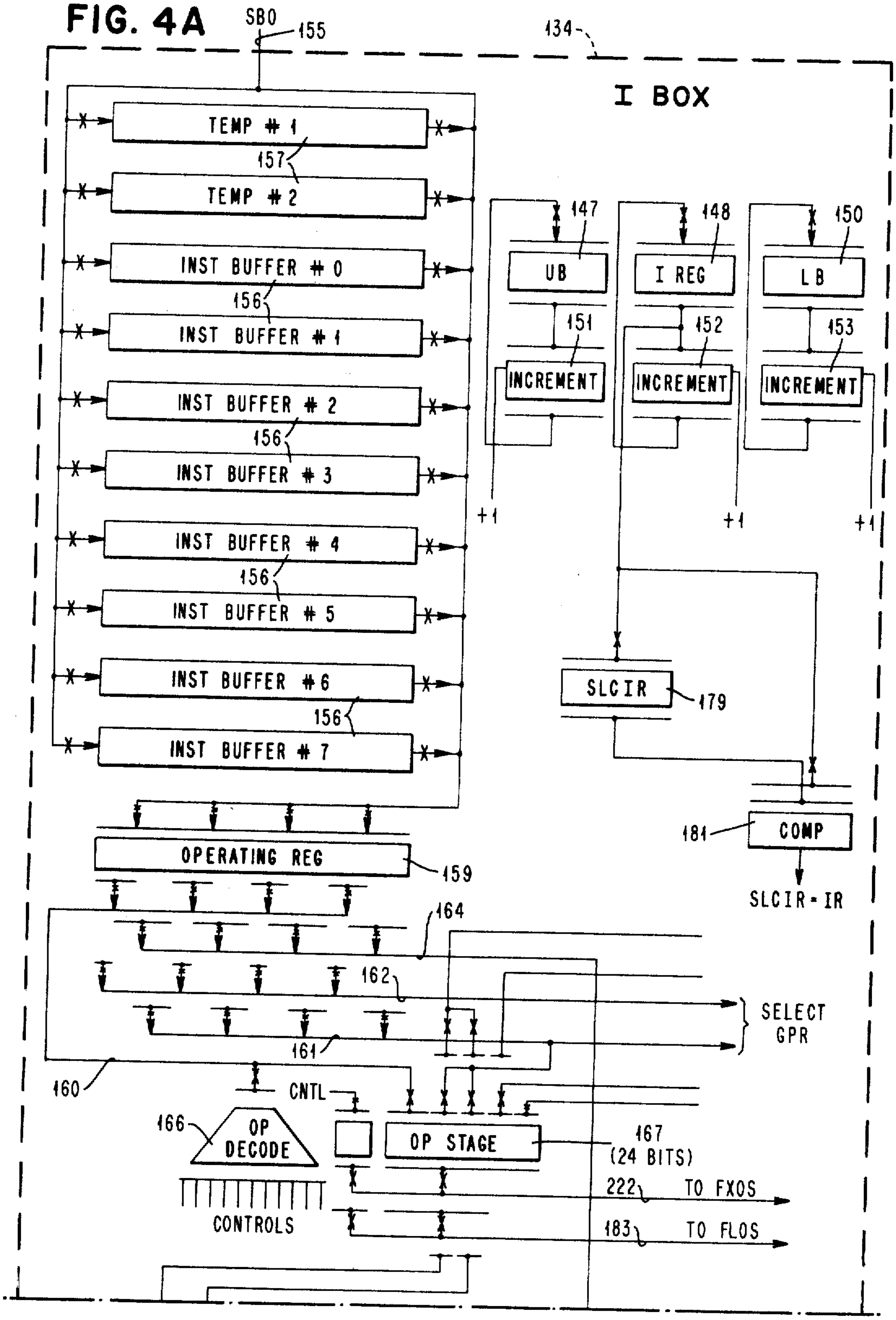
Figure 4B:
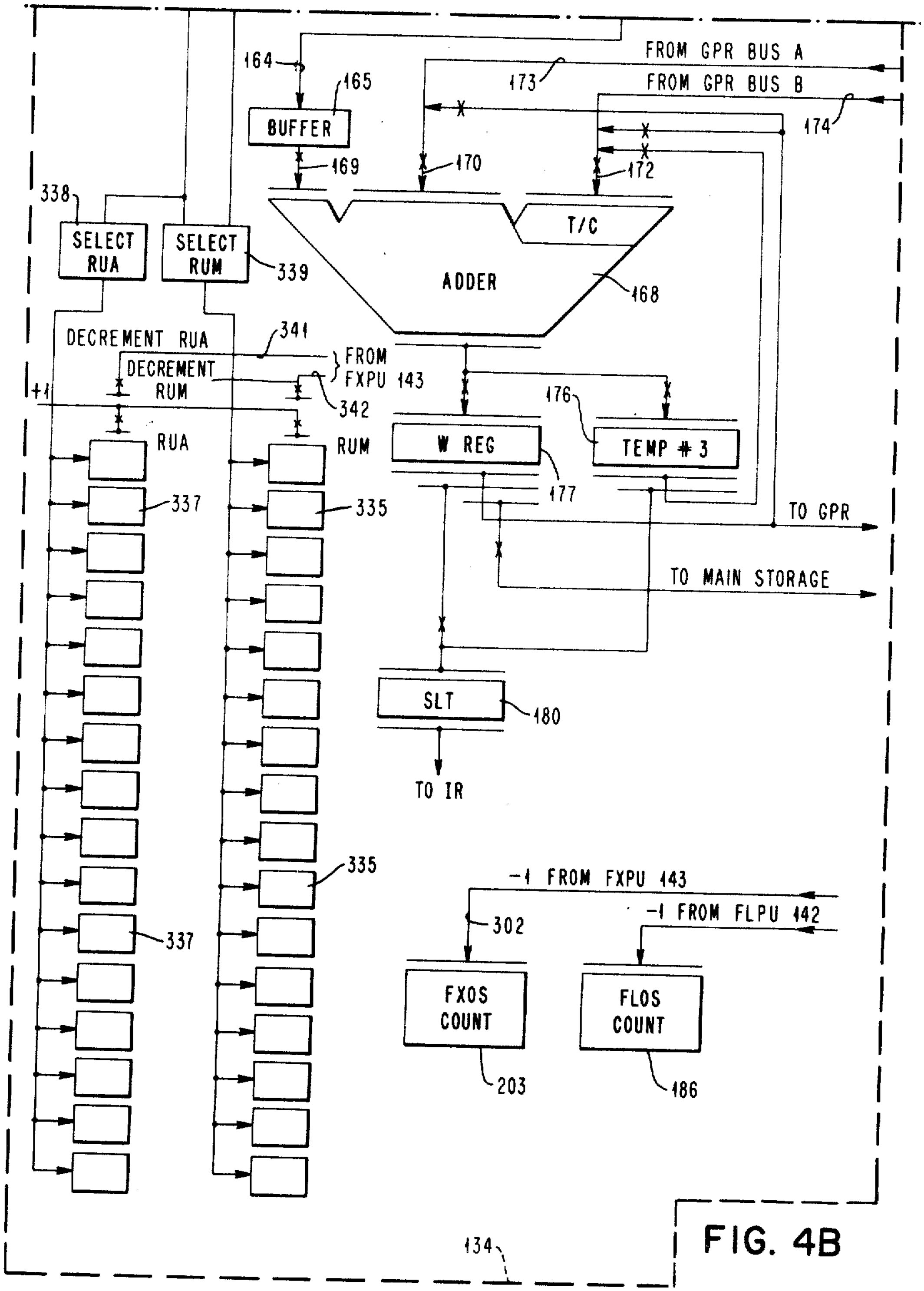

FIGS. 4A and 4B comprise a schematic showing of the functional parts and operand paths of the Instruction Unit of FIG. 3.

Figure 5:
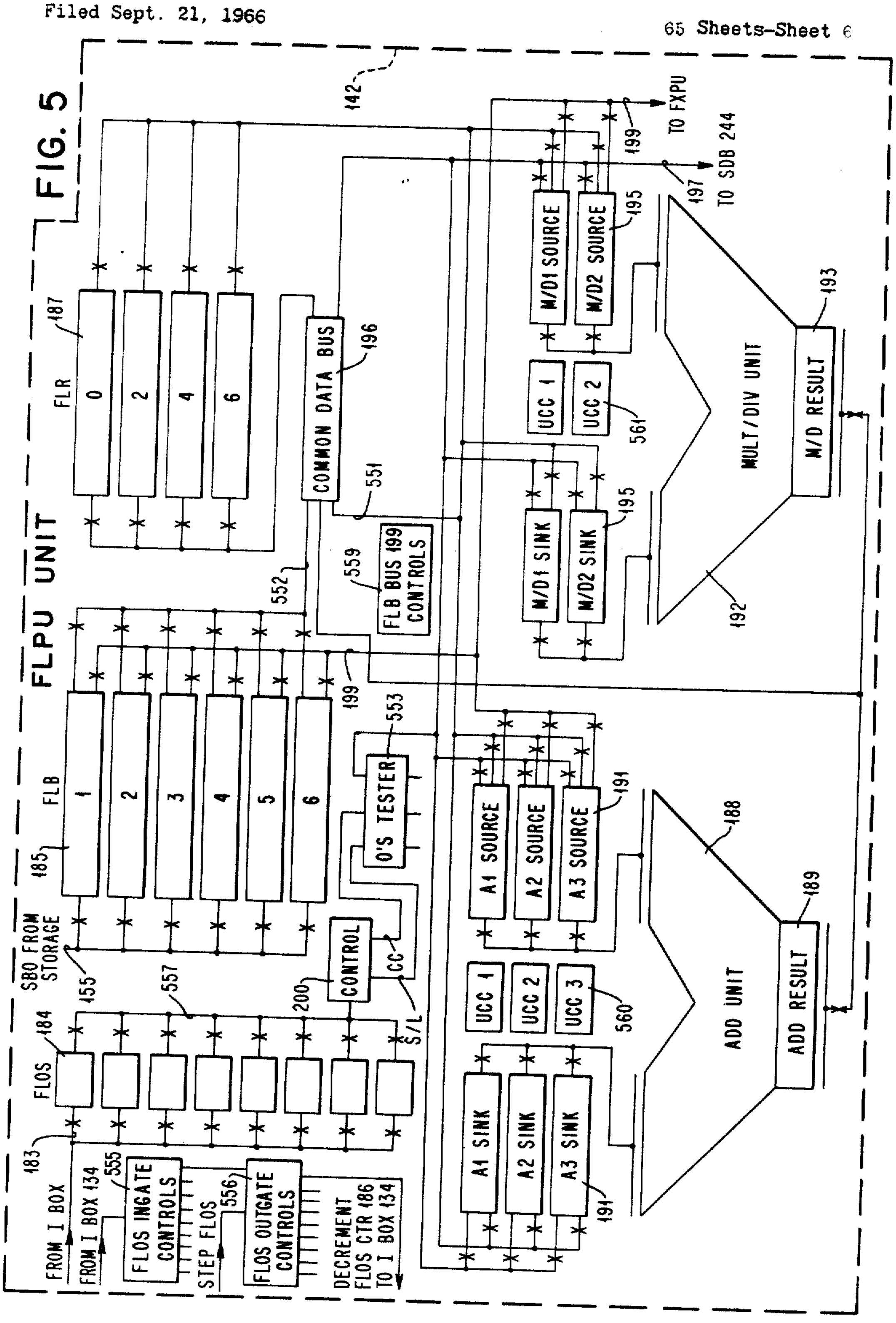

FIG. 5 is a schematic showing the Floating Point Unit and its operand paths.

Figure 6A:
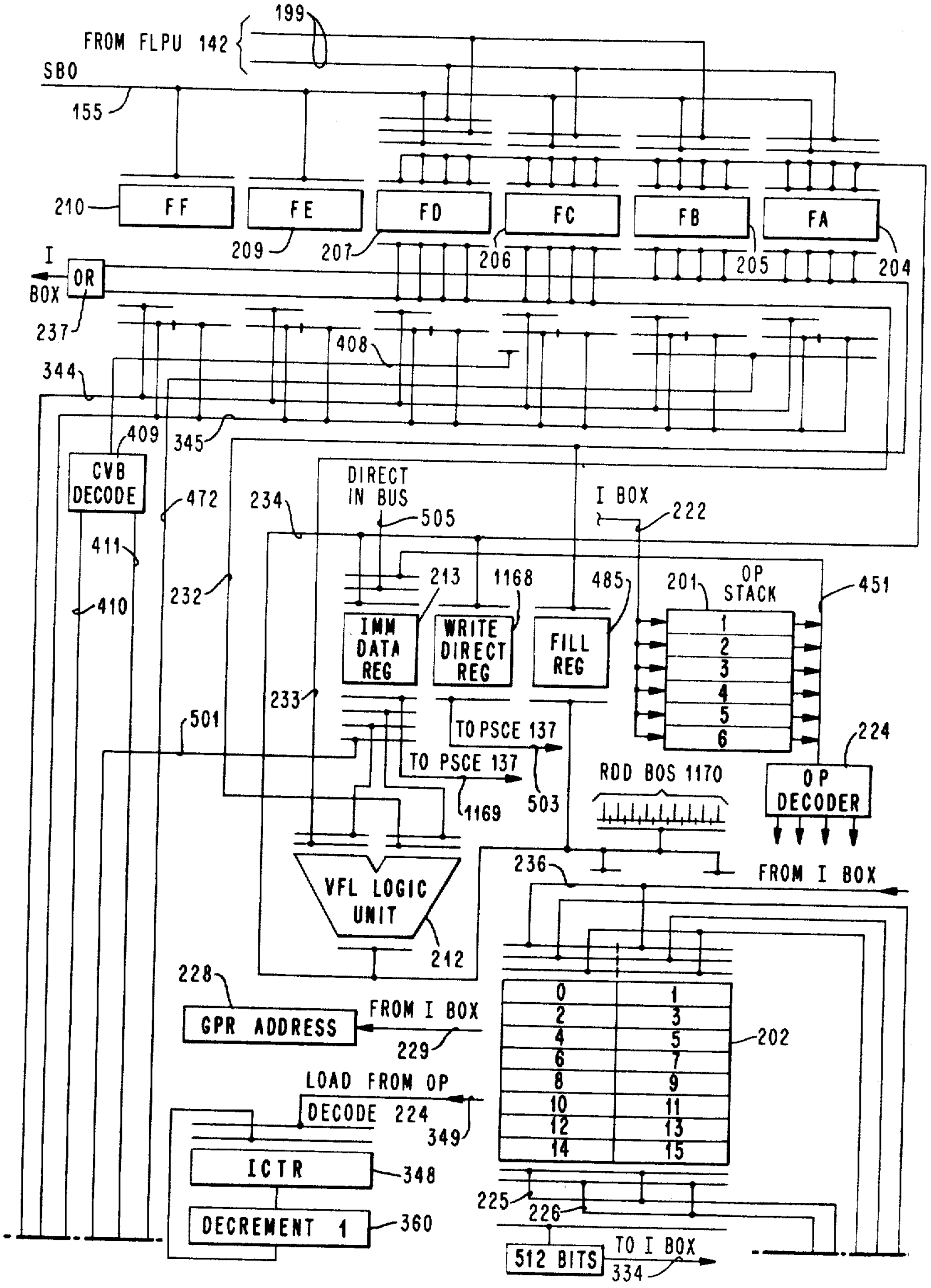

FIGS. 6A and B comprise a schematic showing of the functional parts and operand paths of the Fixed Point Variable Field Length Unit.

Figure 7:
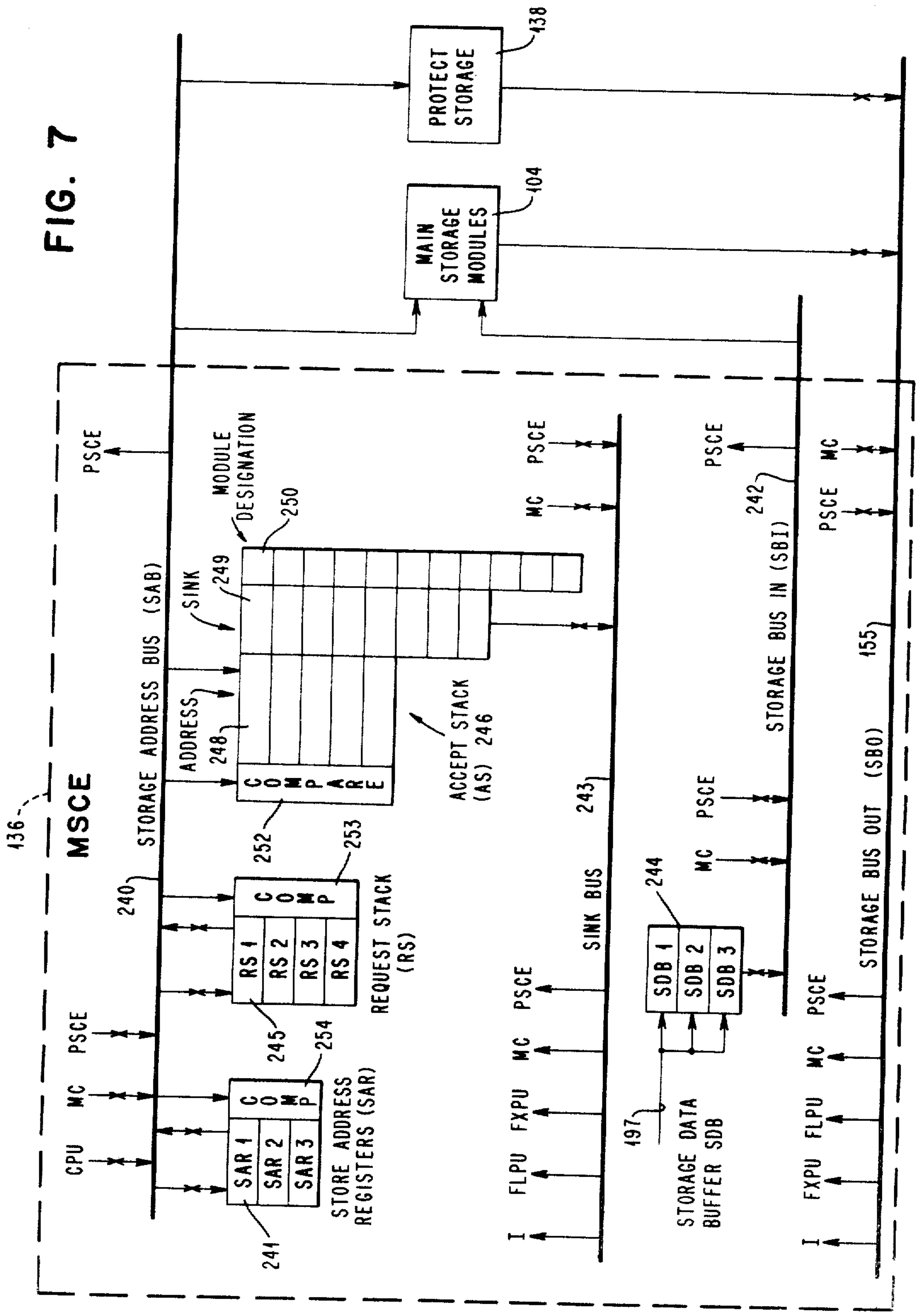

FIG. 7 is a schematic of the Main Storage Control Element showing its functional parts.

Figures 8, 9:
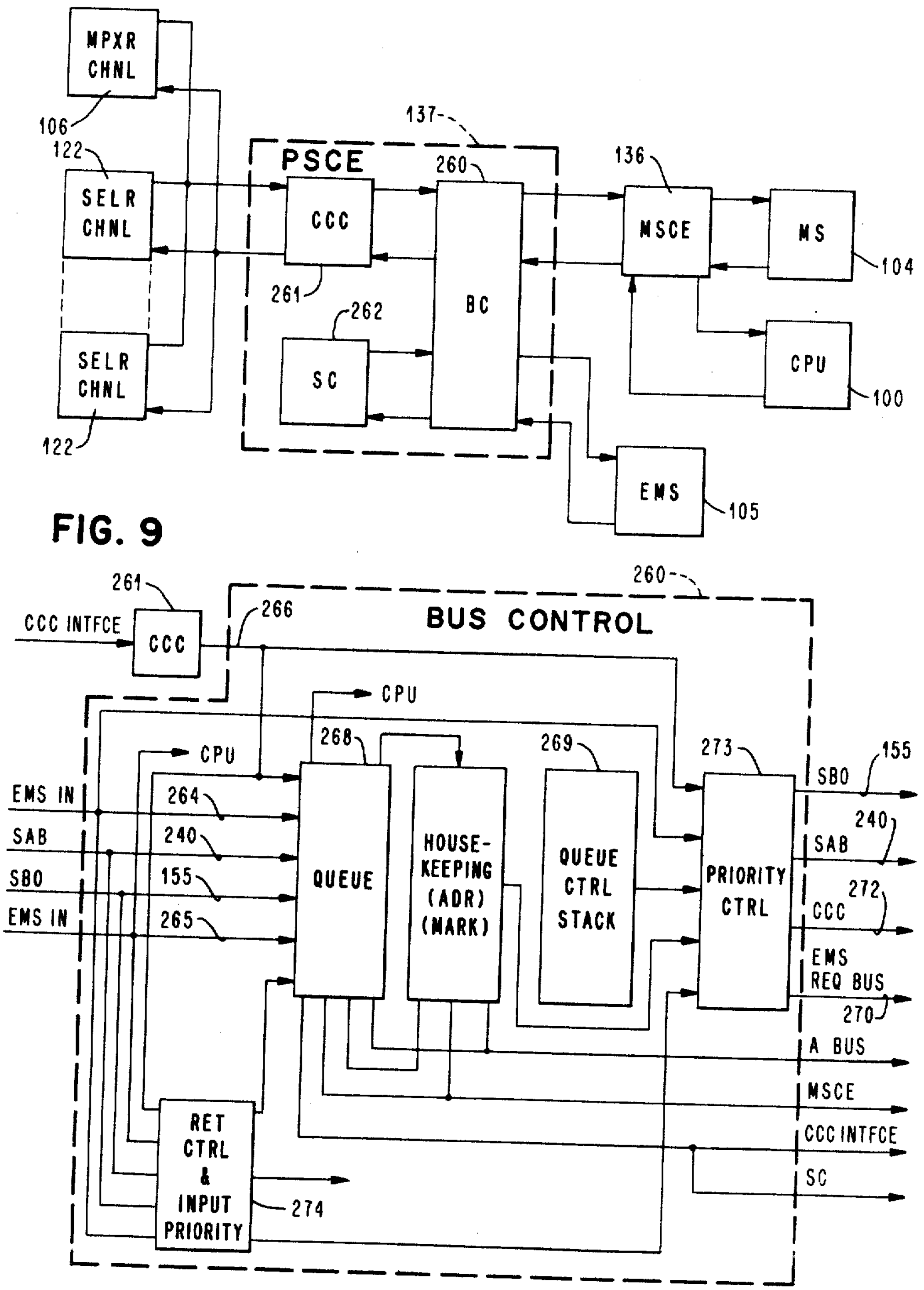

FIG. 8 is an overall schematic of the Peripheral Storage Control Element of FIG. 3.

FIG. 9 shows the internal sections of the Peripheral Storage Control Element of FIG. 8.

FIGS. 10A, 10B, 10C, 10D, 10E, 10F, 10G and 10H combined are a detailed diagram of the functional units of and the data flow in the Instruction Unit.

Figure 10A:
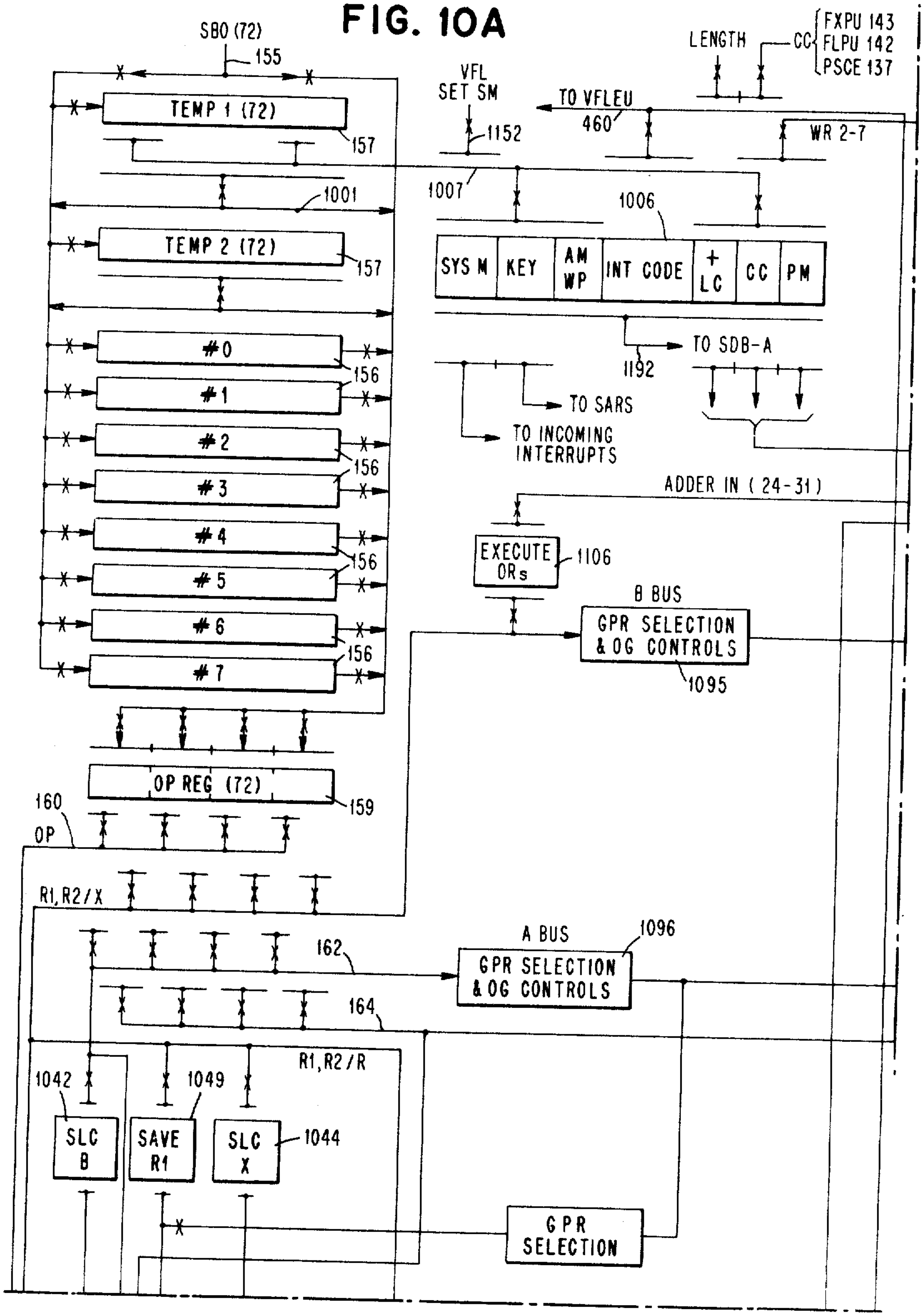
Figure 10B:
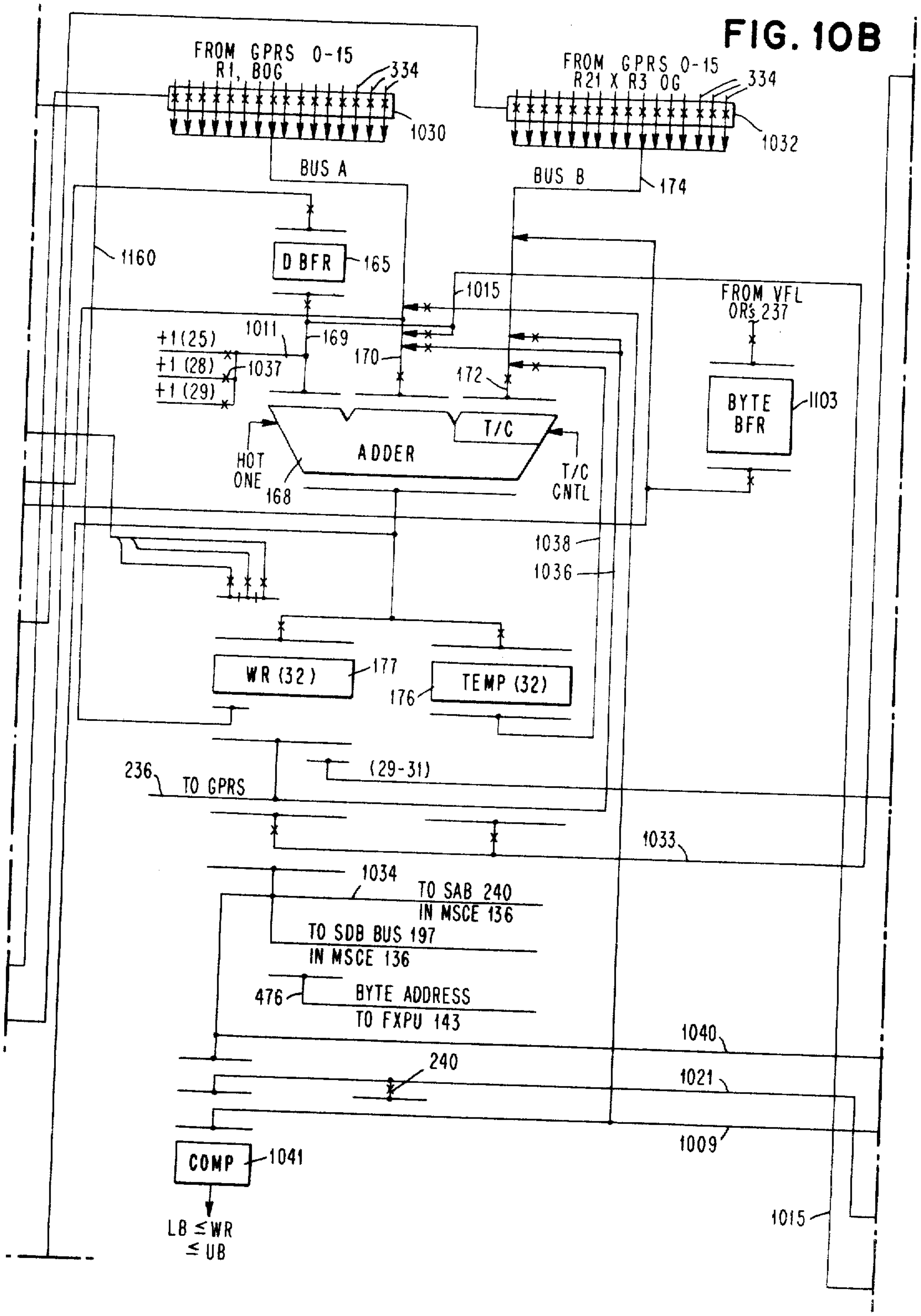
Figure 10C:
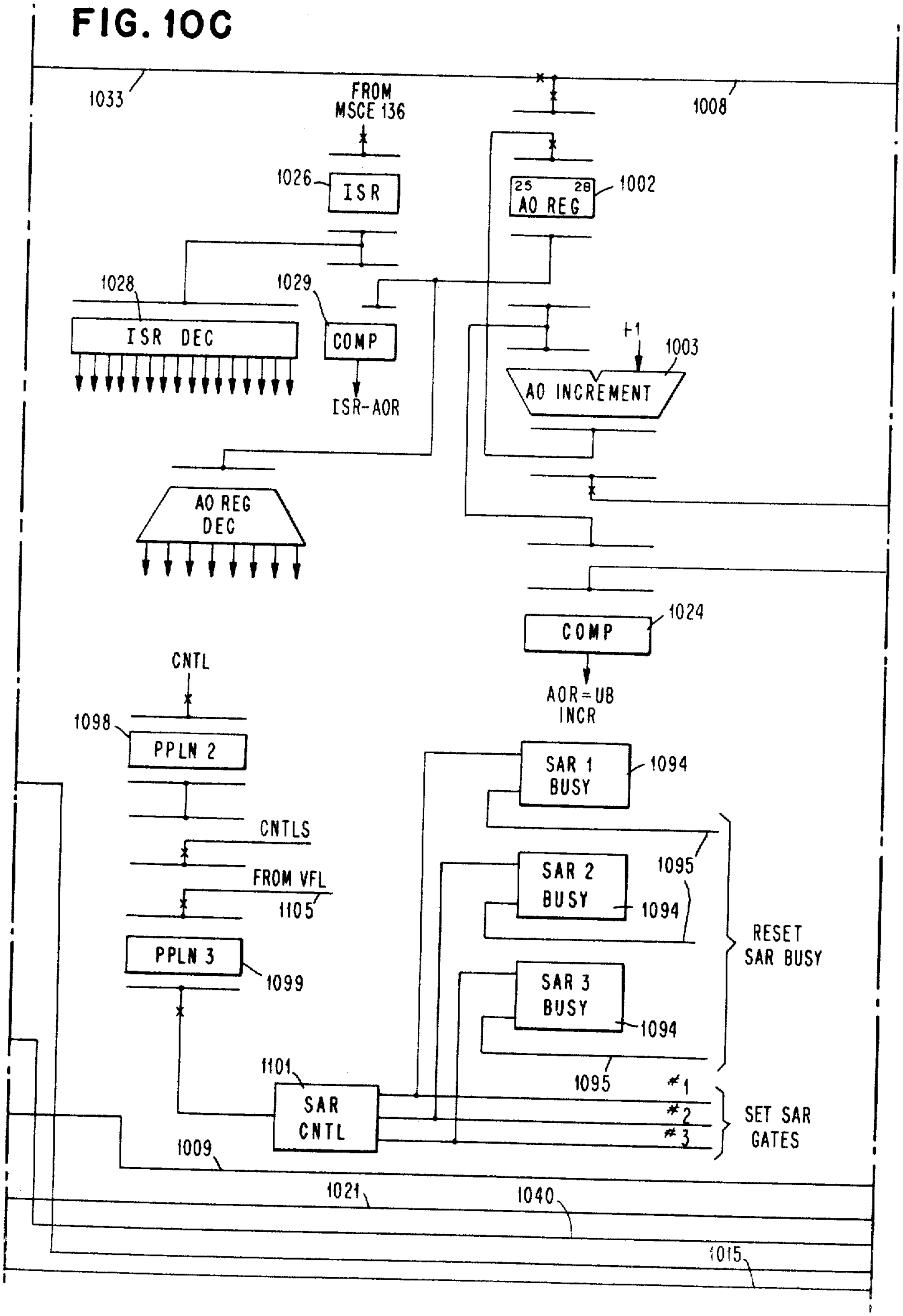
Figure 10D:
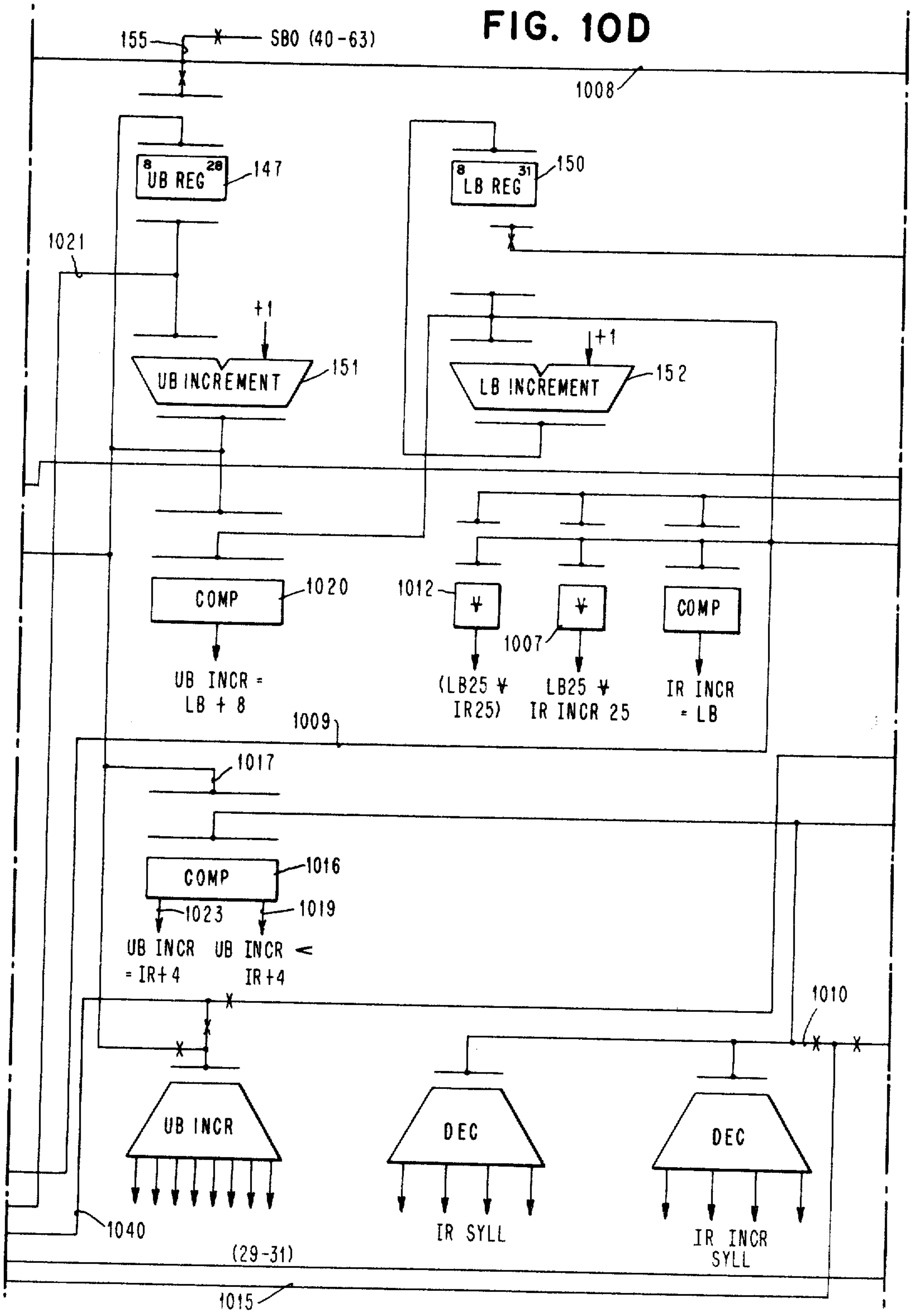
Figures 10E, 10J:
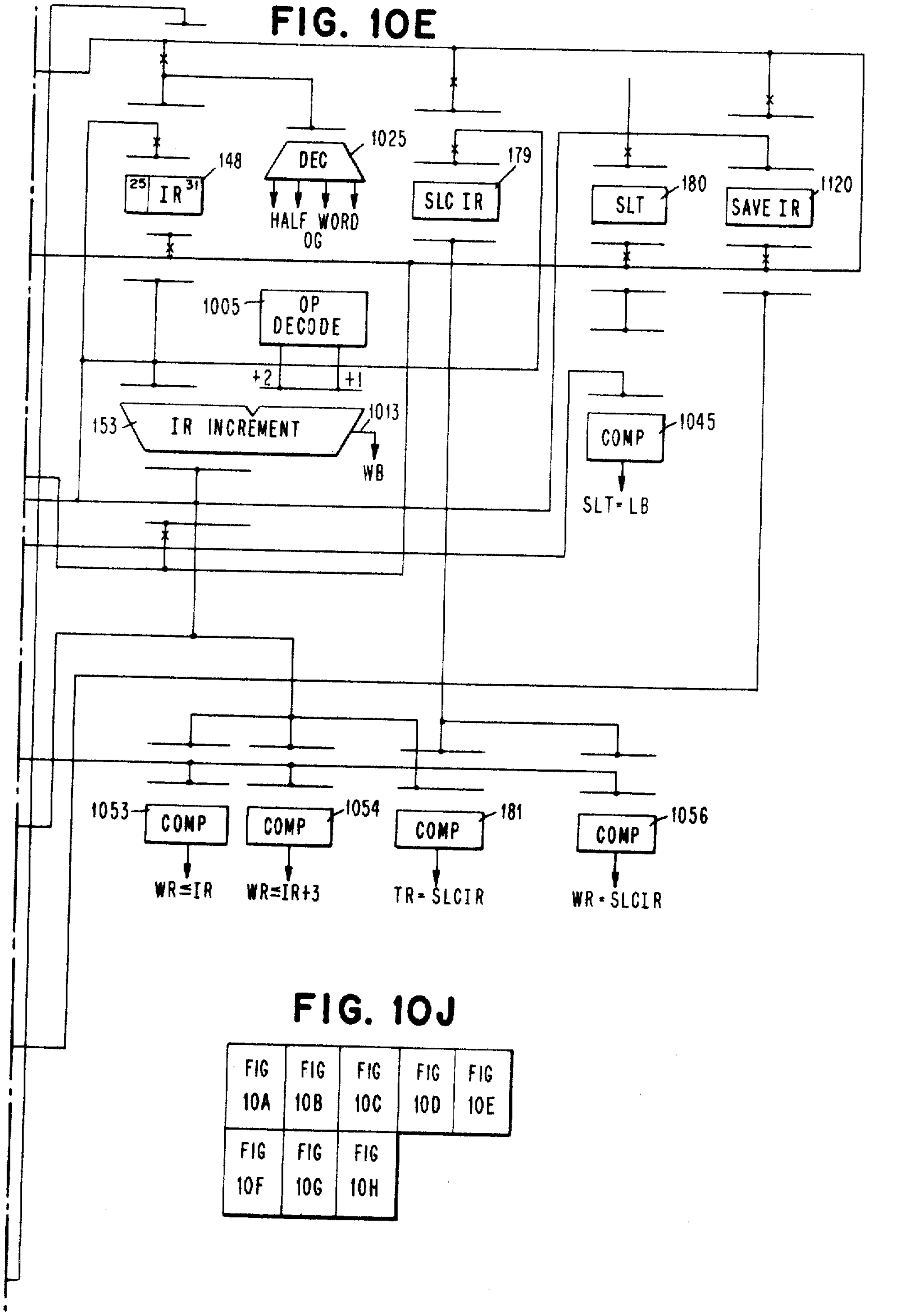
Figure 10F:
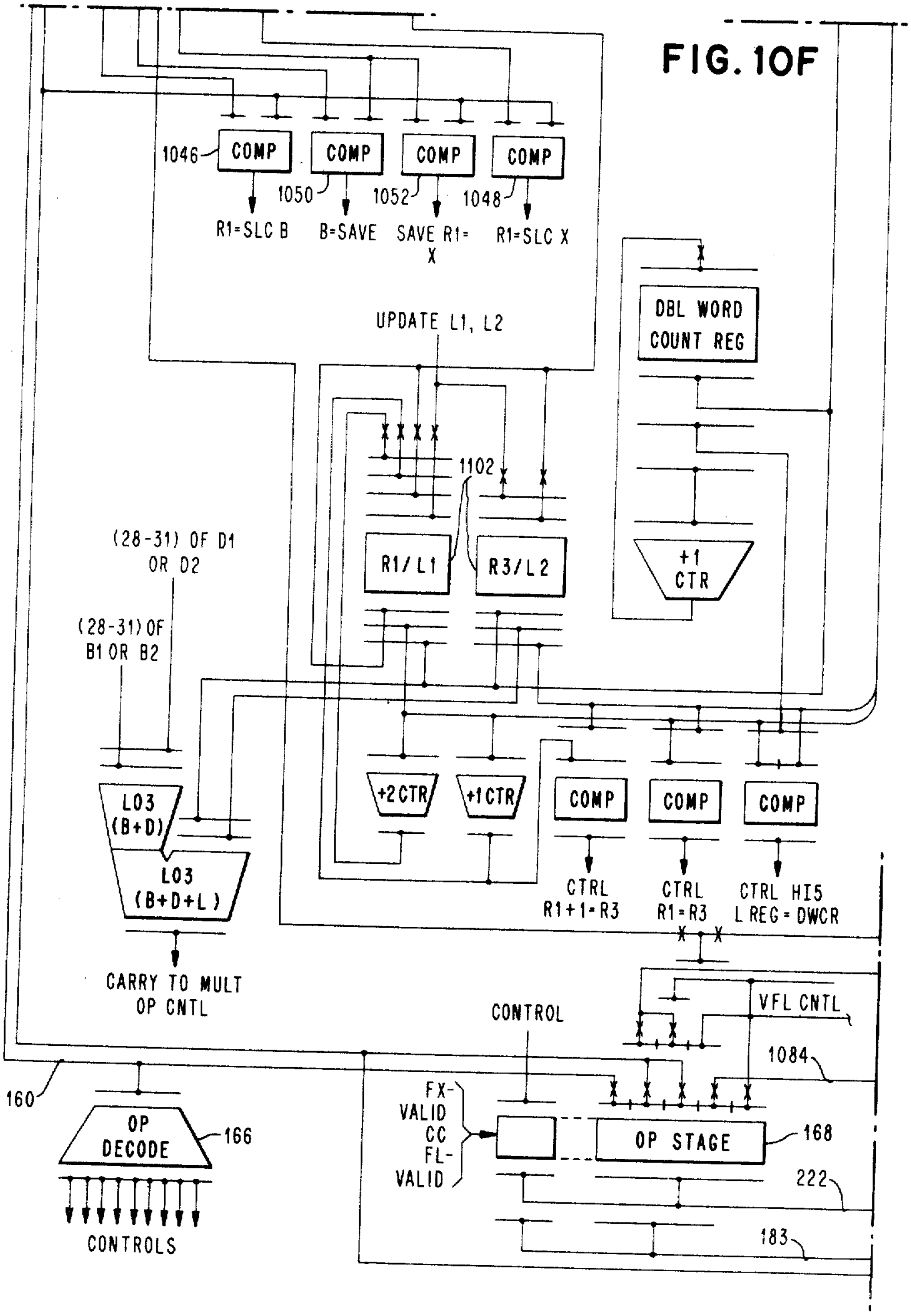
Figure 10G:
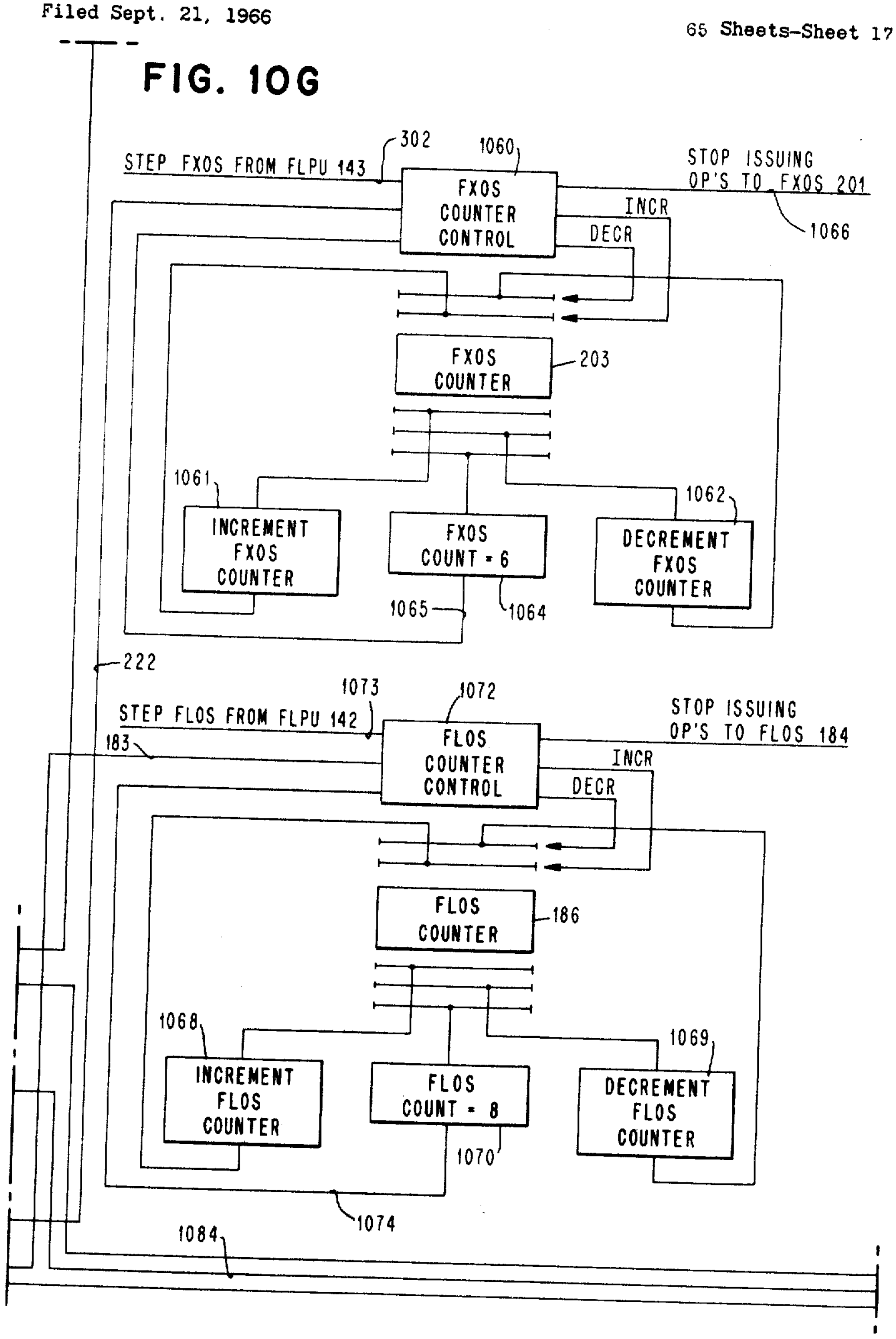
Figure 10H:
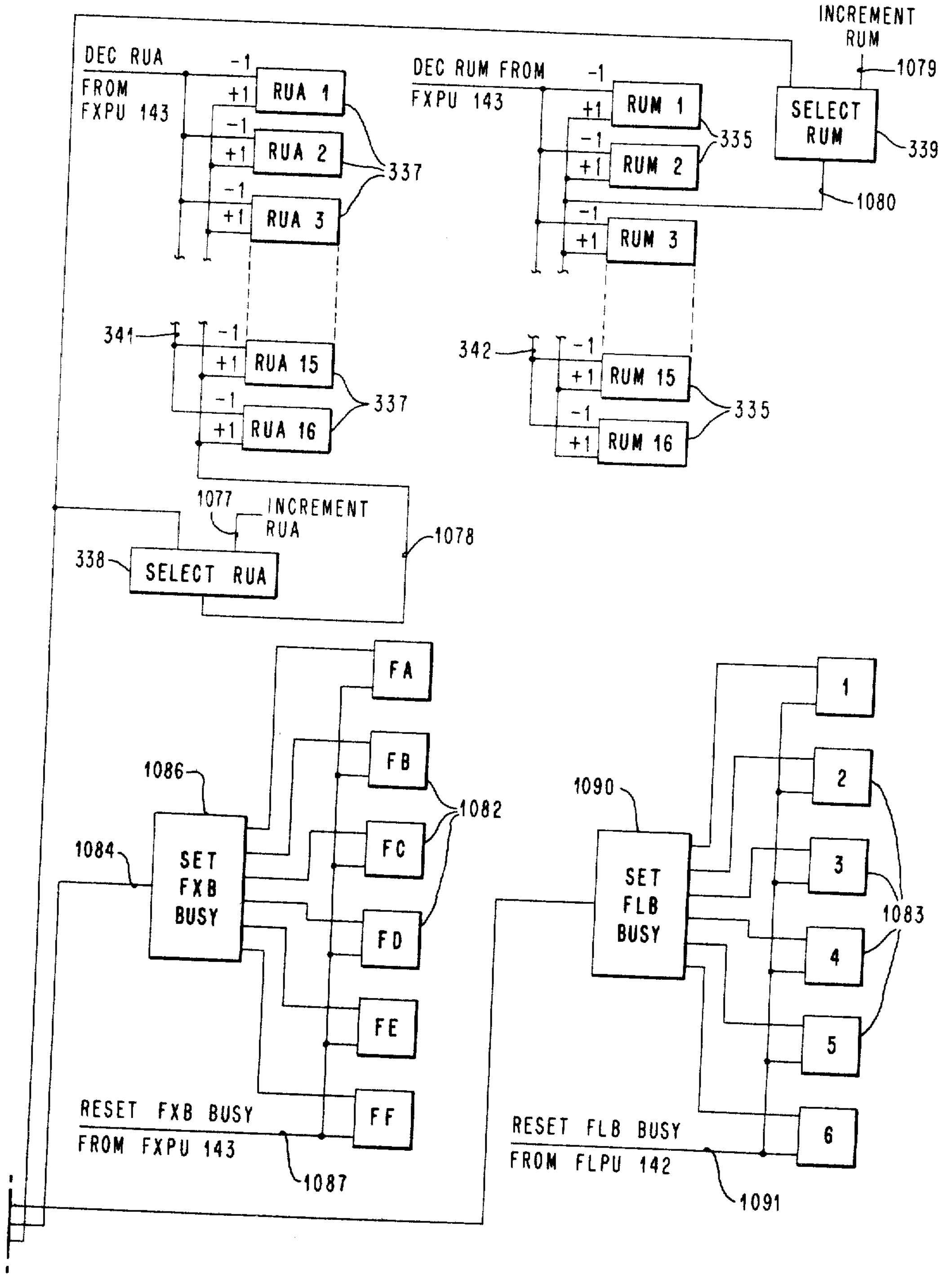

FIG. 10J is a diagram indicating the relative positions of the FIGS. 10A to 10H inclusive.

Figure 11:
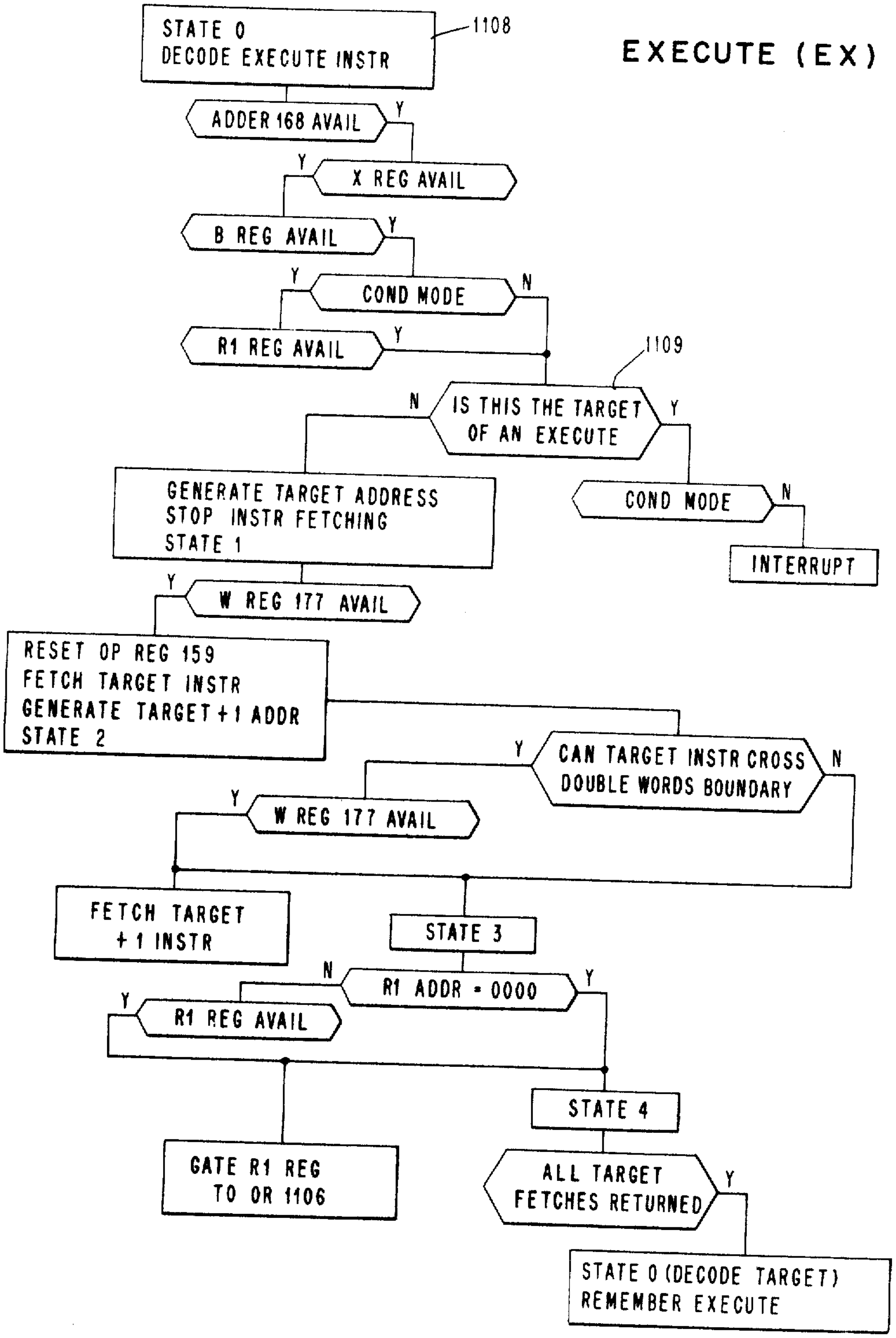

FIG. 11 is a flow chart of the sequence of operations for an Execute instruction.

Figure 12:
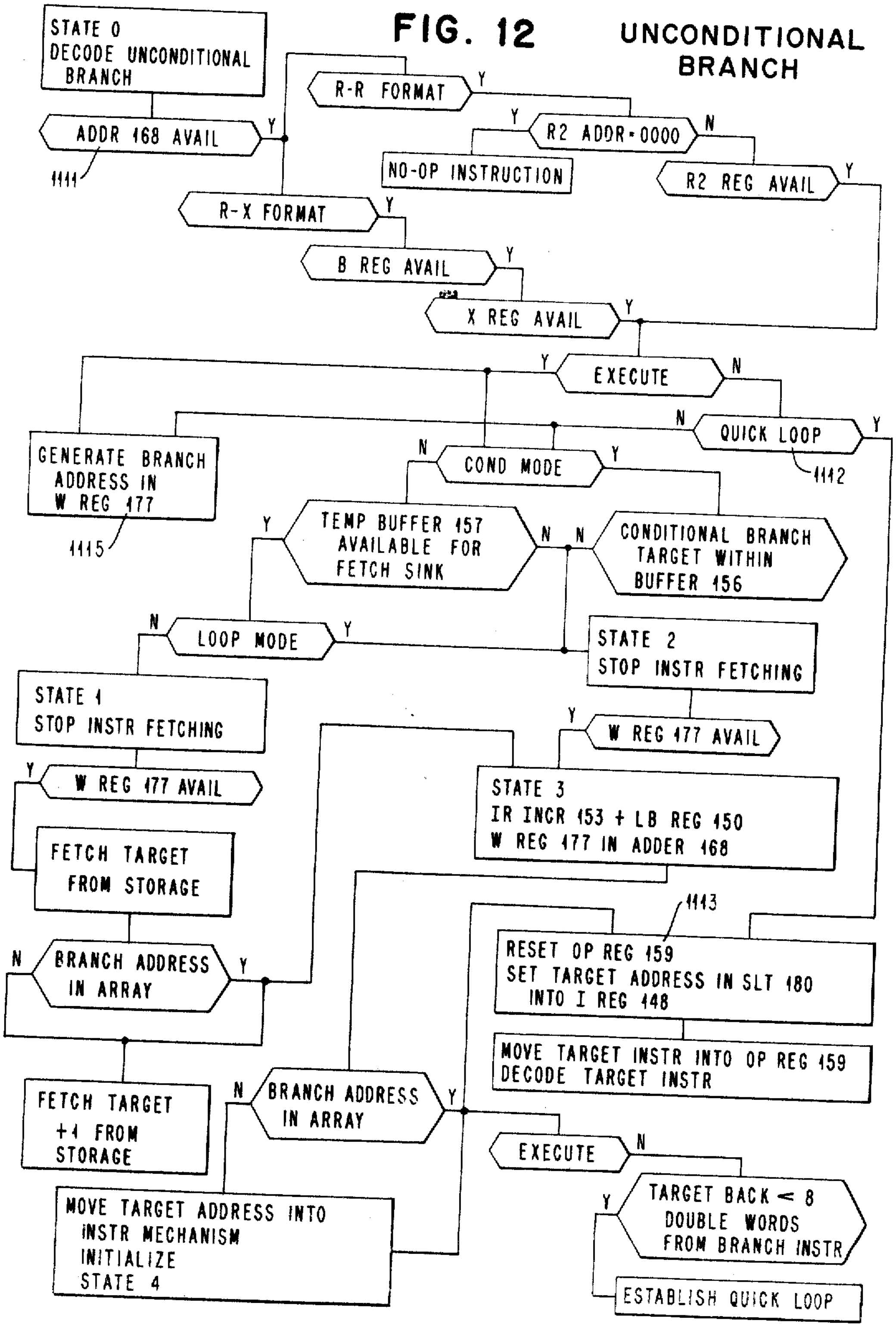

FIG. 12 is a flow chart of the operational sequence for an Unconditional Branch operation.

Figure 13:
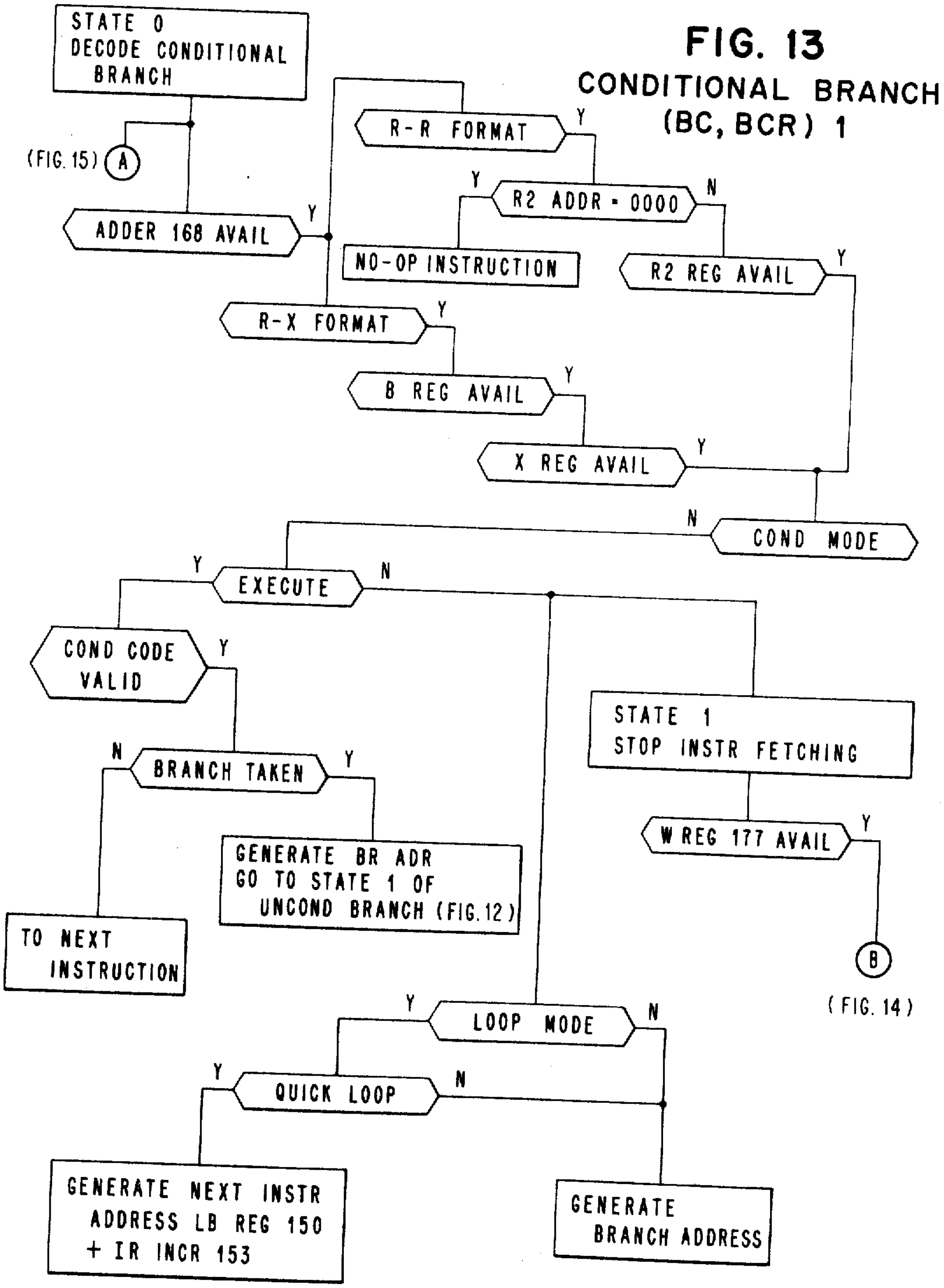
Figure 14:
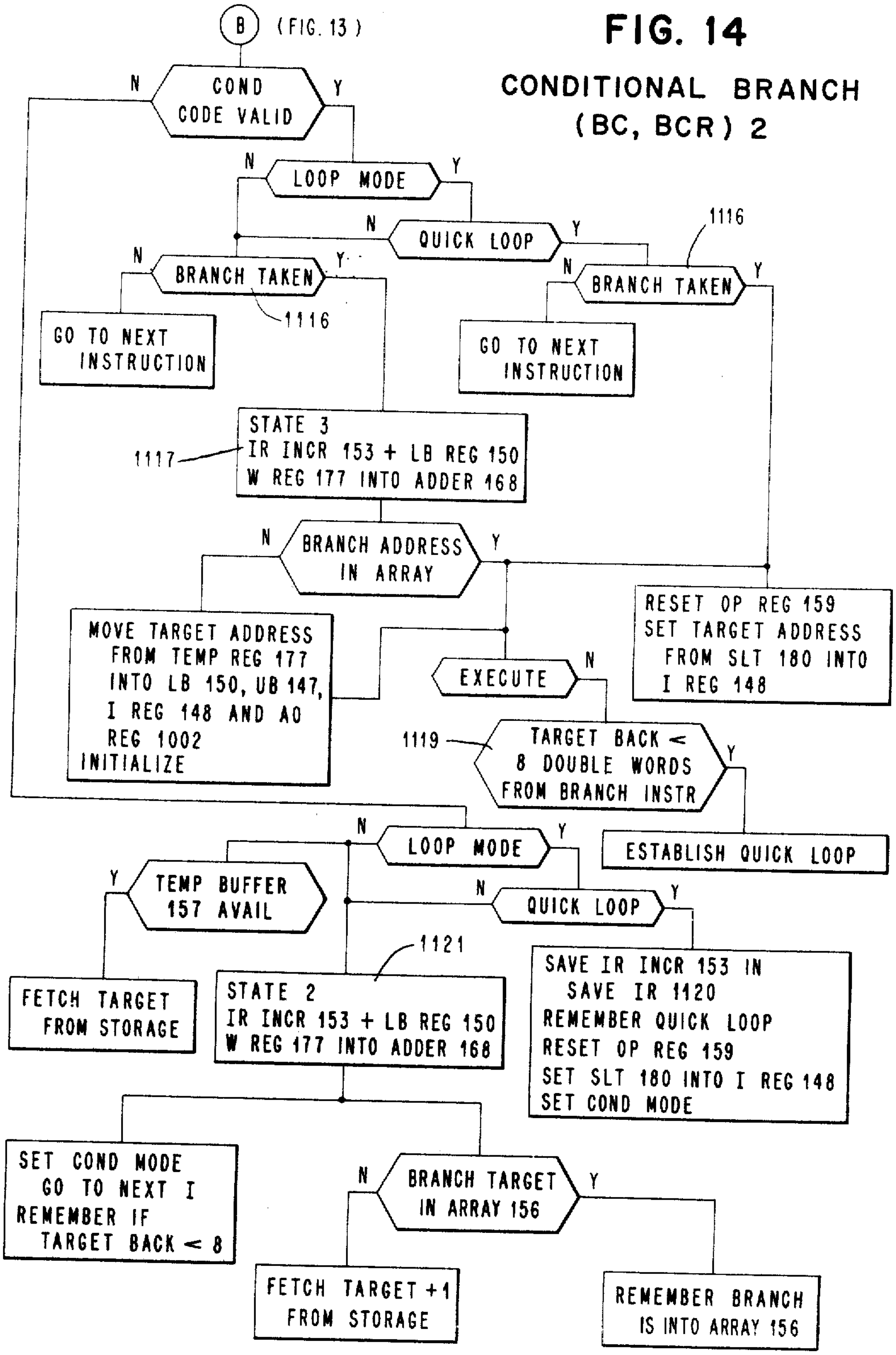

FIGS. 13 and 14 together show the operational sequence for the Conditional Branch type of instruction.

Figure 15:
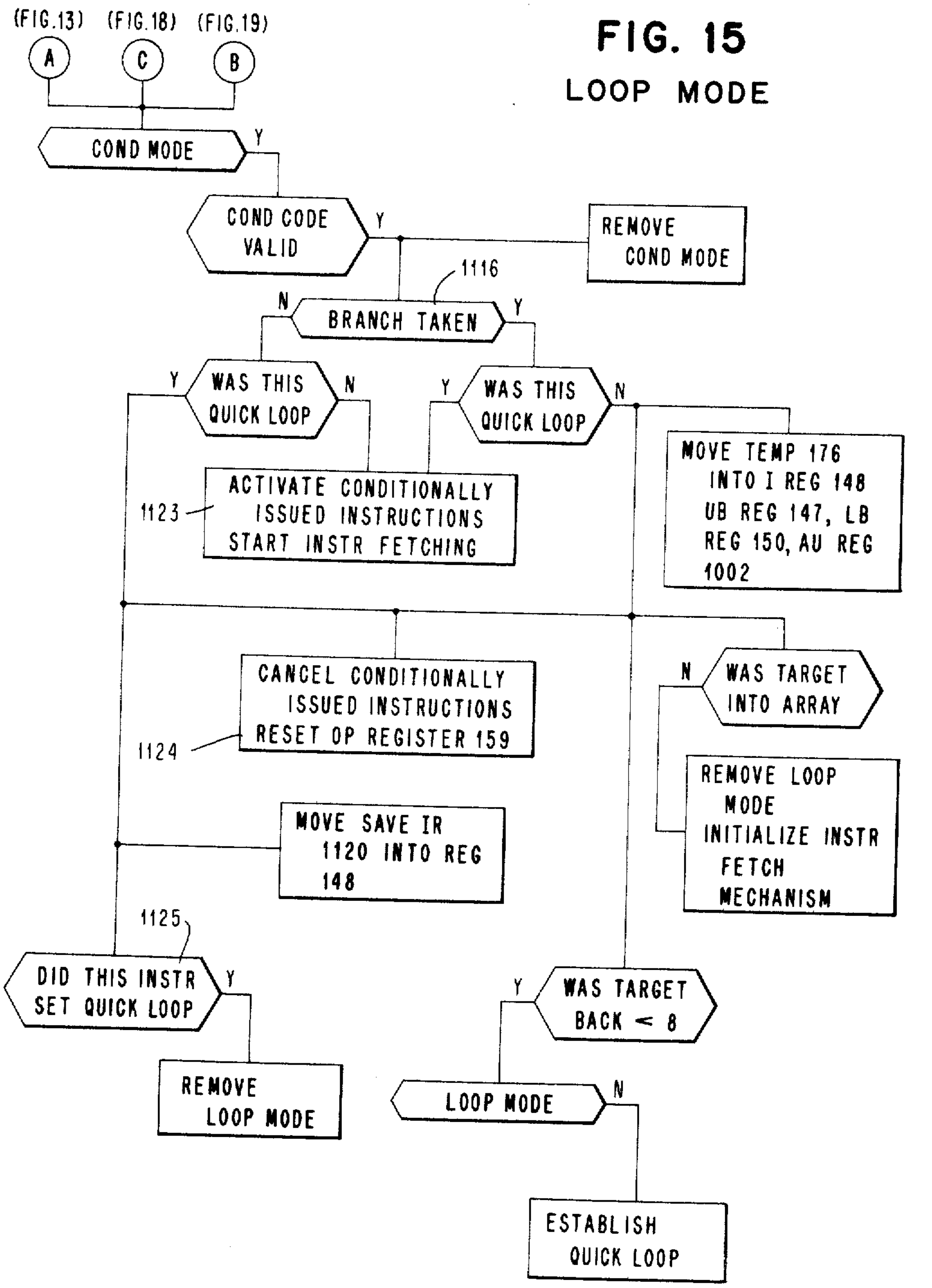

FIG. 15 is the flow chart for the Loop Mode setting of the Instruction Unit.

Figure 16:
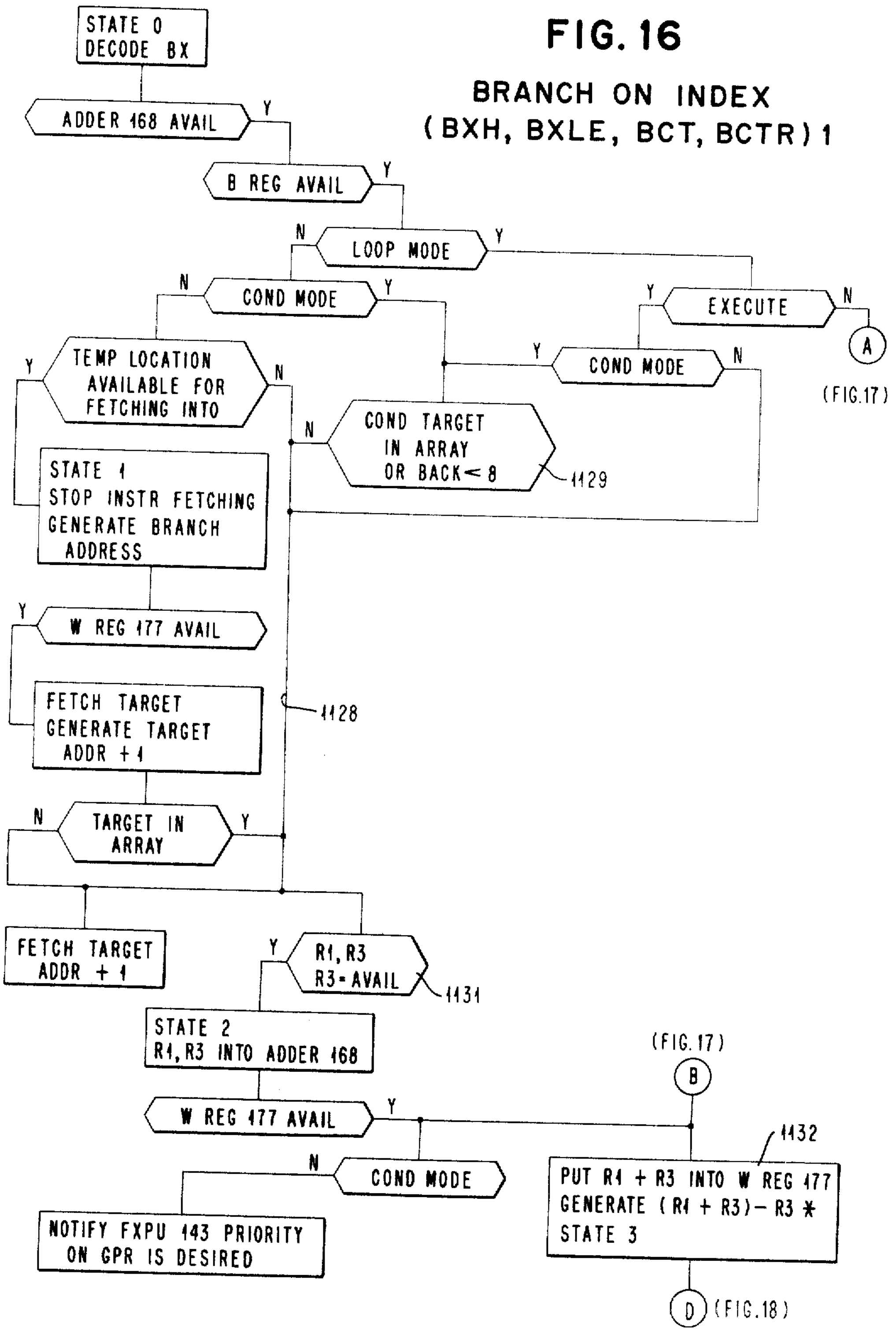
Figure 17:
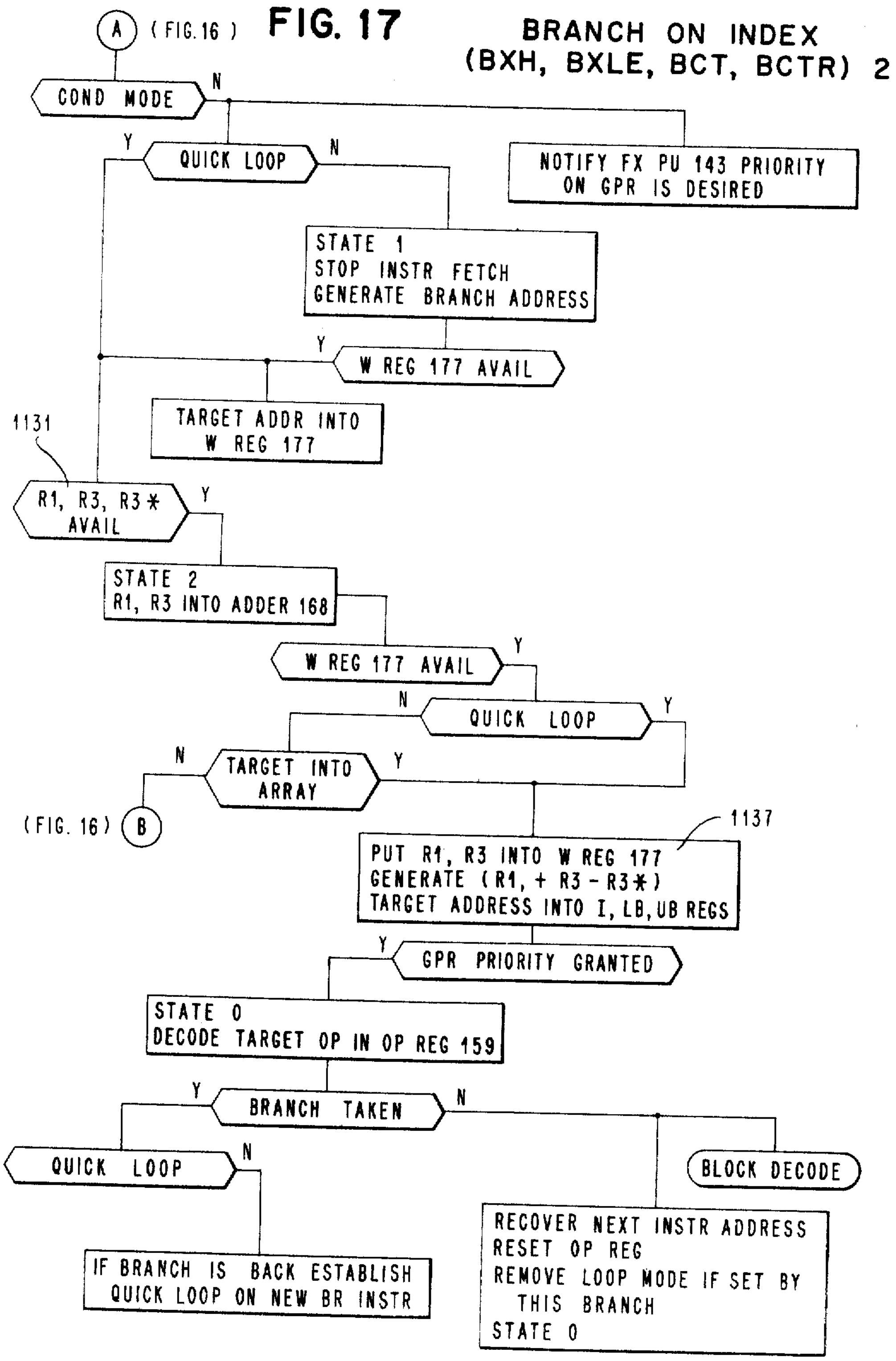
Figure 18:
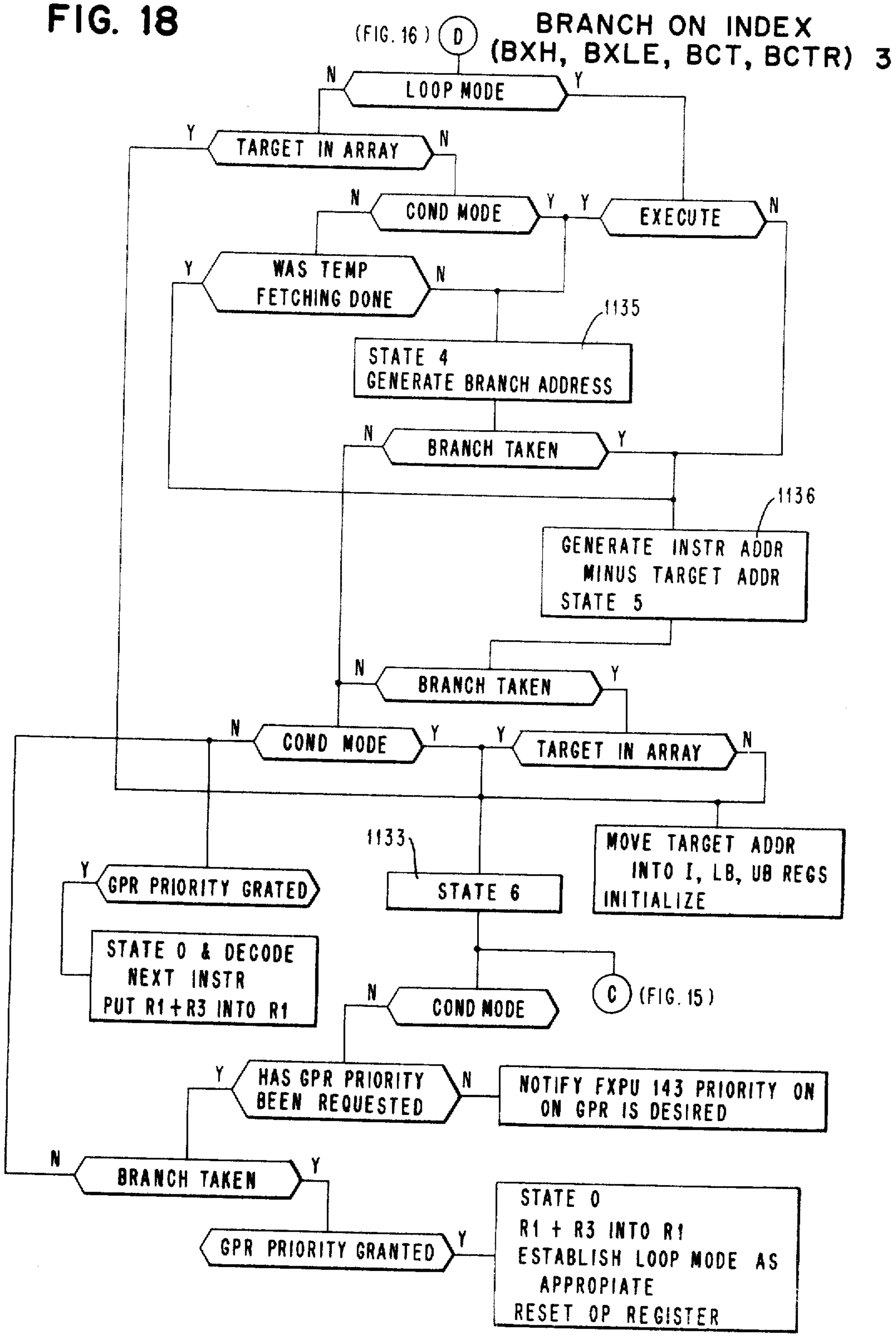

FIGS. 16, 17 and 18 are a flow chart for the sequence of Instruction Unit operations on a Branch On Index instruction.

Figure 19:
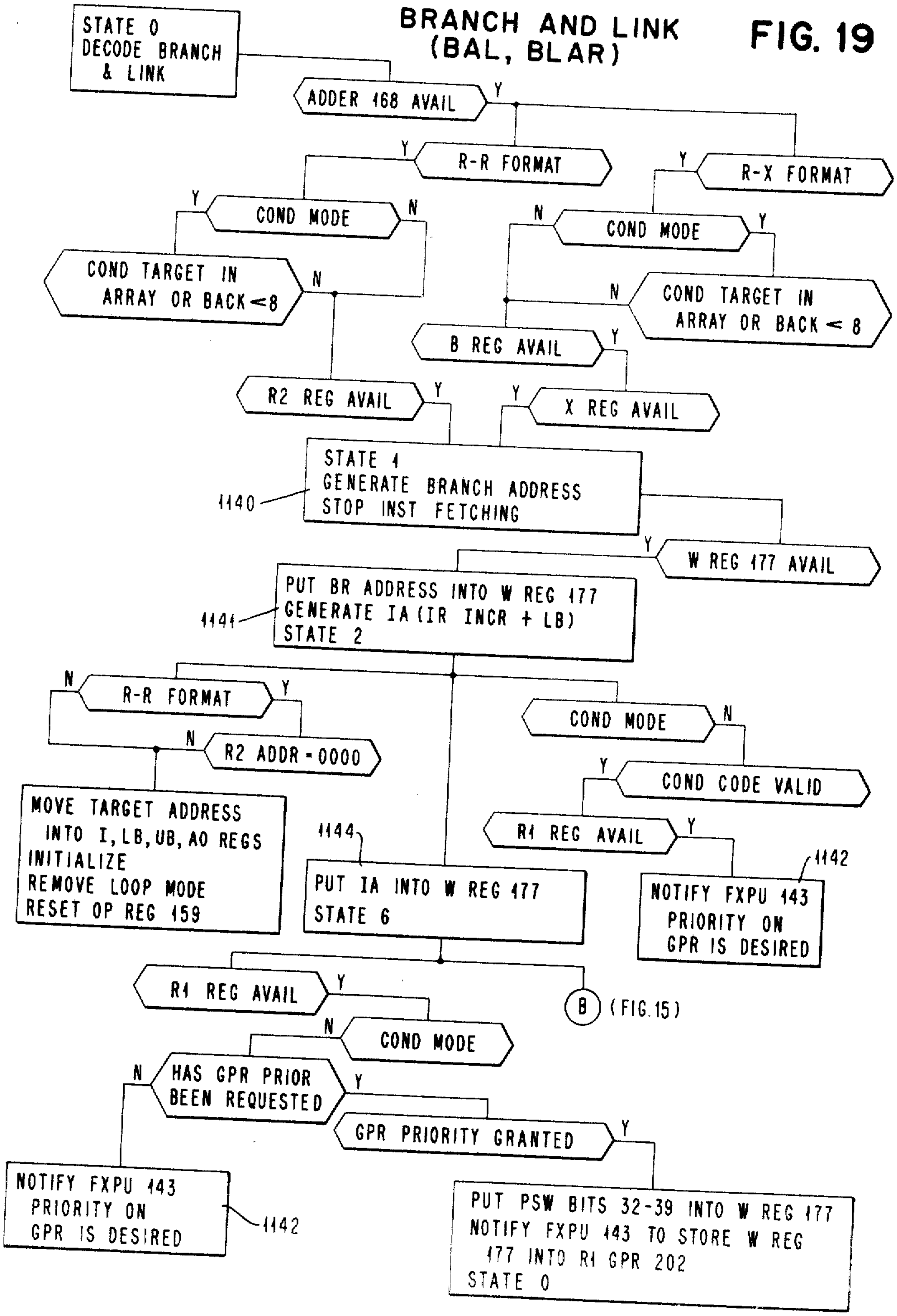

FIG. 19 is the flow chart for a Branch and Link instruction.

Figure 20:
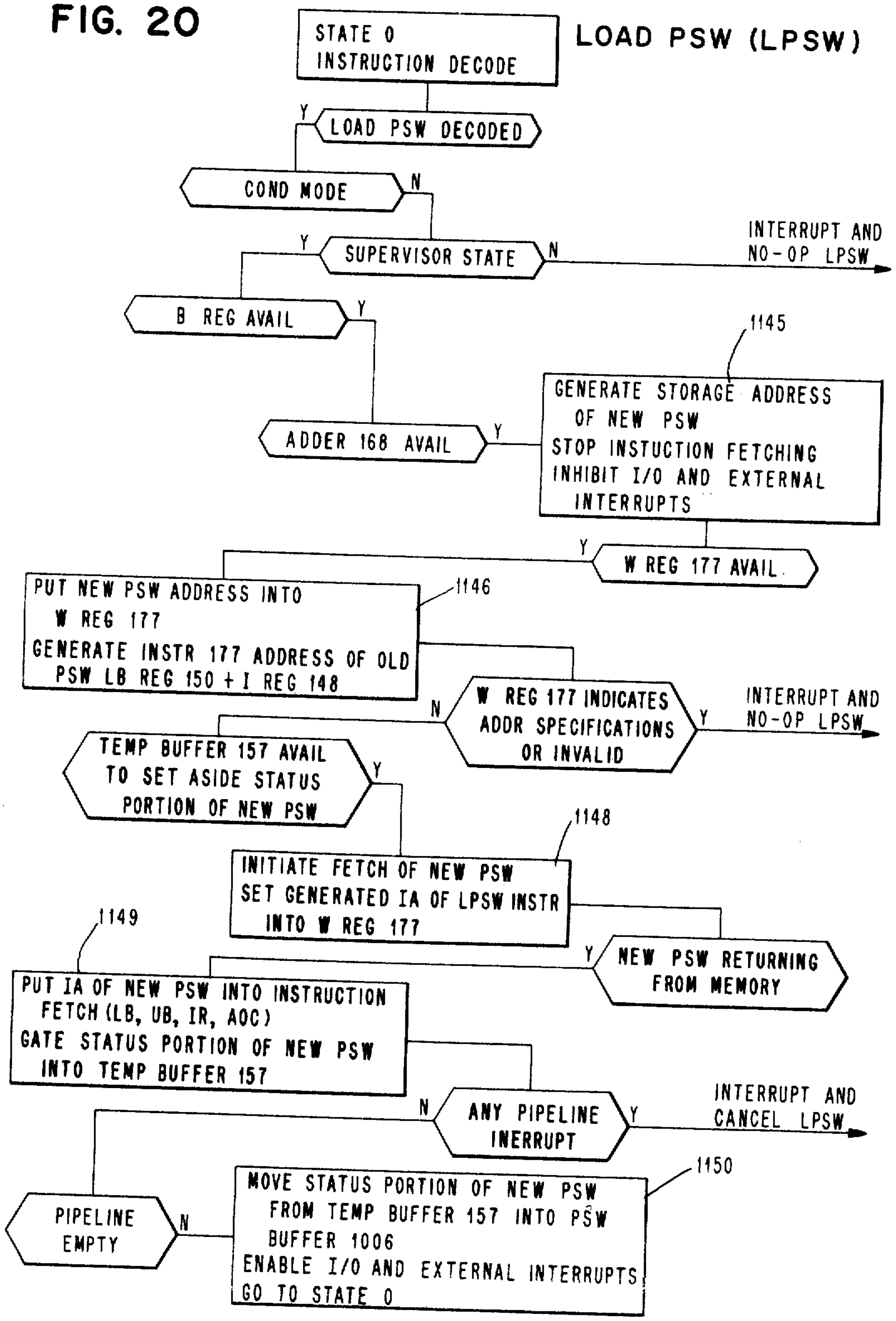

FIG. 20 is the flow chart for the Instruction Unit operations for the Load PSW instruction.

Figure 21:
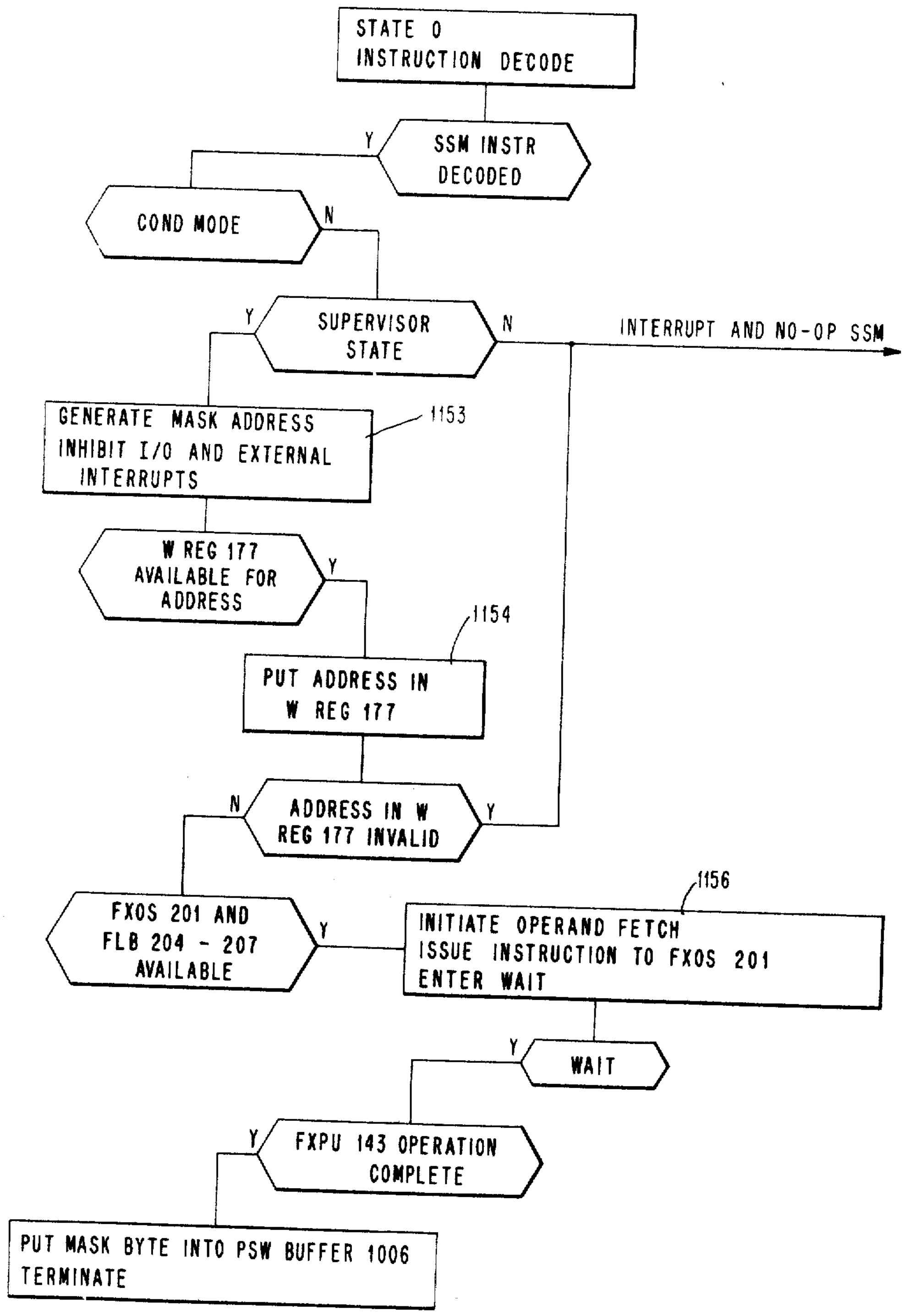

FIG. 21 shows the operations performed for the instruction Set System Mask.

Figure 22:
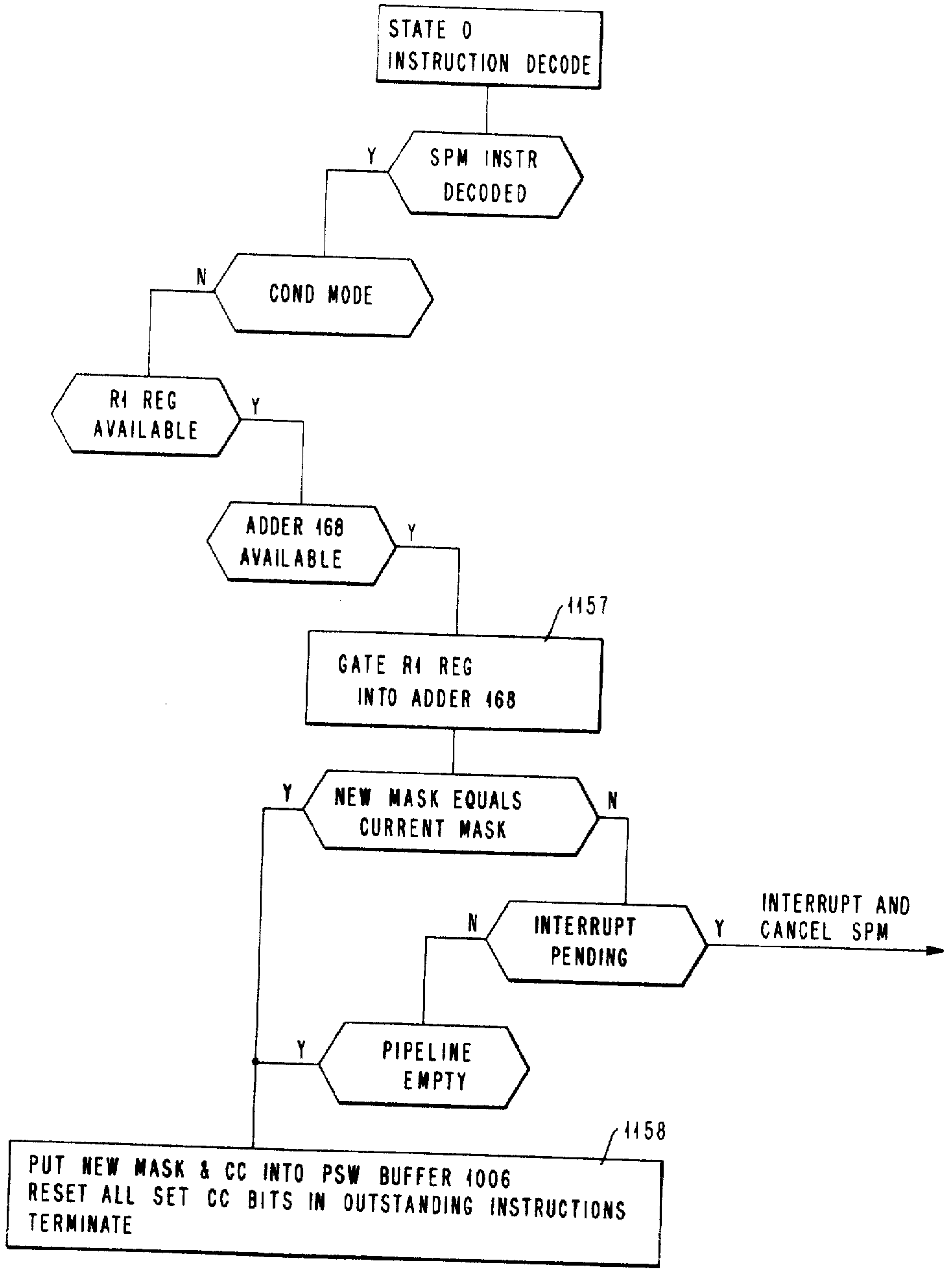

FIG. 22 is the flow chart of the operations need for the instruction Set Program Mask.

Figure 23:
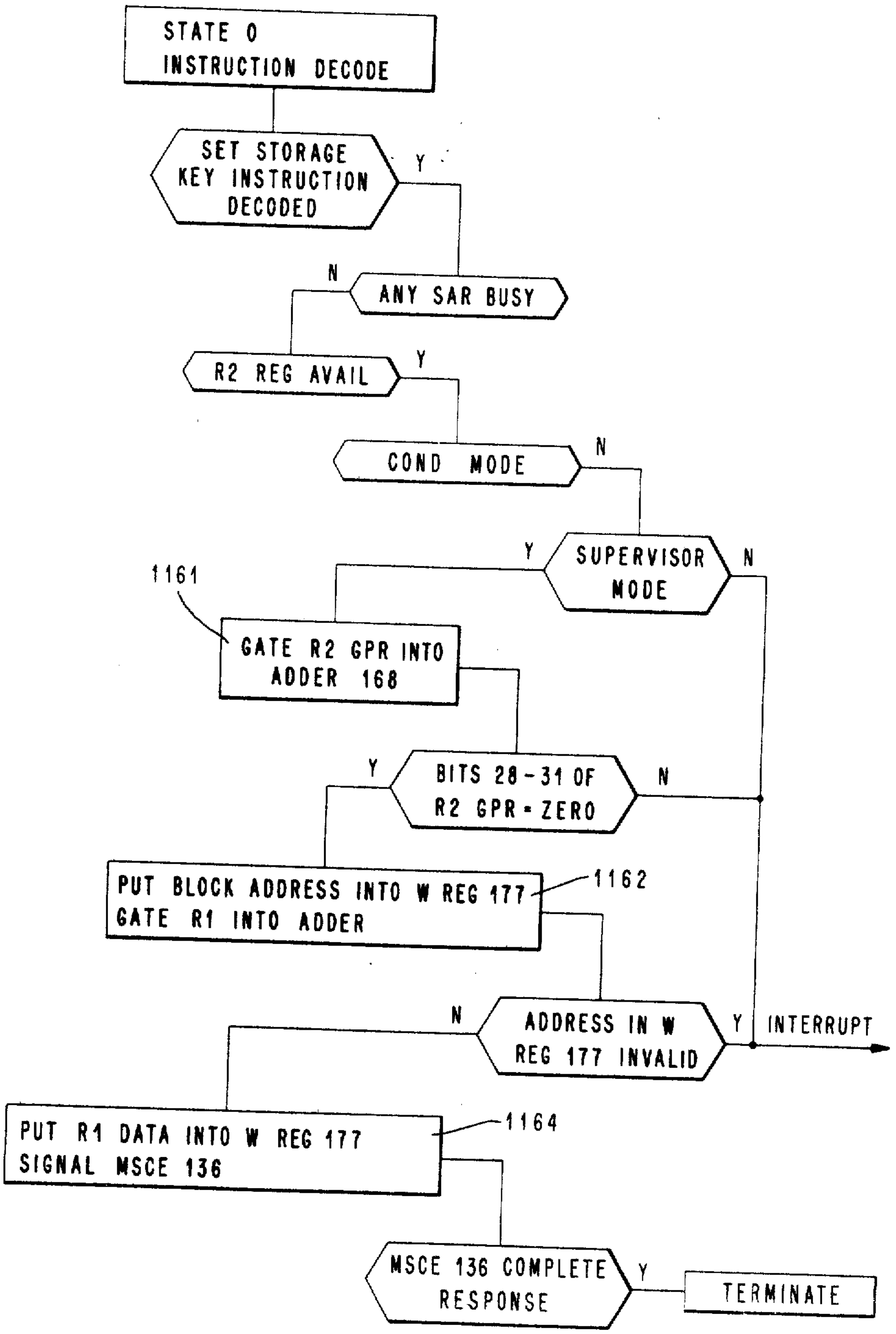

FIG. 23 is a flow chart for the Instruction Unit operations for the Set Storage Key instruction.

Figure 24:
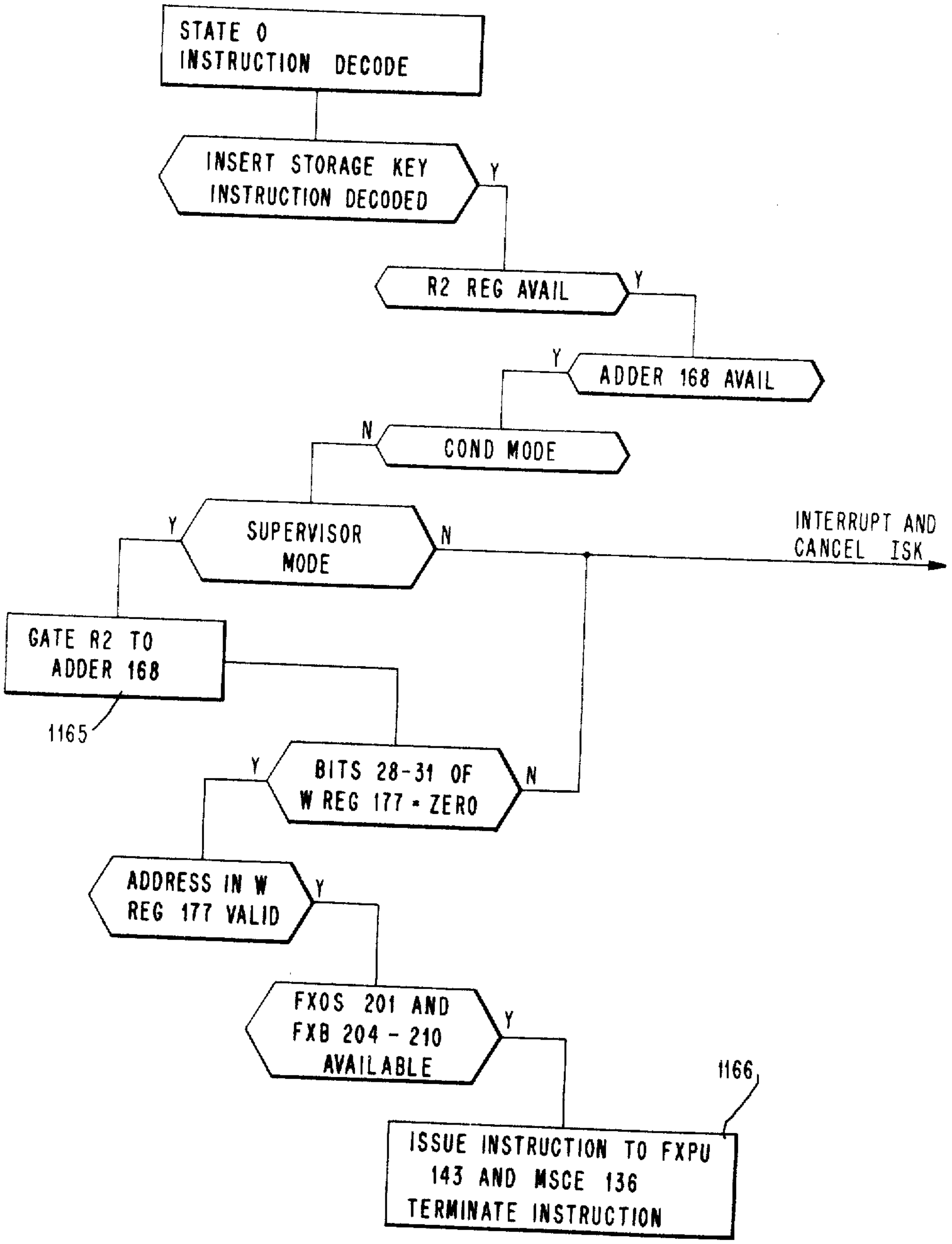

FIG. 24 is the chart of the operational sequence for the instruction Insert Storage Key.

Figure 25:
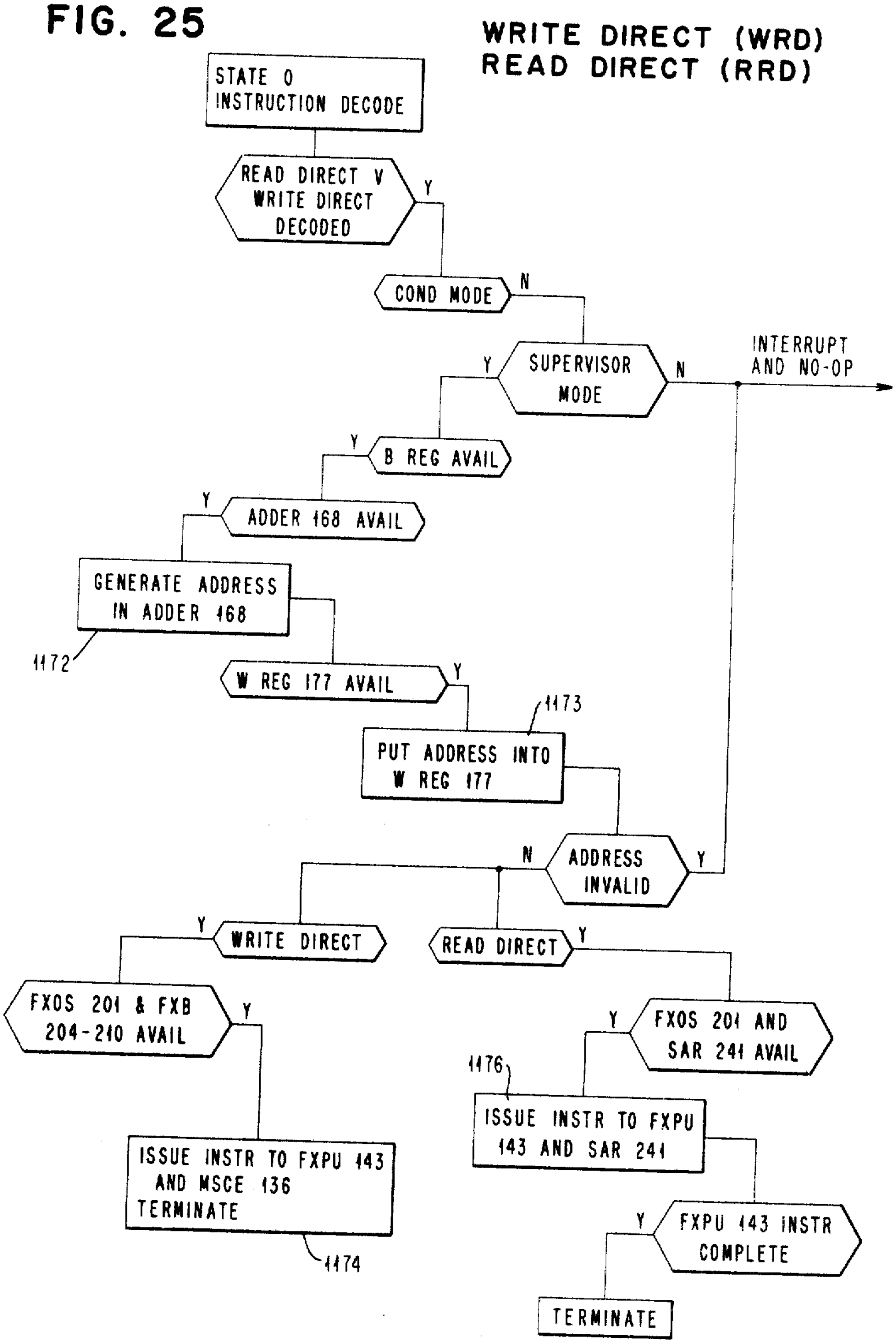

FIG. 25 is a combined flow chart for the two instructions Write Direct and Read Direct.

Figure 26:
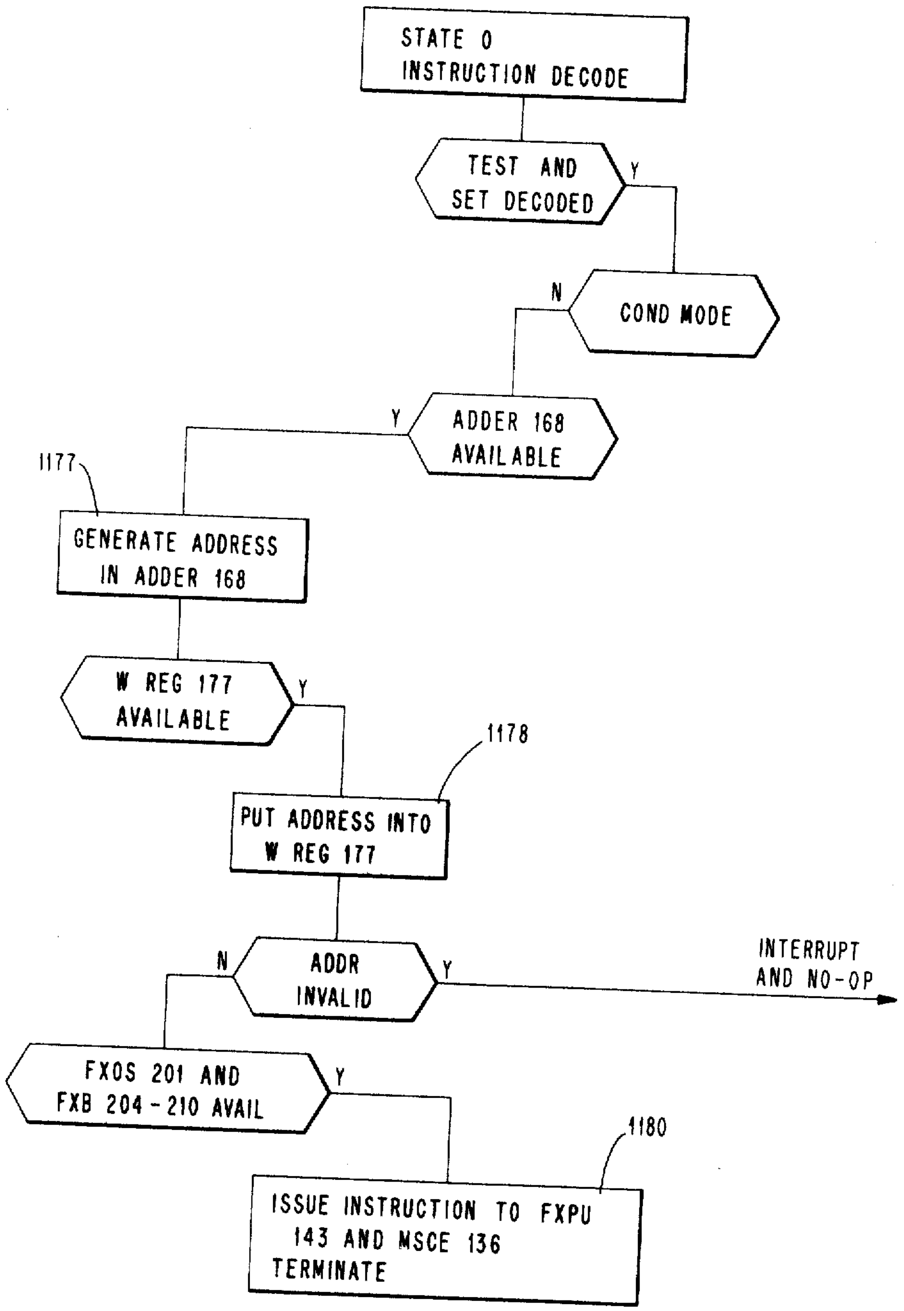

FIG. 26 shows the sequence of operations for the instruction Test and Set.

Figure 27:
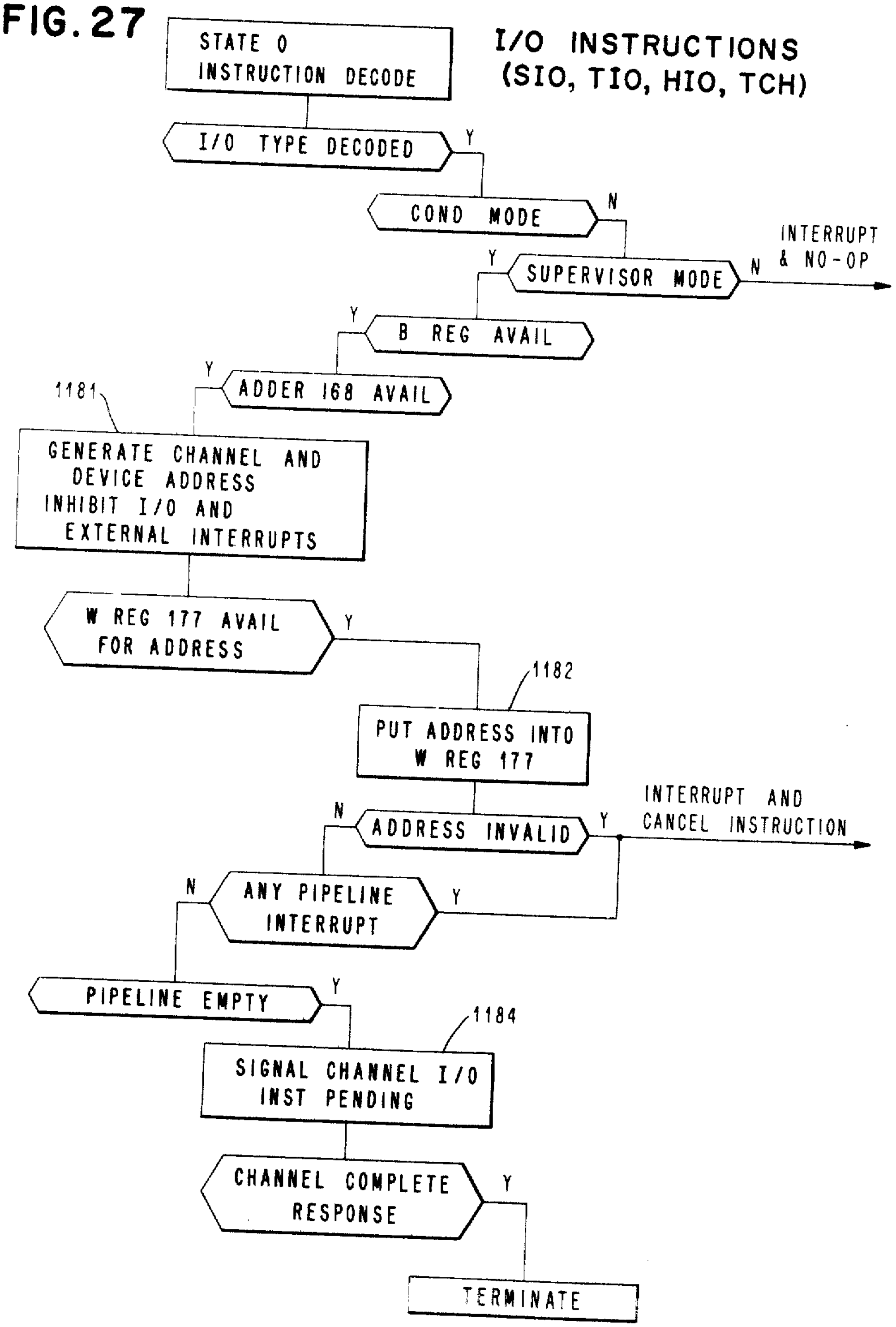

FIG. 27 is a combined flow chart for the Input/Output (I/O) instructions Start I/O, Test I/O, Halt I/O and Test Channel.

Figure 28:
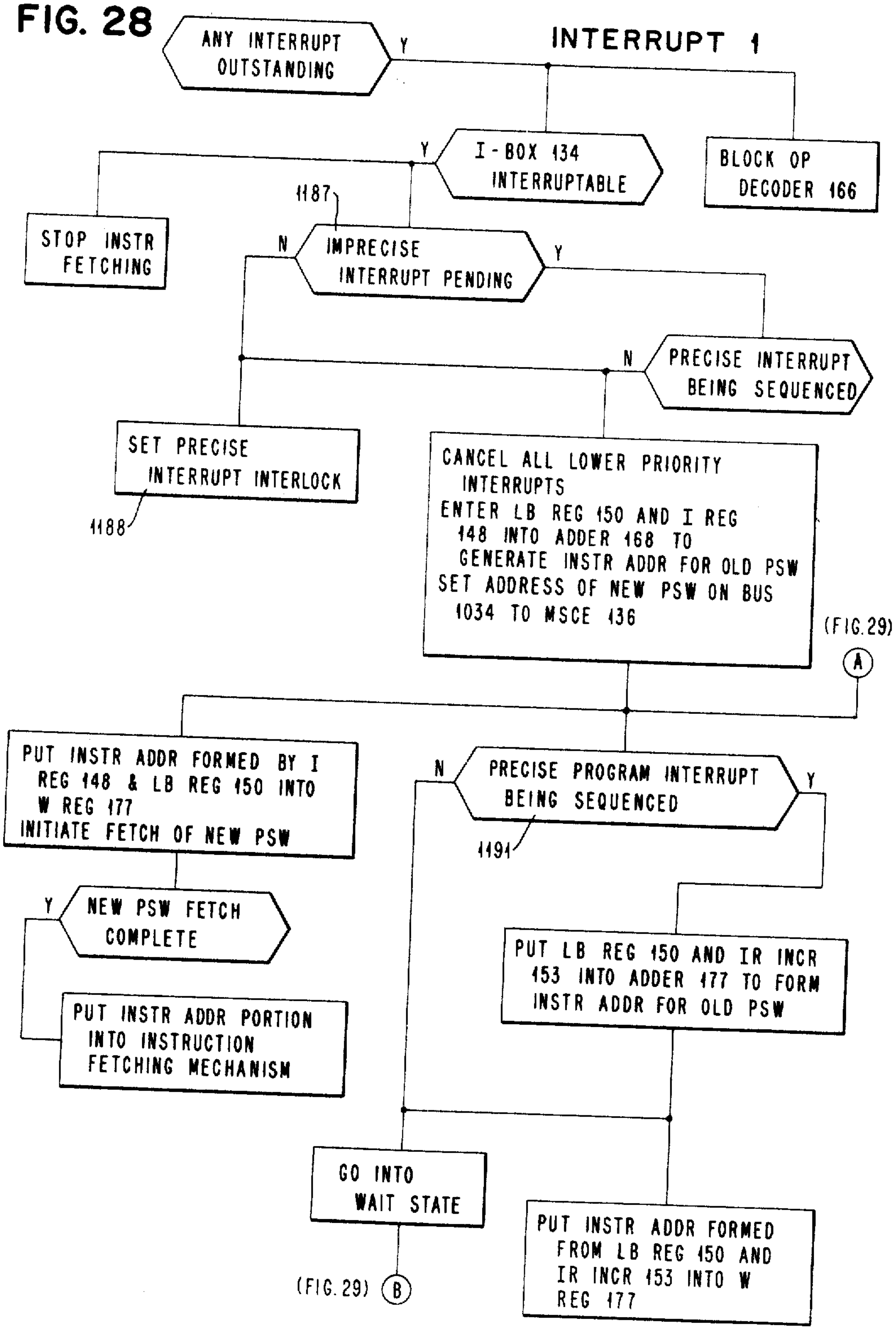
Figure 29:
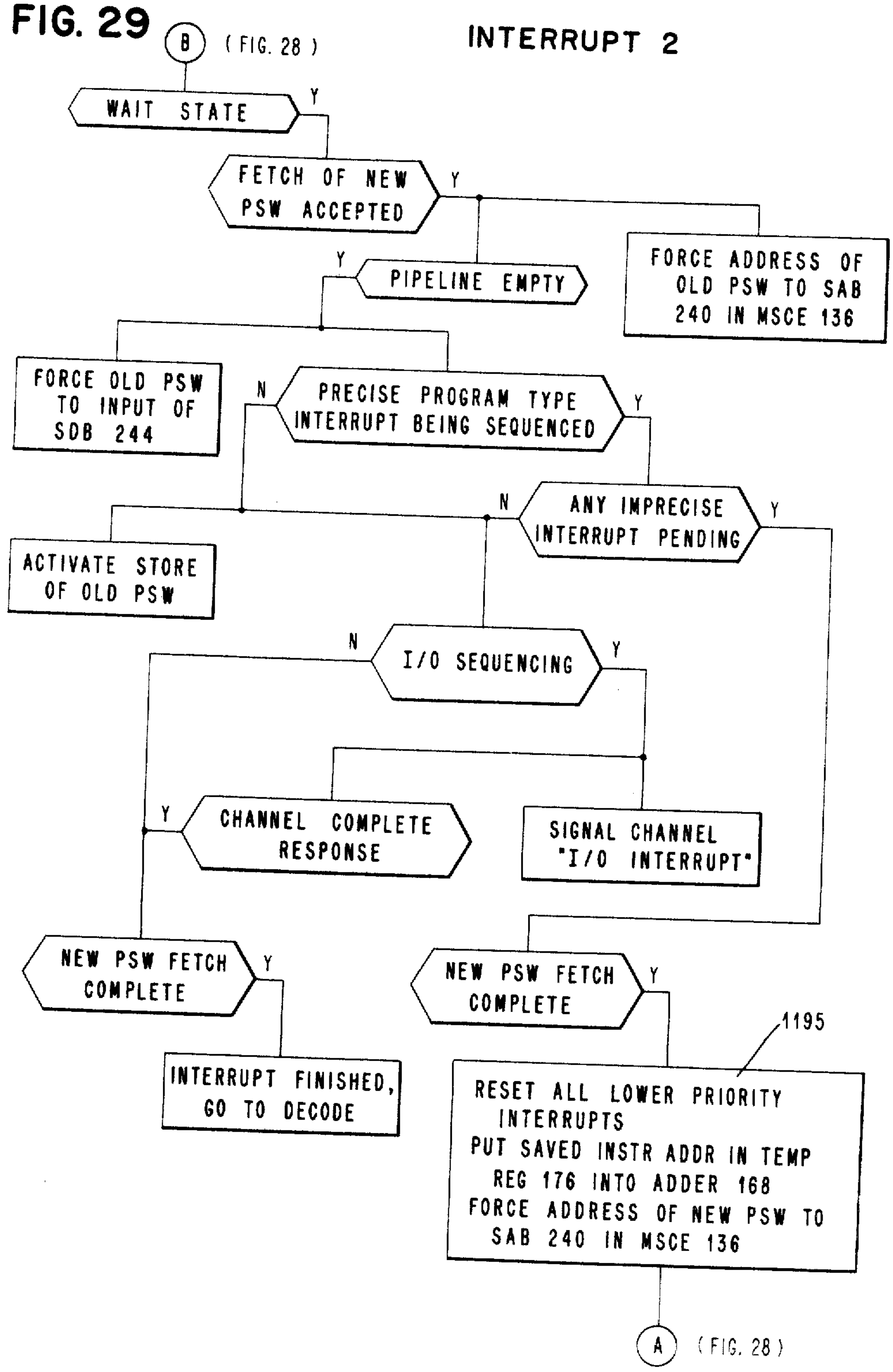

FIGS. 28 and 29 together form a flow chart of the Instruction Unit operations in response to an Interrupt.

Figure 30B:
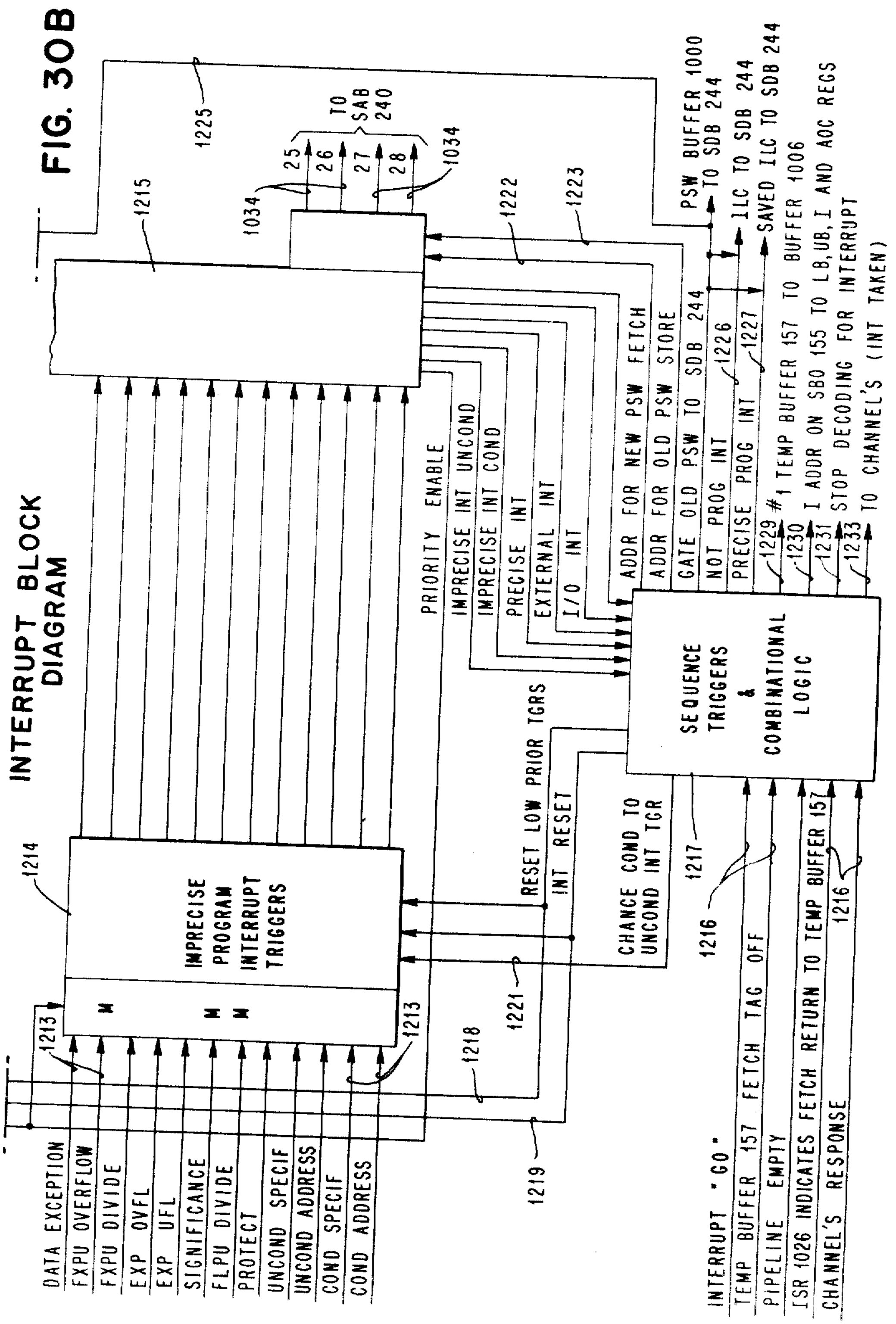

FIGS. 30A and 30B are a diagram of the connections between the functional elements used to control interrupt processing.

Figure 31:
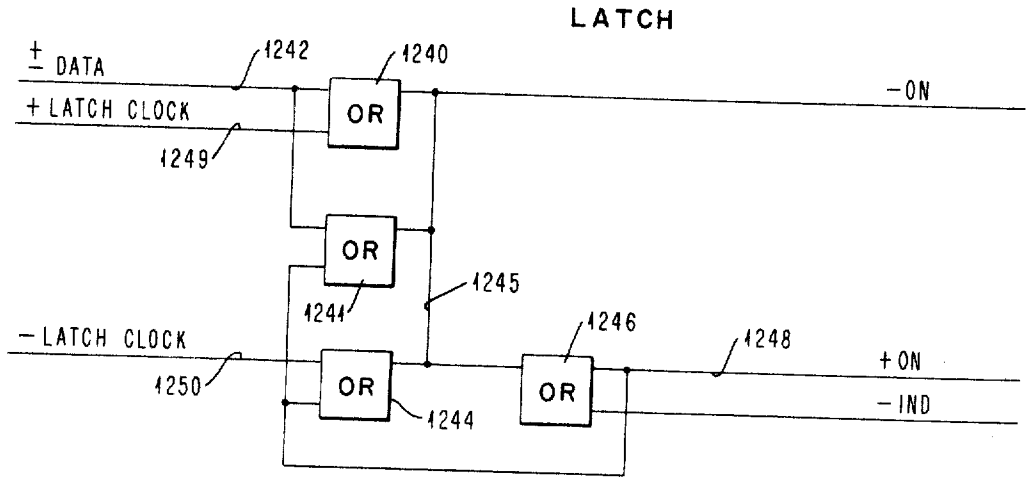

FIG. 31 is a connection diagram of a latch circuit.

Figure 32:
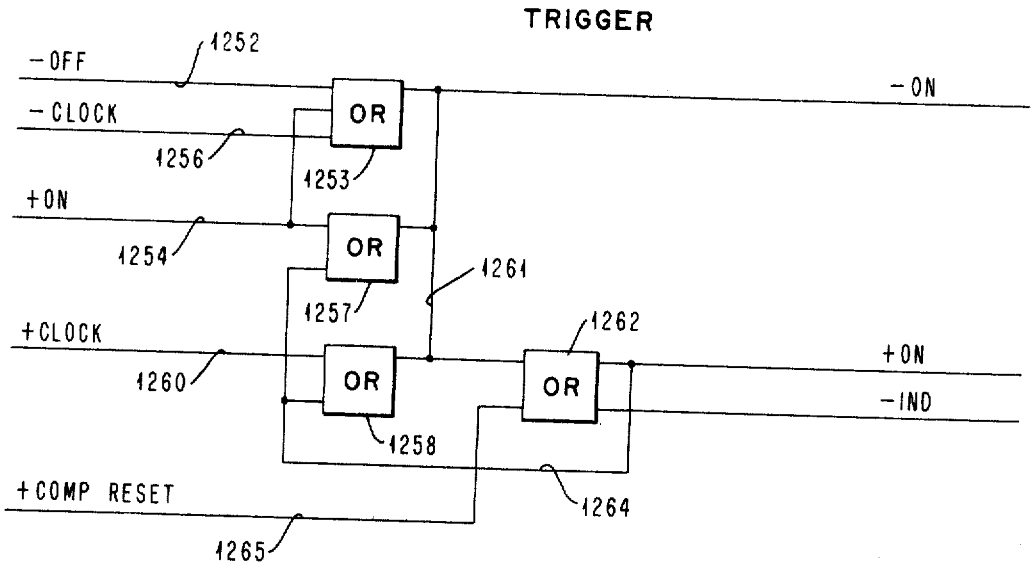

FIG. 32 is a connection diagram of a trigger circuit.

Figure 33A:
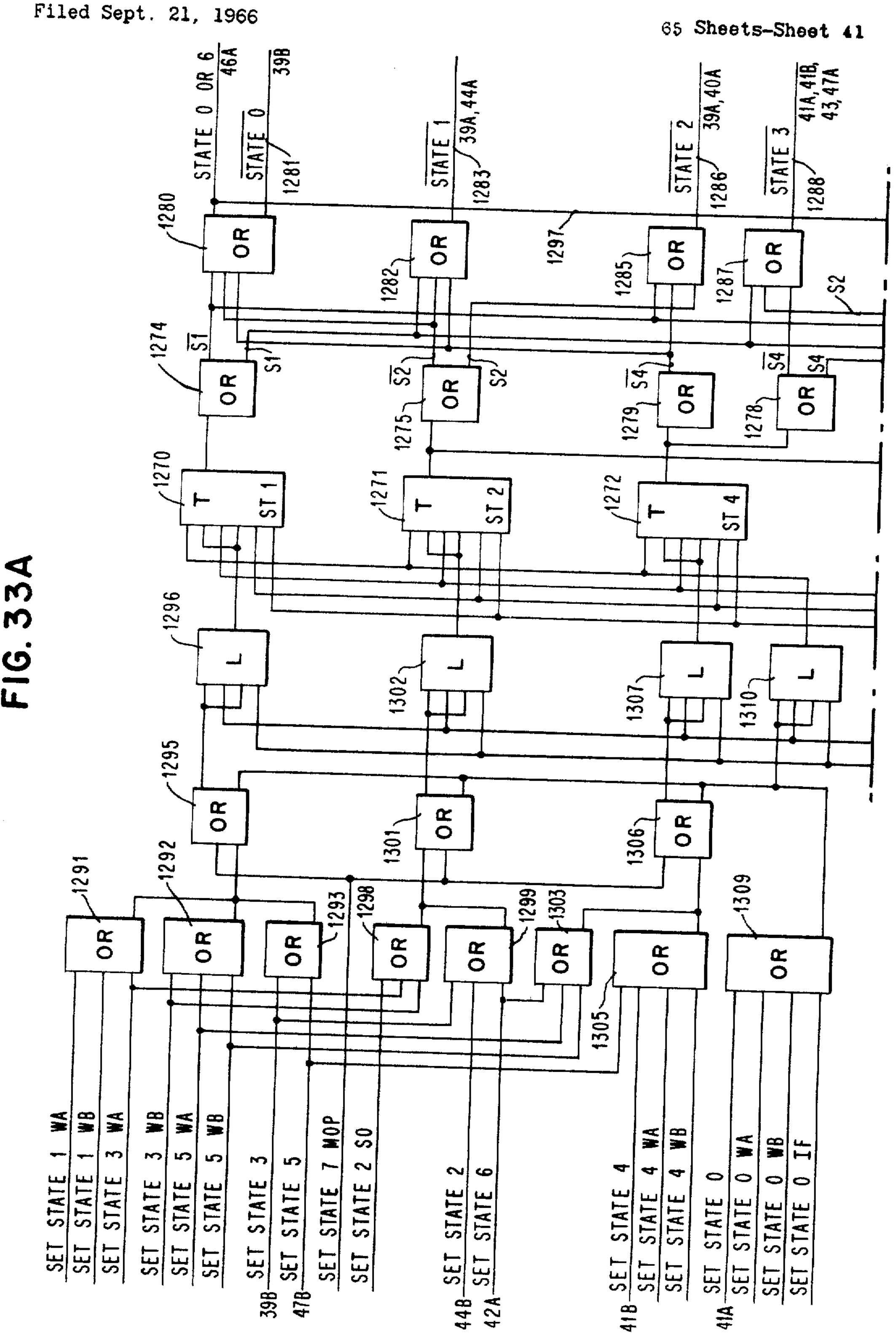
Figure 33B:
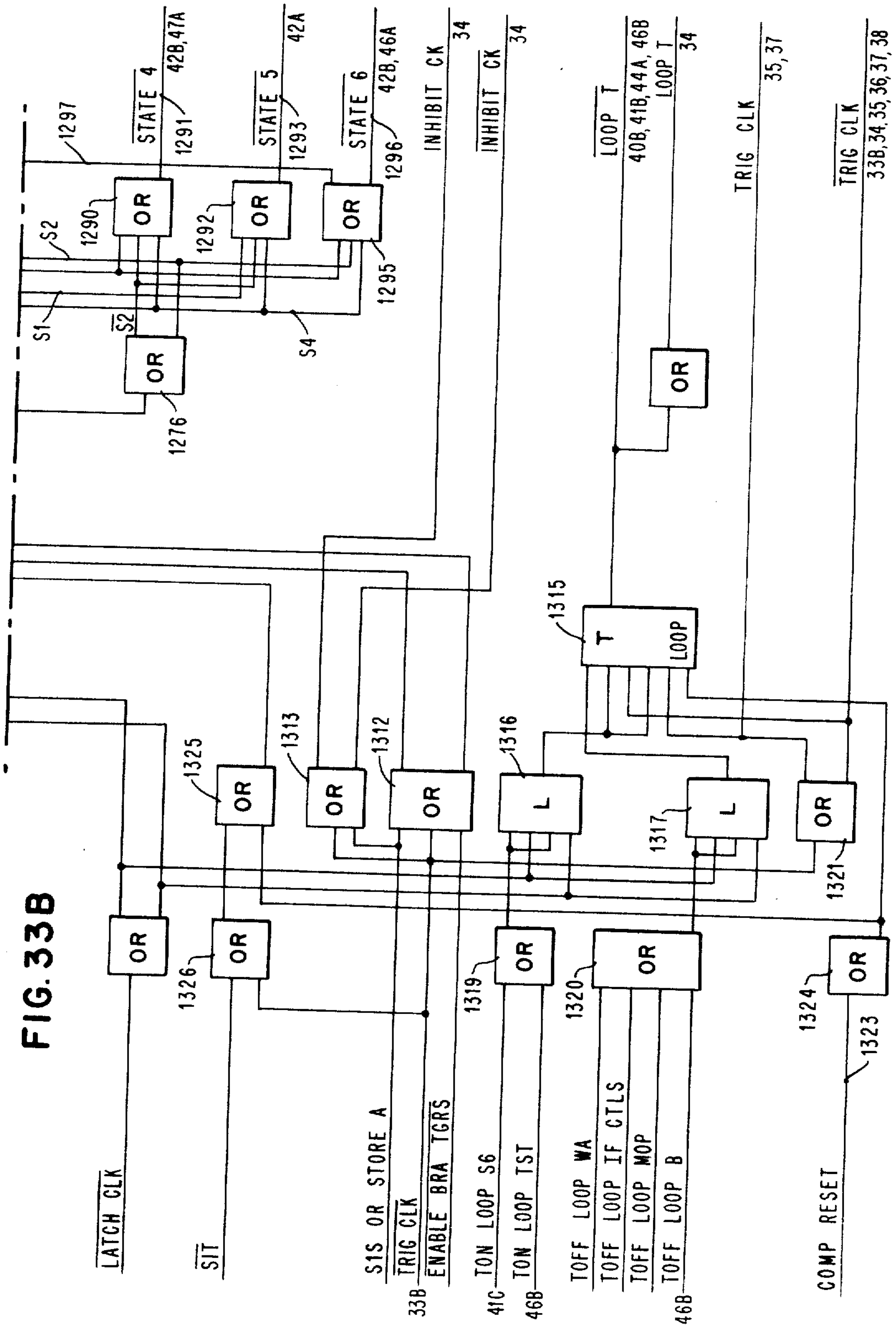

FIGS. 33A and 33B are detail diagrams of the state triggers and their control circuits.

Figure 34:
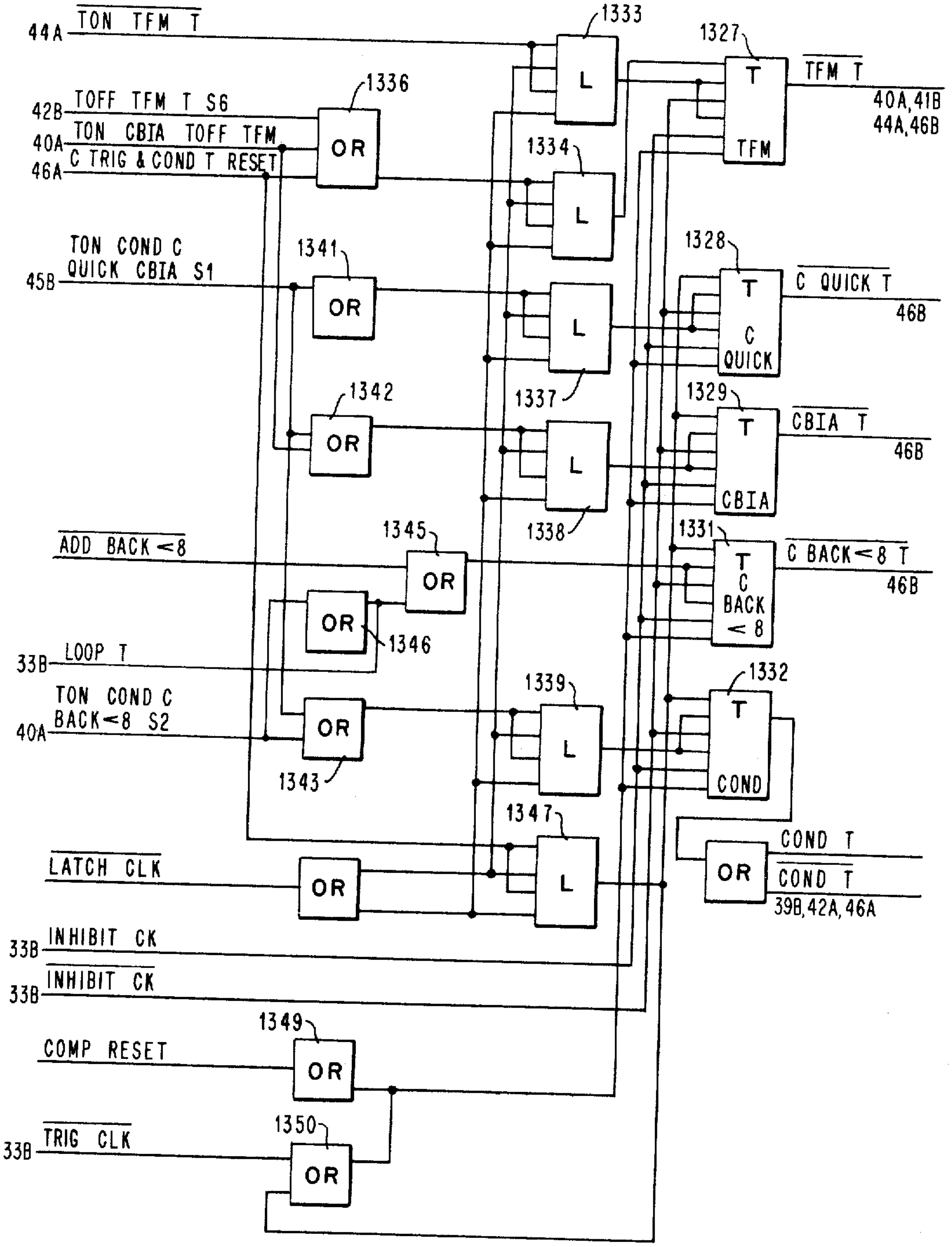

FIG. 34 is a diagram of the circuit connections and controls for the triggers for the Conditional mode .

Figure 35:
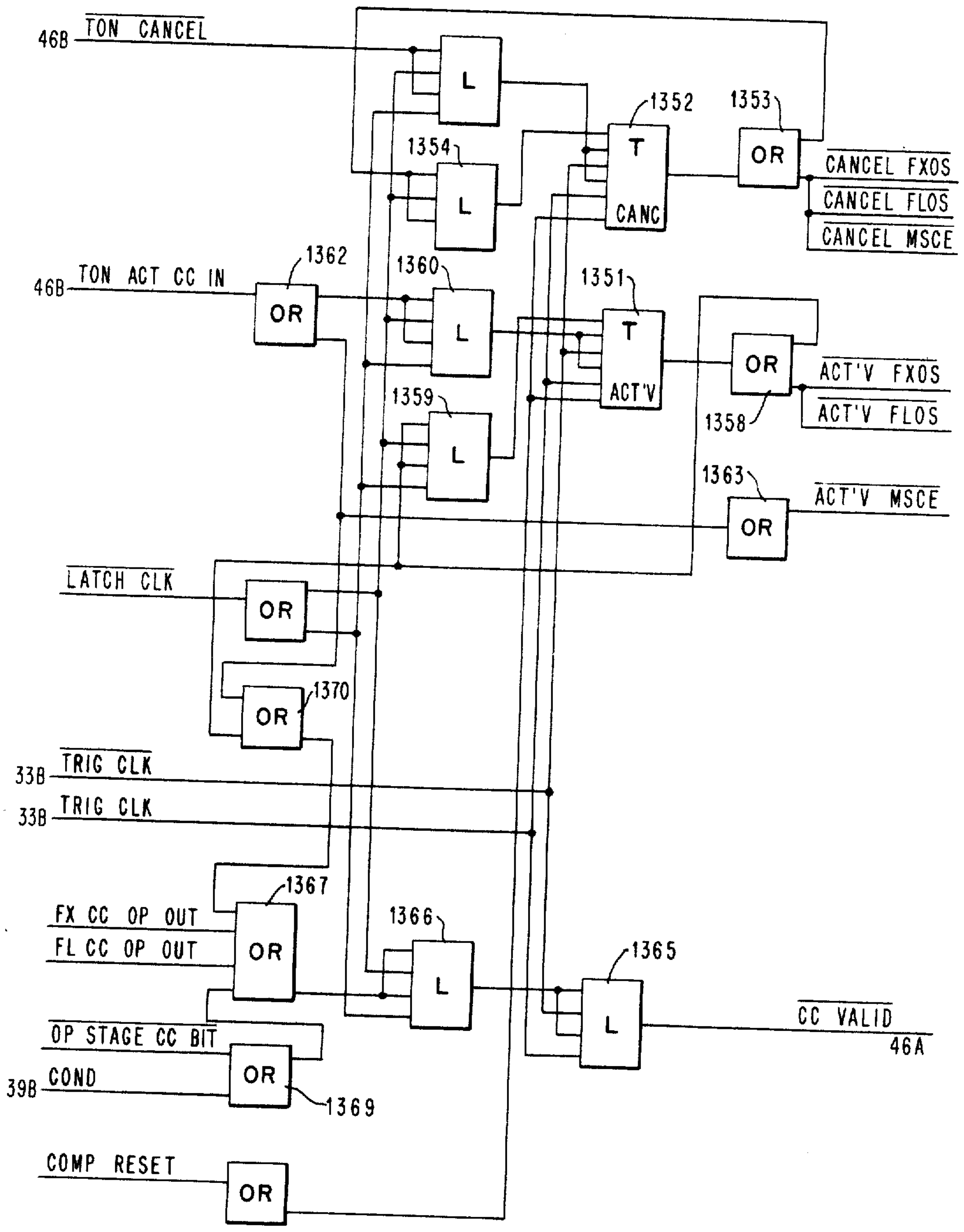

FIG. 35 is a circuit diagram of the condition code controlled cancel and activate triggers.

Figure 36:
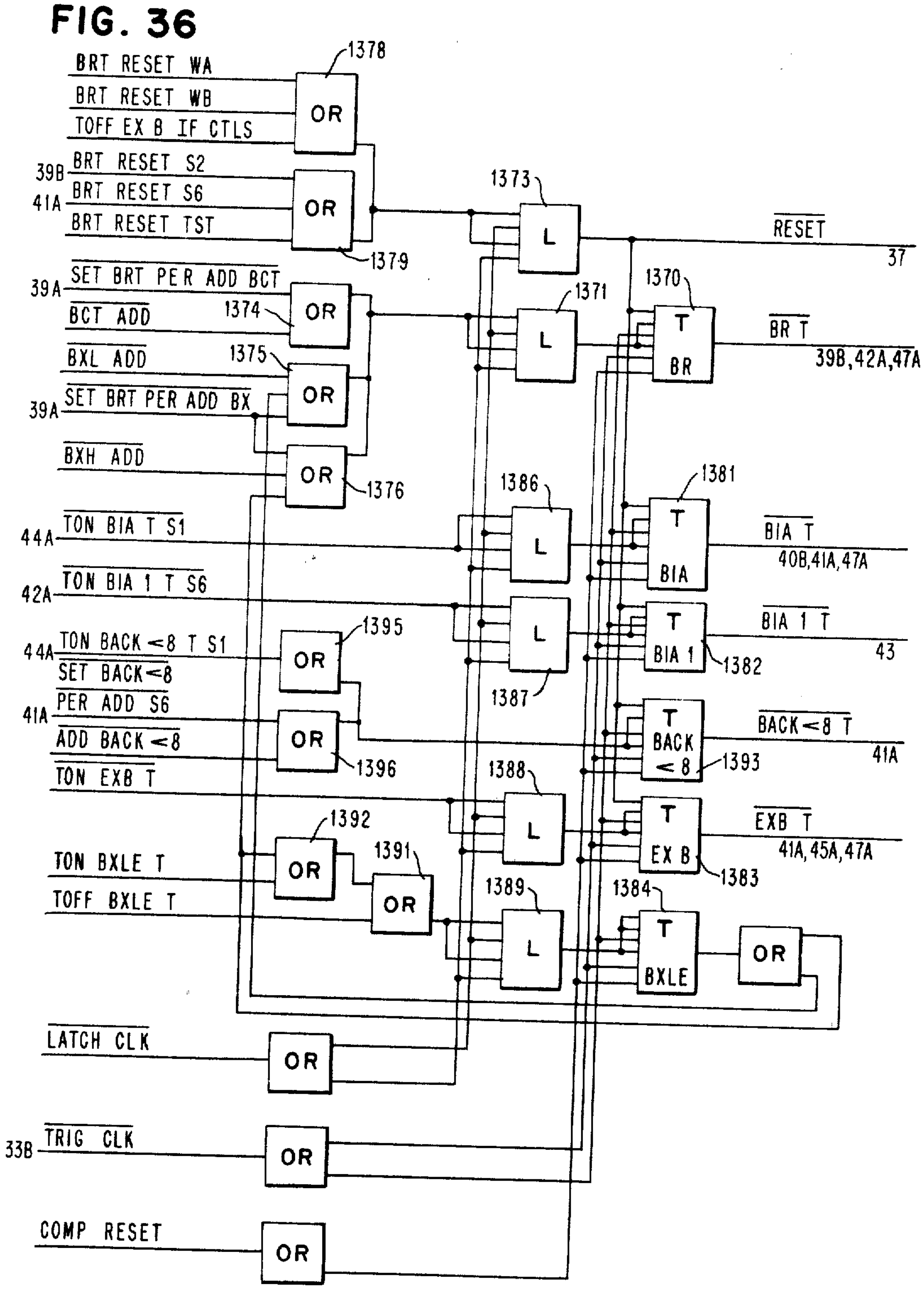

FIG. 36 shows the control circuits for the branch identifying triggers.

Figure 37:
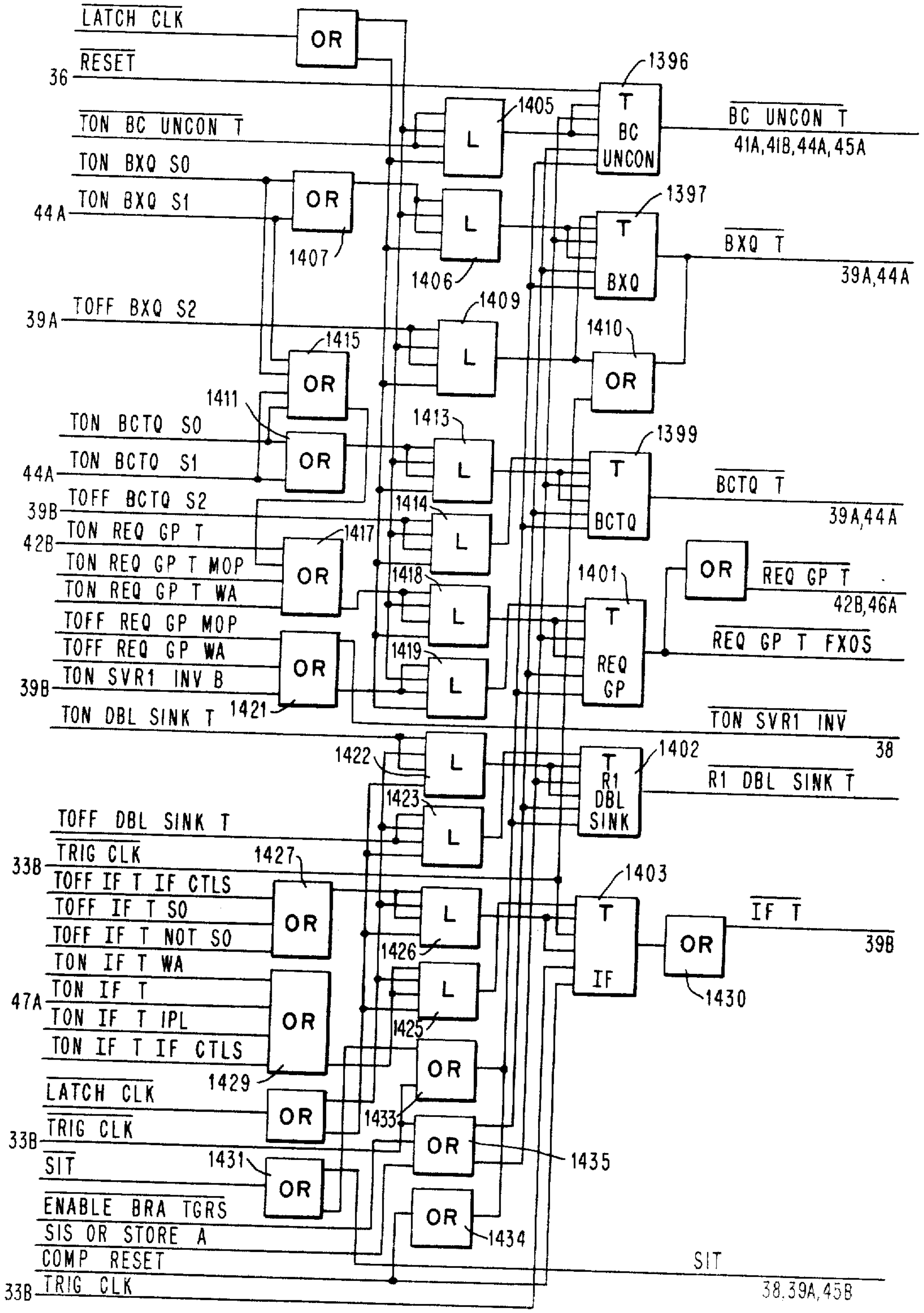

FIG. 37 shows the controls for miscellaneous status triggers.

Figure 38:
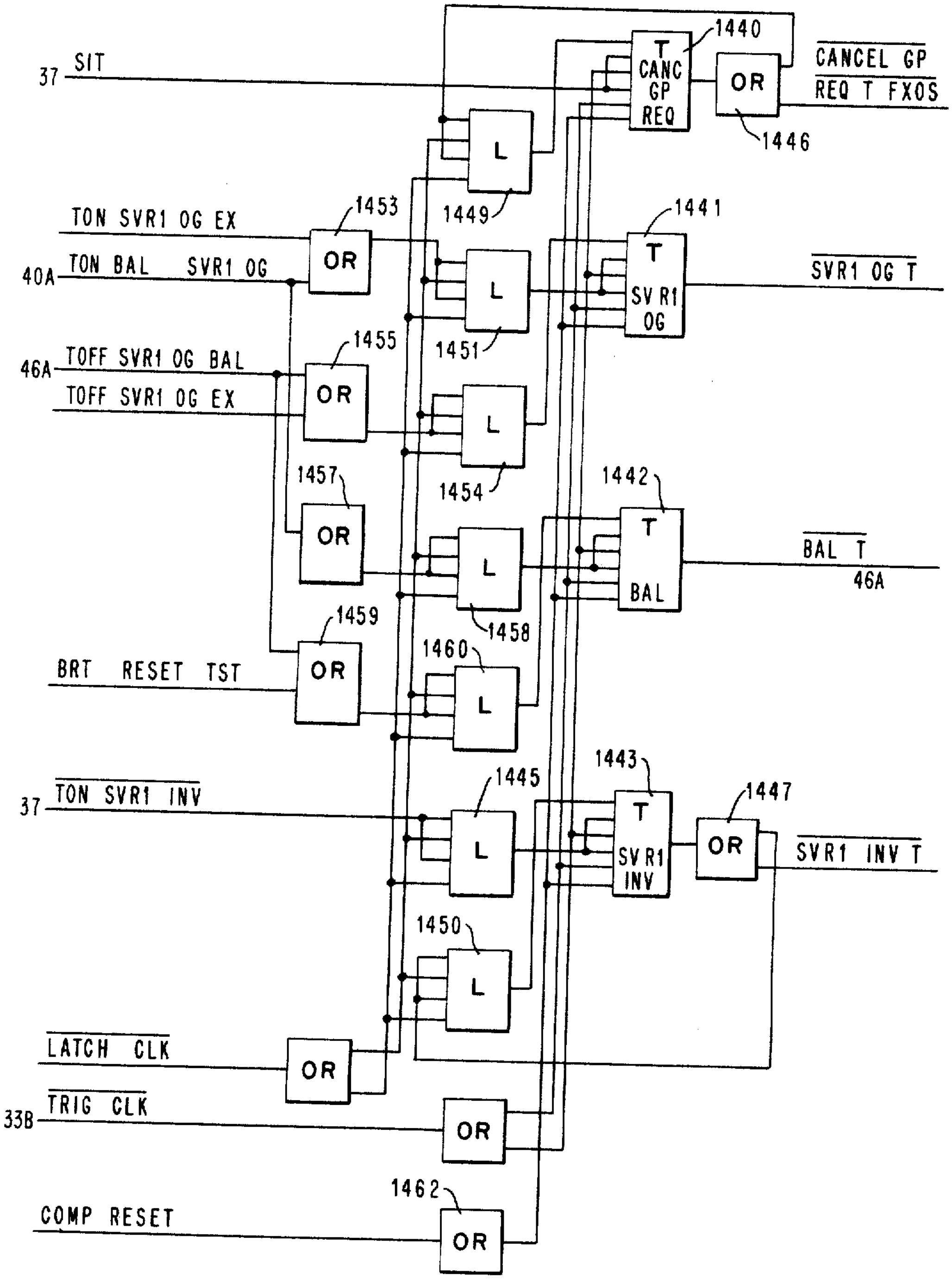

FIG. 38 shows additional miscellaneous triggers and their control circuits.

Figure 39A:
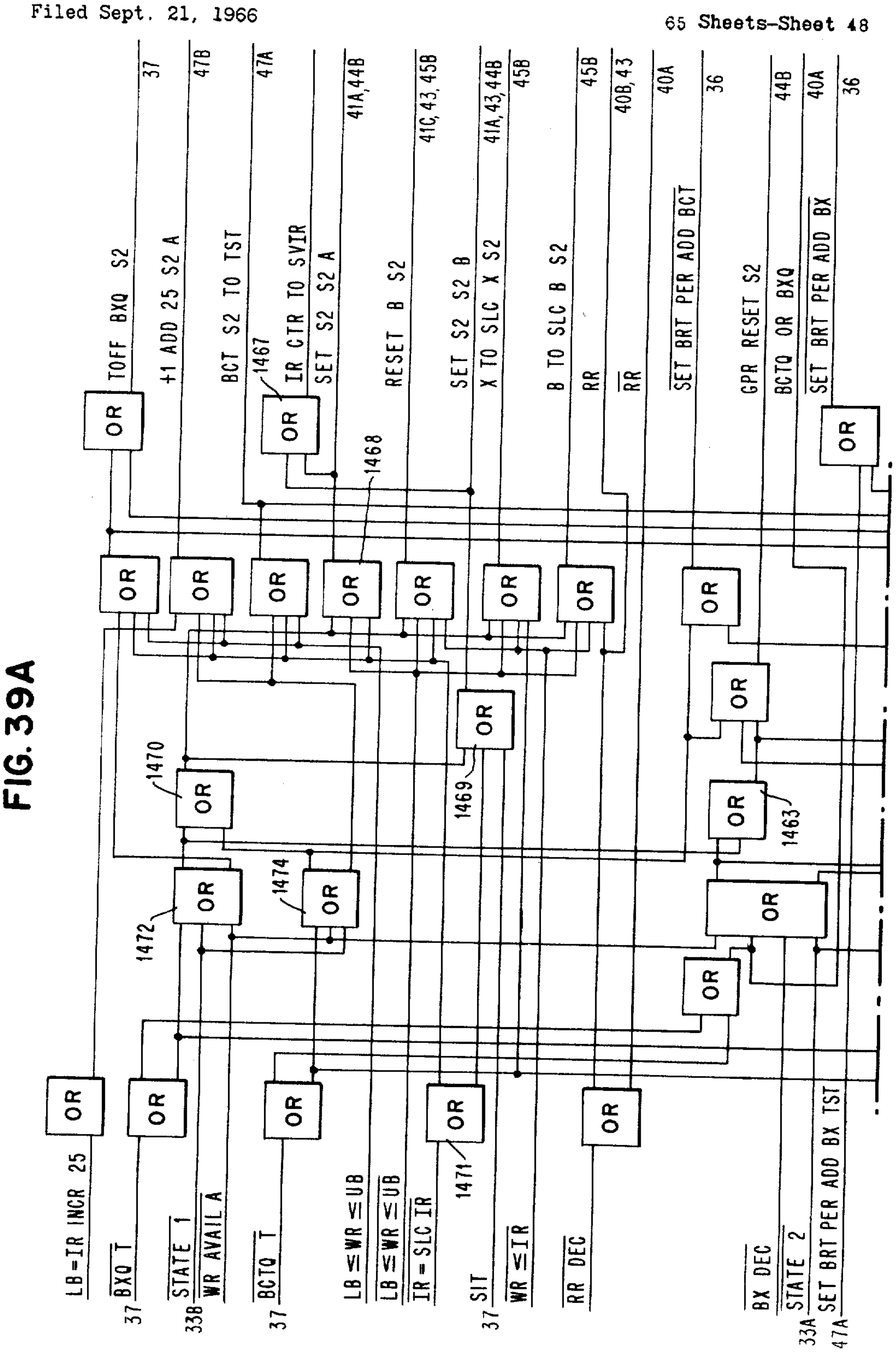
Figure 39B:
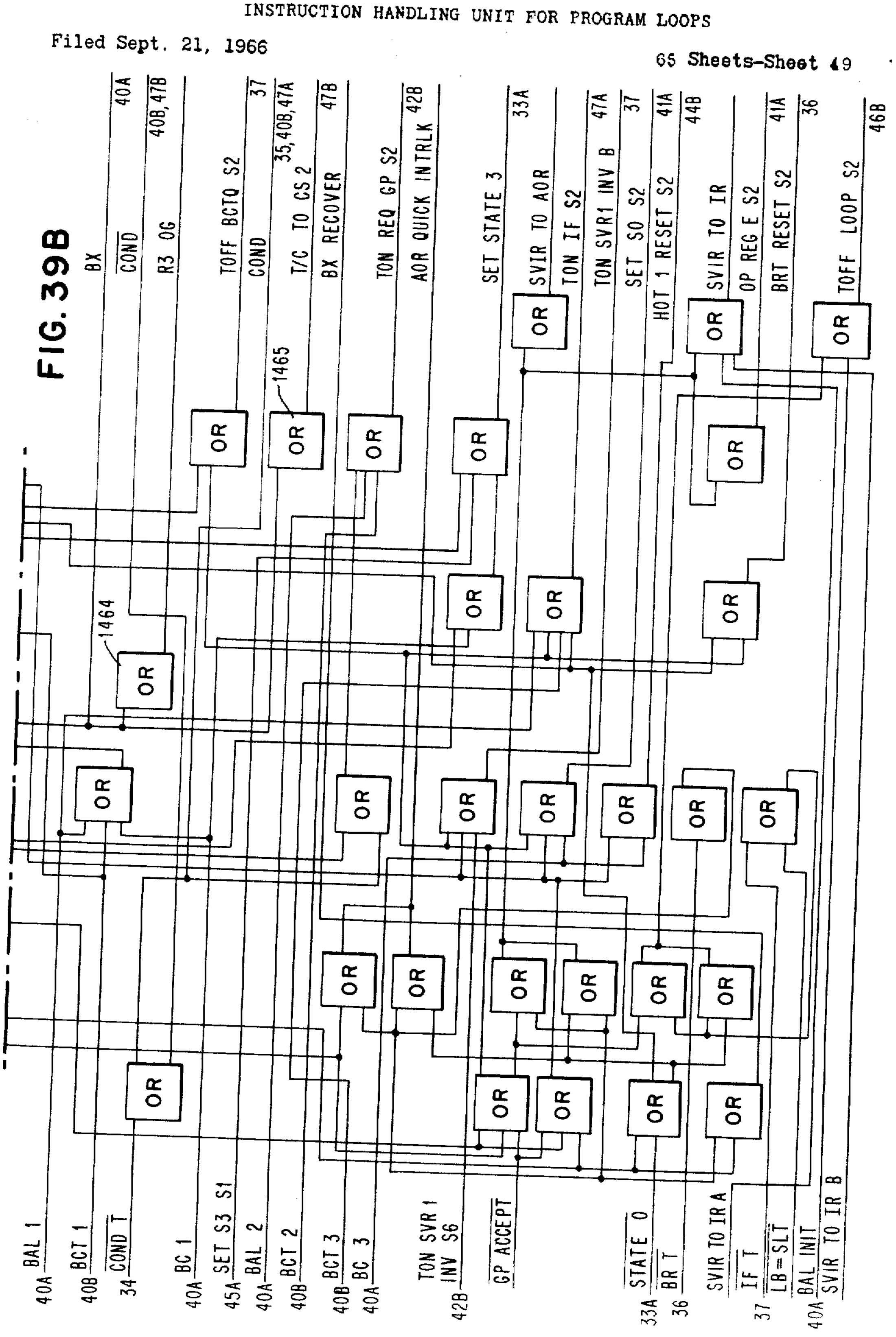

FIGS. 39A and 39B show a number of control circuits used during the S2 state and for quick loop branches.

Figure 40A:
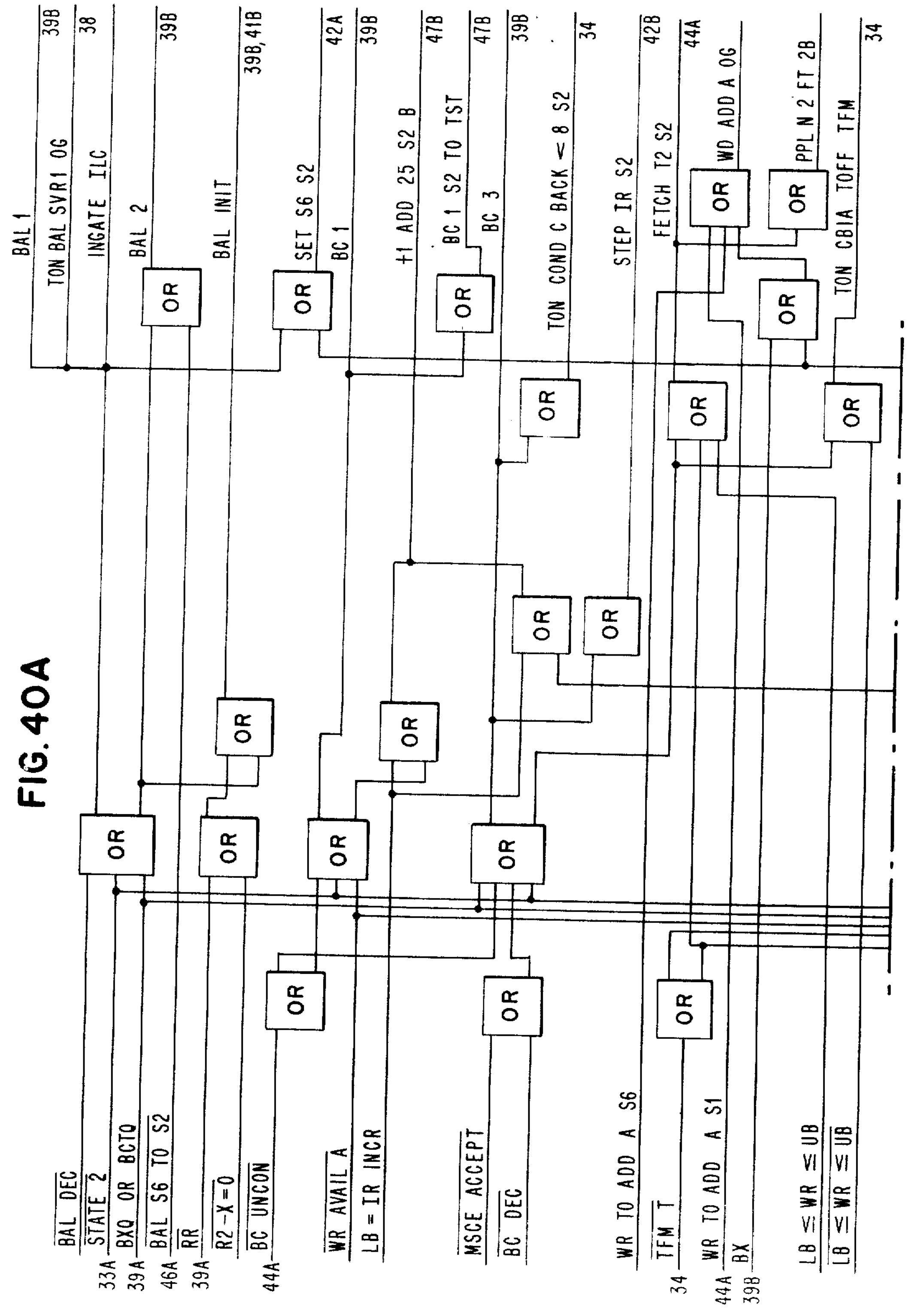

FIGS. 40A and B show additional circuits for the S2 state and quick branches.

FIGS. 41A, 41B, 41C, 42A, 42B and 43 together show a group of circuits for the States 3 and 4 Branch on Condition instruction, and for States 5 and 6 of the Branch on Index and Branch on Count instructions.

FIGS. 44A, 44B, 45A and 45B show a plurality of interconnected circuits for control during the S1 state of the instructions.

FIGS. 46A, 46B, 47A and 47B show the circuits for the Branch Test, Branch and Link State 6, Branch on Index States 3 and 4, and Branch on Count State 4 controls for the I Box.

GENERAL DESCRIPTION

The preferred embodiment of the invention described herein forms a part of a large size data processing system capable of extremely rapid operation, and operation of many sections in parallel whereby large amounts of data may be processed in a reasonable length of time. Data processors of this nature are of great value in real time circumstances where certain computations must be performed in a short time if the data to be produced is to be of value, or where forecasts are to be made of conditions at points of a three or more dimensional lattice. An example of the first type is in the computer forecasting of weather data where updated weather must be predicted for each of a plurality of stations and that updated weather is then used as the basis for another updating, etc. Obviously, if it takes longer to update the weather forecast for all the stations involved than the real time interval for which the updating is computed, there is no real time gain and the repetitions of computer forecast updating cannot generate forecasts ahead of the actual weather. Fore useful weather forecasting, a very large amount of data must be processed in a comparatively short time interval.

Another type of problem for which large high speed processors are required is the determination of successive states at coordinate intersections of a three dimensional configuration such as a nuclear pile where accuracy of successive state conditions can be increased by using a finer coordinate system. However, the amount of data to be processed will increase far faster than the increase in the number of intersections on any one of the coordinates. Here again, high speed processing is needed if the data is to be processed in a reasonable time.

Figure 1:
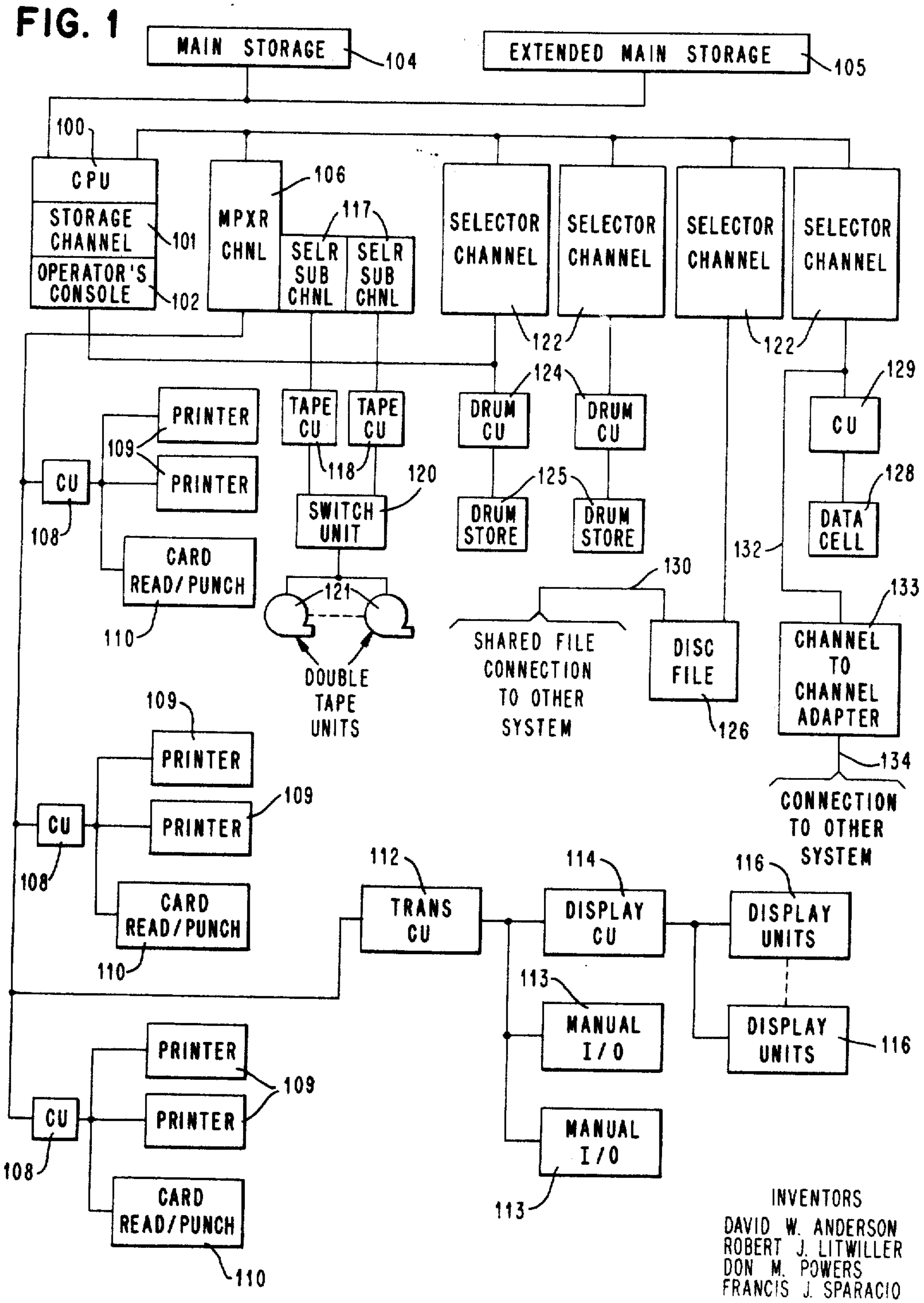
FIG. 1 is a diagrammatic showing of the type of large data processing system in which the invention is incorporated.

Although it is to be understood that the exact configuration of a data processing system will depend upon the form in which data is to be initially supplied to the system and the data outputs desired, a representative configuration of a large system is shown in FIG. 1. Here the Central Processing Unit (CPU) 100, a Storage Channel (SC) 101, and a Maintenance and Operators Console 102, are combined in a main frame which will be uniform for all system configurations. A Main Storage (MS) 104, typically 256 thousand double (64 data bits and 8 parity bits) words, will be connected to the CPU 100 to hold the programs and data required by the CPU, and this Main Store 104 may be suplemented by an Extended Main Storage (EMS) 105 of the same or double capacity, i.e. 256+ thousand or 512+ thousand double words. Due to restrictions on physical size and location, lengths of wire connections, control sizes and the like, data cannot be transferred between the CPU 100 and EMS 105 as rapidly as it can be passed between CPU 100 and MS 104, so that it is preferable to maintain most of the immediately needed material in MS 104 and to make only occasional data transfers from CPU 100 to EMS 105. The Storage Channel 101 which may be almost a small computer is therefore provided in the main frame to control with only occasional commands from the CPU 100, the transfer of large blocks of storage data between the MS 104 and EMS 105, to keep the words in MS 104 reasonably current with needs.

The operators part of Console 102 contains the keyboard, control switches and display units required for operation of the system. To prevent interference with the normally uninterrupted cycling of the machine, the Console 102 is connected to CPU 100 as another Input/Output (I/O) device and not directly, thus enabling the CPU 100 to carry on with the performance of other operations while the Console 102 is being set up for another entry.

The remainder of the system comprises the I/O Devices and their controls to supply the CPU 100, MS 104 and EMS 105 with needed information. A multiplexor (MPXR) channel 106 is provided to receive data from a large number of slow speed devices operating concurrently, and it does this by accepting a byte (eight data bits+one parity bit) of data from a connected I/O device as soon as the device has the data available, and assembling the byte with earlier bytes received from the device until it has a double 64 bit word assembled and then transmitting the word to a storage location. The MPXR 106 will also receive a double word and transmit the word by bytes to a connected I/O device. Due to the speed difference between the operations of MPXR 106 and the I/O devices connected thereto, up to 256 devices can be operating concurrently through the MPXR 106. Typical devices shown attached to the MPXR 106 are three control units (CU) 108, each of which controls two Printers 109 and a Card Read/Punch Unit 110. Also connected to MPXR 106 is a Transmission Control Unit 112 for control of remotely located devices, here shown as Manual Input/Output Devices 113, such as keyboard, typewriters, or card machines, and a Display Control Unit 114, which controls a number of cathode ray tube Display Units 116.

Also shown connected to MPXR 106 as a part thereof are two Selector Sub Channels 117, each of which will be connected through a Tape Control Unit 118 to a Switch Unit 120. Any tape unit of a plurality of Double Tape Units 121 can be connected through Switch Unit 120 and CU's 118, to either of the Selector Sub Channels 117. A selector Sub Channel such as 117 can be connected to any of a plurality of I/O units, but differs from a Multiplexor Channel such as 106, in that only one I/O device can be operating at a time. Such a Selector Sub Channel will be for devices which supply or receive data at a comparatively high rate and cannot share time with other devices on the same channel.

The system shown also includes four Selector Channels 122, although more or less may be connected as desired, and each Selector Channel 122 may have a plurality of I/O devices connected thereto. Two of the Selector Channels are shown as each having a Drum Control Unit 124, and a Drum Storage Unit 125, connected thereto, a third has Disk File 126 attached thereto, and the fourth is shown connected to a Data Cell 128 through its Control Unit 129. A lead 130 from Disk File 126 indicates that the file may be shared with another system. A Channel-to-Channel Adaptor 133 connected by a Lead 132 to the fourth Selector Channel 122, and by another Lead 134 to another system, may permit direct communication between two systems by making each system appear to be an I/O device of the other system.

The Maintenance and Operators Console 102 may also be connected to a Selector Channel 122 to enable entry of control data by the operator in the same manner as other I/O data, and without arresting the system operation unless such is desired.

These I/O devices, including Multiplexor and Selector Channels 106 and 122, and similar units for supplying and receiving data and instructions, are representative of commercially available devices and as the detals of such devices are not part of the inventive concepts claimed herein, no further description of such devices will be given. It will hereafter be assumed that information is supplied by appropriate devices to the Main Storage 104 and the Extended Main Storage 105 as it is needed.

CENTRAL PROCESSING UNIT

Figure 2:
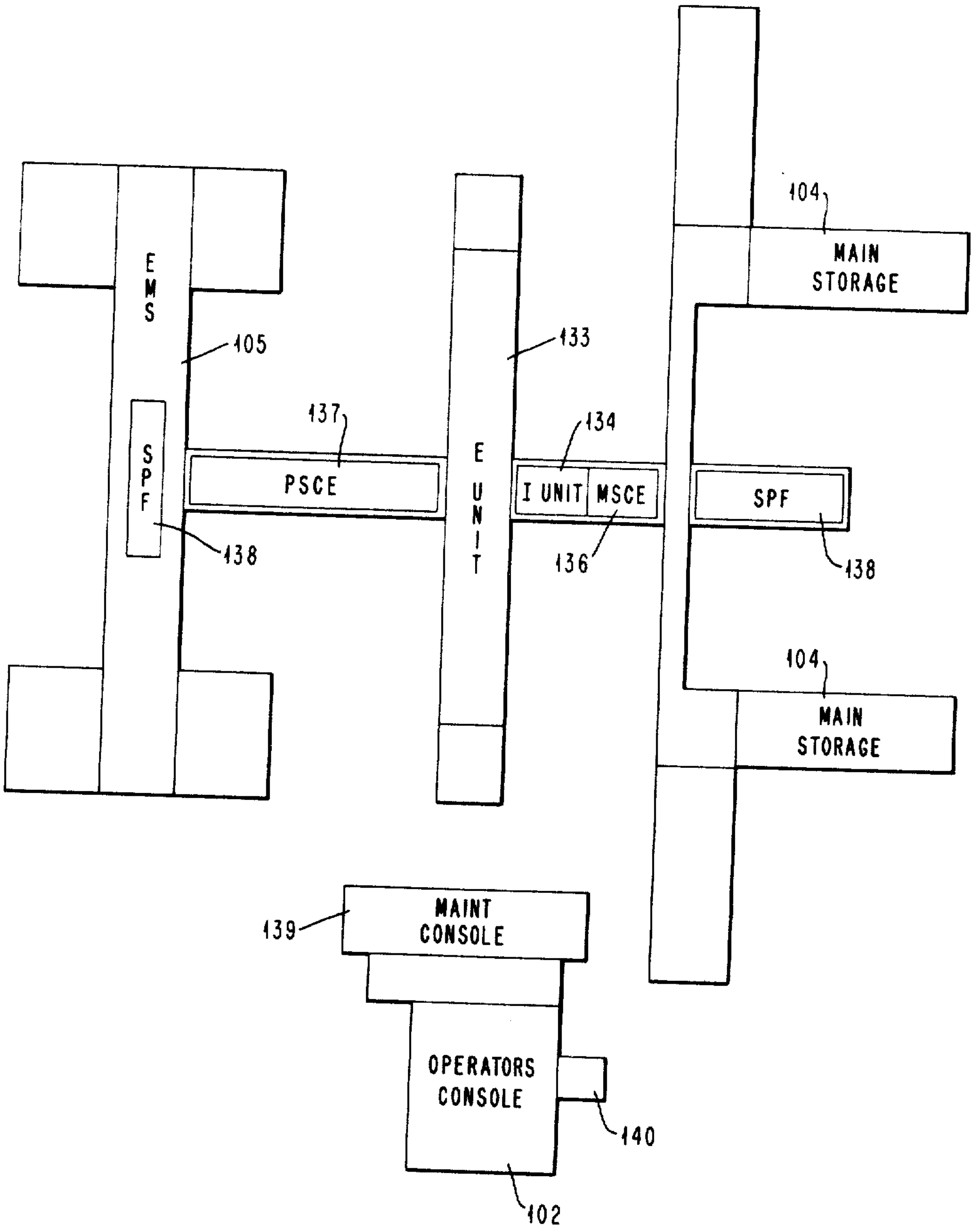
FIG. 2 is a diagrammatic showing of the Central Processing Unit of FIG. 1.

The CPU 100 is the major operating unit of the present system and can logically be subdivided into four more or less independent units. As shown in FIG. 2, the CPU 100 is physically in the form of a cross with four sets of modules connected to a common central junction box. Vertically of the cross and comprising two of the four module sets is the Execution (E Box) Unit 133, which performs all of the arithmetic and logical operations on the data. The inner part of the right-hand arm is the Instruction Unit (I Box) 134, which is responsible for all instruction decoding, operand fetching, and an overall control of the operations of the system. The other part of the right arm is the Main Storage Control Element (MSCE) 136 which is the main interface between the I and E units 134 and 133 and the Main Storage 104. Also all communications between the I and E Units 134 and 133 on one hand, and the Peripheral Storage Control Element (PSCE) 137, pass through MSCE 136. The PSCE 137 forms the other, left, arm of the cross and has connected to it the Extended Main Storage 105. Each Storage Unit 104 and 105 has as a part thereof a Storage Protection Feature (SPF) 138 which stores a protection code for each block of storage addresses, and for each reference to its storage, compares the protection code with the program to ensure that the program is permitted access to the called for storage address. As this Storage Protection Feature is fully disclosed and claimed in the assignee's copending patent application, Ser. No. 334,714, filed by G. M. Amdahl, E. D. Councill, R. J. Flaherty and J. J. Zagursky, on Dec. 31, 1963, and titled, "Memory Protection System," no further description of the details of the SPF 138 will be given herein.

The systems engineers part of the Maintenance and Operators Console 102 is numbered 139 and the both consoles with an attached CRT Display Unit 140 are combined into a separate stand-alone unit and will be connected with each of the four CPU sections by cabled wiring. The Console 139 can display the states of all settable circuits in the CPU and with the operator's part of Console 102 will provide a serviceman with complete manual control of the system for error diagnosis and repair.

As is indicated in FIG. 3, the CPU 100 can be logically considered as five functional sections connected by information carrying circuits and by control signal circuits. Since the E Box 133 has one portion which is primarily used for computations involving floating point numbers, and a second section used mainly for arithmetic operations on fixed point (integer) numbers, and logical or arithmetic operations on variable length alphanumeric operands, it is shown as the Floating Point Unit (FLPU) 142 and as the Fixed Point (including Variable Field Length) Unit (FXPU) 143. The major communications between units are set out in FIG. 3 where the number of control lines (CL), the number of address busses (24 lines each) (AB) and the number of 72 bit (8 bytes each with 8 data bits and 1 parity bit) data busses (DB) are indicated for each direction of communication between the logical units.

The Maintenance and Operators Console 102 is also included in FIG. 3 as it receives communications from all of the CPU 100 areas. The inputs to Console 102 are mostly individual data bit lines from the CPU, there being 926 from the FLPU 142, 629 from the FXPU 143, 1024 from the I Box 134, 681 from the MSCE 136, and 191 from PSCE 137, for indication purposes. In addition a further group of 53 lines 144 from the Console 102, and 100 lines 146 to a Console 102, connect to a Selector Channel 122 to enable the system operator or a system engineer to communicate with the CPU 100.

INSTRUCTION UNIT

The Instruction Unit (I Box) 134 performs under the control of the instruction words of a program and has the following assignments:

(1) Fetching and buffering of the stream of instructions.

(2) Partial decoding of instructions and their assignment to the proper execution unit.

(3) Fetching of operands to the execution units.

(4) Complete execution of branching, I/O and status switching instructions and partial execution of instructions requiring multiple operations.

(5) Handling of interrupts.

The first assignment, instruction fetching is under the control of three registers, the Upper Bound Register (UB) 147, FIG. 4, the Instruction Register (I Reg.) 148, and the Lower Bound Register (LB) 150. Each of these three registers has associated therewith an Incrementer Unit 151, 152, and 153, respectively, which always has an output signal representing one more than the value in its associated register. When the incremented output is fed back into a register, the register assumes the incremented value which then passes to the Increment Unit 151, 152, or 153, to raise it to the next value. Thus, each time the output of the Increment Unit is gated into its register, the register value increases by a unit.

The instruction words from storage, double words of 72 bits each, are received by I Box 134 on a group of 72 lines forming the Storage Bus Out (SBO) 155, and are gated into a set of eight Instruction Buffers 156, numbered 0 to 7, or, under some conditions, into #1 or #2 Temporary Buffers 157. For the present it may be assumed that the first instruction word fetched will be stored in the Instruction Buffer 156 having as its designation the lowest three bits of the double word address of the fetched word. The second word will normally have a sequential address and will be placed in the next higher numbered Buffer until #7 Instruction buffer is filled. The next word fetched will have an address which will end in 000 and the fetched word will be placed in the #0 Instruction Buffer 156.

Initially all Instruction Buffers 156 are considered to be empty as are UB 147, I Register 148 and LB 150. The starting address of the program is placed in UB 147, I Register 148 and LB 150, and a fetch is immediately initiated using the address in UB 147. On the next machine cycle, a second fetch is initiated using the address from Incrementer 151 which address is also placed in UB 147. A third and a fourth fetch are called for on the next two machine cycles with an incrementing of UB 147 on each fetch, after which incrementing the UB 147 will be set to an address three higher than the starting address in I Register 148, and this will be the address of the last word fetched. As will be more fully described later with reference to the MSCE 136, the destination of a fetched word is sent out on the machine cycle before the word is transmitted, and in this instance the input gates to the Instruction Buffer 156 having the address corresponding to the lowest three digits of the storage address will be selected to put the returned word into the appropriate Instruction Buffer 156. Since this is the first fetch, the Operating Register 159 is empty at this time and the fetched word will also be gated into this register. Operating Register 159 is controlled to receive instruction words from any of the Instruction Buffers 156, Temporary Buffers 157 or SBO 155, and holds the current instruction word for decoding and control, and also holds enough of the next instruction word or words to fill up its double word capacity. Successive insturction words are placed in the successive Instruction Buffers 156 as they are received.

In the described embodiment, instructions may be of three lengths, either 16, 32, or 48 bits long and it will be noted that the Operating Register 159 has an elaborate array of gates connected thereto. On the input side, there are four sets of 16 bit gates so that any one or more of the four 16 bit sets of Register 159 can be loaded independently. Initially as was noted, the entire 64 bits of the first instruction word on SBO 155 are loaded into OP Register 159. Since instructions may start at any of the four set positions within this instruction, it will be clear that the current instruction address in I Reg. 148 will need two low order bits in addition to the fetch address to select the proper part of the instruction word in Register 159 for decoding, and one or more of the 16 bit sets to the left may belong to a previous program and are not to be used. Hence, under control of the I Reg. 148, any of the bits needed to fill out these left sets with significant instructions will be gated into OP Register 159 when the second instruction word is fetched over SBO 155. Thereafter, as instructions are used from Register 159, it is refilled from the Instruction Buffers 156 to maintain the Register 159 filled with unused instructions.

Among the out gates from Register 159 is the operating code set of four groups of eight gates supplying a Bus 160 of eight lines. Since the operating code will always be the leftmost eight bits of an instruction, and the instruction can start with any of the four sets within the Regiser 159, the lines 160 are gated to the left eight bits of each set of 16 bits.

Storage addresses within instruction words may be in either of two formats. First will be instructions for those operations requiring only the use of some of the General Purpose Registers (GPR) to be described later and designating one or two GPR's in the second eight bits of the first 16 bits of the instruction. These addresses will be gated out of the appropriate positions to a Bus 161 of eight lines. In the other format, a storage address will be set out in the second or third 16 bits of a longer instruction as four bits specifying a GPR which contains a base address and 12 bits specifying the displacement of the wanted address from the base address. The four bits for the GPR selection will, for this format, be gated out of the selected positions to a Bus 162 which is only four bits wide. The accompanying 12 displacement bits of the address will be gated on a 12 bit wide Bus 164 into a storage buffer 165.

The Op Code part of an instruction in Register 159 will be gated out on Bus 160, and into an Operation Decoder 166, under control of the two low order bits of I Reg. 148, which as mentioned above, identify the location of the current instruction within Register 159. The two highest bits of the operation code specify the instruction format and control the readout of the address part of the instruction to Busses 161, 162, and 164. For a 16 bit instruction, the address or addresses on Bus 161 normally specify GPR's which contain operands for an operation within E Box 133, and will be transmitted thereto along with the operation control signals from Decoder 166.

For a medium length, 32 bit instruction, the second half of the first 16 bits may still specify a GPR for use as for example, as address in Main Store 104, or Extended Main Store 105, and such address will require use of an I Box Adder 168. The Adder 168 has three inputs which are to be added together to produce the effective address of the operand to be fetched. One input 169 is 12 bits wide and is supplied by Buffer 165 which is loaded with the displacement part of the address directly from the Operating Register 159. The base part of the address can be up to 24 bits and will be stored in a GPR which will be gated into a second input 170 of Adder 168 under control of the address on Bus 162. Another factor of the effective address is to be found in an index register which will also be a GPR, and the value in the index GPR, which will be selected by the signals on Bus 161, will be transmitted to the third input 172 of Adder 168.

It should be noted at this time that the GPR's are physically located in the Fixed Point Unit 143, FIG. 3, and not in the I Box 134. As the time required to send a gating signal to the GPR's and receive their stored value is substantial and would cause at least a loss of one machine cycle in the time required to generate an effective address, the numbers stored in the GPR's are made immediately available to the I Box 137 by extending "hot" lines, indicated in FIG. 4*B* as GPR Bus A, 173 and GPR Bus B, 174 into the I Box from the GPR's, and putting gates at the I Box end of these busses. Thus, when a value in a GPR is needed, it may be immediately gated into Adder 168 despite the physeical distance separating the GPR's from the Adder. The only exception to the immediate availability of the GPR settings can arise when a value to be stored in a GPR is generated in Adder 168, and is needed in the next machine cycle, and there is insufficient time available for the value to be stored in the GPR and returned on the Busses 173 and 174. This exception is sensed in the I Box 134 and is compensated for by the provision of a third Temporary Register 176 which is loaded from the output of Adder 168. Whenever I Box 134 determines that the address of a required GPR is the same as that one which has just been loaded from Adder 168, the value stored in Temporary Register 176 is gated to Adder 168 instead of the settings of the associated GPR Bus 173 or 174. Another Register 177, the W Register, also receives the output of Adder 168, and can be gated out to the GPR's or to Main Storage 104, as required.

OPERATION OF THE INSTRUCTION UNIT

In the operation of the I Box structure thus far described, it will be seen that initially UB 147, I Reg. 148, LB 150 and all Instruction Buffers 156 and Temporary Registers 157 are clear of significant values. The address of the starting instruction is loaded into UB 147, I Reg. 148, and LB 150, and instruction fetching is started by requests for double words from the addresses in UB 147. The UB 147 is incremented at each fetch so that it always records the address of the last instruction fetch requested. The UB 147 will request fetches of instruction words until it is three word addresses ahead of the address in I Reg. 148 for a total of four initial words. When the first word returns it is gated into one Instruction Buffer 156 and into Operating Register 159 where the two lowest order bits of I Reg. 148 which have no address function in fetching, control the readout of the initial half word, 16 bit, instruction to the OP Decoder 166, the GPR's etc. As soon as the first instruction is processed by either execution in the I Box, or by being transferred to another unit for execution, the address in I Reg. 148 is increased by the length of the last instruction, this length is indicated in the first two bits of the instruction, and now points to the first part of the next instruction. At this time, the half words of instruction in Operating Register 159, which have been utilized, are replaced by the corresponding half words of the next instruction word from an instruction Buffer 156. Thus, there will always be available in Register 159 at least the operating code part of the next instruction, and the remainder of the instruction can be loaded into 159 as that Op code is being decoded.

Each time the I Reg. 148 is incremented to cause a carry from the two low order bits into a higher order bit, it is an indication that another double word instruction has been completely utilized so far as the I Box is concerned and that decoding has moved into a new word. Since the UB 147 is not now 3 double word addresses ahead of I Reg. 148, a fetch of the next instruction is called for and UB 147 is incremented to again be 3 ahead of I Reg. 148. LB 150 has in the meantime remained at the address of the first instruction word placed in Buffers 156. When UB 147 is eventually incremented so that it calls for a fetch into the same Buffer 156 as the first instruction word was placed in, the address in LB 150 is incremented to point to the next higher address. Thus, in summary, UB 147 contains the address of the last instruction word which has been called for a fetch, I Reg. 148 contains the address of the instruction word being decoded, and LB 150 contains the address of the oldest instruction word remaining in Buffers 156. These operations will continue in this order until a branch point of some kind is reached. For a branch which forms a short enough loop so as to be contained within the past history instruction words already in Buffers 156, as shown by a comparison of the address in LB 150, with the branch address specified in the current instruction, the I Box 134 is set into "Loop Mode."

In Loop Mode, the address in LB 150 is set to the target of the branch and LB 150 is frozen in that state so long as the I Box continues in Loop Mode. It is also possible to generate a Loop Mode state of the I Box if the target of the branch instruction is not contained within the Instruction Buffers 156, but is nevertheless less than eight full double words prior to the address of the present instruction. In such a situation, the entire loop can be contained within the Buffers 156. Upon detection of such a loop, i.e. the branch address is within eight double words of the address in I Reg. 148 but is not at this time contained in Buffers 156, an initialization of the I Box is started. Here, the branch address of the instruction is placed into UB 147, I Reg. 148 and LB 150 as above described, to start instruction fetching. In the Loop Mode state LB 150 is frozen at the starting address and UB 147 is permitted to increase to completely fill the buffers 156 with future instructions as soon as the necessary machine cycles can be spared after the four cycles required for the initial instruction fetches and after such operand fetches and other storage operations, as have priority, have been taken care of.

In either type of Loop Mode state, the complete instruction loop is contained within the instructions stacked in Buffers 156 and will be decoded and transmitted to the E Box 133 for execution without any need for continuous fetching of the instructions of the loop from storage. It will be evident that any branch instruction which leads to an instruction loop will be a branch on condition type of instruction for otherwise the machine will be locked into an unending loop. The I Box 134 operation for all branch on condition instructions will be substantially the same unless the instruction leads to the first type of Loop Mode where the target instruction is already in Buffers 156. As a preliminary description, the I Box 134 will have no difficulty with an unconditional branch instruction or a conditional branch instruction in which the condition for the branch has occurred prior to the decoding of the instruction after its transfer into Operating Register 159. In these unconditional or predetermined condition branches, the target address of the instruction is placed into UB 147, I Reg. 148, and LB 150, as soon as it is determined through Adder 168 and the condition, if any, is tested and thereafter the I Box 134 proceeds in the same manner as initially described.

If, however, the branch is dependent on a condition which has not been determined, when the branch instruction is decoded, the I Box must proceed in a manner which offers the best chance of avoiding loss of time. Hence, the I Box assumes that the condition will not be met and continues to decode and transmit for execution the subsequent instructions. It does, however, set up a condition test circuit to be activated when the condition has been determined and will also pause long enough to call for two storage fetches starting at the target address of the branch. These two instruction words when they return will be stored into #1 and #2 Temporary Buffers 157, respectively, to be available if the program branch is to be taken. Furthermore, the instructions issued to the I Box 134 or E Box 133 after the conditional branch instruction is decoded will be accompanied by a conditional tag which prevents execution of the instruction so long as it is present since the I Box does not now know if the branch is to be taken or not. When the condition on which the branch depends is determined, such conditionally tagged instructions will have their tags turned off if the condition is not met, or if the condition is met the conditionally tagged instructions will be cancelled and thus not executed. Obviously, if the condition of the branch is not met, the instructions stored in Temporary Buffers 157 will be cancelled or if they have not returned from storage, will be blocked at the gates into Buffers 157, but if the branch condition is met, then the word is #1 Temporary Buffer 157 is transferred into an Instruction Buffer 156 and into Operating Register 159 for decoding as the new instructions. The storage address of this instruction word is placed in UB 147, I Reg. 148, and LB 150, and this address determines which of the Buffers 156 is selected to store the instruction word. The instruction word in #2 Temporary Buffer 157 is now transferred into the next adjacent Buffer Register 156 and UB 147 is incremented. Control will then be transferred back to UB incrementer 151, now pointing to the branch address plus two and further instruction fetching will proceed as first described but from the branch path.

If, however, the conditional branch will set up an instruction loop which can be contained within Instruction Buffers 156, the I Box 134 will for the first iteration proceed exactly as above set out but will additionally be set into Loop Mode to prevent the LB 150 from exceeding the target address until the condition of the branch has been determined. If, however, the LB 150 has already exceeded the target address, and thus the first loop instruction has been dropped from Buffers 156, the I Box will be set into Loop Mode and will then proceed as in any other branch, i.e. the target instruction will be fetched into #1 Temporary Buffer 157, etc. as above described.

So long as the I Box 134 remains in Loop Mode, there will be no additional instruction fetching from the Main Store 104 after the Instruction Buffers 156 have been filled with eight words starting at the branch target address until after the branch condition ceases to be met at the branch point or the target address changes. It was noted above that it is normally assumed that a branch will not be taken and that the I Box will issue instructions along the main path after the branch instruction and will tag such instructions conditional and not to be executed until the branch condition is determined. In Loop Mode, however, the alternative assumption is made, i.e. that the branch will be taken and the conditionally issued instructions will be in the branch back to the loop. They will, however, still be tagged conditional and will not be performed until the condition precedent has been decided. When the branch condition is no longer met, any such conditional instructions will be cancelled, the Loop Mode will be set off and new instructions will be issued along the main path. The LB 150 will be unfrozen and the UB 147 will immediately start fetching new instruction words until the normal relationship between the values stored in UB 147, I Reg. 148, and LB 150, is re-established.

It is also possible to leave Loop Mode or change to a different loop by some operation performed as a result of an instruction within the loop. It will be remembered that when the Loop Mode is entered, the address of the branch target is generated in Adder 168 by summing the values in at least one GPR and the address displacement specified in the instruction and stored in Buffer 165. If, during the processing of a loop, an instruction changes the value stored in one of the GPR's which was used to generate the branch address, the old address is no longer valid, and the branch instruction must be reprocessed to determine the new branch address. Such reprocessing of branch address could be done at each iteration of the loop, but does require a full machine cycle, and it is preferred to add some additional hardware to save this machine cycle. Such hardware comprises a Save Loop Count Instruction Register (SLCIR) 179 into which is gated the address in I Reg. 148 when a Loop Mode branch is detected and a Save Loop Target (SLT) Register 180 which receives the target address of the branch when it is available from Adder 168. Thus, SLCIR 179 contains the address of the instruction which sets the branch, and SLT 180 has the target address for the branch. Whenever, in Loop Mode, a branch instruction is found, the setting of I Reg. 148 is compared in Comparator 181 with the setting of SLCIR 179, and if they are found to be equal, the value of SLT 180 is gated into I Reg. 148, thus saving one machine cycle. It is to be remembered that Loop instructions after the branch are not to be executed until the branch condition is determined.

The target address in SLT 180 can be in error at the completion of iteration of a loop if one of the GPR's has had its stored value changed since it was used in generating the address in SLT 180. To detect such condition, the I box 134 also stored during Loop Mode, the numbers of the GPR's which were utilized to generate the SLT 180 address, and also monitors the activity of such GPR's. If there is any alteration of one of these monitored GPR's, the SLT 180 value is considered invalid. Loop mode is therefore cancelled and a new branch address is generated in the same manner as the address was generated in the first loop iteration.

INSTRUCTION ISSUING

A second principal responsibility of the I box 134 is the issuing of instructions to the appropriate units for execution and the fetching of required operands from storage 104 or 105. This task is pipelined in three independent stages so that at any time as many as three instructions may be in process by the I Box, each instruction being at a different stage of processing. This pipeline type of operation naturally provides an improvement in the effective speed of I box operation, even though a particular instruction may be in process longer than the time needed to similarly process an instruction with straight through hardware.

Assuming that there are no interlocks to hold up operation of I Box 134, the first pipeline stage gates out over Bus 160 the operation code (8 bits) of the instruction in Operating Register 159 as selected by the setting of I Reg. 148. The OP code is decoded in Decoder 166 to the type of operation to be performed, i.e. floating point, fixed point, or other, and whether the execution unit will require operands from storage or not. For a floating point type of operation, the I Box will check to see if the Floating Point Unit (FLPU) 142 can accept the instruction. As will be described later, the FLPU 142 is analogous to a simple computer with an instruction stack to hold some instructions, floating point buffers to store operands and some arithmetic and logic units to operate on the operands. If the instruction stack is full, the FLPU 142 cannot accept the instruction from the Decoder 166. Also, if the instruction calls for operands to be fetched from storage, the I Box 134 checks for availability of a floating point buffer register to receive the fetched operand and checks the availability of Adder 168. The Adder 168 is not available if pipeline stage 3 is full, or if pipeline stage 2 is full and MSCE 136 is not accepting addresses for storage fetches for reasons to be set out at a later point. If any of these conditions is not met, the I Box 134 will stop until the condition is met. As soon as it can proceed, the Decoder 166 determines whether the I Box 134 is operating in conditional mode, i.e. whether a conditional branch has been previously decoded and the condition precedent to the branch has not been determined, and whether the operation will set a condition code signal.

As soon as the requirements are met, the I Box 134 will send to the FLPU 142 a signal including the following 14 bit signals:

1 Full/Empty.—Sets tag to indicate valid instruction.
1 Conditional Operation.—Instruction not to be executed when bit is on.
1 Condition Code.—This instruction will set a condition code.
6 Operation Code.—Control the FLPU operations.
2 Register Address.—Designate the one of four registers having one of the operands.
3 2nd Register Address.—Designate a second register or a buffer having a second operand.

If the instruction is for a fixed point operation of the I Box makes similar checks of its own pipeline status and of the FXPU 143 status to detect any blocking conditions. As soon as there are no such conditions, the FXPU 143 receives a set of 24 bit signals as follows:

1 Full/Empty bit.—Set to indicate a valid instruction.
1 Conditional Operation.—Instruction not to be executed when bit is on.
1 Condition Code.—This instruction will set condition code.
8 Operation Code.—Controls the FXPU operations.
4 GPR #1 Address.—The location of operand #1.
4 GPR #2 Address.—The location of operand #2.
3 Fixed Pt. Buffer.—The address of the buffer register which is to have the source operand.
2 Storage Address Register.—Identifies a Storage Data Buffer to receive a generated operand.

Since both the I Box 134 and FXPU 143 can change the operands in the GPR's, an interlock is provided to prevent the I Box from using these registers before the FXPU can set them in an issued but unexecuted instruction, and also to prevent the I Box 134 from changing the GPR operand if the operand is to be used in an unexecuted operation. The structure for this interlock is associated with the GPR's and will be more fully described in the description of the FXPU 143, but briefly consists of a Register Unavailable for Addressing (RUA) Counter 337 and a Register Unavailable for Modification (RUM) Counter 335 for each GPR. Every instruction which uses a GPR as a sink for data storage increments the RUA counter for that GPR and execution of the instruction decrements the counter. The I Box 134 cannot use a GPR to generate an address until the RUA Counter for that GPR equals zero, at which time the GPR will store the correct value for an address generation. Similarly, the RUM counter is incremented whenever an instruction is decoded which uses the associated GPR as a data source and is decremented as the instruction is executed. The I Box is prevented from using such a GPR until its stored data has been fully utilized. Only when both RUA and RUM are 0 can the I Box use a GPR in a manner which would alter its stored value.

As noted above, when the I Box 134 decodes a branch on condition, it checks the condition code setting to determine which way to branch. Since there may be some instruction in the E Box 133 which has not been executed but which will affect the condition code, the branch cannot be determined until the last instruction capable of changing the code has been performed. Each instruction issued by the I Box 134 which can change the condition code includes a condition code bit and this will turn off all other set condition code tags in both FXPU 143 and FLPU 142. Thus, only one condition code tage can be set at any time, and this will be the last one issued. The I Box must hold off on determination of a branch until that condition code tag is reset.

As above noted, until a branch is decided, the I Box 134 will continue to issue instructions tagged for conditional operation. Any such instruction may have a condition code tag set but this will not reset the tag for the previously issued unconditional instructions. It will, however, reset the condition code tag on any previously issued conditional instruction so that one conditional instruction may also have a set condition code tag. When the conditional tag is cancelled on such an instruction, the presence of a set condition code tag will immediately reset any condition code tag bits among the unexecuted instructions.

There are also instructions which can be fully executed within the I Box 134, such as the branching set out above. In general, when the I Box 134 encounters an I Box instruction, it halts succeeding instruction processing until the instruction is completed, and for some instructions the I BOX must wait until all instructions in process, i.e. in the pipeline, are issued before it can proceed.

In pipeline stage two, address generation for the first of any required storage operands takes place. The three operands on Adder Inputs 169, 170, and 172, are gated into the Adder 168, and the sum is gated to the Working Register 177. If the instruction is a store instruction, a quick check is made to see if the store can be to the storage address from which the next instruction now being decoded by OP Decoder 166 was fetched.

In pipeline stage three, the storage address of an operand is passed to an address buffer in MSCE 136, and in a store operation, the address is also checked in the I Box to detect if it is a store to an address from which an instruction fetch has already been made. If so, the I Box stops for one cycle and orders a new instruction fetch from the storage address. The MSCE 136 has, as will be described later, interlocks to insure that the store and fetch will be executed in proper logical order.

EXECUTION UNIT

The Execution Unit (E Box) 133 can be considered as divided into two almost independently operating sections, the Floating Point Unit (FLPU) 142, and the Fixed Point Unit (FXPU) 143, both receiving instructions from the I Box 134 and being connected by data busses to the MSCE 136 for operand transfer.

FLOATING POINT UNIT

The overall data flow and instruction storage of the FLPU 142 is shown in FIG. 5. The 14 bit instruction signal from the I Box 134 is received on a Bus 183 and will be stored in the next available one of a set of eight, 14 bit stack registers forming the Floating Point Operating Stack (FLOS) 184. The I Box can issue instructions for storage in FLOS 184 so long as the stack is not filled. The instructions in FLOS 184 are executed in a strict first-in first-out sequence.

The FLPU 142 also has a stack of six 64 bit buffer registers (FLB) forming the FLB stack 185. Each of these FLB's is connected to the Storage Data Out Bus 155, see FIG. 4, to receive operands from Main Store or Extended Main Store through MSCE 136. These operands will have been called from storage by the I Box 134 as the instruction was decoded. The I Box will also have assigned one of the FLB's 185 to receive the operand and will have transmitted the address of that FLB to MSCE 136 as the sink to which the data fetched is to be sent, and will also have sent it to the FLOS Register 184 along with the operating code to identify to the FLOS 184 where its operand will be found. There is no requirement that the FLB's 185 be used in sequence for either receiving or transmitting operands.

There is also a stack of four 64 bit Floating Point Registers (FLR) 187. These FLR's normally contain one of the operands for every instruction, and are also the sink into which the result of an operation is placed.

An Add Unit 188 is provided to handle all floating point additions. This Add Unit 188 contains a full carry-propagate carry-lookahead type of added in which the complete addition of two operands can be made in one machine cycle with the sum latched in a set of Add Result Latches 189. Since a floating point number will consist of an exponent of a base of sixteen as a multiplier factor and also consists of a fraction part, and as only fraction parts having the same exponent can be added or subtracted, it is necessary to compare the exponents of two addition operands and to right shift the fraction part having the lower value of exponent to align the fraction parts properly. This testing and shifting operation is performed in one machine cycle and the aligned operands are set into latches for application to the adder during the next machine cycle with latching of the result into latches 189. Thus, addition of two operands can be performed in two machine cycles, but as the output during the first cycle is set into latches, it is possible to gate the setting of the latches into the adder and at the same time to gate a second set of operands into the exponent comparing and fraction shifting stage for their preliminary handling. It is thus possible to have two sets of operands in Adder 188 at the same time, and by such pipelining to produce results at the Adder 188 output latches 189 at an effective rate of one per machine cycle.

To provide the operands required for such repetitive adder cycles, the Add Unit 188 is supplied with three sets of input buffers 191, each set being effectively an adder and comprising two 64 bit registers to store respectively, a sink operand and a source operand, and also comprising a group of 10 address latches to store the four bit address of the unit whose output will be stored as the sink operand, all zeros indicating that the operand will be from an FLR 187 and a five bit group for the address of the unit whose output will be stored as the source operand. An all zero condition of the five bit group will specify that one of the FLR's 187 will be the source, a 10000 setting will specify the Buffer Stack 185 as the source, while a non-zero condition of the last four bits will identify one of the other add or multiply-divide units as the source. A single bit, the S/L bit, is a part of the original instruction field in the Operating Stack 184, and indicates whether the operation is to be performed with short or long precision, i.e., it controls the gating for the low order group of 32 bits.

The FLPU 142 also contains a Multiply/Divide Unit (M/D) 192 for the multiplication or division of operands supplied thereto. The result of an M/D unit operation is temporarily held in a group of latches, M/D Result 193. To keep the input of the M/D Unit 192 supplied with operands, there are two Operand Storage registers 195 for each input to the M/D unit. This enables a new set of operands to be stored for the M/D unit 192, while a first setis being utilized in the unit. As in the Add Unit 188, there are ten register positions associated with a pair of Registers 195, four positions to retain the address of the unit from which a sink operand will be supplied, five positions to hold the address of the unit from which a source operand will be supplied, and a short/long precision bit.

A Common Data Bus (SDB) 196 is provided to transfer data between the inputs and outputs of the Add Unit 188, the M/D Unit 192, and the FLR's 187, and to gate out the values in FLB's 185. Insofar as data is concerned, the CDB 196 is an extensive set of gates feeding an output OR circuit, so that any selected input to the Bus 196 may be connected to the Output Bus 197, which is common to all data receiving units including the Storage Data Buffers 244 of MSCE 136. The CDB 196 also contains control circuitry to gate the units which are to utilize CDB 196 in accordance with a preselected priority. The FLB's 185 have first priority and when they contain operands will be gated out in sequence from the lowest numbered on to the highest numbered one. When no operands are in FLB's 185, the Add Unit 188 has next priority for the CDB 196 and is strictly on a First In-First Out priority among the Buffer Registers 191 which have all of their needed operands. The M/D unit 192 has the lowest priority and can gate out its results with a First In-First Out priority between its input registers 195 if both sets are ready at the same time. The First In-First Out (FIFO) priority among the inputs of the Add Unit and the M/D unit is to allow staging of operations through these units to maintain a proper sequence of results, and to prevent any undue delay in supplying operand results.

When any unit requires the use of CDB 196 to transfer an operand, it transmits its request to the CDB priority circuit which will, when no unit with higher priority is requesting the bus, return an accept signal and transmit to every operand input circuit, the address of the unit which is to put its operand on the CDB 196. It was noted earlier that each of the Buffer Registers 191 and 195 stored the address of the unit which was to supply its operand and such a register will also be provided in the other units receiving data from CDB 196 as the FLR's 187 and the SDB's 244 supplied by SDB 197. When the address of the transmitting unit appears on CDB 196, it is compared at every input with the stored address, and when an equality is detected, the receiving unit prepares to accept the operand. The CDB 196 will gate out the selected operand to its Output Bus 197 on the next machine cycle at which time the receiving unit will have its gates opened to receive the operand. On the same cycle which transfers the operand, the control section of the CDB 196 can again respond to a bus request and transmit on its address bus, the address of another unit which will supply the next operand on the bus so that effectively the CDB 196 can transmit at a maximum of one operand in each machine cycle.

The FLB's 185 are provided with a direct input to the right-hand ones, the sources, of the Buffer Registers 191 and 195, and to the Fixed Point Unit 143 by way of the Buffer Bus (FLBB) 199. Whenever an instruction in FLOS 184 indicates that an operand fetched to an FLB 185 is to be a source operand, the FLB when it receives the operand requests a time slot on the FLBB 199. FLB 199 has controls similar to CDB 196 but simpler in that the only priority is between the FLB's 185 according to their number. When an FLB's request for Bus 199 is accepted, its address is sent to all receiving units and, as described above with respect to the CDB 196, on the next cycle the unit which is to receive the operand will gate it in from FLBB 199.

OPERATION OF FLOATING POINT UNIT

The FLPU 142 with its own stored program in FLOS 184, its own storage in FLB's 185 and FLR's 187, and its own execution units Add Unit 188 and M/D unit 192, is essentially a small specialized computer under the overall control of the I Box 134. As was set out in the description of the I Box, any instructions for the floating point unit are sufficiently decoded to identify that the instruction is for FLPU 142 and the operation part of the instruction is sent thereto. If the instruction also specifies the FLR's 187 as the source and sink of the required operands, these two addresses will be also transmited to FLPU 142. If, however, an operand from storage is needed, the I Box 134 will determine which of the FLB's 185 are available for use, will insert the address of the selected FLB 185 into the instruction sent to FLPU and will include the identification of the FLB as the sink of the fetch request sent to MSCE 136. These instructions are sent to and stored in FLOS 184 in sequential order.

When an instruction in FLOS is ready for execution it is decoded in a Control Unit 200 on the output of FLOS 184 to determine what units are required for execution of the instruction. The full information for the instruction, i.e. Op Code and 2 operand addresses, is transmitted to all execution units. Every unbusy execution unit will sample the transmitted information and it will continue to sample the information on every cycle until it is selected. The sampling of the instructions comprises actually entering the data from FLOS 184 into a set of latches and retaining it until the next set of data is put on the FLOS output. When an execution unit is selected for the execution of the instruction, the operation codes already in its latches will be frozen into the units control circuits, and the addresses which accompanied the OP codes will remain in the selected Buffer Registers 191 or 195 or the SDB's. The execution unit is thereafter tagged busy and will not again sample the control signals until it has completed its operation and placed its result signals on the CDB 196. It is to be understood that for the purposes of this discussion, an execution unit may be considered to comprise an FLR 187, a Storage Data Buffer (SDB), or for arithmetic operations, one pair of Buffer Registers 191 or for arithmetic operations, one pair of Buffer Registers 191 or 195 for any pair of registers will store all of the operands required for an operation and such an operation, with only rare exceptions, can start as soon as all operands are stored. It has actually been determined that the time saved by the provision of three separate Add Units and two separate M/D units instead of one Add Unit 188 with three sets of Buffers 191 and one M/D unit 192 with two sets of Buffers 195 is negligible or nonexistent for most programs.

Before any execution unit can be selected it is necessary to bring up a GO signal during a decode cycle. The conditions required for generation of GO are dependent upon the operation to be performed, but may include such tests as:

(1) A precision (S/L) match between an instruction and the data in a sink register.

(2) A precision (S/L) match between an instruction and the data in a source register.

(3) Is Execution Unit Available.

(4) Is operation tagged conditional.

(5) Is the operation cancelled.

(6) Is the FLOS empty.

The next cycle of operation is the Select cycle and comprises some combination of the following operations:

(1) Turn on Execution Unit's Select Trigger for one cycle.

(2) Set Unit Busy Trigger for the selected unit.

(3) Set the FLB name section of the address of the instruction into the FLB address part of the Buffer 191 or 195 and turn on a GO When Full (GWF) tag for the addressed FLB.

(4) Set the FLR part of the address of the instruction into the FLR address part of the Buffer 191 or 195 and turn on a busy trigger for the FLR.

(5) Set a Sink FLR outgate trigger.

(6) Set a Source FLR outgate trigger.

(7) Step the Operating Stack to the next instruction.

It is to be noted that during the decode cycle, an execution unit will receive the address of the unit which is to send it the required operand or operands, and such addresses will be latched in when the unit is selected. During a select cycle of an arithmetic operation, the sink operand from the appropriate FLR 187 will be put on the bus for receipt by the selected execution unit. If, however, the sink FLR has not yet received the operand from a unit, i.e. an FLB 185, the Add Unit 188 or M/D unit 192, it will have its busy tag set as will be described at a later point, and will have in its control circuits the address of the unit which is to supply the operand to the CDB 196 for transmission to FLR 187. If the sink FLR 187 contains a set busy tag during the select cycle when its stored operand is to be transmitted, the FLR 187 will instead transmit the address of the unit to supply the operand and will then be set not busy. This address will replace the FLR 187 address sent to the Buffer 191 or 195, so that when the execution unit which is to supply the operand puts its identification on CDB 196, the identification will be recognized by the control circuits of the receiving unit which will thereupon gate the operand into its Buffer 191 or 195 on the next cycle. This scheme of transmitting the address of the operand supplying unit when the operand is not available is termed "forwarding" and as is evident will enable substantial time to be saved since in this embodiment, it is not necessary to store the operand in the designated FLR 187 and then wait several cycles to transmit it to the using unit. An additional advantage is that the FLR 187 is free to receive a new operand as soon as it has transmitted the address from which its operand was to come.

If the second operand is also to be sent from an FLR 187, another select cycle takes place to transmit either the operand stored in the selected FLR 187 or its stored identification of the unit which is to supply the operand. When the source operand is from main storage, however, the operation is somewhat changed as the FLB 185 to receive the operand is assigned by the I Box when the instruction is decoded in the I Box. Now when the instruction is reached in FLOS 184, the control circuits 200 will look at the addressed FLB and if it is full on the first select cycle, it will be gated out to the execution unit where its stored operand is to be used. If, however, the operand has not been received, the FLB is directed to GO When Full (GWF) as previously noted, and will then put its operand on the FLBB 199 when it has been received and priority permits.

NON-ARITHMETIC FLPU OPERATIONS

The Control 200 in conjunction with FLOS 184 can perform a number of operations without the use of an arithmetic execution unit. These operations will include a number of variations of a load routine such as load, in either short or long precision, one FLR 187 from an FLB 185, or from another FLR 187, or to load from one FLR to another and to test for a zero, positive or negative condition of the operand. The operations will also include a store routine to transmit an operand from a sink FLR 187 to an SDB by way of the CDB 196. None of these operations involve an arithmetic unit and simply transfer data unchanged. If the move operation is to load an FLR 187 from another FLR 187, the operand storage address is sent on the decode cycle and the operand is sent on the next cycle. If, however, the sending FLR is tagged busy, its address register contents are forwarded to the receiving registers address register, and the sending one is reset to not-busy. When the sending device is an FLB 185, the FLB will transmit over the CDB 196 if it is full, or will be set to Go When Full, and it is given priority. The address register contents cannot be forwarded for these operations for the SBO 155 of the FLB's does not connect directly to the FLR's 187.

If the operation is a Store Operation, a similar sequence is followed except that an SDB in the MSCE 136 is to receive the operand from an FLR 187. The SDB will be given the address of the source FLR, or the contents of the source FLR's address register will be forwarded to it if the FLR is busy and has not received the operand.

FIXED POINT UNIT

Figure 6B:
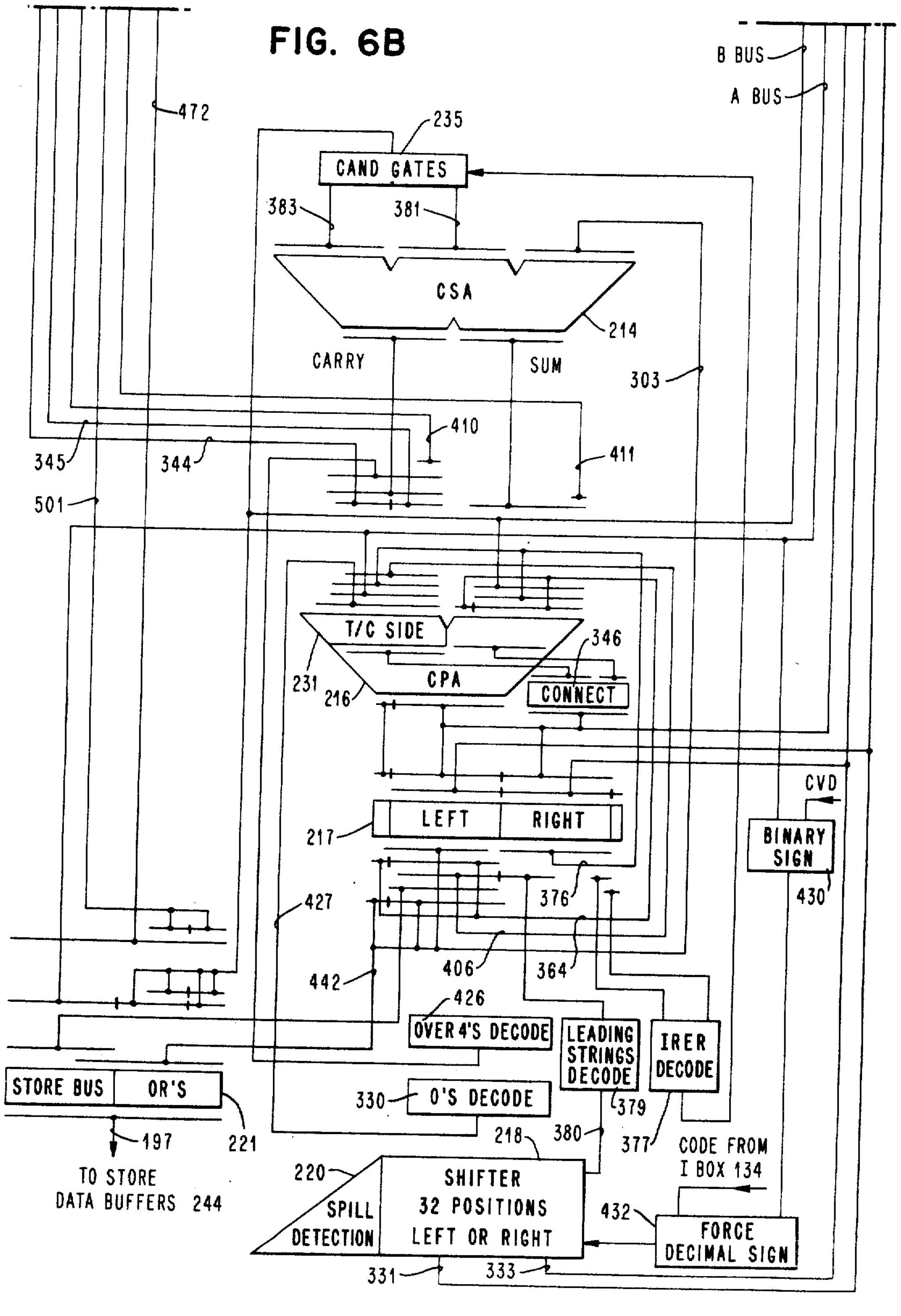

The Fixed Point Unit FXPU 143, FIG. 3, is a part of the E Box 133 and executes all operations using fixed point hexadecimal numbers and all variable length operands, alphabetic and/or numeric. The FXPU 143 comprises five functional units as indicated in FIG. 6. These units are in Operation Stack 201, for both Fixed Point and Variable Field Length operations, a group of 16 General Purpose Registers (GPR) 202, each 32 bits wide and, as previously mentioned in the description of the I Box 134, each connected by "hot" lines to the I Box GPR A Bus 173, and GPR B Bus 174, and six Fixed Point Buffer (FXB) registers FA to FF, individually referenced as FA 204, FB 205, FC 206, FD 208, FE 209, and FF 210. Also included in FXPU 143 are a VFL Logic Unit 212 having associated with it an Immediate Data Input Register 213, and a Fixed Point Execution Unit which may be considered as comprising a 36 bit three input Carry Save Adder (CSA) 214, a 38 bit wide Carry Propagate Adder (CPA) 216 which can feed its output into either half of a 68 bit Accumulator 217, and a Shifter 218 on the output side of Accumulator 217. Shifter 218 is capable of shifting the output signals to the right or to the left up to 32 bit positions and includes an Overflow Detector 220 to detect any significant digit loss on a left shift. A group of Store Bus OR's 221 can combine data to be transferred from different units in the FXPU 143 to the Storage Data Buffers in the MSCE 136 into the one Bus 197.

The Fixed Point Operating Stack (FXOS) 201 contains six 24 bit Buffer Registers. The function of FXOS 201 is to receive microcoded Op's on an input bus 222 from the I Box 134 as previously mentioned, and to issue the Op's on a First in-First Out basis to the Op decoder 224 for control of the Fixed Point/VFL operations.

The 16 GPR's 202 are used as the sink and source of the operands for most instructions. There are two full word output busses, A Bus 225, and B Bus 226, and only full words can be gated from a GPR 202 to a Bus 225 or 226. The GPR Address Register 228 is a 9 bit register set from I Box 134 on Bus 229 to control the address of the GPR which is the sink of an operation and controls the ingating of operands into the GPR's 202. A single byte (8 bits) a full word (32 bits) or a double word (64 bits) can be ingated on any cycle. An ingated byte will always be stored in bit positions 24 to 31, i.e. the right end of a GPR and a double word will be stored in an even-odd pair of GPR's, i.e. #'s 2 and 3, 4 and 5, etc.

The six Fixed Point Buffers 204–210 are used during Fixed Point/VFL operations as sink and source data registers and all operands from storage will enter the FXPU 143 through these Buffers. Four of the six buffers FA–FD are used for all multi-operation instructions, both Fixed Point and VFL, while the other two FE and FF are used only for Fixed Point operations. A buffer can have either the right or the left 16 bit half outgated to the left half of the left input of CPA 216, or the right half of the buffer can be gated into the right half of the same left input of CPA 216, either alone or in conjunction with the gating of the buffers left half into the remainder of the CPA input. It should be noted that this left input of CPA 216 has a T/C side 231 which may be set to cause entry of the operand (T) or its complement (C) for effective addition or subtraction of the operand.

For VFL operations, the FA and FB buffers 204 and 205 may be used as one 64 bit sink register and any byte may be outgated to the sink bus 232 of the VFL Logic Unit 212. The other two buffers FC and FD 206 and 208 may be used as the 64 bit source register and any byte may be outgated to the Source Bus 233 of the Logic Unit 212. Although not further dscribed at this time, there is a Byte Address Register associated with each Buffer FA, FB, FC, and FD, those with FA and FC being three bits wide to address any byte of the combined 64 bits of FA–FB and FC–FD and those for FB and FD being two bits wide to address any of the four bytes in a register when it is used alone as a 32 bit wide register. Each address register can be incremented or decremented by a unit and the data in the register controls the bytes to be outgated to Busses 232 and 233.

The Carry Save Adder 214 is used only for Multiplying operations and has a Multiply Gate 235 connected to two of its inputs to supply to one input either nothing or a one multiple or a two multiple and to the other input either nothing or a four multiple or an eight multiple. All multiples are of the multiplicand operand without a 0, 1, 2, or 3 bit position left shift, and any multiple can be supplied either plus or minus as required.

The Carry Propagate Adder 216 is 38 bits wide on each input. It is used as a 32 bit wide Adder for Add and Subtract operations, as a 36 bit wide Adder for multiplication and division operations and it is used over its full width in Convert to Decimal operations. Only on the left input is a complement function available.

The Accumulator 217 is 70 bits wide with a right 32 bits, a left 32 bits and a six bit left extension, and is used particularly in Multiplication to buffer partial results. The outgating circuits go to the Shifter 218 or back to the inputs of CPA 216 with the CPA input circuits settable for a left shift of either one or three orders, or for a right shift of four orders of only the left part and extension. The outgating for the right part of Accumulator 217 enables the value stored in the right half of the Accumulator 217 to be sent to either input of CPA 216, to be partially decoded along with the left part for a string of leading zeros in Leading Strings Decoder 379, or to a Multiplier Decoder 377 which controls the Multiply Gates 235.

The Shifter 218 spans a full 64 bits and is ingated from Accumulator 217 and for the Multiply operation can also receive the right four bits of the six bit left extension. The input can be shifted to the right or to the left and can be shifted any extent up to 32 orders. Zeros will be filled in on the right or left end, ones will be filled on the left end when a complemented negative number is shifted and any significant digit shifted to the left out of the effective output bus will be detected as a spill.

The Immediate Data Register 213 is linked to the VFL Data flow and is also linked to the Operation Stack 201. Its primary function is to hold Immediate Data which will be included in the instruction word. This register 213 can outgate to either the Sink Bus 232 or the Source Bus 233 for the VFL Logic Unit 212.

The VFL Logic Unit 212 has the Sink Bus 232 and the Source Bus 233 as its two 8 bit inputs and has the ability to AND, to OR, or to XOR (Exclusive OR) the two sets of inputs or to gate either input unchanged to the Result Bus 234.

The I Box can supply data directly to the GPR's 202 by sending a 32 bit word, generally an address base, on a Bus 236 and specifying the GPR 202 to receive the data by the signals on Bus 229 to the GPR Address Register. The I Box 134 can receive signals by the 512 "hot" lines connected to the GPR's and an 8 bit OR 237 drives a bus which can transmit any 8 bit byte from the FXB's 204, 205, 206 or 208, to I Box 134.

The Storage Bus Out (SBO) 155 is a 32 bit wide bus and will carry a word from storage as the response to a fetch request. Data on this Bus 155 will be preceded by the I Box asigned address of the FXB into which the operand is to be stored. As described earlier, the detection of its address by an FXB 204–210 will open its ingates on the next cycle to allow the store value to enter the FXB.

The Floating Point Bus is Bus 199 of FIG. 5 and comprises a 64 bit data part and a three bit address part to select an FXB as above. Data will be put on the Bus 199 as a result of a request from FXPU 143.

The Store Bus OR's 221 can be loaded with up to 64 bits of data to be sent to a Storage Data Buffer (SDB) 244 in MSCE 136. The OR's 221 will also be supplied the address of the SDB 244 to which the data is to be sent. The Store Bus OR's 221 can collect data from the FXB's 204–210, from the GPR's 202 and from the Accumulator 217. Either 1, 2, 4, or 8, bytes of eight bits can be gated through the Store Bus OR's 221.

FIXED POINT UNIT OPERATION

The primary purpose of the decoder 224 is to control the issuing of instructions from the Operating Stack 201. These instructions in FXOS 201 are microcoded in 21 bits with the left eight bits containing the Op code. Three tag bits are also provided for each FXOS buffer register. These three are the Conditional Operation, Set Condition Code, and Full bits which have been previously described.

As Op's are processed, certain signals must be sent to the I Box 134 to maintain up-to-date the I Box counters indicating the status of the GPR's and FXOS. The RUA and RUM Counters 337 and 335 are incremented as OP's are sent to the FXOS and during execution of these OP's the same counters are to be decremented and will indicate that a specific GPR has just completed its function as a sink or a source field. The specific RUM or RUA counter to be decremented will be indicated by the register address field of the Op or from the GPR Sink Address Register 228.

The I Box 134 also maintains the FXOS Counter 203 to indicate the number of unexecuted instructions in FXOS 201. Each Op issued by I Box 134 to FXPU 143 causes the Counter 203 to be incremented, and each OP execution sends a Stack Counter Decrement Signal to the I Box.

Fetches of all operands will have been called for by the I Box when an instruction is decoded, and a specific FXB 204–210 or Floating Point Buffer (FLB) 185, FIG. 4, will have been assigned. In general, all 32 bit operands will be brought into the FXB's while 64 bit operands will be sent to an FLB 185 and will be transferred to the FXB's when requested. The address of the assigned FLB or FXB will be included in the Op sent to FXOS 201. The I Box 134 keeps track of the full or empty status of the FXB's and FLB's by setting a busy trigger when an FXB or FLB is asigned and then having the trigger reset by OP Decoder 224 when the data in the FXB or FLB is used. Also, address generation of operands, branches etc., in I Box 134 will be taking place concurrently with the execution of OP's in FXPU 143. To prevent delay in the I Box processing when Fixed Point operations are in process, the I Box is given priority in making a store into GPR's 202, even to the point of blocking Fixed Point/VFL processing if necessary. This priority is controlled by an ingate priority circuit which monitors all I Box requests for GPR ingating, and as soon as the I Box request for ingating is accepted, it will block an ingate request from the FXPU execution units until the I Box has completed its storing into the GPR's.

In the FXPU 143, the normal processing of Op's in the FXOS 201 is in a serial manner. As an OP is issued to one of the execution units, Fixed Point or VFL, any data required from an FLB 185 is called for and assigned to an FXB 204–210. The FXB's are monitored to detect when all data fields are available to execute the issued Op.

While the execution of one Op instruction is in process in the execution units, the next Op in FXOS 201 is being decoded in Decoder 224 and this will apply for the successive Op's of a multiple Op instruction, as well as for an Op which can be executed in a single cycle. The succeeding Op will be issued as soon as the data facilities for its execution are available to the extent that two or more Op's can be in execution simultaneously if they do not have overlapping hardware requirements.

Most Op's for the FXPU 143 are single Op instructions having, for the control bits 8 through 20, the addresses of the registers containing the needed operands. In these 21 bits, bits 0–7 are for the Op code, bits 8–11 identify a GPR 202 for the first operand, bits 12–15 identify a second GPR 202 for a second operand, bits 16–18 specify which FXB or FLB contain the operand to be sent to storage, and bits 19–20 are the SDB 244 which is to receive the data to be stored in Main Storage 104.

For another type of operation, single operand instructions, bits 12–18 may contain data having a different significance. If the operation is a SHIFT then bit 12 specifies a direction and bits 13–18 are the shift extent, while for a LOAD MULTIPLE or STORE MULTIPLE, there will be a plurality of Op's, i.e., one micro-Op for each word and bits 12–15 are control bits for LEFT, RIGHT, START and END, and bits 16–18 specify the FLB 185 having the storage operand to be processed.

The Fixed Point Unit (FXPU) 143 operations may be grouped into single cycle instructions and multiple cycle instructions. The single cycle instructions include the LOAD instructions in which all operands go through the Adder 216. The source register, either an FXB or a GPR is gated to the left input to Adder 126 and then back to the GPR sink register. If the LOAD instruction includes a test of the operand condition, the test is made at the Adder 126 according to the instruction with the Condition Code being set in accordance with the result of the test. For a LOAD POSITIVE or LOAD NEGATIVE, the T/C gates 231 of Adder 216 are conditioned to enter the operand, complemented as required for the instruction, while LOAD COMPLEMENT always complements the operand. The numeric operations, ADD, SUBTRACT, COMPARE, and the CONNECTIVES, all require two operands and have a GPR 202 as a sink operand storage. The source operand may be from either a GPR 202 source or from an FLB 204–210. For SUBTRACTS and COMPARES, the operand which is to be subtracted is directed to the left input of Adder 216 where it can be complemented as required. The CONNECTIVES, i.e., AND, OR, and EXCLUSIVE OR, are performed within the ADDER 216 in a separate data path and OR'ed into the Adder output. STORE operations route a data operand from the selected GPR 202 to Store Bus OR's 221 for transmittal to an SDB 244.

The multicycle Op's are either a fixed number of cycles, e.g. single word shifts or are data dependent as MULT, DIV, CONVERT TO BINARY, SHIFT DOUBLE WORD, etc. The RUM and RUA Decrement signals and the FXB Not Busy signals are sent to the I Box during the execution of these operations at times dependent upon the operation and the FXOS 201 Buffer Register is released to the I Box as soon as all data has been extracted from it, generally on the second execution cycle.

VARIABLE FIELD LENGTH OPERATIONS

The VFL Execution Unit generally operates with alphanumeric operands having no fixed length. Since such operands cannot normally be encompassed in a double word length, the operation is generally with one operand from storage and a second operand from either storage or a GPR 202. The VFL Logic Unit 212 operates for each cycle on a maximum of eight bits from each operand and these 8 bit bytes are supplied over the Source and Sink Busses 232 and 233 from the FA–FB and FC–FD Buffers. Since the length of storage in a buffer is 8 bytes, it will be necessary for the I Box 134 to keep these buffers filled until the whole of the VFL operands is utilized. The I Box 134 will issue an Op for each word to be used as either a source or a sink, will refill each buffer as the data word therein is utilized, and will indicate when the VFL operation is to terminate.

MAIN STORAGE CONTROL ELEMENT

The Main Storage Control Element (MSCE) 136, FIG. 7 is the communication control unit between the E and I Boxes 133 and 134 on one hand, and on the other hand to the Main Data Storage units 104, and, through the PSCE 137 to Extended Storage Units 105 and the I/O units indicated in FIG. 1.

The MSCE 136 is logically divided into the following functional areas as shown in FIG. 7:

(1) Storage Address Bus (SAB) 240, Store Address Registers (SAR) 241 and Sink Bus 243.

(2) Storage Bus In (SBI) 242, Storage Bus Out (SBO) 155 and three Storage Data Buffers (SDB) 244.

(3) The request Stack (RS) 245.

(4) The Accept Stack (AC) 246.

The Storage Protect Feature 138, shown in FIG. 7, is as previously noted, described in detail in applicant's pending application No. 334,714, and will not be further described herein. It functions to store a protection code for each block of storage addresses in MS 104, and for every reference to an address in MS 104 it compares the code for the block including that address with the code under which the program is operating to detect and signal any unauthorized storage operations.

The Storage Address Bus 240 receives from the I Box 134, the Maintenance Console 102 and PSCE 137, the address at which a storage operation is to be performed, as well as the instructions for performing that operation. The Storage Address Bus 240 is ingated to the Storage Address Registers 241, the Request Stack 245, the Accept Stack 246, and to the PSCE 137, for those storage addresses which are not contained within the MS 104. The Sink Bus is fed from the Accept Stack, the Maintenance Console 102 and PSCE 137, and carries, one cycle in advance of the presentment of data, the sink address of the unit to receive data requested from storage. The Sink Bus 243 is sensed by each unit which can expect to receive data from storage, i.e. the I Box 134, the FXPU 143, the FLPU 142, the Maintenance Console 102 and PSCE 137.

The SBI 242 is the bus carrying all data for insertion in MS 104 or EMS 105, and its only supply source from CPU 100 is through the SDB's 244 although it can also be ingated from the Maintenance Console 102 or the PSCE 137. Similarly the SBO 155 can receive data from the MS 104, PSCE 137, SPF 138 or Maintenance Console 102, and is outgated to the units which sense the Sink Bus 243, i.e. the I Box 134, the FXPU 143, FLPU 142, PSCE 137 and Console 102. The SDB's 244, as previously noted, are filled over a Bus 197 with data under control of store instructions issued by I Box 134 to itself or the E Box 133.

The Request Stack 245 is a group of four buffer registers to hold storage instructions which cannot be immediately put into operation as they are received, due generally to a "busy" condition of the module of Main Store 104 containing the desired operand. It will normally issue a stored request when the requested storage module becomes available and the stored requests will issue in a random order since there is little likelihood that the storage modules of MS 104 will become available in the same sequence as instructions are stored in Request Stack 245. If, however, there are two requests in Request Stack 245 which can be issued, or if there are two requests addressed to the same module, these will be issued in a First In-First Out status to insure issuance of every request and to preserve logical correctness. The Request Stack 245 has priority over the CPU in issuing instructions to MS 104 and when one of its buffered instructions can be issued, that instruction will be transferred into the Accept Stack 246 in preference to one from CPU 100 which will be blocked from access to the Accept Stack side of SAB 240.

The Accept Stack 246 is the main data control area of the MSCE 136. It is essentially a large pushdown stack of buffer registers in which stored data is moved downwardly one step for each machine cycle, so that it becomes available at various output control stations on a strict First In-First Out basis. The Accept stack 246 has first a group of five Address buffers 248, each sufficiently large to store the address of any double word in MS 104. There are also a group of eight sink address buffers 249 to retain the return address of a word being fetched from storage, and also a column of 11 module designating buffers 250 to hold the designation of the module of MS 104 in which the fetch or store instruction was being performed.

It should be noted that buffers 248, 249, and 250 are simultaneously loaded with the data on SAB 240 and as all data progresses downwardly one step per machine cycle, the word address in buffers 248 will remain available for five cycles, the sink address in buffers 249 will be retained for 8 cycles and the module address in buffers 250 will be held for eleven cycles. The reasons for retaining such addresses for the given times is related to the ratio between the machine cycle under which the CPU 100 operates and the much slower cycling speed of the MS 104 modules. After an address has been issued to MS 104 and a module thereof has started to cycle, it requires nine machine cycles before the data for a fetch can be gated on to the SBO. However, only three cycles are required before the data for a store can be gated from the proper SDB 244 into the data register of a module. The sink address in buffers 249 is therefore retained in buffers 249 until the eighth cycle when it is gated from the lowest buffer 249 to the Sink Bus 243 to alert all sink units that data for the specified sink unit will be put on SBO 155 on the next cycle. For a store cycle, the stored data contained in the SDR 244 for the SAR 241 which started the store cycle, is outgated to SBI 242 three cycles after the store request is set on the SAB 240, as will be later described in more detail. The sink buffers 249 also store and shift the control data which accompanied the instruction. Such control data can include error signals, Maintenance Console 102 instructions, etc.

The eleven module designating buffers are used to control on the ninth cycle, the Data Out Gating controls to put the fetched data from the proper module onto the SBO 155. The additional buffer locations are required due to the construction of the modules of MS 104. As is conventional, each module is started cycling by supplying to it one of its addresses. After a fixed interval, herein taken as about eight machine (CPU) cycles, the data from the address location is present in a Storage Data Register in the module and can be gated out as is described above on the ninth cycle. For a store operation, some or all of the data at the addressed location is prevented from entering the Storage Data Register and its place is taken by data ingated from SBI 242. During the remainder of the module cycle, the information in the Storage Data Register is copied into the addressed location and after about the 13th machine cycle, the module can be readdressed for another operation. The eleven buffers of module designation stack 250 are continuously monitored to indicate the busy modules. Every address put on SAB 240 is decoded to determine the designation of the module having that storage address and that designation is compared with all of the module designations in stack 250 to determine if the requested module is busy. The storage address is transmitted to all storage modules and the entire information is gated into Accept Stack 246 and Request Stack 245. If, however, the required module is busy servicing a previous storage request, the request is rejected and tagged invalid in Accept Stack 246 where it will be ignored and will be tagged Valid and held in the Request Stack 245. It should be noted that every request is ingated to one of the Request Stack 245 buffers but is only tagged valid if the requested module cannot accept the request. Unless the valid tag is on, a buffer of the Request Stack 245 is considered empty.

One exception to the rejection of requests for data in a busy module is made when a fetch is to be made from a storage location which is already being fetched from or stored into. If the fetch address is contained within the five buffers of Address Stack 248, it is immediately accepted into Accept Stack 246 despite the busy state of the module. As above noted, the Storage Data Register of the module retains the fetched or stored data so that a second outgating of the data can be performed without the necessity of going through another storage cycle with consequent delay in supplying the data to the requesting unit. The Address Stack 248 is limited to five positions as it is believed that the time saved when the later fetch is more than five instructions after the earlier request does not justify the additional hardware and complexity required to eliminate the storage cycle.

Such detection of a request to a storage location presently being accessed is controlled by a Compare Unit 252 which compares on each machine cycle every address within the five buffers of Address Stack 248 and all addresses in the Request Stack 245 with the I Box 134 requested address on SAB 240 to detect any such request which can be accepted even though the addressed module is busy.

As noted above, Request Stack 245 has four buffer registers. In order to save time, each request applied to SAB 240, is stored in a selected one of these four buffer registers. However, the buffer register is tagged valid only when it is determined that the required storage module is busy. If the required module is not busy, the request in the buffer is not tagged valid and is ignored. When an indication is received that a storage module for which there is an outstanding request in Request Stack 245 is about to go not busy, Stack 245 has priority over any new requests from the I Box 134. The Request Stack 235 will therefore put its address on SAB 240 and inhibit the application of an address to this bus by the I Box 134.

Since execution of a fetch request may be started as soon as it is entered into the Accept Stack 246, whereas a store request must wait until all of the required data is available, a situation could arise where a fetch request is received for data from a particular address while an unexecuted store request for storing in that address is in one of the SAR's 241. In order to prevent the fetching of improper data, the fetch request must be inhibited until the store operation has been completed. This objective is achieved by compare unit 254 at the SAR's which compares every address received on bus 240 with each address in the SAR's. A successful comparison in compare unit 254 means that the request cannot be executed and that it must therefore be stored in Request Stack 245. The entry in Request Stack 245 is chained to the corresponding entry in SAR 241, so no attempt to execute the fetch request will be made until the store has been completed.

Various other multiple access conditions to a single memory address may also exist in the system. When multiple fetch requests are made to the same memory address, the fact that there is an unexecuted request to that address in Request Stack 245 is noted by compare circuit 253, and the two requests are chained together. These requests are executed on a first in-first out basis with the second request, in almost all cases, being applied to SAB 240 on the cycle immediately after the cycle that the first request is supplied to this bus. This is the only exception to the rule that a Request Stack entry is not applied to SAB 240 when the required module is busy. More than two requests to the same storage address would be handled in the same manner. If the request is to an address which is already in one of the five address positions of Accept Stack 246, this fact is noted by Compare Unit 252, and the request is validly entered into the Accept Stack even though the indicated module is busy. In this manner multiple access may be had to the same storage address with only a single storage select operation. Again, more than two requests to the same address would be handled in the same manner. Finally, the presence of two successive store requests to the same address is detected by compare circuit 254 and the requests are chained together in SAR 241. Successive store requests to the same address are likewise handled on a first in-first out basis in order to preserve logical continuity.

It is to be noted that each module of MS 104 can retain the readout or stored data in its Storage Data Register until the module is recycled. As above noted, this feature permits a fetch from an address to be performed following a fetch from or a store into that address of the module. Also, the Accept Stack 246 contains no transient information and will store data indefinitely unless during a machine cycle a clock pulse is gated thereto to step data down through the Accept Stack 246 and out the bottom. Consequently, no data will be lost if the MSCE is temporarily halted. This feature is quite advantageous for diagnostic error testing where the serviceman can cause the Main Storage 104 and MSCE 136 to progress by single machine cycles to enable each stage of the storage operation to be checked for error.

MSCE CONTROLS

The controls in MSCE 136 have two main functions. First, a decision must be made as to which addressing source is to be gated on to the SAB 240, and secondly, assuming that some address is put on the SAB 240, another decision must be made as to which of the instruction buffer units is to be selected.

The first decision may be considered as a priority allocation for it enables a selection between simultaneously calling sources. In every machine cycle, the priority conditions are examined to determine which source is to gate on to SAB 240 in the next cycle, and at the same time, the present contents of a previously selected source are being transmitted over the SAB 240. There is thus an overlapping of service and effectively the SAB 240 can service one storage access call during each machine cycle.

The general order of priority is:

(1) EMS 105 data returns to CPU 100 or MC 102.

(2) PSCE 137 request for data from MS 104.

(3) Maintenance Console 102 returns data to the I Box 134 or E Box 133 or applies requests to MSCE 136 for MS 104 or EMS 105.

(4) Request Stack 245 issue to MS 104 for a multi-access request.

(5) SAR 241 request for MS 104 or EMS 105 service.

(6) Request Stack 245 to MS 104 or EMS 105 for service.

(7) CPU 100 request to MS 104 or EMS 105 for a fetch.

Priority (1) is generated as a result of a previously issued request from CPU 100, or MC 102, for a fetch from EMS 105. When PSCE is about to select an EMS 105 storage module, a signal is sent to MSCE 136 to create a time slot on the SBO 155. Such a time slot on SBO 155 is created by not gating anything to SAB 240 during a cycle so that the Accept Stack has a vacant position. Nine cycles later there will be no data gated out of MS 104 when this vacant position reaches the Data Out Gating position in Accept Stack 246 and PSCE is free to put its data on SBO 155, and also, of course, to put the sink unit address on the Sink Bus 243 during the preceding machine cycle. Since the PSCE 137 created the time slot, it knowns when the Sink Bus 243 and SBO 155 will be available and it gates its data out accordingly.

Priority (2) arises as a result of the notification by PSCE 137 to MSCE 136 of the need of some data device connected to the PSCE 137 for a storage reference to MS 104. The MSCE 136 continuously decodes the module designations in the upper eight positions of section 250 of Accept Stack 246 and signals to PSCE 137 the designations of the modules which are identified in those positions. Since it requires four machine cycles for the decoded designation to be transmitted from the MSCE 136 to PSCE 137, and for the PSCE 137 to respond by making a request, MSCE 136 notifies PSCE 137 of the availability of a module by signalling a not busy condition of a module four machine cycles prior to the end of the storage cycle. The PSCE 137 has priority over the other uses of SAB 240, and it can then issue its request, which it knows will be addressed to a module, which will be available when the PSCE request is received by MSCE 136, and that the request will be received by the Accept Stack 246. It is the responsibility of the PSCE 137 to be ready to accept the data return at the time it is set onto SBO 155.

Priority (3) puts an address from MC 102 on SAB 240 as soon as the requested module is not busy, i.e. its designation does not appear in any buffer of the section 250 of Accept Stack 246 and its busy signal is therefore not energized.

Priority (4) gives next priority to a second instruction of a multiaccess pair of instructions. When the first of such instructions is stored in Accept Stack 246, the MS signal on SAB 240, along with an identification of a buffer in Request Stack 245, causes the contents of the designated buffer to be the next instruction gated out on SAB 240 into Accept Stack 246, so that the instructions are executed in logical order, but without unnecessary intervening storage cycles.

Priority (5) enables a store to MS 104 to be executed when ready. As soon as one of the three SBD's 244 is set with data, the corresponding SAR 241 requests priority within the group of SAR's 241, where priority is on a first in-first out sequence among the ready SAR's. Thus, if the SAR has priority within the SAR's 241, and no higher priority has claimed SAB 240, the instruction on SAR 241 will be put on the SAB 240 for storage in Accept Stack 246, or Request Stack 245, in accordance with the Busy-Not Busy condition of the requested Storage Module.

Priority position (6) is given to the Request Stack 245. Each buffer within Stack 245 with a valid instruction compares the designation of the storage module needed for execution of its instruction with the Busy-Not Busy condition of the module as decoded from the designations of the modules in Section 250 of Accept Stack 246. If more than one Request Stack Buffer compares its module designation with that of a non-busy module, a sub priority of First In-First Out controls which buffer shall be gated on to SAB 240. When a buffer of the Request Stack 245 designates for a fetch request, a storage address which is also contained within an SAR 241, the buffered fetch request is for the fetching of data which has not yet been stored and the request cannot be allowed to compete for priority. It will, however, be designated as a multiaccess buffer and given fourth priority when the instruction in SAR 241 is issued after the required data has been stored in SDB 244

The last priority position is given to CPU 100 requests for storage service which may comprise a direct request for a fetch, the instruction being stored in either Request Stack 245 or Accept Stack 246, depending upon the Busy-Not Busy condition of the required storage module, or which may comprise storage of the instruction in an SAR 241 for a store cycle. As a safety feature, the CPU 100 cannot issue storage instructions when the Request Stack 245 is full. This prevents possible loss of the instruction for lack of a buffer to store it in.

To optimize the overlap operation of storage units, for optimum priority and optimum utilization of the SAB 240, knowledge of the future condition of availability of a storage unit is as valuable as knowledge of its present availability. The module designations in Section 250 of Address Stack 246 are therefore decoded to generate three module busy signals for each module. A first busy signal is the busy to PSCE signal which goes not-busy four machine cycles before the actual end of a storage cycle of a module. The use of this signal enables the PSCE, as above noted, to be present to claim a module for operation as soon as its cycle times out. A second busy signal is Busy to Priority which drops two machine cycles prior to the end of the modules cycle. This signal when down allows the Maintenance Console 102 or Request Stack 245 to be preset to us the SAB 240 during select time.

The third busy signal for a module is Busy to Select which drops only one machine cycle before the end of the storage module cycle. When this line drops, a select signal can be generated to start the module on its next operating cycle when the SAR 241 or CPU 100 requests the module provided that the use of the SAB 240 is not claimed for a higher priority function. If the SAB 240 into the Accept Stack is so claimed, then the SAR 241 or CPU 100 request is inhibited. Obviously, all three of the busy signals for a module are down when the module is not cycling, and all signals will go busy together when the module starts to operate.

The second control condition is the decision of whether or not a storage module is to be selected for an address on the SAB 240. After it is decided in the priority controls which source, if any, shall gate an instruction on to SAB 240, the MSCE 136 must decide what to do with the information to appear on SAB 240. When data is set on SAB 240, it is stored in the topmost position of Accept Stack 246, an SAB Valid Signal is set for one machine cycle, and the storage address on SAB 240 is sent to all storage modules. The Accept Stack 246 decodes this address to determine the designation of the module containing the address and checks the busy-not busy status of the Busy to Select signal for that module. If the Busy to Select signal is down, the selected module recognizes its address on SAB 240 and retains the requested address and starts cycling. At the same time, the topmost position of Accept Stack 246 is tagged valid.

As the capacity of MS 104 is limited, it may happen that the address set on SAB 240 represents a storage location in EMS 105, and if so, when this address is present on SAB 240, it is routed into a buffer register in PSCE 137 for decoding and selection of a location in EMS 105, as will be later described. In the event that the buffer of PSCE 137 is not available, the storage request will be handled as a request for a busy MS 104 module.

In the event that the needed PSCE 137 or MS 104 module are busy, the instruction information which has already been gated into Request Stack 245 is tagged valid to prevent further stores into that buffer of Stack 245, and as above noted, will be issued to SAB 240 when the required storage module is about to go not busy. The multiple access considerations set out previously for double instruction references to a single address may prevent a selection of a non-busy storage module whose address comes up on SAB 240, or may cause a second instruction to be set into Accept Stack 246 without another selection signal to a busy module. When the multi-access situation is detected between the SAB 240 address as set in from CPU 100, and a storage address in a store instruction in an SAR 241, it is too late to prevent the issuance of a select pulse to the storage module required, and such a pulse will issue if the instruction would otherwise be executed. However, in this case, the Sink Address Section 249 of Accept Stack 246 is prevented from being set and although the storage module goes through its storage cycle, there is no sink signal sent out on Sink Bus 243, so no unit is alerted to gate in the information on SBO 155, and it is lost for that cycle.

PERIPHERAL STORAGE CONTROL ELEMENT

The Peripheral Storage Control Element (PSCE) 137 controls the flow of data between the MSCE 136, the Extended Main Storage 105, and the Input/Output (I/O) Channels 106 and 122, see FIG. 1. As indicated in FIG. 8, the PSCE 137 is comprised of three major sections, the Bus Control 260, the Common Channel Control (CCC) 261, and the Storage Channel (SC) 262. The Bus Control (BC) 260 is the central unit of the PSCE 137 and communicates directly with MSCE 137, with EMS 105, with CCC 261, and with SC 262. All accesses to EMS 105 by CPU 100 through MSCE 136, as well as all accesses to MS 104 by either the SC or an I/O unit pass through Bus Control 260. In order to maximize utilization of EMS 105, the Bus Control 260 maintains a request stack that may contain up to eight requests. As any module of EMS 105 becomes available, the Bus Control 260 scans this stack and initiates a storage cycle if there is a request for the not-busy module. Since the BC 260 will start cycling of any needed module as soon as it is not busy, storage requests may be handled out of sequence. Requests to MSCE are similarly handled for as above noted, any module of MS 104 drops its Busy to PSCE signal four machine cycles before the end of its storage cycle, thereby giving the Bus Control 260 of PSCE 137 time to call for use of the module as soon as it is not cycling. Since the PSCE has first priority on calls to MSCE 136, BC 260 can be sure that when it does issue a storage instruction to MSCE 136, the request will be accepted and BC 260 can proceed to another item.

The Common Channel Control (CCC) 261 provides for the attachment of up to five Selector Channels 122 and one Multiplier Channel 106. The channels all attach directly to CCC 261 which in turn communicates with the BC 260. All channel storage requests are monitored by the CCC 261 to maintain priority among them, and the CCC 261 also controls the sequencing of the issued I/O instructions, machine interruptions and unusual conditions. When high speed I/O devices fetch from MS 104, the CCC 261 takes on the responsibility of prefetching data into the buffers of Bus Control 260 to insure that data is available when needed.

The Storage Channel (SC) 262 controls data transfers from one storage to the other. The SC 262 appears to BC 260 as a control unit and its I/O device with both attached to a selector channel as 122. It responds to instructions of the selector channel type and uses the command and interrupt formats of such a channel. All communications between SC 262 and the storage modules are handled by the BC 260 and can be overlapped with other system activity.

BUS CONTROL

The basic internal structure of Bus Control 260 is shown in FIG. 9, and consists of five major elements. These are the Input Busses, the Queue, the Control Stack, the Output Busses and the Priority Control. There are five Input Busses, of which two, EMS In Bus 264 and EMS In Bus 265, handle fetch returns from EMS 105 with Bus 264 being controllable to feed the PSCE Output bus SBO 155 when the EMS fetch is for CPU 100. The SAR 240 brings in requests passing through MSCE 136 and SBO 155 supplies data returns from MSCE 136. The Input Request Bus 266 enters all storage requests from the CCC 261, from SC 262, and from Maintenance Console 102.

Queue 268 is a stack of eight 115 bit buffer registers having a 72 bit data field (64 data bits, 8 parity bits), a 24 bit address field, a nine bit mark field, a six bit key field and a four bit error field. Each request accepted by BC 260 will be assigned to one of the eight buffer registers until the request has been supplied. The function of the fields are:

Data.—Hold data to be stored until the selected storage module has accepted store data during a store cycle, or to receive fetch data when available from a storage module during a fetch cycle.

Address.—The storage address of the request is retained here until it can be received by storage.

Mark.—An eight bit byte with a parity bit to specify which bytes of the addressed double word (8 bytes) are to be changed during a store cycle. When a bit signal is present the corresponding byte is to receive a data byte from the Data Field.

Key.—This field is for the Storage Protect Key which must compare with that of the protection key for the addressed storage location.

Error.—These four bits are separately settable to indicate which type of error has been detected in execution of the request. The indicated errors are Data Check (bad parity) Address Check (bad parity), Storage Protection Violation (wrong key used) and Invalid Address (not contained in the storage modules).

On a Store request, the assigned queue register holds its data until the memory select signal is generated and the data has been entered into the data storage register of the storage module. On Fetch requests, the buffer register of Queue 268 holds the data therein and remains busy until the storage fetch is complete and the data has been gated out to the requesting unit.

Queue Control Stack 269 is a set of eight 30 bit registers having the following data fields:

Primary Decode.—12 bits to indicate the storage being requested.

Source Address.—Eight bits (seven bit plus a parity bit) to identify the unit requesting the storage operation.

Full/Empty.—A bit which is set when a word has been returned due to a fetch request.

Hold.—A bit to prevent a request from being erased after it has been executed. This bit is used for maintenance to prevent cancellation of a request and may also be used to eliminate a defective register for if this bit is set the associated control register cannot be stored into.

Active.—A bit set to indicate that this Control Stack Register is presently occupied by a pending request.

Operation.—Three bits individually settable to indicate one of three CPU 100 operates, Set Tag, Insert Tag, and Test and Set.

Queue Link.—Three bits plus a parity bit settable in combination to identify the Queue Register which has been assigned to this request.

The Control Stack 269 contains all information necessary to establish priority and initiate storage cycles for requests in the Queue 268. In order to determine a First In-First Out relationship, the Queue Sequencing is accomplished by entering new requests into the bottom of the stack and moving all previous requests toward the top.

There are four output busses which are used to transmit data and control information to storages and channels. The EMS Request Bus 270 provides the data and control path from the registers of Queue 268 to EMS 105. The SBO 155 is used to send requested EMS data to MSCE 136 or the CPU 100 and SAB 240 makes storage requests for MS 104 data for EMS 105. The fourth bus is the CCC Bus 272 which returns data from EMS 105 to the Storage Channel 262 or the I/O Channels by way of CCC 261.

The Control Stack 269 is monitored by Priority Control 273 in order to provide for sequencing and routing of requests in the BC 260. The Control Stack 269 is scanned by Priority Control 273 for the following list of functions:

(1) To assign a queue register of Queue 268 to a store or fetch request from CPU 100, SC 262 or CCC 261. The assignment is based on the next available register in Queue 268, and is conditioned by channel activity and priority among requesting elements.

(2) To generate storage requests. This decision is based on the busy status of storage modules and on unit priority when the same storage is being requested by different units.

(3) To return storage fetch data to the Queue 268. To perform this function, the Queue link data is sent to the storage module at the start of a fetch cycle and is returned shortly before the fetch data. The Input Priority section 274 of the Priority Control controls the gates for moving data coming in on EMS Bus 264 into or around the Queue 268.

(4) To return fetch data from Queue 268 to the requesting element. The decision depends upon the identity of the requesting unit. For a CPU 100 request fetch data is transmitted to SBO 155 as soon as possible after the fetch data is put in the Queue 268, but this is not necessarily in the same order as the requests were received. For the Storage Channel 262 data remains in the Queue 268 and may be readdressed if the transfer were on a double word boundary. Control words and single data words are returned to the channel when requested. For I/O requests through CCC 261, the data is transmitted when requested by the I/O device.

Every action of Bus Control 260 requires access to either the Input Busses or the Output Busses or both. However, most actions are independent of each other and may be taken concurrently. Some of the independent actions of Bus Control 260 are:

For Input Busses—

(1) Fetch returns on SBO 155 from MSCE 104 to Queue 268.

(2) Fetch returns from EMS 105 to Queue 268.

(3) Fetch requests from CPU 100 on SAB 240.

(4) Either an I/O Store/Fetch request or a Storage Channel 262 Store/Fetch Request.

For Output Busses—

(1) EMS 105 fetch return to CPU 100 on SBO 155.

(2) A request to EMS 105 on EMS Request Bus 270.

(3) A request to MSCE 136 on SAB 240.

(4) Either a fetch return to CCC 261 or a fetch return to SC 262 on Bus 272.

COMMON CHANNEL CONTROL

The common Channel Control 261 performs the prepriority function among the Channels 106 and 122 for storage requests and interrupt actions. Effectively, the CCC will pass to the Queue 268 any request received from a channel 106 or 122. It is only when two channels make simultaneous requests that one will be granted a built-in priority and be the first to have its request transmitted to Queue 268. In view of the difference in the operating speeds of a device connected to a channel and the internal operation of the PSCE, the momentary delay in transmitting a request is of no importance to the channel operation.

STORAGE CHANNEL

The Storage Channel 262 provides a fast data transfer from one storage to another and as above noted, this transfer can overlap other system activity. The transfer can be between all addressable highspeed core storages connectable to MSCE 136 and to PSCE 137, but cannot include paths to I/O devices connected to channels through CCC 261. A minor limitation is that the data items transferred cannot be bounded in storage addresses by any less than full word boundaries, i.e. no address of a word to be transferred, nor the address to which it is to be transferred can have other than two rightmost zeros.

The SC 262 communicates with the MS 104 and EMS 105 through the Bus Control 260, and consequently takes advantage of the Bus Control Queue 268. Since the function of SC 262 is to transfer words between storage locations, each action of SC 262 requires a Fetch/Store combination of requests. The SC 262 will send fetch requests to the Bus Control 260 as long as space is available in Queue 268. At the same time, the SC 262 will send the corresponding store address to the data portion of the Queue register so that it will in effect accompany the fetch request. When Queue 268 makes the fetch request from the storage location specified in the address portion of the register, the store address is transferred from the data portion into the address portion of the register. Such a change converts the initial fetch request to a store request waiting for data and consequently when the fetch data returns into the data portion of the register, a store request is initiated to put the data into the other storage location.

INSTRUCTION UNIT

The Instruction Unit 134 is shown in substantially more detail in FIG. 10. To recapitulate, the I Box 134 contains 10 64-bit Buffer Registers for storing instructions sequentially. Eight of the Registers, reference numeral 156, are normally used for storing eight eight double words of instructions with each Register 156 identified by a three bit binary number and every instruction word fetched from storage being stored in the Register 156 identified by the last three bits of its storage address, i.e. bits 19, 20, and 21, of the 21 bit double word address. The other two Buffer Registers, reference number 157, are #1 Temporary and #2 Temporary, and are used for storing instructions out of the normal stream of instructions. All 10 Registers 156 and 157 are connectable by gates to a Storage Data Out (SBO) Bus 155, and all Registers 156 and 157, as well as SBO 155, can be gated to an Output Bus 1001, and any or all 16 bit half word groups can be gated into the corresponding areas of a 64 bit wide Operations Register 159 for instruction decoding.

For the purpose of fetching instruction words and loading and unloading the Buffer Registers 156 and 157, a plurality of instruction count registers are provided. These counters are the Upper Bound (UB) Register 147 (FIG. 10D) with an Upper Bound Incrementer 151, a lower Bound (LB) Register 150 with a Lower Bound Incrementer 152, a seven bit wide Instruction Register (IR) 148 (FIG. 10E) with an IR Incrementer 153 and an Advanced Outgate Register (AOR) 1002 (FIG. 10C) with its AO Incrementer 1003. Each register with its incrementer forms a counter wherein the actual count is stored in the register and is sent to the incrementer which generates a count one unit higher and transmits the count back to the registers input gates. The IR Incrementer 153 is somewhat modified in that it can receive either a +1 signal a +2 signal or both signals from an Operation Decoder 1005 to generate an output signal of either 1, 2, or 3 units more than is in the Instruction Register 148. In each instance when it is desired to increment the register, the output of the incrementer is gated into the register to change the value stored therein. After a latching interval, usually one-half of a system clock cycle, the input gates are again closed and the circuit from the register is opened to send the new value to the incrementer for generating the next sequential value to be entered into the system.

There is a considerable amount of information needed in a large data processing system in addition to the constantly changing information available in registers and in the present embodiment, this information collectively is known as the Program Status Word (PSW) and will be stored, except for the instruction address, in the PSW Buffer 1006 (FIG. 10A). The instruction address part of a PSW is entered from bit positions 40 to 63 inclusive of SBO 155 into UB Reg. 147, IR 148, LB Reg. 150 and AO Reg. 1002, with the indicated group of the right 24 bits of a 23 bit wide word (Bits 8–31) going into each register indicated in FIGS. 10C, 10D, and 10E. Generally, a change to a new PSW is equivalent to changing to a new program and is made whenever it is necessary to depart from the current program. The old PSW may be retained in storage to enable performance of programs of higher priority and when it is desired to resume the interrupted program, the old PSW can be brought back into the PSW Buffer 1006 to continue the old program from the interrupted point.

When the PSW is to be changed the new PSW will be fetched and bits 0–39 will be held in #1 Temporary Register 157 until all previous instructions, if any, have been processed and will then be transmitted over a Bus 1007 into PSW Buffer 1006. The instruction address part, bits 40–63 thereof on SBO 155 will be gated to a transmission Bus 1008 and from there bits 25–28 will be set into AO Register 1002, bits 8–28 into UB Register 147, all 24 bits 8–31 into LB Register 150, and bits 25–31 into I Register 148. The UB Register is the fetch control for new instructions and will retain the address of the last instruction word which has been called for from storage irrespective of whether the word is in the Buffers 156 or not. The output of the UB incrementer is therefore the address of the next instruction word to be fetched, and since the UB Register 147 does not include address bits 29, 30, or 31, the UB address is a double word address. The I Register 148 contains the address within the Buffers 156 of the instruction word being decoded which is in half word units so that the bit 31, which is for the byte within the half word, is not used but is received from SBO 155 to be checked for a zero to insure that an improper odd-byte address was not received. As instruction can be 1, 2, or 3 half words long, and as this length is set into IR Incrementer 153, the output of Incrementer 153 is the address within Buffers 156 of the first byte of the next instruction to be decoded. Bit 25 of the instruction address is not needed for identification of an instruction in the Buffers 156 but is required to regenerate the full instruction address when it is wanted. The LB Register 150 contains the full address of the earliest instruction word which is contained within Buffer Registers 156, and which is not to be replaced by an instruction word being fetched but not yet received. The full storage address of the instruction in Buffers 156 which is the next to be decoded can be regenerated by combining bits 8 through 25 of LB Reg. 150 with the output of IR Increment 153, i.e. the buffer address of the next instruction. Since the IR Incrementer 153 could be indicating an address which is within the same group of eight double words as is the address in LB Register 150 or it could indicate an address in the next group of eight double words, bit 25 of LB Register 150 and bit 25 of IR Increment are compared in an Exclusive Or Circuit 1007 to see if they are the same for the same group of eight, or are different indicating that the LB Register address and the IR Increment address are in different groups of eight. When the next instruction word address is to be generated, bits 8 through 25 of LB Register 150 are gated on the LB Bus 1009 into the corresponding bit positions of the middle input 170 of the three-input Adder 168 (FIG. 10B), and bits 26 through 31 of the IR Incrementer 153 are gated to a Common Bus 1010 which is connected to a Bus 1015 to transmit the IR Incrementer address to bit positions 26 to 31 of the same Adder Input 170. If the Exclusive Or 1007 indicates that the bits 25 it receives are the same, the combined input of bits on Input 170 is correct and will pass through the Adder 168 unchanged, but if the Exclusive Or 1007 has found that the two bits are different, a unit is added to bit position 25 by a signal on a line 1011 to change the generated address to a corresponding one within the next group of eight words.

As it is also desirable at times to know the full address of the instruction being decoded, another Exclusive Or Circuit 1012 (FIG. 10D) compares the bit positions 25 of the LB Register 150 and I Register 148 to determine if they are the same or are different. The address will be generated in Adder 168 as above described for the next instruction address except that bit positions 26 to 31 of I Register are gated to Bus 1010. The additional unit on line 1011 will now be gated in under control of Exclusive Or 1012 rather than Exclusive Or 1007 as for the next instruction address.

The AO Register 1002 contains the identification of the Buffer Register 156 from which 16 bit groups are to be gated into OP Register 159. AO Register 1002 will usually be one word ahead of the word address in I Register 148 and will be incremented under control of a signal on a Word Boundary Line 1013 from IR Incrementer 153 which detects each time the incremented address is in a new double word, i.e. when bit position 29 sends a carry signal into position 28.

The initialization of I Box 134 has been previously broadly described but will be more specifically set out herein. As soon as the starting instruction address has been set into UB Register 147, LB Register 150, I Register 148 and AO Register 1002, a comparator 1016 (FIG. 10D) comparing the low order part of the output of UB Incrementer 151 on a Bus 1017 and the I Register output on a Common Bus 1010 signals on a Line 1019 that the Upper Bound Address is less than four greater than the I Register Address and another Comparator 1020 testing the bit positions 25 to 28 of UB Incrementer 151 on Bus 1017 and those of LB Register 150 on Bus 1009 determine the next Upper Bound Address is not eight more than the Lower Bound Address. With these conditions, the data in UB Register 147 will be gated to an Upper Bound Bus 1021 and sent from there to Storage Address Bus 240 as the address part of an instruction fetch. On the next machine cycle, the UB Register 147 receives the Incrementer 151 address data which is also transmitted over Bus 1021 for a second instruction fetch address. This will be repeated until Comparator 1016 signals on a Line 1023 that the incremented upper bound address is four more than the I Register address and stops instruction fetching. When the first instruction fetch is sent, a Comparator 1024 (FIG. 10C) compares the AO Register 1002 address, one more double word than the I Register 148 address, against the UB Incrementer address to determined that the fetched instruction word should be gated from the SBO 155 directly into the OP Register 159 as well as into the Buffer Register 156. A Decoder 1025 at the input to I Register 148 from transmission Bus 1008 decodes the starting instruction address to outgate the proper half words (16 bit groups) of the first fetched instruction into OP Register 159.

Remembering from the description of the MSCE 136 that the words may not return from storage in the same order as the sending of their fetch requests, and that every word put on the SBO 155 is preceded by the address of the sink into which it is to be gated, an Incoming Sink Register (ISR) 1026 (FIG. 10C) receives the sink address from MSCE 136, and if the sink is within the I Box 134, will decode this address in its Decoder 1028 to select the correct Buffer Register 156 or 157 to gate in the data arriving in the next machine cycle. When a comparator 1029 responsive to the IRS 1026 address and the AO Register address, now one unit more than the first instruction address fetched, indicates that the next sink address is less than the AO Register address, the next instruction word received has its valid instruction groups gated into OP Register 159 directly from SBO 155.

Each time that I Register 148 is incremented past a double word boundary, as indicated by a signal on Word Boundary Line 1013 and gating of the IR Incrementer 153 address into I Register 148, Compare 1016 signals that UB Incrementer 151 address is no longer four more than the I Register 148 address, and a new instruction fetch is called for from the UB Increment 151 address. This address is also gated into UB Register 147 to increment it to the last instruction address called for. These I Register conditions will also cause AO Register 1002 to be incremented to stay one double word address ahead of I Register 148.

To this tmie, no instruction words have been returned from storage into Buffers 156, and no further I Box action takes place until the first called for instruction word is returned and gated into its Buffer Register 156, and into OP Register 159, at which time the first instruction will be decoded. The I Register 148 will be incremented each time an instruction is decoded and UB Register 150 will be incremented and a new instruction word fetch request made each time a word boundary is crossed, until Comparator 1020 determines that the UB Increment address is eight more than the address of the LB Register 150. This means that the next fetched instruction word from the address in UB Increment 151 would be returned to the Buffer Register 156 holding the lower bound instruction word. No more fetching from the Upper Bound Registers address can be performed so long as this condition is present, but normally there is no further need for the instruction word at the lower bound. Therefore, when the next instruction word is called for a fetch, both UB Register 147 and LB Register 150 are incremented each time the I Register is incremented past a word boundary. Under such conditions, the UB Register will maintain instruction word fetches three double words ahead of that being decoded under control of I Register 148 and LB Register 150 will contain the address of the earliest instruction still surely available in Buffer Register 156. It will be remembered that some of the last fetches called for by UB Register may not have been returned and therefore some instruction words prior to that at the LB address may still be present in Registers 156, but these could be changed at any moment by return of a fetch to that address and it is preferred not to rely in any manner on such program dependent events.

As a matter of interest, it may be noted that when UB Increment 147 is four words ahead of I Register 148, as indicated by Comparator 1016, this does not constitute a condition for a full stopping of advance word fetches, but it does drop such fetches to a lower priority rating. If under these conditions, a time slot to MSCE 136 becomes available for an instruction word fetch, the word fetch will be initiated. It is therefore possible for the UB Register to be a full seven words ahead of I Register 148, so that the entire set of Buffer Registers 156 is full of unused instruction words. Such a condition can actually occur when a loop of programs starting at the LB address is present within Buffers 156. The UB Register 147 is permitted to call for new fetches at each opportunity until the UB Increment 157 address is eight more than the LB Register 150 address as indicated by the output of Comparator 120.

INSTRUCTION STREAM DISCONTINUITIES

The I Box 134 will continue to fetch and decode instruction words as described above with the UB Register 147 trying to remain about three instruction words ahead of the one the I Register 148 has selected for decoding and with about four used words in the Buffer Registers 156, until a discontinuity in the instruction stream is reached. Such a discontinuity may be a branch operation, a machine interruption or a store into the instruction stream. Branch operations may be subdivided into four catagories, each of which will be processed differently. Branches may be grouped as (1) Unconditional branches (including branch on a condition which has been determined at the decoding time) to a word address in advance of the I Register address, or to a word address more than eigtht word addresses back, (2) a branch on a condition not yet determined and to an address as above, (3) a branch on condition, determined or not at the decoding time to an address less than eight words back but beyond the address in the LB Register 150 and (4) a branch on condition determined or not at the decode time to an address between that in the LB Register 150 and that in I Register 148.

An unconditional branch or a conditional branch for which the condition code has been set (bits 34 and 35 of the 40 bits of the 64 bit PSW in the PSW Buffer Register 1006) will be to an address in a GPR 202 of the FXPU 143, or to an address generated by the addition of the addresses in two GPR's 202 and a 12 bit displacement value specified in the branch instruction. In either event, the branch address is generated in Adder 168. The data in all GPR's 202 is brought by continuously connected Lines 334 to two sets of gates 1030 and 1032 in I Box 134, and when called for in an instruction is gated through either gates 1030 to Adder Bus A 173, or Gates 1032 to Adder Bus B 174, or both, as will be brought out later. If the instruction also includes a displacement factor, this factor will be temporarily held in a Buffer 165 and will then be gated out with the GPR 202 data on Adder Busses A and B, to provide the new instruction address at the output of Adder 168. This address will be entered into Working Register (WR) 177 and into Temporary Register 176, and transmitted on a Bus 1033 which will be gated to Transmission Bus 1008 and gated into the I Register 148, UB Register 147, LB Register 150 and OA Register 1002. This is the same condition as previously described for the start of a new program and further I Box 134 operation will be as set out above, but now proceeding from the branch address.

If the branch is on a condition which has not yet been decided as evidenced by the setting of the CC Bits in PSW Buffer 1006, the I Box makes the initial assumption that the branch will not be taken and will continue to decode the remaining operands which are already stacked in Buffer Registers 156, or have been called for in an issued fetch. No new instructions will be called for to continue fetching on this branch, however, but instead the I Box fetches the first two double instruction words on the branch path to have them available if the branch is found to be the correct way to proceed. The address of the branch target register will be generated in Adder 168 as above described, and transmitted over a Bus 1034, gating to Storage Address Bus 240 in MSCE 136, see FIG. 7, where it becomes the address of the fetch request being sent from I Box 134 at this time. The sink address for this fetch is specified to be #1 Temporary Buffer 157. On the next machine cycle, another fetch is called for with the next succeeding double word address generated by returning the address in WR 177 back on Bus 1036 into an input of Adder 168, and simultaneously injecting a unit signal on a Line 1037 into the 28th bit position of Adder Input 169. The new address is now sent to MSCE 136 on Bus 1034 and is so labeled as to be returned to #2 Temporary Register 157 for storage. The I Box 134 will now proceed to decode and issue the remaining instructions already fetched and being fetched into Buffer Registers 156. As earlier noted, however, each of these instructions will have a conditional tag bit included therein, and will not be executed until the conditional bit is turned off. When the Condition Code bits of PSW Buffer 1006 are set valid, if the condition of the branch instruction is not met, the conditionally issued instructions are to be performed and the I Box 134 proceeds to send out an ACTIVATE Signal to set all conditional tag bits to zero and thereby enable the already decoded instructions to be executed. If, on the other hand, the condition of the branch is met by the valid condition code, then the I Box 134 sends a CANCEL signal to all execution units to cancel the Full signal for the conditionally issued instructions. When the condition of the branch is met, the branch target address retained in Temporary Register 176 is transmitted through the Adder 168 and over Busses 1033 and 1008 to the AO, LB, UB and I Registers. At the same time, the instruction words in #1 Temporary Buffer 157 are gated out to Bus 1001 and transferred to both the Buffer 156 for its storage address and into OP Register 159 for immediate decoding to start a new instruction sequence. On the next cycle the next instruction word in #2 Temporary Buffer 157 is transferred into the next higher numbered Buffer 156. For this second instruction word transfer, UB Register 147 is incremented to the address of the second fetched word, and is then released to start further instruction word fetches along the branch path as described for normal instruction word fetching. It is to be understood that when the CC bits of PSW Buffer 1006 are set to a valid condition, the I Box 134 will take immediate action to continue proper instruction decoding. If the branch condition is not met, the ACTIVATE signal will be sent immediately, any fetches to the #1 and #2 Temporary Buffers 157 will not be issued and any issued fetches will be ignored, and all controls will be returned to normal condition. If the branch condition is met, the CANCEL signal is sent to the execution units and the fetch into #1 Temporary will be gated directly into its Buffer 156 and OP Register 159 when it is returned. The fetch return for #2 Temporary Buffer Register 157 will also be passed from SBO 155 into its Buffer Register 156. Also the I, UB, LB and AO Registers will be reset to the branch target address. In short, in conditional mode, as soon as the CC bits are set valid, they are tested and the I Box 134 takes immediate action to continue on the correct branch path as soon as possible.

INSTRUCTION LOOP MODE

It can happen that a branch on condition will have a target address which is within the seven earlier instruction word addresses and can therefore form a loop of instructions containing eight or less double instruction words. As previously described for a branch on condition, the I Box 134 will not take any positive action until the CC bits of PSW Buffer are set valid, but when the branch is decoded, a test is immediately made to see if a loop of instructions can be set up. For this test, the full instruction address is generated by sending the LB Register bits 8 to 25, I Register bits 26 to 31 to Adder Bus A 173, and the possible additional bit to bit position 25 of Adder Input 169. Simultaneously, the target address in Temporary Register 176 is sent on a Bus 1038 to Adder Input 172 and complementally through Adder 168 to subtract it from the Instruction address. If the output of Adder 168 is positive and less than eight, a loop can be formed and I Box 134 sets itself into a potential loop mode state. At this time, the WR 177 address is sent on a Bus 1040 to a Comparator 1041 (FIG. 10B) where it is compared with both the UB Register 147 address and the LB Register 150 address to see if the target address is within the instructions already in the Buffers 156. If the branch target address is not present in Buffers 156 but the target is less than the seven words back, the I Box 134 will continue on as in any branch instruction by fetching the two words along the branch path into Buffers 157 and will then issue conditional instructions along the normal path from those instructions already fetched, but as mentioned will not issue new fetches along this path. Consequently, the UB and LB Registers will not be incremented. If, when the CC bits of PSW Buffer 1006 become valid, it is found that the branch is to be taken, the action above described for a normal branch will be taken by resetting the UB, LB, I and AO Registers to the target address and starting decoding of the new instruction words along the branch from the target address.

If, on the other hand, a possible loop mode exists but the branch target instruction is already present in the Buffers 156 as determined by Comparator 1041, the precautionary fetches to #1 and #2 Temporary Buffer Registers 157 are unnecessary and will not be issued. For either situation, steps are taken to save as much time as possible each time the branch on condition instruction is decoded in loop mode. The first time the possible loop mode is detected by finding the target address is less than eight words back of the I Register address, the I Register address is sent on Bus 1010 to Save Loop Close Instruction Register (SLCIR) 179 for storage therein, the lower digits (25 to 31) of the target address in W Register 177 are gated into the Save Loop Target Register (SLT) 180 and the identifications of the GPR's 202 whose data was used as the base and index values and added with the displacement value for generating the branch target address are stored in the Save Loop Close Base (SLCB) (FIG. 10A) and Save Loop Close Index (SLCX) Registers 1042 and 1044 respectively, for use if it is later found that an instruction loop will be performed.

For either type of loop mode, when the CC bits of PSW Buffer 1006 are valid and if the branch path is selected, a loop mode trigger 1315 (FIG. 33B) is set and depending upon the output of Comparator 1041, two courses of action are available. If the Comparator 1041 indicates that the branch target address is not within the Buffers 156, but is less than the present instruction address, a full initialization or normalization is performed and any conditionally issued instructions are cancelled, but the loop mode state remains set. In the normalized condition, as above noted, the target address is inserted in the AO, UB, LB and I Registers 1002, 147, 150 and 148, respectively, and fetching of instructions is resumed. In the loop mode state, a Comparator 1045 keeps a continuous check on bits 25 to 31 of the LB Register 150 against the bits of the SLT Register 180, and when it finds an equality, will prevent any further incrementing of LB Register 150. This will maintain in Buffers 156 the target instruction of the branch and when UB Register 147 has completed fetching of the full set of eight instruction words, including some past the branch instruction if space and time are available, the locking of LB Register 150 will in combination with Comparator 1020 prevent further advance of UB Register 147. The instructions now in Buffers 156 will be decoded starting at the entered branch target address and will be sent to the execution units for a second iteration of the instruction loop.

If, however, Comparator 1041 indicates that the target instruction is still present in Buffer Registers 156, the target address is not entered into the UB and LB Registers 147 and 150, but only into the AO and I Registers 1002 and 148, thereby starting the next loop iteration. Any previously issued conditional instructions are cancelled as above noted. Fetching of additional instructions under control of UB Register 147 continues as space on the storage controls becomes available and LB Register 150 will be incremented for each fetch until Comparator 1045 indicates that the bits 25 to 31 of LB Register 150 are equal to those in the SLT Register 180 to stop further incrementing of LB Register 150, as above noted. The instructions of the loop will be further decoded in the normal manner until the original branch instruction is again decoded. It will be remembered that in normal instruction processing, it is assumed that a branch instruction condition will not be met and instruction decoding is continued in the conditional mode past the branch point, thereby saving time when the CC bits are valid if the assumption is correct. If the assumption is not correct, and the branch is taken, the correction cycles only use time which would be required under the branch conditions and no further time loss occurs. This assumption is changed when the system is in loop mode for now it is known that the branch was taken at least once and it is assumed that branching will continue. The conditional instructions are therefore issued along the branch path when the I Box 134 is in loop mode. When the CC bits in PSW Buffer 1006 become valid, they are tested in the usual manner to see if the branch is to be taken and if not, an initialization takes place. There is no need to fetch any additional instructions into #1 or #2 Temporary Registers 157 for it is known that the next instructions are already in Buffers 156.

When the branch instruction is again decoded with the I Box 134 in loop mode, one machine cycle can be saved if the previous target address is used rather than using the instruction addresses, GPR's 202 and Adder 168 to regenerate the address. At each branch point decoded, the I Register 148 address is compared in Comparator 181 against the address in SLCIR 179 to see if this is the same instruction which set the I Box into loop mode. If the two addresses are the same, the target address is also presumably the same and the target address in SLT Register 180 is transferred over Bus 1008 into the I Register to start another interation of the instruction loop. Since the performance of the instruction loop iteration depends on the CC bits, the previously described conditional issuing of instructions will apply, but the instructions will be issued along the branch path.

There is, however, one set of circumstances under which the target address saved in SLT Register 180 is not the correct target and this arises when the data in the GPR's 202 used in the original generation of the branch target address has been modified during the last loop iteration. To check for this possibility the identification of the GPR 202 whose data was used for the base address is saved in SLC B Register 1042, and the identification of the GPR 202 storing the index address is saved in SLC X Register 1044. On each instruction, the identification of the sink GPR 202 is compared in Comparators 1046 and 1048 respectively, with the identifications in SLC B and SLC X Registers 1042 and 1044, and if any inequality is found, it indicates that the target address in SLT 179 is no longer valid. The new target address will now be determined from the branch instruction as in the first branch instruction. The B and X identifications and target address will again be saved, but unless there is an internal change within the loop, the next iteration will again use the same GPR's and such saved addresses will be of no value.

Thus, the I Box can handle with a minimum time loss, the possible types of branching where there is an unconditional branch forward or back to a target more than eight double words back, where the branch is conditional and more than eight double words back, and the two loop mode branches where the target address is less than eight double words back and is or is not already within the instruction Buffers 156.

STORING INTO INSTRUCTION STREAM

There are two instances in which an executed instruction may cause a change in an instruction of the stream of instructions in such a way as to require special handling. A first such instance is when an I Box 134 instruction generates an address value to be stored in one of the GPR's 202 and the next instruction uses that GPR as the source of its base or index address value. It will be remembered that the GPR's are physically located in the FXPU 143 and are connected to I Box 134 by Hot Wires 334. Due to the high repetition rate of the present embodiment of the invention, there is not sufficient time available from one cycle to the next for the signals to be sent to the GRP 202, pass into and through the register latches and return over the Bus 334 in time to be used in the next cycle. To avoid the necessity of holding up further I Box operations until the data is available on Lines 334, the Save R1 Register 1049 is set on every cycle to the address of the GPR 202, if any, specified in the instruction as the instruction sink register. The data stored in that GPR 202 will be generated in Adder 168 and retained in W Register 177. On the next cycle, the value in the Save R1 Register 1049 is compared in Comparator 1050 with the identification on Bus 162 of the base register for that cycle and in a Comparator 1052 with the identification on Bus 161 of the GPR acting as Index Register for the cycle. If either Comparator 1050 or 1052 finds an equality, the correct data is not yet available at gates 1030 or 1032, of the A or B Adder Bus 173 or 174. Therefore, the address data in W Register 177 is gated over Bus 1033 to A Adder Bus 173 or to B Adder Bus 174, depending on whether it is the B or the X instruction word address which matches the Saved R1 address and the corresponding gate from Bus 334 to the Adder Bus will not be opened. This will enable gating in of the updated Register 202 contents without the need for waiting for the updated signals to return.

The second instance of a store into the instruction stream is the alteration of a storage word when the original word has been returned to and is buffered in a Buffer Register 156 or is being fetched. For this situation, the W Register which will have generated the address at which the storage data is to be entered will contain a value which is equal to or less than the value in the UB Register 147 which is the address of the last fetched instruction word and will also be equal to or greater than the address in the LB Register 150 which designates the earliest instruction word in Buffers 156. If the value in W Register 177 is between the values in the UB Register 147 and that in LB Register 150, there will be an output signal from Comparator 1041. This signal will set off the tag bit for the Buffer 156 having or to receive the instruction word from the address which is to store the new data and will call for a new fetch of the word at the storage address designated by the W Register 177 to refill the Buffers 156. If the instruction word has already been passed by I Register, only the fetch time will have been wasted, but such a fetch of a past word is required if an instruction loop including that word has been or will be set up. It is considered preferable to always refill the instruction Buffers 156 for these circumstances rather than provide the extra hardware needed to remember which Buffers 156 are empty and call for a fetch to that Buffer if a loop mode state is set up. Such a late fetch could halt the I Box 134 operations until it has been returned.

A special problem arises when the store operation is to an address which is that of the next instruction to be decoded. Due to the overlapping of instruction decoding and pipelining of operations, even the best timing would not generate and transmit the address of the store instruction before the next instruction was being decoded so that the instruction to be altered would already be in the pipeline. To avoid this possibility, a quick check is made to see if the effective address of a store operation could refer to either of the next two instructions following the store. A Comparator 1053 checks at every store operation the low order part of W Register 177 against the word part of I Register 148, and another Comparator 1054 simultaneously checks the low order part of W Register 177 with the word part of I Register 148 increased by three units. If on such store operation the compared part of the store address in W Register 177 is more than the I Register 148 address as checked in Comparator 1053 and it is equal to or less than the I Register value increased by three units, there is a possibility that the store is to an instruction word being decoded. The I Box 134 will immediately pause for one machine cycle until the Comparator 1041 has made a check of the full addresses for checking the instruction store for a conflict. Such one cycle delay will occur on less than about 25% of the store operations.

Such a store into the instructions already in the Buffer Regitsers 156 can also require changes when in loop mode, a store is made to the instruction address which has been the branch instruction. In addition to the above noted refetching of the new instruction word and possible one cycle hold up, this type of store requires that the system be reset from loop mode since there is no assurance that the changed instruction will be a branch one or even if it is a branch that the same loop will be set up. The W Register is therefore on a store operation compared with the saved I Register address in SLCIR 179 by a Comparator 1056. If the store is to an instruction in the Buffers 156, and this instruction is the one which initially set up the branch loop, as indicated by an equality in Comparator 1056, then the I Box is reset from loop mode to enable a fresh start for obviously, if the new instruction were not a branch, the I Box would continue to the end of the instructions in Buffers 156, and would come to a halt.

INSTRUCTION ISSUING

The second principle responsibility of I Box 134 is the decoding of instructions in sequence, the issuing of instructions to the apropriate units, and the issuance of fetch instructions for the required storage operands. Instructions may be received in five different formats, one of which is one half word long, three of which are two half words long, and the last one being three half words in length. The formats are designated as the RR format which is for all instructions in which the required operands are in the registers within the E Box 133, either the GPR's 202 for instuctions for the FXPU 143 or the FLR's 187 for FPU 142 operations. Instructions in this format are one half word (16 bits) in length and comprise an eight bit operation code, a four bit code identifying the register in which a sink operand is stored, either a GPR 202 or an FXR 187 depending upon the operation code, and a second four bit code identifying the similar register in which a source operand is stored. The first two bits of an RR format instruction are 00 which is interpreted to mean an RR format. The third bit is a one for instructions for the FLPU 142, while a zero in the third bit indicates instructions for the FXPU 143 or the I Box 134, the fourth bit distinguishing between them with a zero for the I Box 134 instructions and a one for FXPU 143 instructions. The remaining four bits of the operation code distinguish between the different instructions within a unit.

The second format is the RX format identified by the first two bits from the left being 01. This instruction is two half words long (32 bits) and includes an eight bit operation code, a four bit identification of the register, either a GPR 202 or an FXR 187, storing the sink operand, a four bit identification of a GPR 202 containing an index value, a third four bit group identifying a second GPR 202 containing a base address and a 12 bit address displacement. The values in the index and base GPR's are added to the displacement value to generate the effective storage address of the source operand to be fetched. In some instructions, no sink register is utilized and the four bit sink register address can be utilized for other purposes, e.g. as a mask group. For this instruction format a one in the third bit position indicates an instruction for FLPU 142, and a zero in that position designates an instruction for either the I Box 134 or the FXPU 143.

The third and fourth formats may be considered together since both are two half words (32 bits) long and each has the three leftmost bits as 100. In the RS format, the first eight bits are the operation code as in all of the other instructions, and the next four bits specify the GPR 202 which contains the sink operand or which is the first of a series. The second four bits is the identification of a second GPR 202 which may contain a second operand, be the last one of a series, or may be meaningless in some instructions. The last 16 bits are always the identification of a storage address and will comprise a four bit identification of a GPR 202 having a base address and a 12 bit displacement value which will be added to the value in the base GPR to generate the effective storage address for the instruction. In the SI format instructions, only one byte of the storage word is processed and the second operand, if any, is always the byte of immediate data in the second eight bits from the left of the instruction, bits 8 to 15. Some instructions using the SI format do not have an immediate operand byte and for these instructions the bits 8 to 15 are meaningless and are ignored. Most of these operations are I Box 134 instructions relating to machine status changes or to input/output equipment commands.

The last format is the SS format and is used where two storage locations are to be specified. The left eight bits is the operation code with the two leftmost bits being 11 to identify the format. The SS format is always 3 half words (48 bits) long with the two right-hand 16 bit half words each identifying a base address storing GPR 202, and a displacement value which are added as above described to generate the two storage addresses. The remaining eight bits can be either two four bit length fields to specify the number of pairs of operands to be processed, or can be an eight bit length field to specify the number of bytes of data to be processed, the specific meaning depending upon the operation code.

As previously mentioned, the I Box 134 will process instructions in three pipelined stages with up to three instructions being in different phases at the same time. In the first stage, the left eight bits of the instruction are gated from OP Register 159 on the OP Bus 160 to OP Decode 166 which will set the OP Stage information including the E Unit, FXPU or FLPU to receive the instruction, whether the results of the instruction are to set the condition code, the operation code and the identification of all registers and buffers which are to contain the operands.

As previously mentioned, there are six FXOS Buffer Registers 201 and each time an instruction is issued to the FXOS 201, over Bus 222, an FXOS Counter 203 in the I Box 134 is incremented by a unit value under control of an FXOS Counter Control 1060 which is responsive to issuance of an instruction to FXOS 201 from OP Stage 169 to gate into FXOS Counter 203 the incremented value from the Counter Incrementer 1061. When an instruction is gated out of FXOS 201 and executed in the FXPU 143, a signal STEP FXOS is generated on a Line 302 and sent to FXOS Counter Control 1060 which is thereby conditioned to gate into FXOS Counter 203, the output of the Decrementer 1062 to thereby reduce the reading in the FXOS Counter 203 by one unit. A Compare Unit 1064 is continuously coupled to the FXOS Counter 203 and will generate a signal when the value in FXOS Counter 203 is equal to six (0110). This signal is returned to the FXOS Counter Control 1060 on a Line 1065 and is passed out on a Line 1066 to stop the I Box 134 from issuing any more instructions to FXOS 201 which is full and cannot accept them. FOX Counter Control 1060 is also capable of balancing out the increment and decrement signals so that if both are received on the same cycle, no signal is passed to the FXOS Counter which will be unchanged. FXOS Counter Control 1060 also provides a fast control over the stop signal on Line 1066 since it can utilize the incoming STEP FXOS signal on Line 302 to block the signal on Line 1065 substantially before the decremented value can pass through the Counter 203 and Comparator 1064 to drop the signal on Line 1065. A substantially similar set of units is provided to control issuance of instructions to the eight instruction Buffer Registers in FLOS 184. The FLOS Counter 186 is provided with an Incrementer 1068, a Decrementer 1069 and a Comparator 1070 whch generates an output signal when the value in FLOS Counter 186 is equal to eight indicating that FLOS 184 is full and can accept no more instructions. The FLOS Counter Control 1072 receives a signal from Bus 183 each time an instruction is issued to FLPU 142 and in response thereto will gate the incremented value from Incrementer 1068 into Counter 186. When a STEP FLOS signal is received from the FLPU 142 on a Line 1073, the Counter Control 1072 will gate into Counter 183 the value output from Decrementer 1069, and as above noted for FXOS Counter 203, if both signals are received on the same cycle, no change will be made in the reading of Counter 186. Similarly also the stop signal from Comparator 1070 on a Line 1074 is passed through FLOS Counter Control 1072 to a Line 1076 which signals the I Box 134 to stop issuance of instructions to FLPU 142.

It will also be recalled that many of the machine instructions for execution units identify one or more General Purpose Register 202 as the source register for operands or as the sink register for operands to be generated by the instruction, and other instructions use the values in identified GPR's 202 as base addressses. As there is no fixed sequence of decoding and execution of instructions, it is important to prevent the I Box 134 from using the data in a GPR 202 for an address before the Execution Unit 133 has generated the correct data for that GPR 202. The I Box 134 is therefore provided with a Register Unavailable for Addressing (RUA) Counter 337 and a Register Unavailable for Modification (RUM) Counter 335 for each GPR 202. Each RUA Counter 337 is incremented by a unit each time an instruction is issued from OP Stage 167 which specifies the associated GPR 202 as the sink register for an instruction, and the same RUA Counter will be decremented by a unit each time the associated GPR 202 is used as such a sink by the E Unit 133.

It is also necessary to prevent the I box 134 from changing the data in a GPR 202 if there is an outstanding instruction which specifies that the GPR 202 is the source of data for an unexecuted instruction and therefore each instruction which is issued from OP Stage 167, and which identifies a GPR 202 as a source register, will cause the RUM Counter 335 associated with that GPR to be incremented by a unit. This RUM Counter 335 will be decremented by the unit when the GPR 202 data has been utilized in the instruction being executed. The RUA Counters 337 and RUM Counters 335 are essentially the same and may be a conventional type of Add-Substract Counter since the only condition of interest is a counter reading of zero. Each instruction set into OP Stage 167 will receive from Bus 161 the identification of a sink register R1 and possibly a source register R2. The R1 sink register identification on Bus 161 is decoded in Select RUA Control 338 to determine an RUA Counter 337 to be incremented, and if the instruction is determined by OP Decoder 166 to be one in which a sink GPR 202 is specified, the Select RUA Control 338 is signalled on a line 1077 to send an increment signal over Bus 1078 to the selected RUA Counter 337. When the FXPU 143 executes this instruction, it returns a signal to the same RUA Counter on a corresponding line of Decrement RUA Bus 341 to decrement the RUA Counter by a unit. When the RUA Counter is at zero, there are no outstanding instructions which can change the data therein and its data is now logically available to I Box 134 for use as an address factor in a later instruction.

The set of RUM Counters 335 are physically the same as the RUA Counters 337 and are selected for incrementing by the Select RUM Control 339 when an address for what could be a source register designation is present on address Bus 131. If the OP Decode 166 determines that the instruction being issued is one using a GPR 202 as a source register, it sends a signal on Line 1079 to the Select RUM Control 339, to cause an increment signal to be sent on Bus 1080 to the selected RUM Counter. When the FXPU 143 executes the instruction for which the identified GPR is the source operand storage, the FXPU sends a Decrement RUM signal to the appropriate RUM Counter on Bus 342. As long as the FXPU 143 needs needs the data in the GPR as a source operand, it is not permissible for the I Box to modify the data as a result of a logically following instruction although it would be permissible to use the data in GPR 202 as an address since there is, so long as the corresponding RUA Counter is at zero, no instruction to be executed which will change the data in the GPR. Thus the I Box 134 is not allowed to use or modify a GPR 202 so long as the RUA and RUM Counters 337, 335 are not at zero.

One of the major functions performed by I Box 134 when it issues an instruction to the FLPU 142 or the FXPU 143 is to call for a fetch of the operand or operands required from storage for the execution of the instruction and it must send with the fetch request the identification of the Buffer Register which is to receive the operand and retain it until it is utilized. This same identificaton will be sent with the instruction in place of the original storage address so that the execution unit can find the operand. To determine the buffer register which may be assigned for an instruction, I Box 134 maintains a Busy Trigger 1082 for each of the six Fixed Point Buffer Registers 204–210, and a Busy Trigger 1083 for each of the six Floating Point Buffer Registers 185. When an instruction requires the use of an FXB 204–210, the I Box selects a non-busy one and transmits its identification with the fetch request to MSCE 136 and enters the identification over a Bus 1084 into OP Stage 167 as a part of the instruction to be sent to FXOS 201. This identification on Bus 1084 will be decoded in a Set FXB Busy Control 1086 to set the corresponding FXB Trigger 1082 to a busy status. This Trigger 1082 remains set and prevents further assignment of this FXB 204–210 by I Box 134 until the operand in the FXB is gated out and used in the FXPU 143. At this time, the FXPU 143 sends a Reset FXB Busy signal on the proper line of a Bus 1087 to reset the Busy Trigger 1682, thereby freeing the Buffer Register 204–210 for further assignment by I box 134.

The FLB's 185 are similarly assigned by I Box 134 for buffering of fetched storage operands and may be assigned on either a floating point or a fixed point instruction. The FLB Address Bus 1088 will receive the address of an assigned FLB 185 for setting the OP Stage 167 to transmit the identification as a part of an instruction and will also transmit the address to the Set FLB Busy Control 1090. The Control 1090 will decode the FLB address and will set the corresponding FLB Busy Trigger 1083 to prevent further assignment of the corresponding FLB 185. When the operand in FLB 185 has been transmitted to an operand utilizing area, a Reset FLB Busy signal is sent on the corresponding line of a Reset FLB Busy Bus 1091 to reset the FLB Busy Trigger 1083 and free the corresponding FLB 185 for reassignment by I Box 134.

A substantially similar arrangement is provided for control of storage operations. There are three Storage Address Registers (SAR) 241-Storage Data Buffer (SDB) 244 pairs in MSCE 136. When the I Box 134 decodes a store instruction, it selects one SAR 241 to receive the address in storage to receive the operand and simultaneously sends to OP Stage 167 on either the FXB Address Bus 1084 or the FLB Address Bus 1088, the identification of the selected SAR 241 for inclusion as a part of the instruction. When the storage address is sent to the selected SAR 241 from W Register 177 on Bus 1034 to SAB 240 in MSCE 136, the Pipeline 3 Storage OP Register 1092, to be further described, simultaneously transmits control information thereto and this information is utilized to set an SAR Busy Trigger 1094 preventing further assignment of the assigned SAR 241. After the execution unit has executed the instruction by sending the desired operand to the associated SDB 244, and the MSCE fully executes its part of the store operation, a RESET SAR signal is returned by MSCE 136 on one of the Lines 1095 to reset the associated SAR Busy Trigger 1094 and free the SAR 241 for another assignment by I Box 134.

It has previously been stated that I Box 134 can handle instructions in several phases at the same time. In the first cycle, an instruction has its first eight bits on the left sent to OP Decoder 166 which determines the unit to receive the instruction, assigns Buffer Registers for the operands to be fetched, and passes to the OP Stage 167, the designations of the Registers, either GPR's 202 or FLR's 187, to be utilized in the execution of the instruction and transmits this assembled information to the executing unit. If the instruction is an RR type, that is all that is needed and it will be complete at the end of the cycle unless as earlier noted, the executing unit cannot accept additional instructions, in which case the I Box 134 stops until it can transmit the instruction.

If the instruction is in an RX format, an address generation is required for the storage operand and OP Decode 166 will gate into the B Bus GPR Selection Controls 1095 the four instruction bits (bits 12–15) designating the GPR 202 storing the index value, will gate into the A Bus GPR Selection Controls 1096 the four instruction bits (16–19) designating the GPR 202 storing the base address and will gate into Buffer 165 the 12 bits (20–31) of the displacement value. On the next machine cycle, the setting of the A Bus GPR Selection Controls 1096 will be decoded to open the Gates 1030 to gate to A Bus 173 the data in the GPR 202 designated as the index register, and the setting of B Bus GPR Selection Controls will be decoded to open the Gates 1030 to gate to B Bus 174 the data in the GPR 202 designated as the base register and will gate out Buffer 165 to Adder Input Bus 169. The three sets of data will be added together in Adder 168 to generate the effective fetch address and at this time the previously described quick check of the three low order bits of the address is made in a store instruction to see if the instruction can be a store into the next instruction already being decoded. If the store could be to the next instruction, the next instruction is held up for one machine cycle. At the end of this cycle, the effective address is retained in W Register. All control information necessary for the fetch or store was sent in the decode cycle to a Pipeline 2 Buffer Register 1098 for retention, and at the end of the second cycle this data is transferred to Pipeline 3 Buffer Register 1099.

During the third cycle the address in W Register 177 is transmitted on Bus 1034 to SAB 240 in MSCE 136, and the control data in Pipeline 3 Buffer Register is sent to MSCE. If the instruction is a store instruction, the previously noted comparison of the address in W Register 177 is compared in Comparator 1041 to determine if the store is to an address already in the Instruction Buffers 156 or being fetched for a Buffer 156. If so, the Buffer 156 is set to an empty status and a new fetch is issued to follow the store instruction. Also, on a store instruction, the address of the designated SAR 241 is decoded in SAR Control 1101 to set the SAR Gates to receive the address and control data, and also sets the associated SAR Busy Trigger 1094 to prevent selection of the SAR 241 for another store operation.

If the instruction is in RS format, the I box operation is the same except that the bits 12–15 of the instruction are not used as the designation of an index register and consequently the B Bus GPR Selection Controls are not set to open a set of Gates 1032 on the next cycle. For an SI format instruction, the I Box acts the same as for an RS format even to gating the eight bits 8–15 of the instruction into the OP Stage 167. In this instruction, however, these bits represent data, not register designations.

The last instruction format, the SS format, is distinct in that it may contain one or two length fields and contains two storage addresses, each with a base register designation and a displacement factor. The length fields or field are transferred on Bus 161 to an L Register 1102 for later use, and the first address, bits 16–31, is decoded as in the RS format. In this SS format the decoding of the next instruction is held up for one machine cycle during which the second address is processed in the same manner as the first address was processed in the previous cycle, thus enabling the Pipeline Buffers 1098 and 1099 to issue two fetch instructions on successive cycles. If there should be any holdup in the acceptance of instructions by MSCE 136, the entire I Unit 134 will stop processing all instructions requiring communication with MSCE 136 until the instructions can be accepted.

There are two inputs to I Box 134 which should be briefly mentioned at this time. In the instructions Translate and Translate and Test, the FXPU 143 requires bytes from a table in storage. The address of the byte is generated by adding to the basic table address held in W Register 177, the byte transmitted from OR 237, FIG. 6A, into a Byte Buffer 1103, and from there gated to Adder Bus B 174. The resultant address is used to fetch the needed table word. The other input is used in operations such as Pack and Unpack in the VFL part of FXPU 143. Here it is at times possible to have operands being stored in and fetched from the same addresses on successive cycles. Due to the prefetching of operands required to maintain rapid processing, this condition must be detected for special processing. When the I Box 134 finds this condition, it sets controls to insure that the FXPU 143 will not be given a fetched byte of a word until the word has been stored. In effect all prefetching is suppressed when overlap can occur. To speed this up as much as possible, the store and fetch control information from the VFL section of FXPU 143 are introduced directly into Pipeline 3 Buffer Register over a Bus 1105, to start the fetch or store at the first available cycle.

FLOW CHARTS FOR BRANCHING INSTRUCTIONS

In the following description of the accompanying flow charts, certain of the Mnemonics such as RR, RS, RX, SI and SS refer to the instruction format and have just been described. Others as B, X, GPR, FLR, FXR, FLB, FXB and SAR, have been referred to in earlier sections of this description and relate to hardware registers of the described embodiment of the invention.

In the flow charts, the rectangular boxes indicate the operation of setting status or control triggers and the diamonds or double pointed boxes are logical decisions which determine the triggers to be set on the next clock pulse if all preceding conditions are met.

*Adder Available* is a reference to the Address Adder 168 and implies that the Adder is either currently not used or if used, its output will move into W Register 177.

*Register* (X, B, RI etc.) *Available* refers to the GPR's or other storage registers which are available when they are not currently tagged as sinks (or sources if I Box will modify them) for fixed point operations, i.e., RUA or RUM≠0.

When a result is to be put into a GPR 202, an early request is signalled because two cycle timing is required in the request-accept loop even though I Box 134 is given top priority.

One of the most general branching instructions is the EXECUTE instruction which is an unconditional one cycle branch to an instruction identified by the EXECUTE instruction. The EXECUTE instruction is in RX format in which the instruction address is determined by the sum of the data in the index (X) GPR 202, the data in the base (B) GPR 202, and the displacement data in the instruction. The addressed instruction is fetched with a return sink address to #1 Temporary Buffer 157, and if the target instruction can be across a double word boundary, the next consecutive double word address is generated by recirculating the address in W Register 177 and entering a unit on Line 1011 into the adder inputs. This fetch is to be reurned to #2 Temporary Buffer 157, and is required because the instruction could be across the double word boundary. When returned, the first instruction word is gated into OP Register 159 starting at the half word addressed by the execute instruction (an odd address to a byte is considered an error and stops the instruction), and when the second word is returned, it is gated into the remainder of the OP Register 159 and the instruction is now decoded for execution. During the decoding, bits 24–31 of the data in the GPR 202 identified in the EXECUTE instruction are gated out through the GPR gates 1030 to Adder Bus A 173, and pass to the Execute OR's 1106 where the bits are ORed with bits 8–15 of the fetched instruction to effectively insert new register addresses or operand lengths into the fetched instruction. This fetched instruction is executed as modified and the next instruction in the normal sequence is the next to be executed as the I Register 148 is incremented on an EXECUTE instruction, but is not loaded with the address of the target instruction.

Referring to the Execute Flow Chart, FIG. 11, state zero is the initial I Box status in which the instruction is decoded to set the controls specific to the instruction. When the Execute instruction is decoded, Block 1108, a check is made of the availability of the Adder 168, and, by reference to their RUA counters 337, of the availability of the two GPR's identified as the index and base registers. If the instruction is being conditionally issued, the GPR specified as the source of bits to be ORed with the target instruction must also have its RUA counter at 0, but if no conditional mode is set, the condition of this GPR is not considered at this time. One machine rule is that no execute instruction may have another execute instruction as its target since this could lead to an unending loop of execute instructions. If this condition is detected, Block 1109, and the I Box 134 is not operating in conditional mode, an interrupt condition is signalled to eliminate or record the programming error. Under the normal conditions, the N exit from Block 1109 is taken to cause generation of the target instruction address, to stop other instruction fetching and to set controls to state one. In state one, on the next cycle, if the W Register 177 is available for use, the OP Register 159 is reset to remove the used EXECUTE instruction which has the X and B register identifications in the B Bus and A Bus GPR Selection Controls 1095 and 1096 respectively, and the R1 identification is stored in the SAVE R1 1049. A fetch of the target storage address is called for with a sink in #1 Temporary Buffer 157. The next consecutive storage address is generated by incrementing W Register 177 through Adder 168 and stage 2 conditions are set.

In the next cycle, a check of the starting address of the target instruction is made to see if it ends in either 100 or 110, i.e. starts in either of the last two half words of a double word, for if so the target instruction could extend into the next word which will be fetched as soon as the address is available in W Register 177. After the fetch request is sent, or if the target instruction cannot extend over the word boundary, the I Box is set to state 3.

In the state 3 cycle, a check is made of the R1 address for an R1 address of zero means that the target instruction is to be executed unmodified and as soon as the availability of the R1 register is determined (its RUA Counter 337=0) the R1 register gates 1030 are set to put the R1 data on A Adder Bus 173 and to the Execute OR 1106 and for either event, the I Box 134 is set to state 4. As soon as all target fetches are returned, in state 4, and are set into OP Register 159, the I Box is returned to the original state zero to enable a decoding of the new instruction. For this target instruction decoding the I Box remembers, Block 1109, that it is decoding the target instruction of an execute instruction and that it is to interrupt if the target is also an execute instruction. The execution of this type instruction permits indirect length, index mask, immediate data, and arithmetic-register designation in an instruction by data stored in a GPR which data can be modified as desired to alter the effect of the instruction without any changes in the target instruction.

There is no specific UNCONDITIONAL BRANCH instruction, but it is possible to execute a BRANCH ON CONDITION instruction unconditionally. A BRANCH ON CONDITION instruction can be in either an RR format (BCR) or an RX format (BC) wherein the four bits 8–11 normally specifying a sink register are now a condition code mask, and the branch address is contained in either the GPR 202 identified in the last four bits of the RR format or is the address generated as the sum of the specified index GPR data, the specified base GPR data and the address displacement given in the instruction. There are two condition code bits in the PSW Buffer 1006 which can be set individually to zeros or ones thereby being settable into four combinations, namely, 00, 01, 10, and 11. Each of the four mask bits correspond to one of these four combinations and if any mask bit is one, the branch will be taken if a corresponding combination is present in the condition code bits. Clearly, if all four mask bits are ones, the branch will be taken no matter what condition code bits are set, and will be in effect an unconditional branch. If either all four mask bits are zeros or the four bits for the branch GPR designation are all zeros, the branch will not be taken and is equivalent to a null operation.

The flow chart conditions for an UNCONDITIONAL BRANCH operation are shown in FIG. 12, where the chart starts with the I Box 134 in state 0 and an unconditional branch decoded. If the Adder 168 is available, Block 1111, the format of the instruction is checked for an RR format in which the R2 GPR address is checked for an all zero condition which if found automatically sets the I Box 134 to no-op the instruction without further investigation. If the R2 address is any value other than zero, the RUA Counter 337 for the R2 GPR 202 is checked for a zero condition indicating R2 is available. If the format is found to be RX a check is made of the RUA Counters 337 for the GPR's designated as the base and index registers. For either format, if the I Box 134 is not remembering that the present instruction is the target of an EXECUTE instruction, see FIG. 11, but the quick loop condition is set, Block 1112, the OP Register 159 is reset and the target address is moved from the SLT Register 180 into the I Register 148 and A0 Register 1002, Block 1113. The I Register 148 moves the target instruction from its Buffer Register 155 to the OP register 159 for decoding as described. The quick loop condition, Block 1112, is present when the target of the branch instruction is present in the Buffer Registers 155, i.e., is equal to or more than the LB register 150 address as indicated by the Comparator 181 determining that the I Register 148 address is the one for which the target address is saved in SLT Register 180.

When the instruction is the target of an EXECUTE instruction or the quick loop mode trigger is not on, Block 1112, the branch address must be generated as required by the instruction format, Block 1115, and the conditional mode status is determined. If the I Box 134 is not in conditional mode, the availability of a Temporary Buffer 157 is determined. If a Temporary Buffer 157 is available, and we are not set in loop mode, the I Box 134 is set into state one and normal instruction fetching is stopped. When a Temporary Buffer 157 is not available, or the I Box is already in loop mode, or if the I Box 134 is in conditional mode but the conditional branch target is not in the Buffer Registers 155, the I Box goes to a state two condition and stops instruction fetching. As soon as W Register 177 is available in either state, i.e., the branch target address is held therein, state two shifts to state three and state one will shift to state three after a fetch request is issued for at least the target instruction to be returned to the Temporary Buffer 157 as a sink, or if the branch address is not already in the array of Buffer Registers 156, then after a fetch request is issued for the instruction at the next address after the target address. In state three, a test will be made to find if the branch target is lower in magnitude than the address of the branch instruction. This is determined by generating in Adder 168 the branch instruction address from the LB Register 150 and the IR Incrementer 153, and adding thereto the complement of the branch address in W Register 177. When the branch target is already in the array of Buffers 156, control is transferred to Block 1113 to start decoding instructions along the branch, or if the branch target is not in the Buffers 156, the target address is transferred into the LB, UB, I, and AO Registers and the I Box Buffers 156 are normalized as previously described. Now if the instruction is not the target of an EXECUTE instruction, and the target address is less than eight double words earlier than the branch instruction, the quick loop condition, Block 1112, is established so that on the next decoding of the branch instruction the branch will be taken immediately. It may be noted that even if the branch target is not in the array of Buffers 156, the first time the branch instruction is decoded the decoding of the target address as less than eight double words earlier than the branch together with the initializing and establishment of the quick loop mode, will insure that the target will remain in the loop for further iterations. Another feature to note is the ability to set the I Box for loop mode even if the target instruction is more than eight double words earlier. This results in conditional instructions being issued along the branch rather than continuing along the main instruction path as when loop mode is not set. This can save some fetching and instruction cancelling as it is considered more likely that a branch once taken will continue to be taken rather than that only one loop iteration will be made. With this assumption, there will be fewer decoded and conditionally issued instructions to be cancelled than if it were always assumed that the branch would not be taken.

The CONDITIONAL BRANCH instruction is substantially similar to the UNCONDITIONAL BRANCH just described but is subject to several additional restrictions. For instance, if a CONDITIONAL BRANCH is decoded with the I Box 134 already operating in conditional mode, the operation stops for it would not be proper to have two branches depending upon the same condition. Also, for such a branch, instruction prefetching must be set up for the branch path, or the main path if I Box 134 is set in loop mode. The important conditions are the branch target address is back and loop mode can be set, the target address is back less than eight double words but is not now in the Buffers 156 so loop mode can be set, or the target address is already within the Buffers 155 and a quick loop can be set up.

Considering the flow charts, FIGS. 13 and 14, a decoding of a CONDITIONAL BRANCH instruction checks for availability of Adder 168, and if the format is RR, for availability of the named R2 Register, or if the format is RX, for availability of the B and X Registers. When the registers are available and the I Box is not in conditional mode, the target instruction of an EXECUTE instruction will wait for the condition code to become valid and will go either to the next instruction for a no branch condition, or for a branch condition will generate the branch address in Adder 168, and go to state 1 of UNCONDITIINAL BRANCH, FIG. 12. The usual branch instruction will not be the target of an EXECUTE instruction and the I Box 134 will be set to state 1, and instruction fetching halted. At the same time, the loop status will be tested and unless both loop mode and quick loop have been established, the branch address will be generated in Adder 168, but if both loop mode and the quick loop are set, then the address of the next instruction will be generated. In state 1, as soon as the W Register 177 is available, i.e., contains the address of the next instruction to be fetched, control passes to FIG. 62 at entry point B, at which point the condition code in PSW Buffer 1006 is tested, and if valid, enables the branching decision to be made immediately. If both the loop mode status and quick loop status are set, and the branch is not to be taken, Block 1116 (N), the I Register 148 is incremented to the next instruction, but if the branch is found to be proper, the OP Register 159 is reset to clear out the next instruction which is not to be decoded and the SLT Register 180 is gated into I Register 148 to start the new instruction loop. When the I Box 134 condition is such that either loop mode status or quick loop status is not set, the branch test, Block 1116, will switch between the next instruction for a no branch decision and the state 3 condition for a branch decision. In state 3, Block 1117, the test is made for a possible loop by generating the difference between the next instruction address and the target address in Adder 168. If the branch address so generated is already in the array of Buffers 156, then the control is the same as the output of Block 1116 in a quick loop, i.e., reset OP Register 159 and set the target address into the I Register, this time directly from W Register 177. If the branch address is not in the array of Buffers 156, then the target address is transferred to the instruction unit controls and the I Box is initialized as set out above. For either case in state 3, the quick loop will be established if the target is less than eight words back of the I Register 148 address, Block 1119 (Y).

When the condition code is not yet valid at the decoding of a branch instruction, it is desirable to proceed with instruction decoding along one of the possible paths in hope that when the condition code does become valid, we can have some instructions preprocessed and ready for execution. We must not, however, make any changes which cannot be reversed if we have selected the wrong path. Therefore, as previously described, we assume there will be no branch if the I Box is not in loop mode, and that there will be a branch if the I Box is in loop mode. Instructions will be processed along the selected path until it becomes evident that the wrong path was taken. If the I Box is not set for a quick loop mode, it will save some fetch times if we also make some fetching for the instructions along the non-selected path and store them in Temporary Buffers 157. All instructions issued in this state are tagged conditional and are not to be executed. Referring again to FIG. 14, when the condition code is not yet valid when I Box 134 is in state one, if both the loop mode test and the quick loop test are (Y), then the next instruction address (IR INCR 153) is saved in the SAVE IR Register 1120, and the branch target address in SLT Register 180 is set into I Register 148 to start the loop iteration. The OP Register 159 is reset and the conditional mode state is set to prevent execution of instructions until the condition code becomes valid. If either loop mode or the quick loop is not set at the time the condition code is tested, the I Box 134 goes to state two and the target instruction is called for by a fetching request since it will be needed in any event. If we are in loop mode, but not in a quick loop, this instruction is the next one to be decoded and processing of further instructions will be halted until it is returned into a Temporary Buffer 157 and also directly into OP Register 159. Instructions will still be called for even though decoding of instructions along the main path continues. In state two, Block 1121, the Adder 168 is again used to determine if the target instruction is within eight double words of the I Register 148 address. The Adder 168 is furnished the output of IR Incrementer 153, the output of the LB Register 150, and the complement of the target address in W Register 177, to determine if the branch target is backward or forward and how far. In this state two, the conditional mode status is set and the I Register 148 is incremented to the next instruction address. If now the branch address is already in the array of Buffers 156, this is remembered, but if the target address is not in the array, then the target address in W Register 177 is incremented in Adder 168 to generate the next instruction address to be fetched and buffered in #2 Temporary Buffer 157.

FIG. 15 shows the controls for establishment of the loop mode condition for any of the conditional branch instructions. When a control signal is received at input A, from FIG. 13, indicating that the I Box is in state zero of a CONDITIONAL BRANCH instruction, and so long as the conditional mode is set up, the condition code stages of PSW Buffer 1006 are tested. When the condition code becomes valid, the conditional mode is removed to enable further instruction executions to continue, and the branching conditions are tested to determine if the branch is to be taken or not. If the branch is to be taken and the I Box 134 is in quick loop status, a correct assumption was made of the correct instruction path. At this time then, Block 1123, the conditionally issued instructions are activated and instruction fetching continued. This will also be true if the branch is not to be taken and I Box 134 is not in a quick loop status. Under these conditions, further proceedings will be as in Block 1123.

In the reverse situation where the branch is taken but I Box 134 is not in a quick loop status, or if the branch is not taken but a quick loop status was set, instruction decoding has proceeded along the incorrect path and must be corrected, Block 1124. In this condition, the cancel signal is sent to all conditionally issued instructions, and the OP Register 159 is reset. If this is the change from a loop mode to no branch, the saved next instruction address in Save IR Register 1120 is set into I Register 148 and decoding continues on the normal path, but if the change is into the branch path for the first time, then the branch target address saved in Temporary Register 176 is set into the UB, LB, I, and AO Registers 147, 150, 148 and 1002 to start the new instruction decoding sequence. In the first of these two situations, i.e., not branching while in a loop state, there is a possibility that the loop mode was actually set up by a later instruction and that loop mode should continue. This is tested by comparing in Comparator 181, the I Register 148 contents with that of SLCIR Register 179. If they are the same, Block 1125, then the loop mode state was set by this instruction and is removed.

In the other situation where the branch was taken and I Box 134 was not in quick loop state, when the target address test indicates that the target was less than eight words back, the quick loop status is set. Also, if the target address is not in the array of Buffers 156, as indicated by the output of Comparator 1041, the loop mode status is removed to enable proper fetching and the Instruction Buffers 155 and I Registers, etc. are normalized to start out anew. Since the quick loop is still set, however, the LB Register 150 cannot be incremented to drop instructions of the loop from the effective buffered instructions.

There is a group of four branch instructions which may be considered together since their differences are minor. These are BRANCH ON COUNT, BCTR in RR format, and BCT in RX format, BRANCH ON INDEX HIGH (BXH) and BRANCH ON INDEX LOW OR EUAL (BXLE), both in RS format. In all of the instructions, the branch address is specified in some way in the instruction and will be generated at the output of Adder 168. For the BCT instruction the branch address will be the sum of the X and B register contents with the displacement value of the instruction. For BXH and BXLE it will be the sum of the B register contents with the displacement, and for BCTR it will be the R2 register contents alone passed directly through the Adder 168.

In the two BRANCH ON INDEX instructions, the two specified GPR's 202 have their contents added and the sum returned on Bus 236 to the first specified GPR 202. Then this sum, still in W Register 177, is compared with the value in the GPR which is the odd numbered one of the even-odd pair containing the second specified GPR 202, and the branching decision taken in accordance with the comparison result. It will be evident that if the sum is gated from W Register 177 over Bus 1036 complementally into B Adder Bus 174, and the comparand from the GPR 202 is sent over A Adder Bus 174 and entered true into Adder 168 and addition performed with a Hot One on a Line 1127 then there, will be an end around carry in Adder 168, if the sum is less than or equal to the comparand, and no carry if the sum is greater than the comparand. This end around carry can be tested against the condition of the branch instruction to determine if the branch is to be taken to the address still held in Temporary Register 176.

For the two BRANCH ON COUNT instructions, the branch target address is set into Temporary 176 as above either as a sum or directly from the GPR through Adder 168. Now the first specified GPR is gated out on A Adder Bus 173 to Adder 168 and is reduced by one unit. This unit can be entered by setting the B Adder Bus 174 for a complemental entry without gating any external value to the input. If the Hot One is not signalled on line 1127, there is a net subtraction of one unit. As in the BRANCH ON INDEX instructions, this result is sent over Bus 236 to the sink GPR 202 and is entered complementally into Adder 168 over Bus 1036 and B Bus 174 with a Hot One on Line 1127, but without any GPR 202 being gated in over A Adder Bus 173. If the sum in the sink GPR 202 has been reduced to zero, there will be an end around carry in Adder 168 and this carry can be used as the signal that normal instruction sequencing is to proceed. The BRANCH ON INDEX instruction is the more comprehensive of these instructions, and its controlling factors will be described with reference to its flow charts FIGS. 16, 17, and 18, since the BRANCH ON COUNT can be derived therefrom by elimination of some of the GPR controls.

In FIG. 16, when a BRANCH ON INDEX instruction is decoded, the first check is to see if Adder 168 is available for use in the instruction, and then to check the RUA and RUM counters 337 and 335, respectively, for the GPR 202 designated as the base register to be sure it is available. If now the I Box 134 is in loop mode and the instruction is not the target of an EXECUTE instruction, then control exits to entry point A of FIG. 17. If the instruction is the target of an EXECUTE instruction, a check is made of the conditional mode status. If conditional mode is not set, control is passed to a Line 1128, but if the conditional mode status is set, then a test, Block 1129, is made to see if the conditional branch target address is or will be within a quick loop (loop mode is already set) and if not control is passed to Line 1128. If block 1129 is set Y, then no action will be taken until the conditional mode status changes to N, passing control directly to Line 1128.

When it is sensed that loop mode is not set but conditional mode status is set, further control is passed to Block 1129 to prevent further action if the conditional branch target within the quick loop which would be established if the branch were to be taken. When the conditional mode status is removed, the availability of the Temporary Buffer Registers 157 is tested and if neither is available, control is again sent to line 1128, but if one or both are available, the I Box goes into state one to fetch the instructions along the branch path (loop mode is not set). In this state one, the normal sequential instruction fetching is halted and the branch target address is generated from the instruction data. When the W Register 177 has the branch target address available, the address is sent on Bus 1034 to MSCE 136 for a fetch into the Temporary Buffer 157, and also back through Adder 168, to increment the address to the next address. As the target address fetch is being made, a test of the comparator 1041 is made to see if the target address is already in the array of Buffers 156, or is being fetched for them, and if so control is passed to Line 1128. If the target address is not available to the array of Buffers 156 then a fetch request is made for the now generated target address plus one and control sent to Line 1128.

Line 1128 is the entrance to the testing part of the instruction and starts at a Block 1131 where the availability of the GPR's 202 designated as the index register R1, the increment register R3 and the comparand register R3* is checked and further processing is halted until all are available. The designation R3* is for the odd numbered member of the even-odd pair of GPR's 202 of which the R3 GPR is a member. The R3* can be either than R3 register or the next higher numbered one depending on whether R3 is odd or even. When these registers are available (RUA and RUM counters=0) the I Box passes to state 2 and gates the R1 and R3 GPR's into Adder 168. As soon as W Register 177 is available to accept the sum of R1 and R3, state three is entered and, if the I Box 134 is not in conditional mode, the FXPU 143 is notified that I Box 134 requires priority to enter data into a GPR 202, i.e., into R1.

In state three, Block 1132, the R1, R3 sum is gated into W Register 177 and passed back to the input of Adder 168 to be subtractively combined with the data from the R3* GPR and control is passed to entry D on FIG. 18. At entry D, FIG. 18, if I Box 134 is not in loop mode but the target address has been determined to be in the array of Buffers 156 (Comparator 1041, FIG. 10), the I Box shifts to state six, Block 1133. If, however, the target is not in the array, a check is made of the conditional mode status and if we are in conditional mode, the I Box shifts to state 4, Block 1135, but if not in conditional mode, the status of Temporary Buffers 157 is looked at. If no fetching was done, I Box 134 also shifts to state 4, Block 1135, which will generate the branch target address and will then wait until the decision on the branch conditions is met. If, on the other hand, there was fetching to the Temporary Buffers 157, the I Box 134 goes into state five, Block 1136. State five is also reached from state 4, Block 1135, when it is decided that the branch conditions have been met and the branch is to be taken. In state five, the difference between the instruction address from I Register 148 and LB Register 150, and the target address from W Register 177 (Block 1132, FIG. 16) is determined in Adder 168 to decide if loop mode can be set up. If when the branch decision is made, the branch is to be taken, the test is made to see if the target address is in the array of Buffers 156 (Comparator 1041, FIG. 10B), and the I Box 134 goes into state six, Block 1133. If the target is not in the array, then it is also necessary to initialize the I Box 134 by transferring the target address to the I, LB, UB, AO Registers and setting SLT and SLCIR if a quick loop is to be set up. From either state 4, Block 1135, or state five, Block 1136, if the branch is not to be taken, the instruction sequence is to proceed along the normal path so the conditional mode setting is checked. If we are still in conditional mode, the I Box 134 shifts over to state 6. State six has an exit to entry C of FIG. 15 to enable a setting for loop mode if possible, and also waits until the conditional mode status goes off. At this time, if priority on the use of the GPR's 202 had not been previously requested, priority is now requested of FXPU 143 to store the sum of R1 and R3 into the R1 GPR 202. If priority had been requested, and the branch taken, as soon as GPR priority is granted, I Box 134 is shifted to state zero, the R1, R3 sum is transferred to the R1 GPR 202, loop mode status is set if appropriate and the OP Register 159 is reset for the new instructions.

If the branch has not been taken in this control sequence or the branch had not been taken during state four, Block 1135, and conditional mode was not set, then a wait is set up until the GPR priority is granted. As soon as granted, the I Box 134 is shifted to state zero to finish the instruction and decode the next instruction in OP Register 159. The sum of R1 and R3 is also transferred to the R1 GPR 202 for storage. Thus, as soon as the I Box 134 is not in conditional mode, if the branch is to be taken, the I Box is initialized and set into loop mode as required or if the branch is not to be taken, processing is continued in the normal instruction decoding sequence.

Another combination of initial conditions and control sequencies is possible at the start of a BRANCH ON INDEX instruction, and this is shown in FIG. 17, which is reached from exit A on FIG. 16, i.e., the I Box 134 is in loop mode and the present instruction is not the target of an EXECUTE instruction. At entry point A, FIG. 17, nothing proceeds until any conditional mode state of the I Box 134 is set off, at which time a request is made for a priority slot on the GPR 202 controls in FXPU 143. Also a check is made of the quick loop status and if the status is not set, the I Box 134 goes to state one wherein the normal instruction fetching is stopped and the branch target address is generated from the BX-instruction. When the W Register 177 is free, it receives the target address and Block 1131 is tested. Block 1131 is also tested directly is set. As soon as the R1, R3 and R3* GPR's 202 are available, the I Box 134 shifts to state two and gates the rather than through state one if the quick loop status R1 and R3 GPR's into Adder 168 to generate the new index value. When W Register 1177 is again available to receive the new index value, the quick loop status is tested, and if the I Box is in a quick loop state, or if the target address is already in the array of Buffers 156 (loop mode is already set) processing is to proceed conditionally along the branch path, Block 1137. If the quick loop status is not set, and the target is not in the array, then control is shifted out at exit B to entry B and Block 1132 on FIG. 16.

When processing is conditionally along the branch path, Block 1137, the R1, R3 sum from Adder 168 is put into W Register 177 and fed back into Adder 168 for subtractive combination with the data from the R3* GPR 202, and the target address is passed back into I, LB, UB, AO Registers, the SLT etc. registers of I Box 134 as required. As soon as the priority on the GPR 202 bus is granted by FXPU 143, the R1, R3 sum in W Register 177 is sent on GPR Bus 236 for storage in the R1 GPR and I Box 134 switched into original state 0 wherein decoding of the next instruction in OP Register 159 is started. This will be the target instruction of the branch for this address has been sent to I Register 148, etc. for control. After the determination of whether the branch conditions are met or not, a quick loop status is to be set if the branch is to be taken and I Box 134 is not already in quick loop status. If, however, the branch is not to be taken a recovery must be made to the normal instruction sequence. This recovery first blocks the OP Decode 166 to prevent issuance of the instruction then in OP Register 159 as it is now determined to be the wrong one. Instead, the next instruction address is recovered from Save IR 1120, the OP Register 159 is reset, and if loop mode had previously been set by this instruction in a prior loop iteration (IR=SLCIR Comparator 181) it is now reset. From this condition the I Box is reset to state zero to continue with the decoding of the next instruction in the normal instruction sequence.

Thus, the instruction first effects an addition of the data in the designated R1 and R3 GPR's 202 and stores the sum in the R1 register. The sum and the data in the R3* register, either R3 or the next higher numbered GPR 202, are combined subtractively and the result is tested for the branch condition. If the branch is to be made, it is made to the address generated by adding the data in the GPR 202 designated as the base register to the address displacement given in the instruction. A branch instruction occurring in conditional mode will be halted at the branch point until the conditional mode status is removed, but if not in conditional mode, the instruction prefetching to the Temporary Buffers will be made when loop mode is not set, otherwise decoding of instructions is continued around the instruction loop.

The BRANCH AND LINK instruction is an unconditional branch instruction which also stores in a designated GPR 202, the right half of the Program Status Word so that the condition status of I Box 134 can be reconstructed at a later time if it is desired to resume the normal instruction sequence. In this instruction the branch address is first determined either by direct reading from the GPR 202 designated in the instruction as the R2 Register (RR format) or by combining the base address data in the GPR's 202 designated as the index and base registers with the displacement amount from the instruction. This address will be held in W Register 177 while the next instruction address in the normal sequence is generated in Adder 168 from the LB address in LB Register 150, and the incremented instruction address from the IR Incrementer 153 with or without the bit 28 correction as needed. The branch address is now moved into the I, LB, UB, etc. registers to start the new series of instruction fetches. The W Register 177 is now free to accept the next instruction address from Adder 168. The PSW half to be stored in the GPR 202 designated as R1 in the instruction is composed of the 24 bits of the full instruction address from W Register 177, and an eight bit byte from the PSW Buffer 1006. The eight bit byte comprises a two bit instruction length code, either 01 for the BALR instruction (RR format) or 10 for the BAL instruction (RX format), the two bits of the condition code and a four bit program mask which indicates the conditions that will be allowed to interrupt the program being performed.

Referring now to the BAL flow chart, FIG. 19, it will be seen the first part of the controls is the same for either instruction format and that after the BAL instruction is decoded, the availability of Adder 168 is tested. As soon as it is available, the conditional mode status and conditional target address are checked to halt operations if there is a possibility that a conditional mode instruction loop could be set up, and the RUA counters 337 of the required GPR's 202 are checked to insure availability of the GPR's 202. When the GPR's 202 are available, the I Box shifts to state one, Block 1140, wherein it generates the branch address in Adder 168 and stops further instruction fetching. As soon as the W Register 177 is available to accept the branch address in Adder 168, the I Box shifts to state two, Block 1141, and transfers the branch address into W Register 177. At the same time the IR Increment 153 output and the LB Register 150 outputs are gated into Adder 168 to generate the address of the next instruction in the normal sequence. It is a convention in the preferred embodiment of the invention that in branch instructions, an R2 designation of 0000 in the instruction does not indicate the GPR 202 numbered zero, but instead indicates no branching. This convention is checked for in state two by a test for RR format and R2 address of 0000, and if either is (N), the branch is taken by moving the branch target address into the I Register 148, the LB Register 150, etc., to initialize the I Box 134 and start it on a new series of instruction fetches. If loop mode has been set, it is removed and OP Register 159 is reset to prevent decoding of instructions after the branch.

In state two, the FXPU 143 is notified that the I Box 134 requires a priority time slot in the GPR 202 entry controls, Block 1142, if the conditional mode status is not set, if the condition code in PSW Buffer 1006 is valid, and if the R1 GPR 202 is available (RUA 337 and RUM 335=0) for receipt of the PSW data. Another function in state two is to transfer the updated instruction address from Adder 168 into the W Register 177 and to transfer the I Box 134 to state six, Block 1144. In state six a control signal is transferred to the loop mode controls, FIG. 15, and with the designated R1 GPR available, if the I box 134 is not in conditional mode, a check is made of the GPR priority request status, and if no request has been sent, one is now sent, Block 1142. If a priority request had been sent, or after the request is now sent, a pause is made until the FXPU 143 notifies I Box 134 that the priority request is granted. The PSW bits 32–39 (ILC, CC, and PM bits) are now transferred into bit positions 0–7 of the W Register 177 and along with the updated instruction address (link) in the W Register is sent over Bus 236 to the FXPU 143 for storing in the R1 GPR 202. The I Box 134 is now returned to state 0 for the next instruction decode which will be along the branch path.

STATUS SWITCHING AND I/O INSTRUCTIONS

These instructions comprise a group of 14 instructions which are handled within the I Box 134 of the CPU without reference to the execution units of the CPU.

The instructions of the group are:

| Mnemonic | Instruction | Format |
|---|---|---|
| LPSW | Load PSW | SI |
| SPM | Set Program Mask | RR |
| SSM | Set System Mask | SI |
| SVC | Supervisor Call | RR |
| SSK | Set Storage Key | RR |
| ISK | Insert Storage Key | RR |
| WRD | Write Direct | SI |
| RRD | Read Direct | SI |
| TS | Test and Set | SI |
| SIO | Start I/O | SI |
| TIO | Test I/O | SI |
| HIO | Halt I/O | SI |
| TCH | Test Channel | SI |

These instructions affect or are associated with basic changes in the status of the machine, either change of program or system controls, or communication with Input/Output (I/O) equipment. It is expected that the frequency of their occurrence will be low as compared with other instructions of the system. Consequently, no sophisticated hardware is provided to enhance their execution as the total time saved would be inconsequential.

A major interlock on the issuance of all of these instructions is with the conditional mode status. The I Box 134 cannot proceed with the decoding of any of this group of instructions until the outstanding condition test is completed for the changed machine status may alter the effect of an instruction execution, may alter protection features or make other changes which cannot be recovered from if the wrong branch is selected for execution. Furthermore, many of the instructions require that all outstanding instructions be completed prior to their execution for the execution can change system aspects required for execution of the earlier instructions, e.g., an interrupt signal arising during drain of the pipelined instructions has logical precedence over status switching changes or all outstanding store instructions must be executed prior to executing I/O commands or changing storage protection codes.

The LOAD PROGRAM STATUS WORD instruction fetches a new PSW from storage and sets it into the PSW Buffer 1006 with the instruction address part going into the I Register 148, the LB and UB Registers 150 and 147, respectively, and into the AO Register. Since the new PSW will contain a system mask to enable selected input channels, a storage protection key, a group of indicators to set a code format, wait state, problem state, etc., and the 32 bit word comprising two bit positions to be filled with an instruction length code, two bits specifying the condition code, the four bit program mask and the next instruction address, loading of a PSW is equivalent to changing to a new program or resuming one at an interrupted point. Furthermore, as instruction steps are considered logically as if fully executed in sequence, no PSW change may be allowed to interfere with execution of prior instructions.

The LOAD PSW instruction is written in the SI format and is implemented in the following manner as shown in the flow chart, FIG. 20. First, during the decode cycle, the conditional mode status and supervisor mode status are checked in addition to the normal interlocks (RUA, RUM) requiring availability of the address register. The SI format for this instruction specifies only the operation code and one storage address, therefore, only the base register need be checked for availability. Second, Block 1145, current instruction fetching is terminated, I/O and external system interrupts are inhibited and the double word storage address of the new PSW is generated. Third, Block 1146, the instruction address of the LOAD PSW instruction is reconstructed from the I Register 148 and LB Register 150 data and the address of the new PSW is retained in W Register 177. The instruction address of the old PSW is generated to be available if an interrupt due to an error is signalled, at which time this address may be stored with the old PSW sent to storage. Fourth, the new PSW address is checked for specification and invalid exceptions which can terminate the instruction and signal an interrupt. If no such exceptions are found the new PSW fetch is requested, Block 1148, and the instruction address is shifted into W Register 177. Fifth, the return of the requested PSW from storage initializes the instruction fetching mechanism with the new instruction address, Block 1149, with the rest of the PSW being set aside in #1 Temporary Buffer Register 157. Sixth, when the pipeline is empty, the new PSW is moved, Block 1150, into PSW Buffer 1006 to start the new program sequence in I Box State 0, but if before the pipeline is empty, an interrupt is signalled from the CPU as a result of an invalid condition, the LOAD PSW instruction is cancelled and the old PSW with the saved instruction address is loaded into storage as part of the interruption procedure.

This instruction is a privileged instruction, not encountered in normal programs and can be executed only when the I Box 134 is set to the supervisor status, i.e., bit 15 of PSW Buffer 1006 is set to zero. The address specification above referred to indicates that the given address is not to a double word boundary, i.e., does not have three low order zeros, and consequently cannot fetch a full PSW. An invalid address is one which is not contained in the actual storage modules incorporated with the system.

The Supervisor Call (SVC) instruction is an RR format instruction which is valid in either a program mode or supervisor mode, and is the only instruction which can change the I Box from a program mode to a supervisor mode. The instruction actually causes an interrupt operation in which bits 8–15 of the SVC instruction are stored into bit positions 24–31 of PSW Buffer 1006 as the interrupt code. During the interrupt operation, bits 16–23 of PSW Buffer 1006 are made zeros, the whole PSW is stored into address location 32, and the new PSW is obtained from storage address 96. The design objective is merely to overlap the entry to the supervisor call interruption with the drain of the instructions in the execution units and being issued by the I Box 134. During such pipeline drain, however, no steps should be taken which would destroy the logical sequence of instruction execution.

When the SVC instruction is decoded, an interrupt condition is signalled, instruction fetching is stopped, the instruction address of the SVC is generated in Adder 163 and the storage address of the new PSW is forced to the MSCE 136 as part of a fetch request for this storage address. The instruction address of the SVC instruction is held in W Register 177 and the address of the next instruction is generated in Adder 168 from the data in LB Register 150 and the IR Incrementer 153. After the new PSW is returned it will be stored in Temporary Buffer 157 except for the instruction address part which will be set into I Register 148, UB Register 147, LB Register 150, etc., to initialize the I Box 134 and start the new instruction fetching sequence. Any interruptions due to execution of instructions in the pipeline will be given priority and can still store the old PSW in PSW Buffer 1006 with the address of the instruction (SVC) being decoded at the time of the interruption. Such an interrupt will be processed exactly the same as if no SVC instruction were being processed, and the effect will be to cancel the SVC instruction. After the pipelined instruction are all executed, the address of the next instruction will be set into W Register 177 to become a part of the old PSW. This address will be used to resume the program at the interrupted point at a later time. The portion of the new PSW in Temporary Buffer 157 will now be transferred into PSW Buffer 1006 and the first instruction of the new sequence will be decoded to start the new program. The new PSW can set the system to any status and to any program instructions desired by the programmer.

The SET SYSTEM MASK instruction is in the SI format specifying only an OP code and a byte address. The instruction substitutes the addressed byte for bits 0–7, the system mask, in PSW Buffer 1006. The system mask specifies which of the system I/O channels can interrupt the CPU, a one bit in the mask allowing a channel to interrupt. As only one byte is to be handled in this instruction, the FXPU 143, FIG. 6, is utilized as it alone can work with single bytes. The I Box 134 will send a fetch request to MSCE 136 for the word including the byte and direct that the fetched word is to be returned to an available FXB 204–207. It also issues an instruction to the FXOS 201 and includes with this instruction the byte address. When this instruction is reached in normal execution of the FXOS 201 instructions, the selected byte will be gated out to either Bus 232 od 233 and sent through OR 237 to I Box 134. Since I Box 134 is still set in the decode of the SSM instruction, the byte will be passed through gate 1152 into bit positions 0–7 of PSW Buffer 1106.

There is no need to wait for drain of the pipeline for the system mask is not affected by nor affects interrupts within the CPU. However, the FXPU will be empty and little FXPU activity is expected due to the number of elapsed cycles. Any I/O and external interrupts are inhibited during execution of the instruction to insure that if there are any such interrupts, the correct system mask will be available to enable or disable the interrupts.

Referring to the SSM flow chart, FIG. 21, when the SSM instruction is decoded with the I Box 134 in state zero, the decoding status, the I Box status is checked for a not conditional mode and for a supervisory state before the instruction can proceed. A finding of not supervisory mode is cause for an interrupt action with cancellation of the SSM instruction, for this instruction is a privileged one and can be executed only in supervisory states. If the preliminary tests are passed, the mask byte address is generated, Block 1153, in Adder 168 and the interrupt controls are inhibited from responding to external or I/O interrupt requests, since it is necessary to have the updated system mask available for these interrupts. Actually, the new mask may bar an interrupt which is inhibited during the SSM operation. When the byte address is generated in Adder 168, W Register 177 is tested for availability to receive the address as soon as it is free, Block 1154.

When the mask byte address is in W Register 177, it is checked for validity, and if it is not within the connected storage addresses, the instruction is interrupted, but for a valid address, the FXPU 143 indicators, FXOS Counter 203, and the FLB Busy Triggers 1082, are checked for availability and the operand fetch is issued, Block 1156, to MSCE 136 naming a selected FLB 204–207 as the sink. The OP Stage 167 issues the required instruction to FXOS 201 and a waiting state is entered. After the FXPU 143 completes its operation and gates the required byte out through OR Gate 237, FIG. 6, the byte is passed through gate 1152 into bit positions 0–7 of PSW Buffer 1006, and the instruction terminates.

The SET PROGRAM MASK (SPM) instruction is in the RR format with an OP code and only one register R1 designated. The instruction acts to replace bits 34–39 of PSW Buffer 1006 with bits 2–7 of the word stored in the R1 register. The R1 register data is not changed. Comparing this instruction with the BRANCH AND LINK instruction, it will be seen that the bits to be loaded into Buffer 1006 could have been set into the R1 GPR on an earlier BAL instruction, thereby recovering from the earlier branch. The set bits are the two bits of the condition code and the four bit program mask which indicates the arithmetic conditions that are to be allowed to cause system interrupts.

The SPM instruction can be executed in any program state as it is not privileged but logical correctness must be preserved. Therefore, prior to a program mask change, all operations under the old mask must be completed for the old mask must be stored as part of the old PSW when an interrupt occurs. For the same reason, no new instructions after the PSM instruction can be executed until the mask is changed. Therefore, the I Box 134 will wait for the issued instructions to be executed before the SPM instruction is executed, unless the old and new program masks are the same. In this case, there is no conflict and the instruction will be executed immediately.

In the flow chart, FIG. 22, for the SPM instruction, it will be seen that when the instruction is decoded, the not conditional mode status, the availability of the R1 GPR 202 (i.e. RUA counter=0) and the availability of Adder 168, enable the GPR Selection Mechanism 1096, FIG. 10*a*, to open the appropriate gates 1030 to gate the designated R1 GPR 202 into Adder 168, and from its output into W Register 177, Block 1157. If the new program mask bits and the old mask bits are equal, the six bits of the condition code and mask, Block 1158, are immediately sent over Bus 1160 into PSW Buffer 1006. Simultaneously, the Set Condition Code bits in all issued instructions are reset, for the new CC setting logically follows these instructions. When the new and old masks are not the same, any pending interrupts will be processed to terminate the instruction, and I Box 134 holds up until the pipeline of issued instructions is empty before the new mask is transferred as in Block 1158. Execution of Block 1158 operations terminates the SPM instruction.

STORAGE PROTECTION KEYS

The storage protection feature was briefly mentioned in the discussion of the MSCE 136, and comprises a separate small storage unit having one storage location for each block of 2048 bytes of storage. The storage key is a five bit key stored in the storage location corresponding to the protected block of storage. The key is four bits to specify the program to which the storage block is assigned, and which therefore has full access to the block, and a fifth bit which specifies whether the storage block is protected against storage operations, with fetches of the data permitted, or is protected against both storage and fetch operations. Any number of blocks can have the same protection keys except that a zero key indicates no protection.

Two privileged instructions are available for processing the storage key groups. The SET STORAGE MASK instruction is in RR format and is used to transmit to MSCE 136 a group of five bits from bit positions 24–28 of the register identified by the R1 address field. The group of five bits is stored in the storage protection storage at the address designated by bits 8–20 of the GPR 202 identified by the R2 address field. Bits 28–31 of this register are required to be zero, otherwise an address exception is signalled and the instruction cancelled on an interrupt. The INSERT STORAGE MASK instruction is also in the RR format and is used to inspect the storage key group for a block of storage locations. Here the key for the block of storage locations identified by bits 8–20 of the GPR 202, identified by the R2 address field, is stored in bit positions 24–28 of the GPR 202, identified by the R1 address, field, and bits 29–31 of the register are set to zero. Bits 28–31 of the R2 register must be zero in this instruction. In both the SSK and ISK instructions, a special signal is sent to MSCE 136 to inform it that the addressed storage location is in the storage protection area, not main storage.

The flow chart for the SET STORAGE KEY instruction is set out in FIG. 23. When the SSK instruction is decoded, the I Box 134 waits for the conditional mode trigger to be set off and then tests the SAR Busy Triggers 1094, the availability of the R2 GPR (RUA=0) and the supervisor mode status which must be on since this is a privileged instruction. If I Box 134 is in problem state, an interrupt is signalled and the SSK instruction cancelled, but in the supervisor mode, the data in GPR 202 identified by the R2 address field is gated by GPR Selection Control 1095 through Gates 1032, FIG. 10B, into Adder 168, Block 1161. If bits 28–31 of this data are not all zeros, an interrupt is signalled with cancellation of the SSK instruction, otherwise the storage address part, bits 8–20, of the R2 GPR is passed into W Register 177, and the GPR 202 identified by the R1 address field is gated through Gates 1032, FIG. 10B, by GPR Selection Controls 1095 into Adder 168, Block 1162. If the address in W Register 177 is invalid as identifying a storage location outside of those provided in the system storage modules, an interrupt is signalled to cancel the SSK instruction, but the normal operation is to gate the storage key, bits 24–28 from Adder 168 into W Register 177, Block 1164. The W Register data is then set out over Storage Address Bus 240, see also FIG. 7, into MSCE 136 along with a SSK signal. When this signal is received, the data goes directly into the storage protect feature 138 and not into an SAR 241 as does a normal storage instruction (no SAR's are busy at this time). When the storage key is successfully put into the protect storage 138, a completion signal is returned by MSCE 136 to I Box 134, and receipt of this signal terminates the instruction.

The flow chart for the ISK instruction is set out in FIG. 24. Here when the ISK instruction is decoded in I Box 134, the availability of the GPR 202, designated by the R2 field, the availability of the Adder 168 and not conditional mode status are ascertained, and the supervisor mode is checked to call for an interrupt and cancellation of the instruction if it is not present. If I Box 134 is also in the supervisor mode, the data in the designated GPR 202 is gated through the Gates 1032 into Adder 168, and from there into W Register 177, Block 1165. At this time the bits 28–31 of the data are inspected for an all zero condition. If any of these bits is a one, the interrupt mechanism is signalled and the ISK instruction ended, but if the address bits are all zeros, and the address is valid for the attached system storage, the FXOS Counter 203 is tested for a less than six state, and the FXB Busy Triggers 1082 are tested to find if FXOS 201 can accept an instruction and if there are available at least two FXB's 204–210. As soon as all conditions are met, the I Box issues a fetch request to MSCE 136 and an instruction to FXPU 143, Block 1166. The fetch request will call for the storage key for the designated block of addresses to be sent in a word to a designated source FXB. The instruction to FXOS 201 in the FXPU 143 will call for the fetching of the sink GPR 202 designated by the R1 address field of the instruction into an FXB 204–210, the insertion in its right-hand byte of the mask bits from the word from MSCE 136, and the return of the R1 word back to its sink GPR 202. The I Box 134 does not need a response signal from FXPU 143 to terminate the instruction can proceed as soon as the instruction is set to FXOS 201.

MULTI-SYSTEM COMMUNICATIONS

When two or more data processors are connected into a multiple CPU system, various facilities are provided to permit data communications between the different CPU's. The facilities can include a shared I/O device, a shared storage unit, or a channel-to-channel adapter. Control and request communications are accomplished by a direct control feature wherein one system can instruct another to read or write a byte of information. The present preferred embodiment utilizes two instructions for such control information and processes them through the FXPU 143 since byte handling is involved.

The instruction WRITE DIRECT (WRD) is in SI format and will make available as a set of static signals, the data byte addressed by the base and displacement part of the instruction, and will also provide the eight bits of immediate data from the instruction as an instruction byte for a period of about eight to 16 machine cycles. The word containing the byte is sent to the FXPU 143 which is instructed to put the addressed byte of that word into the Write Direct Register 1168, FIG. 6, where it will be retained indefinitely. The eight bits of immediate data in the instruction are sent to the Immediate Data Register 213, and when the instruction is excuted, the Immediate Data Output Bus 1169 will receive the data in the Register 213 for a plurality of machine cycles, at least long enough for the associated system to recognize that a communication is being received and to perform its interrupt cycles.

The instruction READ DIRECT (RRD) is also in the SI format and will be a part of the normal response to a communication issued by a WRITE DIRECT in another system, although it can also be used after recognition that other outside data is desired. In this instruction an eight bit byte available as static signals on a Bus 1170, FIG. 6, is placed into a storage at the byte location given by the base and displacement areas of the instruction. The byte of immediate data in the instruction is transmitted out as instructions for the system sending the data to be read in. A hold signal from the sending system must be absent to enable the system read-in. This hold signal is normally present only when the data signals are being changed during the WRITE DIRECT instruction.

The WRD and RRD flow chart is shown in FIG. 25. As shown, when a RRD or WRD instruction is decoded while the I Box 134 is in state zero, the conditional mode status is checked for a not conditional mode and the supervisor mode status is tested to interrupt the program and abort the operation if the I Box 134 is not in supervisor mode. If it is in a supervisor mode, the Adder 168 is checked for availability as is the GPR designated as the base register (RUA=0). With both of these available, the GPR is grated under control of the GPR Selection Controls 1096 through Gates 1030 into Adder 168 along with the displacement data from the instruction to generate the address of the byte in storage, Block 1172.

As soon as W Register 177 becomes available, the generated address from Adder 168 is stored in it, Block 1173. This address is checked for validity to be sure that it is within the bounds of the connected storage locations, otherwise an interrupt operation is initiated and the instruction aborted. Now, if the instruction is a WRD, the FXOS Counter 203 is checked for a count of less than six, and the FXB Busy Triggers 1082 are inspected to find a non-busy FXB 204–210. When these are present, an instruction is sent to FXOS 201, Block 1174, and a fetch request is sent to MSCE 136. The MSCE request specifies the storage location to be fetched and the FXB 204–210 into which the fetch is to be returned. The FXOS 201 instruction contains the byte address of the word being fetched and instructions to gate out the selected byte through the VFL Logic Unit 212, FIG. 6, into the White Direct Register 1168. The instruction in FXOS 201 also contains the eight bits of immediate data from the program instruction and this is sent over Bus 451 into the Immediate Data Register 213. When the instruction is executed, the FXPU waits until the Write Direct Register has been loaded and then gates out the data in the Immediate Data Register 213 on Bus 1169 for about eight to 16 machine cycles. When the I Box 134 has issued the fetch request and the instruction to FXOS 201, it has no need to wait and terminates its execution of the instruction.

When the instruction is RRD, after the address is checked for validity, a check is made of the FXOS Counter 203 for a count of less than six and the SAR Busy Triggers 1094 are inspected to find a non-busy one. As soon as both conditions are met, Block 1176, the FXOS 201 is issued an instruction including the immediate data byte and a store instruction is issued to a selected SAR 241 specifying the byte address into which data is to be stored. The I Box 134 is latched up to prevent its decoding any further instructions at this time. When the FXOS 201 instruction is decoded, the immediate data in the instruction is put into Immediate Data Register 1168, FIG. 6, over Bus 451, and is then gated out over Bus 1169 for from eight to 16 machine cycles. After this time, the RDD Bus 1170 is gated to Bus 234 and into the Immediate Data Register 213 from which it is passed on Bus 501 through the OR's 221 to Bus 197 and to the SDB 244 for storage. At this time an FXPU instruction complete signal is sent to I Box 134 which may then terminate its execution of the RDD instruction.

The TEST AND SET instruction is in the SI format and is an interlock feature to enable one CPU to be interlocked with another CPU. In this instruction, a word is fetched from storage into an FXB and one byte is gated therefrom to FXPU 143 and tested there to set the right-hand bit of the condition code in accordance with the left-hand bit of the byte. When the MSCE 136 performs the fetch of the selected address word, it rewrites this word back into storage in the usual manner but with the selected byte set to all ones.

The TEST AND SET instruction, see the flow chart, FIG. 26, requires only a check for a non-conditional mode status. When the Adder 168 is available, the GPR 202 identified in the B instruction field is gated out through Gates 1030 into Adder 168 at the same time the displacement is gated from Buffer 165 to generate the address of the byte, Block 1177. As soon as the W Register 177 is available, the address is transferred into it Block 1178, where it is tested for invalidity and if found to be out of the connected storage, starts an invalid address interrupt with cancellation of the instruction. If the address is valid, the FXOS Counter 203 is checked for availability of an FXOS 201 location and the FXB Busy Triggers 1082 are checked to be sure an FXB is available. As soon as all conditions are met, the word fetch request is issued to MSCE 136 and the instruction is set to FXOS 201, Block 1180. The I Box 134 is not required for any further action on this instruction and it is terminated.

INPUT/OUTPUT INSTRUCTIONS

There are four instructions for controlling the operations of the Input/Output devices connected to a system. All of these instructions are privileged and can be executed in the supervisor state only. All are in the SI format with no immediate data and consist of the Operation Code and a storage address in Base-Displacement form. The sum of the data in the GPR designated by the base field and the displacement data specifies in the third byte, bits 16–23, the address of a channel, only addresses 0–6 being valid, and in the fourth byte, bits 24–31, specifies the identity of a device connected to the specified channel. The CPU program initiates the I/O operation with a START I/O (SIO) instruction identifying the channel and the device on that channel. The channel will then fetch a channel address word (CAW) from a fixed location in main storage. The CAW contains the protection key and the address in main storage of the first of the channel command words (CCW). The CCW specifies the command to be executed and the storage area, if any, to be used.

If the channel is not busy when the SIO instruction is sent it, it attempts to select the required device by sending the device address to all connected units. The unit which recognizes its address connects itself logically to the channel and responds by sending its address back to the channel. The channel then sends the command code part of the CCW over the connecting lines and the selected device responds with a status byte indicating whether it can execute the command. This terminates the execution of the START I/O instruction, and its results are indicated by setting the condition code bits in the PSW Buffer 1006, FIG. 10A. Further control over the device is through the CCW's which may be chained one to the other to keep the device busy for an interval.

The TEST I/O (TIO) instruction sets the condition code bits of PSW Buffer 1006 in accordance with the condition of the addressed device. The address is generated as above.

The HALT I/O (HIO) instruction is used to end operation of the addressed I/O device prior to the programmed termination of the devices operation and will set the condition code bits to correspond to the channel condition. The TEST CHANNEL (TCH) instruction sets the condition code bits in PSW Buffer 1006 in accordance with the status of the channel at the time of the test. The state of the channel is not affected and no channel action is caused. The address is generated as above for both the HIO and TCH instructions, but for the TCH, only bits 16–23 of the address are of interest and bits 24–31 are ignored.

There are four conditions in the channels, sub-channels (multiplexor channel only) and I/O devices which are of interest and for which the conditon code may be set. These conditions are (1) Available (A), (2) Interruption Pending (I), (3) working (W), and (4) Not Operational (N).

The condition code setting for the conditions of interest are set out in the table below where an X indicates that the state of the component is not significant, the first column (C) being for the channel, the second column (S) being for a subchannel, if any, and if there is no subchannel, it is considered as available for condition code purposes, and the third column (D) is for the device status. In the condition code columns, they are START I/O, TEST I/O HALT I/O and TEST CHANNEL, in that order.

| Component | | | Condition Code | | | |
|---|---|---|---|---|---|---|
| C | S | D | SIO | TIO | HIO | TCH |
| A | X | X | ------ | ------ | ------ | 00 |
| A | A | A | a | 00 | 00 | ------ |
| A | A | I | 01* | 01* | 01* | ------ |
| A | A | W | 01* | 01* | 01* | ------ |
| A | A | N | 11 | 11 | 11 | ------ |
| A | I | X° | 10 | b | 00 | ------ |
| A | W | X° | 10 | 10 | 01* | ------ |
| A | N | X° | 11 | 11 | 11 | ------ |
| I | X | X | ------ | ------ | ------ | 01 |
| I | A | A | a | 00 | 01* | ------ |
| I | A | I | 01* | 01* | 01* | ------ |
| I | A | W | 01* | 01* | 01* | ------ |
| I | A | N | 11 | 11 | 11 | ------ |
| I | I | X | 10 | b | 00 | ------ |
| I | W | X° | 10 | 10 | 01* | ------ |
| I | N | X° | 11 | 11 | 11 | ------ |
| W | X | X | 10 | 10 | 10 | 10 |
| N | X | X | 11 | 11 | 11 | 11 |

a The condition code is 00 if a regular I/O operation is initiated and is 01* if the channel end condition is signalled and no data transfer takes place.

b The condition code is 01* when the pending interrupt is for the addressed device and is 10 if the pending interrupt is for another device.

° These conditions can occur only in the multiplexor channel 106 and its subchannels 117.

*This symbol indicates that the status of the channel is stored in a fixed location in main storage. The status stored includes the protection key, the address of the next CCW, the conditions and errors associated with the channel and subchannel and the number of unit counts left from the last CCW used.

Due to the high speed of the CPU and the fact that channel operations are asynchronous with the CPU operations, a number of interlocks are required. First, since the START I/O command directs that the channel fetch control information and it is possible that the CPU may have just issued an instruction to generate and store that CAW, the channel cannot be started until the store is completed. Secondly, since the SIO, TIO, and HIO instructions sometimes store the status in main storage if certain irregularities are detected, the CPU must be held up until the channel indicates that its functions are complete. Logic considerations dictate that the CPU must be held on the I/O instructions until the channel completes its operation. The time required may be in the order of 150 to 200 machine cycles.

The only difference in the I Box 134 in the issuance of these instructions is the OP code which is transmitted to the channel and this is taken directly from the program instruction. All I Box operations for the I/O instructions are the same and are shown on the combined flow chart, FIG. 27. As shown, when the I Box 134 decodes an instruction as being an I/O type, it checks for a non-conditional mode status and waits until such status is present. The supervisor mode is then inspected and the operation nullified during an interrupt, if the I Box is not in the supervisory mode. Otherwise, as soon as the GPR 202 identified in the B field as the base register and the Adder 168 are available, the address data is gated into Adder 168 to generate the channel and device address, Block 1181. The I/O and external interrupt signals are inhibited at this time from causing interrupt operations. As soon after this as W Register 177 is available, the address is transferred into it, Block 1182, and the W Register is tested for an invalid address, which if found will cause an interrupt. The I Box 134 now waits for the issued operations to be executed and the pipeline emptied so that if any interrupt conditions, not I/O or external, are found they may be handled in a logical manner with the logically premature I/O instruction cancelled. When the pipeline is empty, the channel concerned is signalled, Block 1184, that an I/O instruction is pending. The channel will accept the instruction as soon as it can and will signal I Box 134 when it has completed its required action. The I Box 134 will wait until the channel completion response is received before it terminates its action and proceeds to the next instruction. As was noted in the I/O table for the condition code settings, on START I/O, the presence of some conditions may change the condition code settings during the starting up of the selected I/O device.

MULTIPLE OPERATION INSTRUCTIONS

As was earlier pointed out, the responsibility for execution of all instructions except for the branching, I/O and status switching instructions is outside of the I Box 134. For most of such other instructions, the I Box 134 issues a single OP instruction to the execution area, either FXPU 143, or FLPU 142, and will make at most only one storage request, either fetch or store. There is, however, a class of instructions which do not follow this pattern in that they each require the I Box 134 to issue a plurality of OP instructions (always to FXPU 143) and generally each OP will require at least one storage request. All but two of these instructions (LOAD MULTIPLE, STORE MULTIPLE), are in the SS format, i.e., contain two storage addresses, each storage address in a base-displacement form.

The multi-Op instructions are broadly as follows:

LM LOAD MULTIPLE—STM STORE MULTIPLE.— The GPR's 202 starting with a specified one and ending with another specified one, are loaded from or stored to successive storage addresses starting from the one specified in the instruction. Uses one OP per word moved.

TR TRANSLATE—TRT TRANSLATE AND TEST.— Each byte of the source word is replaced by a corresponding byte from a table. For the Test part, any non-zero byte from the table stops the instruction. Requires one OP per source word and one fetch for each source word byte. A length field determines the number of bytes processed but the TEST can terminate sooner.

NC AND—DC OR—XC EXCLUSIVE OR— CLS COMPARE LOGICAL.—The indicated operation is compared on each pair of bytes from the two words. Requires one OP for each sink word used and two fetches per OP.

MVZ MOVE ZONE—MNV MOVE NUMERIC—MVC MOVE—MVO MOVE WITH OFFSET.—The second operand bytes or the numeric (right 4 bits) or the zone (left 4 bits) part are moved into the first operand location bytes or the bytes are moved into the first location with a left shift of 4 bit positions.

PK PACK—UNPK UNPACK.—These are decimal operations in which an eight word byte is spread out to two bytes including zone bits or two bytes are packed into one by eliminating the zone bits.

ED EDIT—DMK EDIT AND MARK.—These instructions substitute into a pattern operand, certain types of bytes of the second operand. The byte address of the first occurrence of one type of byte in the second operand is MARKED into the I Box 134.

These multi-OP instructions have several common characteristics. For one, all instructions have variable length data fields. For another, the responsibility for executing the instructions is divided between the I Box 134 and the FXPU 143 with I Box 134 responsible for fetching and storing of operands, and for staging in OP Stage 167, and issuing the necessary OP's and the FXPU 143 instruction units (FXOS 201) and execution units (VFLEU) jointly responsible for the interpreting of the OP's and the processing of the operands. For a third characteristic, the multi-OP instructions are the only ones (except for CONVERT TO BINARY) which cause operands to be fetched into the FLB's 185 (FIG. 5) for use in the FXPU 143. These multi-OP fetches provide greater buffer capacity than by using the FXB's 204–210 directly, and enable use of the FXB's as working registers in the execution of the instruction. These multi-op instructions require availability of an FLB 185 for the fetch sink, but render four of the six FXB's 204–207 unavailable until the instruction is completed.

Generally, the I Box has completed its part of a multi-OP instruction when it has issued the last OP for the instruction except for TRT and EDMK which may require generation of a byte address as a result of data conditions. For the two exceptions, the instruction can be considered completely issued only when possibility of byte address storing has been passed. The I Box 134 can move to decoding of a succeeding instruction as soon as it has completed a multi-OP instruction. If this next instruction is in the FXPU 143 it can probably be issued with assignment of one of the extra FXB's 209, 210 unless it is in the SI format for which the operands can be handled only from the FXB's tied up by the multi-OP instruction. Another possible holdup in resumption of instruction issuing after a multi-OP instruction occurs if the next instruction makes use of the L Register 1102, FIG. 10, i.e., another multi-OP or an SVC instruction. In this case, it is possible that the FXPU 143 has not yet finished with the length information from the L register 1102, and therefore any instruction which will change the contents of L Register 1102 must be delayed until the assimilation of the length information is complete.

The I Box 134 issues fetch requests for operands, a double word at a time, as rapidly as possible based on the availability of Floating Point Buffers (FLB's) 185 and its knowledge of the needs of the FXPU 143. Similarly, it sets up store instructions for double word operands based on the availability of the Storage Address Registers (SAR's) 241. The extent to which this storing and fetching can proceed and the I Box knowledge of the needs of the processing in FXPU 143 is also limited by the availability of buffer positions in FXOS 201, since the names of the FLB's and SAR's must be passed to FXPU 143 by means of OP's issued to FXOS 201. The I Box 134 has a capability of issuing both a fetch and a store instruction simultaneously for those sink operands which must be both fetched and stored. Generally, there are no particular problems associated with the fetch and store requests since MSCE 136 can handle the operands in their logical order but special recognition and handling is necessary for those instructions whose operand streams overlap in storage, or for those instructions which may be prematurely terminated upon detection of a condition.

The instruction issuing part of the I Box 134 involves the staging and issuing of OP's to the FLPU 143. Staging refers to the process of setting into OP Stage 167, the assorted pieces of information which must be conveyed to the execution areas. As the staging is completed, the OP Stage is set valid for FLPU 142 or FXPU 143 and the instruction is issued. For most OP's the staging is completed in one cycle and can be issued at the beginning of an address generating cycle whereas a multi-OP instruction may require several cycles for staging each OP which will be issued at the end of an address generating cycle.

The following sequence tables show the sequences of instructions, fetch and store requests, and the issued OP's containing the FLB 185 and SAR 241 assigned for each storage request. In the tables F and S represent fetch and store requests, SC is the source double word, SK is the sink double word. A time axis can be considered as running down the table, i.e., two storage requests on the same line will be issued on the same cycle, but consecutive lines do not necessarily represent consecutive cycles and the OP number is the OP which contains the identification of the FLB 185 or SAR 241 associated with the storage operations on that line.

Table 1 is specifically for an AND instruction and is representative of the I Box action for a group of operations including NC, OC, XC, MVZ, MVN and, with elimination of all store operations, of CLC. Each of these operations processes a byte from the sink and source words and (except CLC) puts the result back into the sink word which is later put in storage. The VFL portion of the FXPU 143 will control the entry of the source and sink words into its registers and the sending of completed sink words to the SDB's 244.

SEQUENCE TABLE 1

Instruction: NC
Length=12 bytes
Source Starting Byte Address=000
Sink Starting Byte Address=101

| Storage Operations | Comments | OP# |
|---|---|---|
| F SC 1 | | OP1 |
| F SK 1 S SK 1 | | OP1 |
| F SC 2 | | OP2 |
| F SK 2 S SK 2 | | OP2 |
| F SK 3 S SK 2 | SC stream involves only 2 double words | OP3 |

In this sequence, source processing starts at the left-most byte and sink processing at the sixth byte so the sink word will be used after three bytes and will be sent to the SDB specified in OP1, after which the next sink operand will be transferred from the FLB 185 specified in OP2. The original source operand will still be used but will be used up before the sink operand is exhausted and will be transferred in from the FLB 185 identified in OP2 for the source operand. This alteration will continue until the total number of bytes have been processed.

Sequence Table 2 is for a TRANSLATE (TR) or TRANSLATE AND TEST (TRT) instruction represented by a TR instruction. For TR and TRT, table word fetches will be about eight times as frequent as operand word fetches. This one operand ahead is maintained by fetching two operand words at the start and then fetching a new operand word each time the FXPU 143 signals that the one ahead operand word has been taken from the FLB 185.

Table word addresses are generated by the I Box Adder 168 adding the argument byte from FXPU 143 sent over the Byte Buffer 1103, FIG. 10B, together with the base and displacement factors of the table origin from the instruction. For TR this means that the I Box 134 responsibility is not completed until the fetch for the last table word has been sent to MSCE (FXPU 143 will identify this last byte). For TRT the I Box 134 responsibility is greater for it must be prepared to generate the address of a byte found by FXPU 143 to be non-zero. The byte count will be sent to the I Box 134 to generate the byte address and store it in GPR #1. With this possibility, the I Box 134 is not free to proceed until the last table byte has been examined. The set SAR-Valid entry in the comments relates to possible overlap operations wherein the store may not be made without forwarding its data to FXPU 143, or the store may be into the table area as will be more fully brought out later. The TRT instruction does not store the generated results and would not require the store operations in Table 2.

sink byte address. Ordinarily this is sent with the sink operand to the FXPU 143, but for the MVC instruction, no sink operand is fetched so it is necessary to send the sink byte address with the first OP. The Table 3 is otherwise about the same as Table 1 with alternate fetch source and store sink instructions sent to MSCE 136.

SEQUENCE TABLE 3

Instruction: MVC
Length=12 bytes
Source Starting Byte Address=101
Sink Starting Byte Address=010

| Storage Operations | Comments | OP |
|---|---|---|
| F SC 1 | | OP1 |
| S SK 1 | 1st OP contains starting SK byte address | OP1 |
| F SC 2 | | OP2 |
| S SK 2 | | OP2 |
| F SC 3 | | OP3 |
| | SK stream involves only 2 double words | |

There is no dependency between the I Box decoding and the operation of the FXPU 143 during this instruction, and as soon as the last OP is issued, the I Box 134 is free to proceed with the decoding of the next instruction.

SEQUENCE TABLE 2

Instruction: TR
Length=12 bytes
Argument Starting Bytes Address=101

| Storage Operations | Comments | OP |
|---|---|---|
| F OPR WD 1 S OPR WD 1 | | OP1 |
| F OPR WD 2 S OPR WD 2 | Set SAR for OPR WD 1 VALID | OP2,3,4 |
| F TBL WD 1 | TBL WD 1 address per OPR WD 1, BYTE 5 | OP2 |
| F TBLE WD 2 | TBL WD 2 address per OPR WD 1, BYTE 6 | OP3 |
| F TBL WD 3 | TBL WD 3 address per OPR WD 1, BYTE 7 | OP4 |
| F OPR WD 3 S OPR WD 3 | Set SAR for OPR WD 2 VALID | OPs5-12 |
| F TBL WD 4 | TBL WD 4 address per OPR WD 2, BYTE 0 | OP5 |
| F TBL WD 5 | TBL WD 5 address per OPR WD 2, BYTE 1 | OP6 |
| F TBL WD 6 | TBL WD 6 address per OPR WD 2, BYTE 2 | OP7 |
| F TBL WD 7 | TBL WD 7 address per OPR WD 2, BYTE 3 | OP8 |
| F TBL WD 8 | TBL WD 8 address per OPR WD 2, BYTE 4 | OP9 |
| F TBL WD 9 | TBL WD 9 address per OPR WD 2, BYTE 5 | OP10 |
| F TBL WD 10 | TBL WD 10 address per OPR WD 2 | OP11 |
| F TBL WD 10 | TBL WD 10 address per OPR WD 2, BYTE 6 | OP11 |
| F TBL WD 11 | TBL WD 11 address per OPR WD 2, BYTE 7 | OP12 |
| F TBL WD 12 | TBL WD 12 address per OPR WD 3, BYTE 0 | OP13 |

In the table, it will be noted that the first two instructions are combined fetch and store instructions with the store having to wait until the FXPU 143 sends the sink word to the SDB 244. The table words are fetched as soon as the FXPU can start sending the bytes of the first operand word. As soon as the FXPU 143 has used all of the bytes of the first operand, it moves the second operand word from the FLB 185 and this transfer will be signalled to I Box 134 which will thereupon issue the next fetch. Such I Box fetch issuing will be continued until it has issued all of the fetches needed to exhaust the length field entry in L Register 1102.

Sequence Table 3 is for the MOVE instruction (MVC) which transfers data from one storage location to another. Unless the addresses overlap so that a fetch may have been made from a storage location into which a storage is pending, whereby the wrong data is fetched, there are no particular problems. For this possible overlap, the I Box notifies the FXPU 143 in the first OP. The only other feature of interest is the method of handling the Sequence Table 4 represents the EDIT (ED) and EDIT AND MARK (EDMK) instruction sequencing. The instructions use a pattern word into which some bytes will be substituted from a source word or into which some filler bytes will be inserted depending upon the source bytes. The instructions are the same except that EDMK may need a byte address generated and stored in GPR #1. The sink field length for the pattern is known but the source field may be from one-half of the pattern length to more than the pattern length. Also the relative length of the operands as well as the processing rate are data dependent. To accommodate this situation, the I Box functions are tied to the data rate of the FXPU 104. After the first two source and sink (pattern) words are requested by fetches, a new word will be fetched only when the FXPU 143 has finished with a corresponding word. It has been made a rule herein that the FXPU 143 will step to a new OP in FXOS 201 each time it finishes with a pattern word and that I Box 134 will issue a new OP each time it fetches a new pattern word.

SEQUENCE TABLE #4

Instruction ED
Length=21 bytes
Source Starting Byte Address=000
Pattern Starting Byte Address=110

| Storage operations | Comments | OP |
|---|---|---|
| F SC1 | | 1 |
| F P1, S P1 | This op is issued unconditionally | |
| F SC2 | | 2 |
| F P2, S P2 | This op is issued unconditionally | 2 |

| Storage operations | Comments | OP |
|---|---|---|
| F P3, S P3 | P3 is fetched and a store is set up when the VFLEU requests P2 per OP2; OP3 is issued with information on a new pattern only. | 3 |
| F SC3 | SC3 is fetched when the VFLEU requests SC2 per OP3; note that this fetch is not sufficient for issuing this op (i.e., OP4). | 4 |
| F P4, S P4 | P4 is fetched and a store is set up when the VFLEU requests P3 per OP3: OP4 is issued with information on new pattern and new source. From the instruction, it can be seen that this is the last P fetch. | 4 |
| (SC3) | No new SC wd is fetched because SC3 has not been needed by the VFLEU. This op is issued when P4 is requested, in case SC3 is needed to complete P4. Since it turns out that SC3 is not needed to complete P4, this op will have to be cancelled. No new P is fetched, since P4 was last. | 5 |

In the table it will be noted that as the sink (pattern) starts byte processing at the sixth byte of its word, and the source operand starts at the zero byte of its word, the sink word will be used up first. This causes the second OP to be decoded to bring in the next pattern word and the first byte at the left of this next pattern word will be processed and a new OP is requested. This request will cause the next pattern word to be requested and the FLB will be assigned for the next sink word for which a fetch request is issued, but the old FLB number will be repeated for the second source word. Note, however, that no fetch request is sent for the source word until the second source word is transferred into the FXPU 143. The identification of the FLB 185 receiving the new (third) source word is saved to put into the fourth OP next to be issued. It is to be noted that the third source word is available if it is needed, but since sink and source words are used at different rates, the third source word was not required before the end of the pattern field was reached. Each OP issued will contain the designation of the FLB 185 which is holding the last fetched source word so that the FLB designation may carry over a number of OP's. The I Box 134 must remain available until the end of the EDMK instruction to generate the byte address of the first non-zero source byte.

For the MOVE WITH OFFSET (MVO) instruction only the first sink word needs to be fetched. This is because in this instruction, the four righthand bits of the first sink word remain the same and the others are all replaced by the source data. The first fetch is therefore for the first source word and the next fetch is for the first sink word accompanied by a store sink instruction. The FLB's 185 designated for these operands are identified in the first OP. The next source word is requested and then a store for the second sink word is issued. The FLB's for these operands are identified in these instructions. The source fetching and sink storing are terminated when the I Box 143 has issued enough requests to take care of the operations required by the length fields.

For PACK (PK) data is being taken from two source bytes and compressed into one byte. This requires fetching a new source word twice for each sink word stored, but as there is no sink fetching, the byte address to be used to start the packing at the correct byte position is sent to the FXOS 201 with the first OP. One OP will be issued for each source word used with two source words being fetched at the start of I Box OP issuance. Each OP contains the designation of the SAR to receive the sink word and succeeding OP's continue the same SAR designation until the sink word is stored.

The UNPACK (UNPK) instruction is the reverse of the PACK in that two sink words will be stored for each source word fetched. An extra source word will be fetched at the start and a sink store request set up in a SAR 241. Each OP thereafter will contain the FLB designation of the next source word until the word is transferred to a FXB for use, at which time the next fetch will be set up by I Box 134. Each OP will include the designation of the FLB containing the next source word and the address of the SAR designated to receive the next sink word. Normally in PACK and UNPACK instructions, the sink word is not fetched at any time, but it can happen that a sink word is to be stored at the location from which the advanced source word was fetched. Since logically the store should have been made before the fetch, it is necessary for I Box 134 to recognize this overlap situation and to correct for it by holding up the source fetch until the sink word has been stored.

The LOAD MULTIPLE (LM) or STORE MULTIPLE (STM) instructions load or store double words into or from an even-odd pair of GPR's 202 from or into adjacent double words of storage. The double word store or fetch requests are issued from I Box 134 with each OP loading or storing the two GPR's. The only point of I Box 134 control is that on the first OP, a fetch or store of only the right-hand word may be necessary, and on the last OP only the left-hand word may be of interest. These are taken care of by use of bits signifying first OP, last OP, and partial operand for the instruction. The I Box 134 is not tied up after the last OP is issued to load or store the last identified GPR 202.

OVERLAPPING OPERANDS

All Storage-Storage (SS) format instructions involve two operand fields and these fields can overlap in storage in any way. In a high speed processor with prefetching, this can lead to some conflicts in those instructions which modify one of the operand fields in storage. Clearly, if a source operand is logically fetched from a storage location before there is a storage operation into that location, there is no problem for the source bytes are used before the data at their storage address is to be modified. Similarly, if the source word address is greater than a full double word less than the sink word address, there will be a store of the sink word at a storage address before the data at the address can be logically fetched for the source, recognition of such a store-fetch possibility being a function of MSCE 136. If, however, the sink address is less than eight bytes more than the source address, an overlap is possible which cannot be corrected by MSCE 136. For this situation, the I Box must test the sink and source starting addresses to determine if their difference is less than eight byte addresses. If such a difference is found, an overlap bit is set in the first OP to be issued. The MSCE 136 is notified that for this instruction it is to suppress its multi-accessing linking whereby a single storage access can be used for a fetch-fetch or fetch-store or store-fetch combination of requests. All storage accesses for this condition must be in strict logical order. The test for possible overlap takes place after the two operand fetches and the sink store instruction have been issued, so that their storage addresses are available but before the OP containing the designations of the FLB's for these fetches has been issued. When the FXPU 143 has been notified of a possible overlap situation, it is up to the FXPU 143 to maintain its operands in proper condition.

This notification of possible overlap is sufficient for the I Box part of the instructions NC, OC, XC, MVC, MVZ and MVN. For MVO the instruction is processed from right to left rather than left to right as in the above instructions. For this instruction, the sink address is subtracted from the source address to determine if the difference is positive and less than eight which is the same test as above but in the opposite direction.

In the TRANSLATE instruction, the table bytes are taken at random over the table area, and hence it cannot be told from the instruction parameters whether there is any actual overlap, and thus the FXPU 143 cannot be informed of possible overlap in the first issued OP. The only apparent way is to detect when a fetch request (for a table word) is from the same double word address as the word being processed. When notified of this comparison, the FXPU 143 can make the proper corrections. For this comparison, the I Box 134 makes use of the address comparators already in the MSCE 136. The I Box 134 can control the valid bits of the SAR's 241, and for this instruction enables only the valid bit for the SAR pertaining to the sink word being processed. Now, when the MSCE 136 receives a fetch for the same address as is in the SAR 241, it notifies the I Box 134 of such comparison but does not link the two requests together in its normal fashion, and merely sends a dummy fetch to the FLB, i.e., sets it full but does not set up a storage access, and tags the FLB 185 to note the matching address. When the FXPU enables transfer of the fetched data to its FXB from the FLB, the empty FLB with the matching address tag notifies it that the desired byte is in its own sink register and to process it from there. In the PACK and UNPACK instructions, the operands are used up at different rates so that it is possible to have a dynamic overlap during the execution of the instruction. In addition, therefore, to the notification of possible overlap as above set out, a test is made in UNPACK to see if the sink starting address is less than eight bytes smaller than the source starting address, or in PACK to see if the source starting address is smaller than but within 16 byte addresses of the sink starting address. In both of these cases the source and sink may overlap and the FXPU 143 and I box 134 go into a "hand holding" mode in which the I Box 134 will issue a fetch and an OP only when the FXPU completes processing of either a source or a sink word. This is slow but insures that the store instruction to the MSCE will be executed before the overlapping fetch is executed, thus maintaining proper sequencing.

The TRANSLATE AND TEST and the COMPARE instructions do not modify storage and cannot therefore have any overlap problem. The EDIT and EDIT AND MARK instructions can have overlapping fields but are considered safe and not subject to modification because of overlap since the definition of the instruction for this embodiment is that the result of overlapping fields is indeterminate and not to be relied upon. In the instructions TRANSLATE AND TEST and COMPARE it is possible for the execution of the instruction to be terminated prior to the end of processing of the operand fields. In such early termination, it is necessary for the unused OP's in FXOS 201 to be cancelled and those FLB's 185 tagged busy with the operands for these OP's are to be freed for further use. The OP's are cancelled and the FLB's 185 freed substantially as in cancellation of conditionally issued OP's, i.e., the FXOS 201 steps through them setting the Full tags off and setting empty the identified FLB's and/or SAR's.

INTERRUPTS

Many situations can arise during the execution of a problem program by a data processing machine which requires that the program be departed from for at least a time and that some other routine be performed, either a program having a higher priority or a program to correct an error detected during the processing of the program. As defined in the present embodiment, such interruptions will initially store in a fixed storage location, all data necessary to re-enter the old program at the point of interrupt if this is possible. Each type of interrupt has its own interrupt priority, and any interrupt operation can be interrupted by one of higher priority. When the higher priority interrupt has been executed, it returns control to the interrupted one which finishes its operation if possible and returns control to the original program. Generally, an interrupt operation cannot be broken into by another interrupt of the same or lower priority for this could lead to an endless loop of interrupts where a static machine condition is present.

It will generally be possible for the I Box 134 to store in the PSW Buffer 1006, FIG. 10A, an interruption code representing the interrupting reason and the address of the next instruction to be decoded (IR INCREMENT 153+LB Reg. 150) but for some interrupts the offending instruction has been passed on to the FXOS 201 or FXOS 184, and the instruction address is no longer available. Such interrupts for which the interrupt causing instruction cannot be directly identified are termed imprecise interrupts. Program exceptions which fall into this imprecise class are:

(A) Fixed Data Overflow, Incorrect Data Format and Fixed Divide error signalled from the FXPU 143.

(B) Exponent Overflow, Exponent Underflow, Significance and Floating Divide error signalled from FLPU 142.

(C) Protect Violation signalled from MSCE when a protected area of storage is addressed.

(D) Address specifications which arise by violation of the word boundary conditions for data fetching and storing and signalled after completion of the address generation.

(E) Invalid address in which an attempt is made to fetch or store outside of the available storage addresses, signalled after address generation.

These imprecise exceptions are identified by storing a 00 in the ILC section (bits 32–33) of the PSW Buffer 1006. The pipeline of instructions already issued is drained by execution of these instructions prior to honoring the interrupt and any further imprecise interrupts due to execution of these instructions will be ignored and lost to the programmer. However, the instruction stored in the old PSW will point to the next instruction to be issued, making it possible to return to the program without logically missing any instructions, although the results may be adversely affected by the detected exception. It is also possible, since operations can be executed out of sequence, for the first interrupt condition recognized to be logically after a second condition which is lost.

Imprecise interrupts which arise from conditionally issued instructions are merely noted and will be either activated or cancelled when the conditional instructions are activated or cancelled. Where basic machine status changes are involved, all instructions issued prior to the status change will be executed before the change. For example, an instruction issued under a program mask is completed prior to a program mask change, thus insuring that any interrupts will be able to store the mask which enabled the interrupt. Logical consistency is maintained when an invalid, privileged operation, execute, supervisor call, precise address or precise specification interrupt precedes an imprecise one. Should the imprecise one occur during the drain of the pipeline, required prior to honoring the precise interruption, the original interruption will be cancelled. Since the address stored is that of the next instruction, the effect when the program is resumed of the cancellation of the interrupt is to treat the instruction leading to the precise interruption as never having occurred.

In the hardware implementation for handling the interrupt routines, the efficient handling of the singular interrupt case is particularly important since single interrupts are by far the more frequent. When the I Box 134 is signalled to execute an interrupt, it first halts the OP Decoder 166 to prevent any new instructions from being initiated or issued, and then waits for the completion of the current instruction. A new PSW corresponding to the type of interrupt is fetched and the instruction address in the new PSW is used to initialize the instruction fetching mechanism in the same manner as for a branch with the rest of the PSW being retained in a Temporary Buffer 157. After the instruction pipeline has emptied, the old PSW is stored at an address corresponding to the type of interrupt, and with a code indicating the type of interrupt. The remainder of the new PSW is then transferred into the PSW Buffer 1006 and the OP Decoder 166 re-activated to continue I Box operations on the new interrupt program. This new interrupt program will be designed for the type of interrupt encountered and may restore control to the original program after the interrupting condition is taken care of. If a higher priority interrupt condition arises due to a logically earlier exception, the first interrupt is sequenced to the pipeline empty state and then the PSW for the new interrupt is fetched.

Interrupt conditions may be considered as divided into the precise and imprecise exceptions with the imprecise ones having the higher priority since they are due to conditions logically prior to those causing the precise interrupts. Such priority prevents programming inconsistencies such as storing with a PSW on an interrupt, a program mask indicating that the system should not have been interrupted. This requires that the imprecise interrupts must be recognized independently of the others, but there is also priority within the group of imprecise interrupts such that a first recognized signal inhibits all subsequent interrupt signals until it is honored. Should more than one interrupt signal occur simultaneously, an internal priority will cancel all but one and the cancelled ones are lost. The priority among the imprecise interrupts is:

(1) Data, FXPU Overflow, FXPU Division.
(2) FLPU Exponent Overflow.
(3) FLPU Exponent Underflow.
(4) Significance.
(5) FLPU Division.
(6) Protect Violation.
(7) Specification.
(8) Invalid Address.

The Specification and Address interruptions may be signalled as a result of conditional fetching operands. These are recognized as conditional, i.e. they do not suppress recognition of later arising signals which are associated with unconditional instructions, but they do stop I Unit decoding. When the conditional mode is removed, they are cancelled or emit a simulated signal which is recognized as an interrupt signal.

The precise interrupts are those which are signalled while the instruction address in I Register 148 still refers to the interrupting instruction. Among these the operation, privilege, EXECUTE and SUPERVISOR CALL exceptions are recognized as the instruction is decoded, while the specification and invalid address may occur during the time the instruction is within the I Box 134. These interrupts are inhibited by any other interrupt trigger being on and the instruction giving rise to this interrupt will be treated as if it had not been decoded. Its instruction address will be stored with the old PSW and it will be the first instruction decoded when a return is made to the program.

External signals calling for an interrupt are of a fixed duration and will be remembered if they are received during execution of a program for a prior interruption. The external signal is stored in a captivity trigger which maintains a signal replacing the external signal and will be recognized after all internal interruptions are processed. The I/O interruption signals are direct coupled until they are honored in the I Box 134. They are lowest on the priority tree and will wait until all other causes of interrupts have been taken care of.

The sequence chart for the interrupts is shown in FIGS. 28 and 29. There are two basic entry points into the sequencing for interruptions;

(1) Normal, which is the usual situation for a singular exception and (2) Priority Usurpation, entry A, which occurs when a first interruption is being sequenced and the associated drain of the execution unit instructions leads to an imprecise interruption.

In the normal situation which is applicable to all interruptions, the recognition of the interruption signal immediately halts decoding of any further instructions by OP Decoder 166. Nothing more happens as a result of the interrupt signal until the I Box 134 is in an interruptable state. This requires that any instruction which requires I Box 134 sequencing and has been initiated will be either completed or will be processed to a point wherein it signals a precise interrupt at which time it will be cancelled. This instruction which now signals an interrupt is logically later than the one whose interrupt signal is being processed and programming-wise should not yet have been reached for processing.

After the execution pipeline is drained, the I Box 134 and E Units 142 and 143 must not be set in a conditional state, an interlock made necessary by a hardware sharing facility, and the Adder 168 must be available. Once these conditions are met, the I Box 134 is interruptable and sequencing of the interrupt signal can be initiated. If the interrupt is not an imprecise type, Block 1187, an interlock, Block 1188, is set to prevent a further interrupt by an interrupt signal of lower priority. At the same time, Block 1189, all lower priority interrupts are cancelled, the address of the new PSW corresponding to the interrupt is sent in a fetch request to MSCE 136, and the addresses in LB Register 150 and I Register 148 are sent to Adder 168, FIG. 10B, on Busses 1009 and 1015 to generate the instruction address of the instruction causing the interrupt. If the program interruption is of the imprecise type and the I Box 134 is not already processing a precise type of interrupt, the sequence also passes to Block 1189.

After the address generation, Block 1189, or if an imprecise interrupt is signalled during the sequency of a precise interruption, entry point A, the present instruction address from Adder 168 is transferred to W Register 177, and the fetch of the new PSW whose address is on Bus 1034 is initiated. When the fetch of this new PSW is complete, its instruction address is put into the instruction fetching part of the I Box 134, as in initializing, and instruction decoding for the interrupt can be started. If the interrupt is an external or I/O interrupt, nothing was in error and the program can be resumed after the interrupt has been processed at the instruction which was being decoded when the interrupt was signalled and it is this address which is now stored in both W Register 177 and Temp. Register 176. If, however, it is a precise program type of interrupt which is being processed, the program should resume at the next instruction after the one causing the interrupt. The type of interrupt being processed is therefore looked at, Block 1191, and if it is a precise type of program interrupt, the next instruction address is generated by gating the LB Register 150 and IR Increment 153 over Busses 1009 and 1015 to Adder 168 and this address will be transferred into W Register 177 with the I Box 134 going into a waiting state. If the interrupt is not a program type of precise interrupt, the next instruction address is not formed and the I Box goes directly into the wait state, entry B, FIG. 29.

After the MSCE 136 has accepted the fetch request for the new PSW, the wait state is terminated and the address at which the old PSW is to be stored is set on the SAB 240 of MSCE 136 from Bus 1034. Now the I Box 134 waits until the instruction pipeline is completely empty and it then gates out the old PSW from PSW Buffer 1006 over Bus 1192 to the first SDB 244 in MSCE 136 and including the saved instruction address from W Register 177, which is sent to the SDB 244 over Bus 1193 from the W Register.

At this time the possibility of a priority usurpation is checked by seeing if a precise type of interruption is being processed and, if so, whether an imprecise interruption is now pending. If this new interruption is found, Block 1195, and after the new PSW has been fetched, all lower priority interrupt signals are removed, the saved instruction address in Temp Register 176 is returned to the input of Adder 168, and the address for the new PSW corresponding to the new interruption is set on the Bus 1034 for transmission to the SAB 240 in MSCE 136. The sequencing is then resumed at entry point A, FIG. 28, since the preliminary steps need not be repeated.

If the program is not to be usurped, the interrupt being sequenced may be completed. The old PSW will be gated into the SDB 244 to enable its storage in the proper storage address set in the SAR 241, and the store operation will be activated. If the interrupt is not an I/O sequence, the I Box waits until the PSW fetch is completed by transfer from Temp Register 157 into PSW Buffer 1006, and the fetching mechanism is set to the new instruction address. The interruption is now complete and the OP Decoder 166 is freed to continue with instruction decoding. This new instruction decoding will normally be along a special program sub-routine to compensate or correct or accommodate the cause of the interrupt, and may be any needed instructions. This subroutine will normally transfer control back to the PSW which was in control when the interrupt was signalled. If the cause of the interrupt was due to the I/O equipment, a signal will be sent at this time to the I/O Channel that its interrupt signal is being processed. As soon as the channel response to the interruption is complete, the control also waits for completion of the PSW fetch and termination of the interrupt sequencing.

It should be noted that certain of these interruptions, i.e., the FXPU Overflow, the Decimal Overflow in CVB instructions, the exponent underflow and significance checks, can be inhibited by lack of a set bit in bit positions 36 to 39 of the PSW Buffer 1006. Such interrupts will be ignored until the program mask is changed by a new PSW or a SET PROGRAM MASK (SPM) instruction. There is another interrupt mask in the PSW and this is bit 13 which is set if a machine check, i.e., a detection of a processing error, is to be allowed to interrupt system processing. When a machine check interrupt is recognized, the CPU 100, except for MSCE 136, is stopped at the earliest feasible clock point. A log out of the CPU data configuration is initiated and when complete is followed by a reset of CPU 100. Further sequencing is the same as for an imprecise interruption except that there is no need to wait for I Box interruptibility or pipeline drain as the CPU reset has removed all interlocks and set the execution units to an empty state.

It is to be recognized that the PSW for each interrupt contains the program mask bits to allow a higher priority interrupt but to inhibit one of equal or lower priority. This will prevent establishment of a loop of interrupts, none of which is completed before it is interrupted by another.

A block diagram showing the interconnections between the interrupt controls is presented in FIG. 30. At the top, the eight line bus 1196 from L Register 1102, FIG. 10F, carries the interrupt code stored in the L Register 1102 from a SUPERVISOR CALL instruction. The group of external signals on BUS 1197 are as above noted, direct wire signals and are shaped into pulses in Unit 1199, and set into the External Captivity Triggers 1201, by a timing signal on line 1202. The signals from these External Captivity Triggers are screened through an External Mask 1203 to set the External Identify Triggers 1205 for those signals which will be recognized, and these will be returned over a Bus 1206 to reset the recognized ones of the External Captivity Triggers 1201.

The I/O Channel interrupt signals are received over a Bus 1207 and those which pass through the system mask, bits 0–7 of PSW Buffer 1006, can set the I/O Interrupt Triggers 1209. The next Bus 1210 carries the signals for the precise type of program interrupts and sets corresponding triggers in the Precise Program Interrupt Group of Triggers 1211. Bus 1213 carries the imprecise program interrupt signals some of which are maskable and all of which have a corresponding Trigger 1214.

The outputs of all of these triggers 1201, 1205, 1209, 1211, and 1214, are fed to the Control Circuits 1215 which function for recognition of interrupt signals, priority recognition, generation of the interrupt codes needed for insertion in PSW Buffer 1006, and generation of the new PSW address for fetches and the old PSW address for stores. The interrupt code is gated out when required to SDB 244 in the MSCE 136 over bit position lines 21–31 forming a part of PSW Buffer Bus 1192, FIG. 10A. The address which is generated for the PSW fetches and stores is transmitted to the Storage Address Bus 240 over Bit Position Lines 25–28 of the address Bus 1034. Since PSW's are a full double word, the three low bits 29–31 are always zeros and the permanently assigned storage locations for PSW's are at the start of storage so there is no need for higher order bit position lines for these PSW address bits are also all zeros.

The Sequence Triggers and Combinational Logic Unit 1217 is the processing control for the interrupt circuits. It receives from Control Circuits 1215 an identification of the kind of interrupt being processed and on Lines 1216 from other I Box indicators the status signals indicating interruptibility of I Box 134, #1 Temporary Buffer Register 157 available, Pipeline empty, fetch return to Temporary Buffer 157, and a channel response to an I/O interrupt. At the times indicated on the sequence charts, FIGS. 28 and 29, the Sequence Triggers 1217 issue to the Triggers 1205, 1209, 1211, and 1214, a signal on a Line 1218 enabling reset of the lower priority triggers when a higher priority interrupt is signalled to Control Circuits 1215, and it also controls a signal on a line 1219 to completely reset all Interrupt Triggers 1201, 1205, 1209, 1211 and 1214, at the end of an interrupt. For the Imprecise Program Interrupt Triggers 1214, there is a special line 1221 which signals that interrupt signals previously set in conditional mode are to be switched to unconditional interrupt triggers as the condition has been resolved.

On the control side of Unit 1217, a signal on a Line 1222 will gate out to Bus 1034 the address of the new PSW for a fetch request, and a signal on Line 1223 will gate to Bus 1034 the address in which an old PSW is to be stored, both addresses being generated by the Control Unit 1215. There is also a Signal Line 1225 which gates to Bus 1192 the old PSW in Buffer 1006, and including the interrupt code on Bit Positions 21–31 from the Control Circuits 1215. Since the Instruction Length Code (ILC), bits 32 and 33 of PSW depend upon the type of interrupt, the two lines 1226 and 1227 signalling not a precise program interrupt and a precise program interrupt respectively, are gated out under contol of Line 1225 to gate the correct ILC bits to the Storage Data Buffer 244 when the old PSW is being stored. The other output Signal Lines 1229, 1230, 1231, and 1233 are, respectively, to control transfer of a new PSW from Temporary Buffer 157 into PSW Buffer 1006, to gate the Instruction address of a new PSW into the instruction fetch registers (LB, UB, I and AOC), to stop I Box 134 decoding for the interrupt and to signal the I/O channels that an interrupt is being taken.

It will be noted that the system of interrupt priorities enables an interrupt sub-routine brought into aciton as a result of one type of interrupt to be interrupted, program mask permitting, by another type of interrupt which may in turn have its fixup sub-routine interrupt. It is thus possible to have three or more interrupts pending at the same time and each at a different stage of its program. By proper sub-routine programming it is possible for each interruption when completed to transfer control back to the sub-routine which it interrupted so that each interrupt will be finally processed in order of priority with eventual return to the problem program at an instruction following the one which caused the interrupt.

BRANCH AND LOOP MODE CONTROLS

The I Box 134 as previously described with reference to its data flow in FIGS. 10 to 30, has a built-in control structure to control the various gating circuits thereof. In the above description of the flow charts, a number of references have been made to various machine states wherein specified control actions take place, or which in combination with the other conditions set further controls. These machine states are actually determined by a set of trigger circuits and, so far as it can be conveniently developed, functions common to a number of different instructions have been grouped under control of a single state trigger so that the triggers are common to all of the I Box instructions.

OUTPUT CONTROL SIGNALS

Many other functions, in addition to the machine states, are common to more than one instruction, and the branch and loop mode controls are therefore set up so that a single function control signal may be generated as a result of a plurality of conditions in different instructions. In the drawings FIGS. 33A to 47B, the following control signals are generated for transmittal to other areas of the machine for the purposes indicated. In FIG. 34, the COND T signal is transmitted to the execution units to inform them that any further instructions are to be tagged conditional. In FIG. 35, the CANCEL FXOS, CANCEL FLOS, CANCEL MSCE, ACTIVATE FXOS, ACTIVATE FLOS, and ACTIVATE MSCE, are sent to the FXOS 201, the FLOS 184 and the MSCE 136 to cancel or activate the conditionally issued instructions. It should be noted here that the line above the name of a signal indicates only that the voltage level of the normal signal is at a more positive level. An overlined signal is one which is at a higher (positive) voltage level when a non-controlling signal is being transmitted, and which drops to a lower voltage to indicate the presence of a significant signal in contrast to the unlined signals which shift from a lower voltage to a more positive signal level to indicate the presence of a controlling signal. In FIG. 36, the REQ GP T FXOS signal goes to the FXOS 201, FIG. 6, to request a priority slot for entry of data into a GPR. The R1 DBL SINK T signal indicates that an operand to or from the GPR 202 designated as the R1 register is a double word wide and that availability of the even-odd pair of GPR's must be checked before processing the instruction.

FIG. 38 generates a CANCEL GP REQ T FXOS signal which is sent to FXOS 201, FIG. 6, to cancel a request for priority in access to a GPR 202. The SVIR OG opens the outgate from the Save IR Register 1120 to the Common Bus 1008, and the SVIR INV signal indicates that the data in Save IR Register 1120 has been used or is otherwise invalid. For FIGS. 39A and 39B, the IR INCR TO SVIR, SVIR TO AOR AND SVIR TO IR signals control the gating of data from the IR Incrementer 153 to the Save IR Register 1120, or from Save IR Register to the AO Reg. 1002, or I Reg. over Bus 1008. The R3* OG signal works in conjunction with the B Bus OG Controls 1095 to gate the designated (R3*) GPR 202 to the Adder 168. The AOR QUICK INTLK prevents the gating out of the next instruction word from buffers 156 to the OP Register 159 when a quick branch is detected, and the BX RECOVER is generated when the I Box is to be cleared of the effects of an instruction loop erroneously started at a Branch on Index instruction when the loop was conditionally entered in loop mode and it is later found that the loop is not to be taken.

Figure 40B:
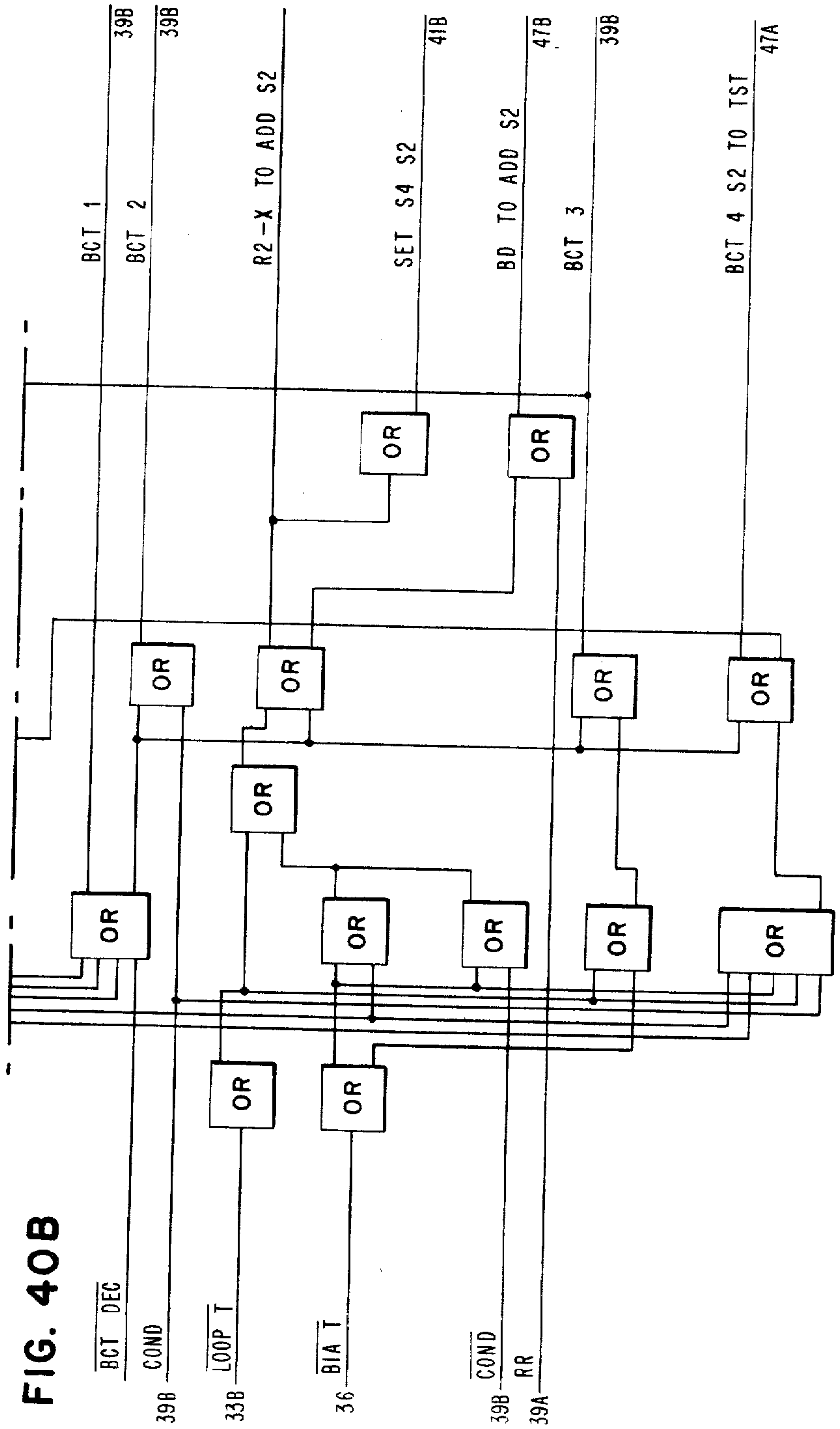

In FIGS. 40A and 40B the TON R1 OG IN B is sent to the OG Controls 1096 to set the gate 1030 for the selected GPR data to be gated in to Adder 168. The B signal designation indicates that it is the B Bus input to the Adder 168 which receives the data. The INGATE ILC signal goes to the PSW Buffer 1006 to open the gate from the Buffer 1006 to the Working Reg. 177 to enable the right half of the PSW to be stored in a GPR 202 on a BAL instruction. The WR TO ADD A OG signal outgates the Working Register 177 to Adder input Bus A over Bus 1036. The PPLN 2 F T2 B is used to indicate the Pipeline Stage 2 that a fetch is to be called for the #2 Temp. Buffer 157, and the R2–X TO ADD S2 is generated to set the OG Controls 1095 for the B Bus of Adder 168 for the GPR specified in the R2 (or X) field of the instruction, the field being the same bit positions but having different functions for the GPR 202 identified therein in different instructions.

Figure 41A:
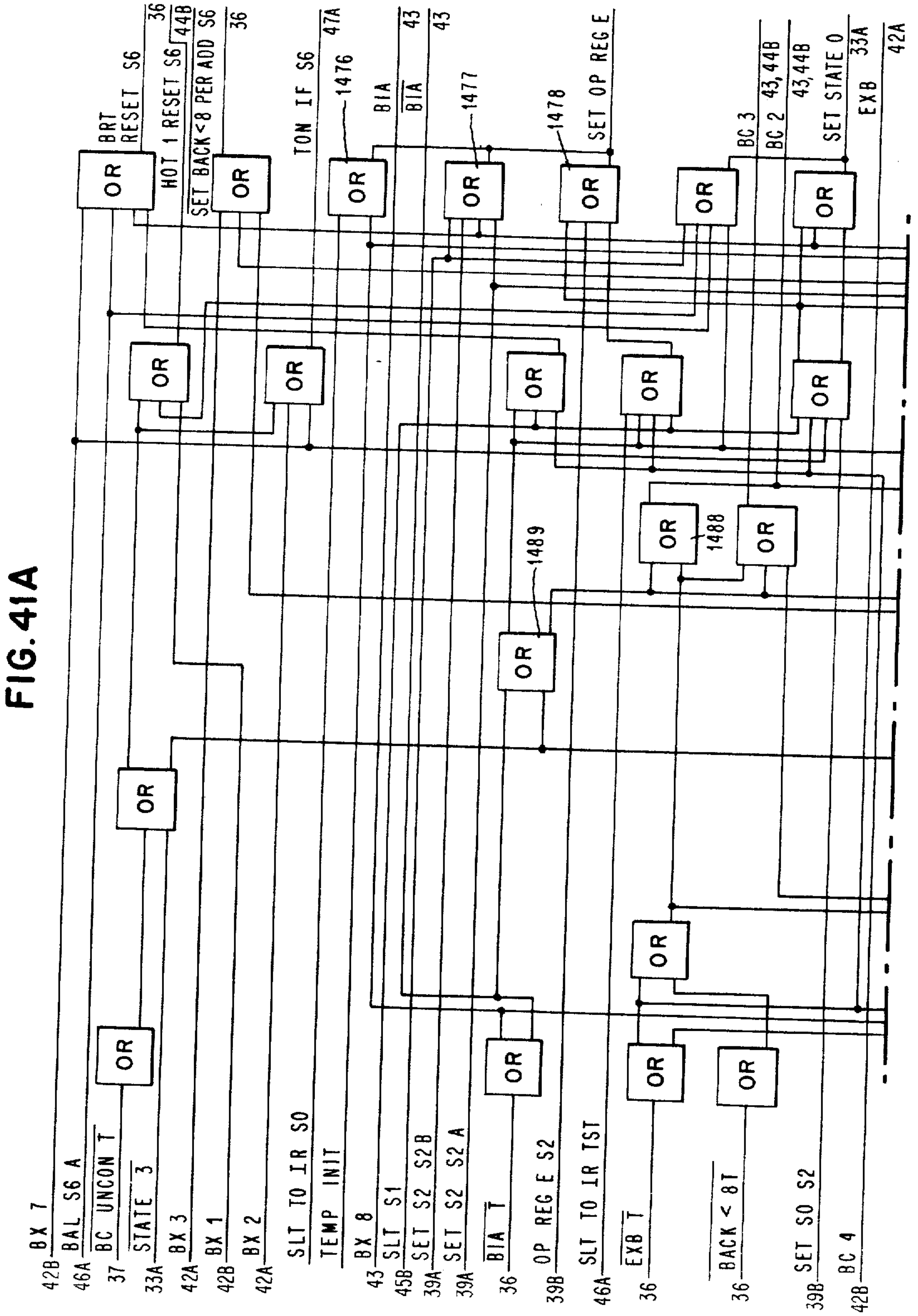
Figure 41B:
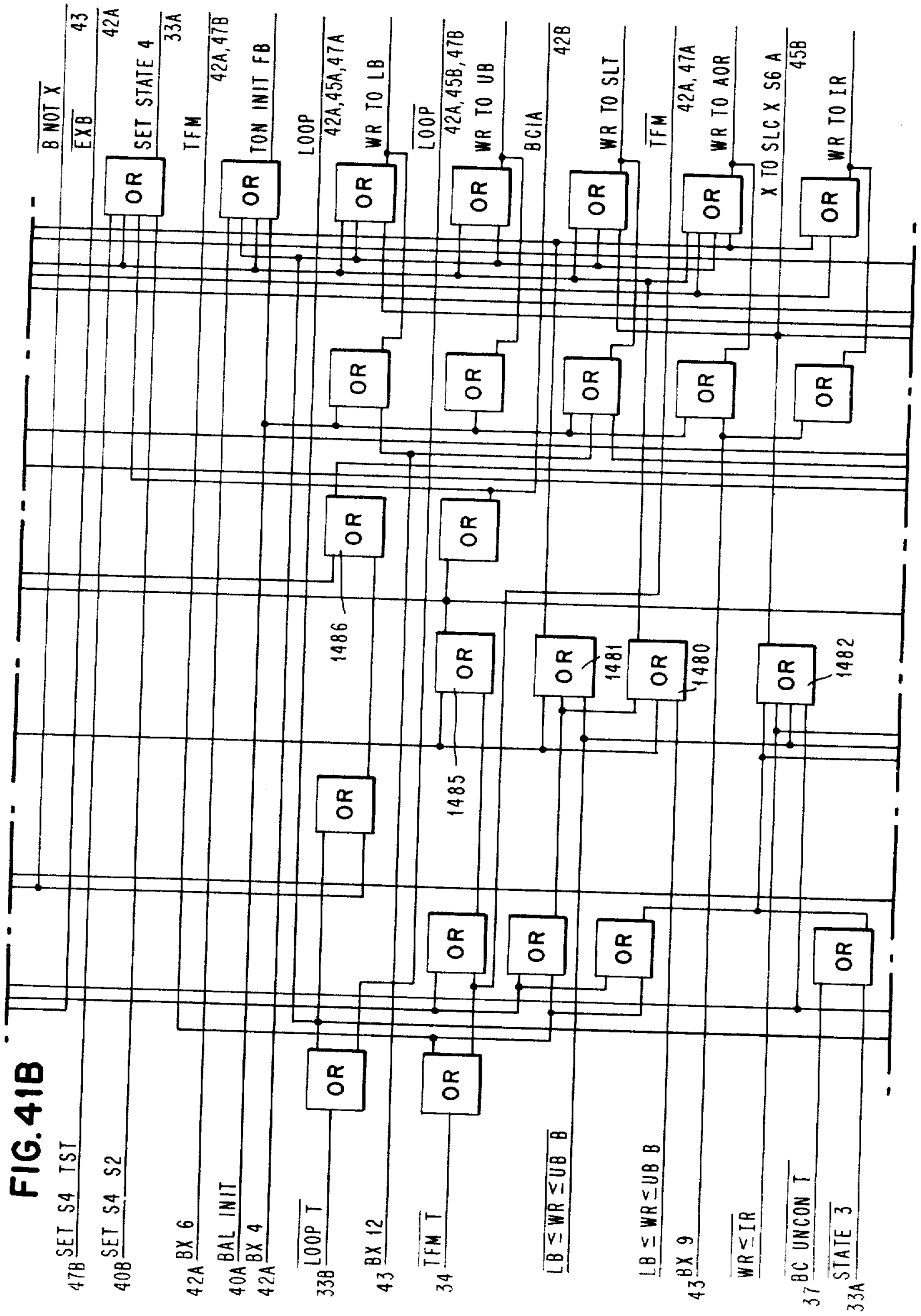
Figure 41C:
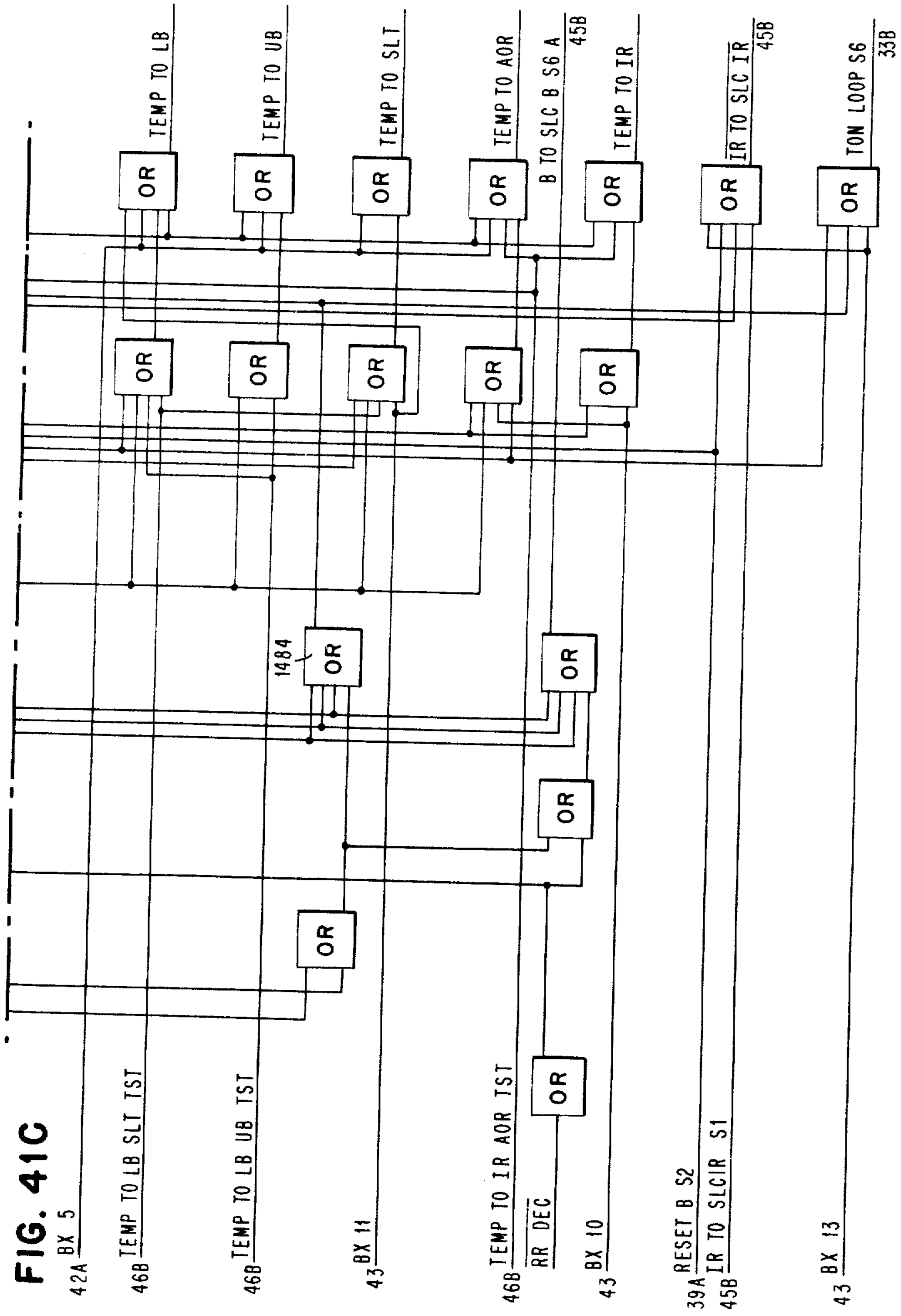
Figure 42A:
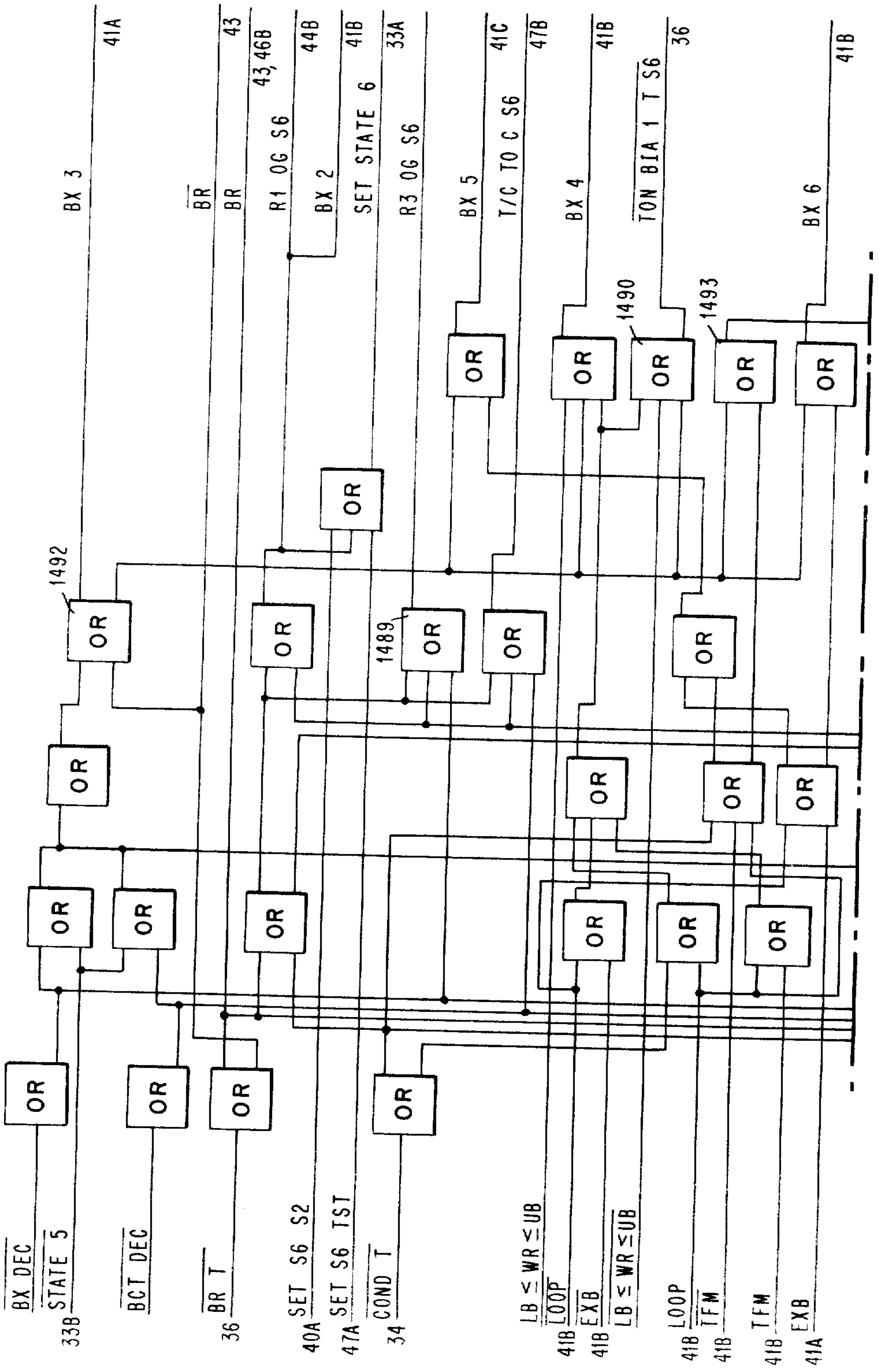
Figure 42B:
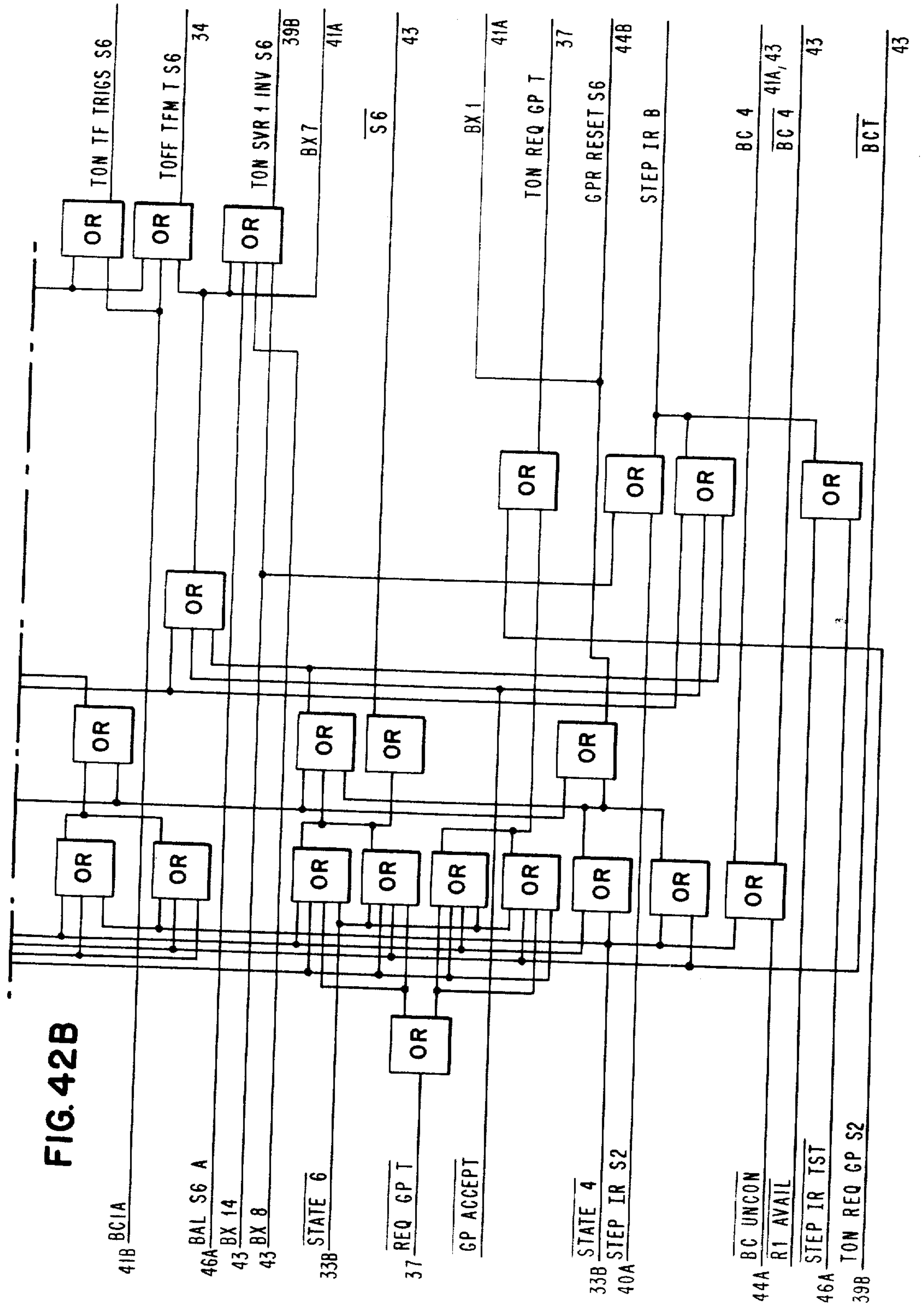

For FIGS. 41A–41C the SET OP REG E sets on an empty tag for the OP Register 159, thereby preventing any further instruction decoding until the next instruction is loaded into it. The signals WR TO LB, WR TO UB, WR TO SLT, WR TO AOR, WR TO IR, TEMP TO LB, TEMP TO UB, TEMP TO SLT, TEMP TO AOR and TEMP TO IR open the gates from the Working Register (WR) 177, or Temporary Register (TEMP) 176 to Bus 1033, and from Bus 1033 to the indicated Lower Bound 150 (LB), Upper Bound 147 (UB), Save Loop Target 180 (SLT) Advanced Outgating Register 1002 (AOR), or to the Instruition Register 148(IR), respectively. The IR TO SLCIR opens the gates from I Register 148 to Common Bus 1008 to transfer the I Register 148 data to SLCIR Register 179. In FIGS. 42A and 42B the R3 OG S6 signal is generated only when the system is in state 6 and controls the OG Controls 1095 to set the Gates 1032 to gate out the data in the GPR 202 designated in the instruction as R3 to Adder 168. The TON I F TGS S6 is another signal generated when the system is in state 6, to turn on the Instruction Fetch Triggers to call for a new instruction. The Step IR B signal is one line of a number which control the incrementing of I Register 148 by transferring to its the data in the IR Incrementer 153.

Figure 43:
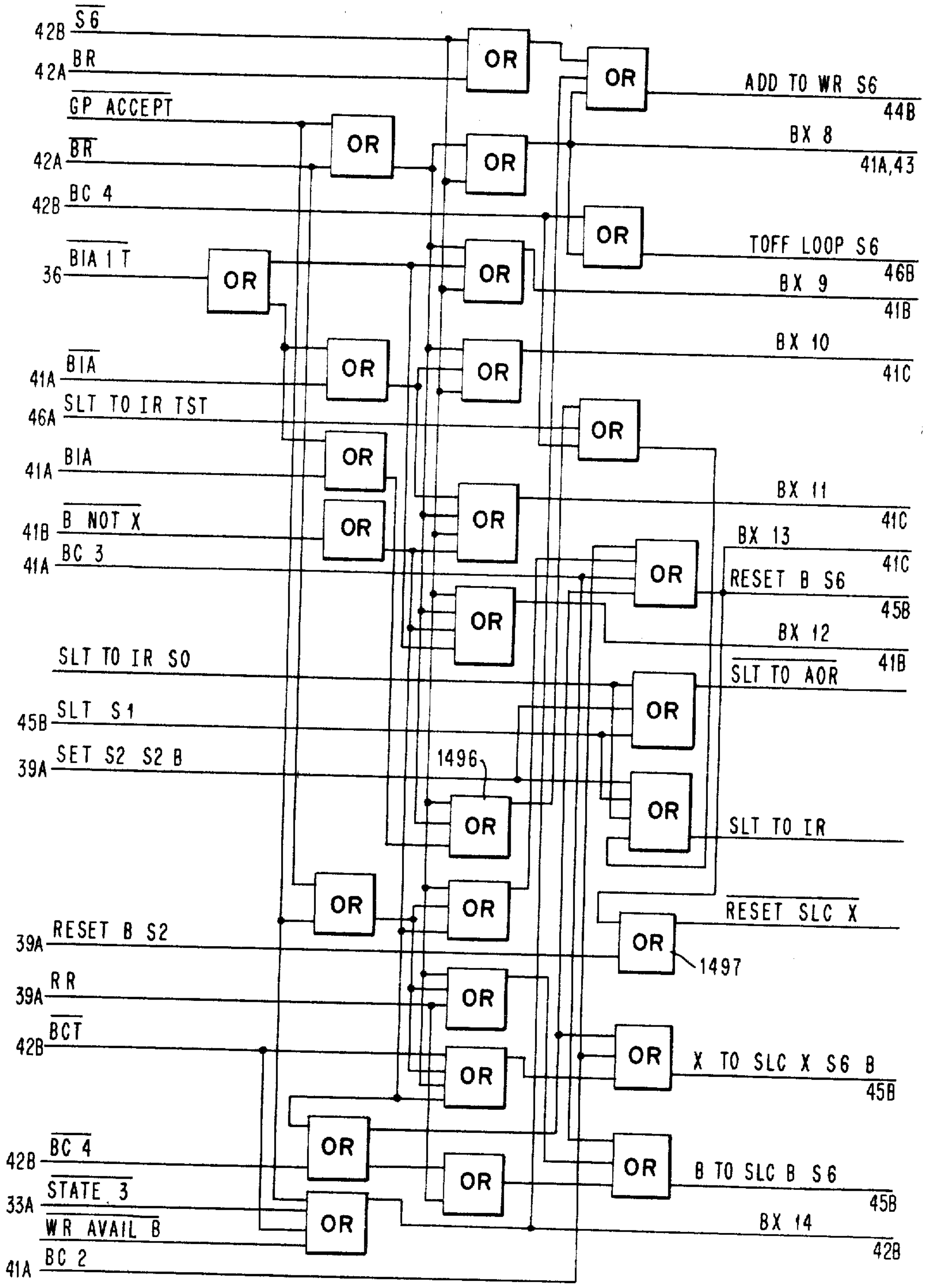
Figure 44A:
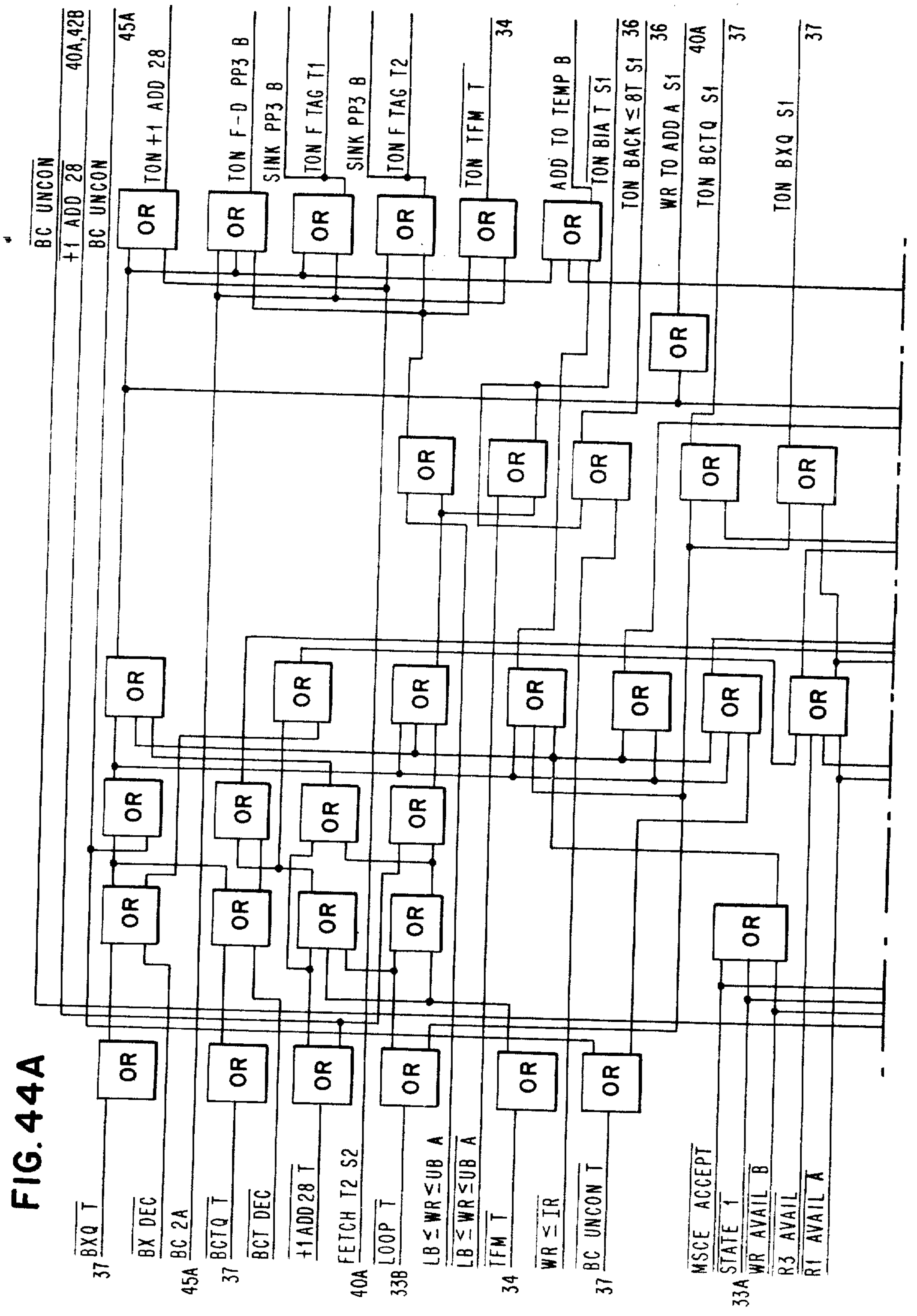
Figure 44B:
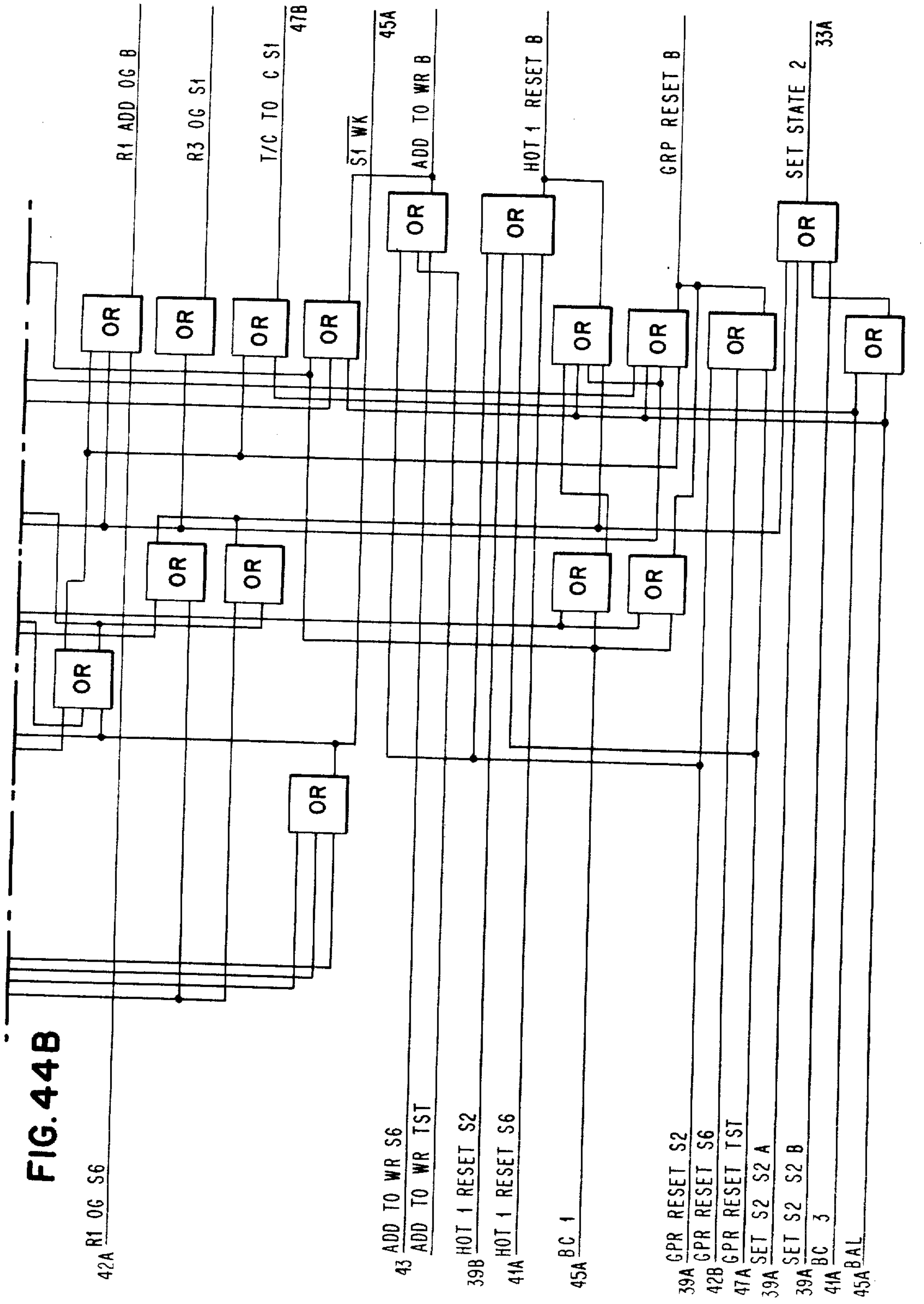

The outputs of FIG. 43 are the ADD TO WR S6 which opens the gates between the output of Adder 168 and Working Register 177 during the state 6 condition, the SLT TO AOR signal which gates data transfer between Register 180 and 1002 over Common Bus 1008, the SLT TO IR signal for data transfer from the SLT Register 180 to I Register 148, and the RESET SLC X which resets the SLC X Register 1044 when its data is no longer needed, as when the Instruction Unit leaves the loop mode state. In FIGS. 44A and 44B, the TON +1 ADD 28 sets a trigger to open a gate to connect the line 1037 to the Bit 28 input on Bus 169. The TON F TAG T1 and TON F TAG T2, respectively, turn on the fetch tags for Temporary Registers 1 and 2, Buffers 157 to indicate that a fetch is outstanding for the associated register. The ADD TO TEMP B and ADD TO WR B signals control the outgating of Adder 168 to the Temporary Register 176 or the Working Register 177, respectively, and the R1 ADD OG and R3 OG S1 signals control the OG Controls 1095 and 1096 to gate the GPR's 202 designated as the R1 and R3 registers to the Adder 168. The HOT 1 RESET will reset any of the triggers which have been set to gate in a Unit to input 169 or 1127 of Adder 168, and this signal with the GPR RESET signal which resets all triggers in the OG controls 1095 and 1096 and therethrough gates 1030 and 1032, constitute an Adder Clean Up pair of signals. The SVIR OG–+1 ADD 29 B signal gates out the SVIR Register 1120 to Bus 1015 and puts a unit value into the Adder Bit position 29 as required to generate with the Lower Bound data a new instruction address. The R–X to SLC X and B to SLC B signals ingate the R or X Register identification on Bus 161, and the B identification on Bus 162, respectively, into the SLC X and SLC B Registers 1044 and 1042. The RESET SLC B signals will reset the SLC B Register 1042 to zero.

Figure 46A:
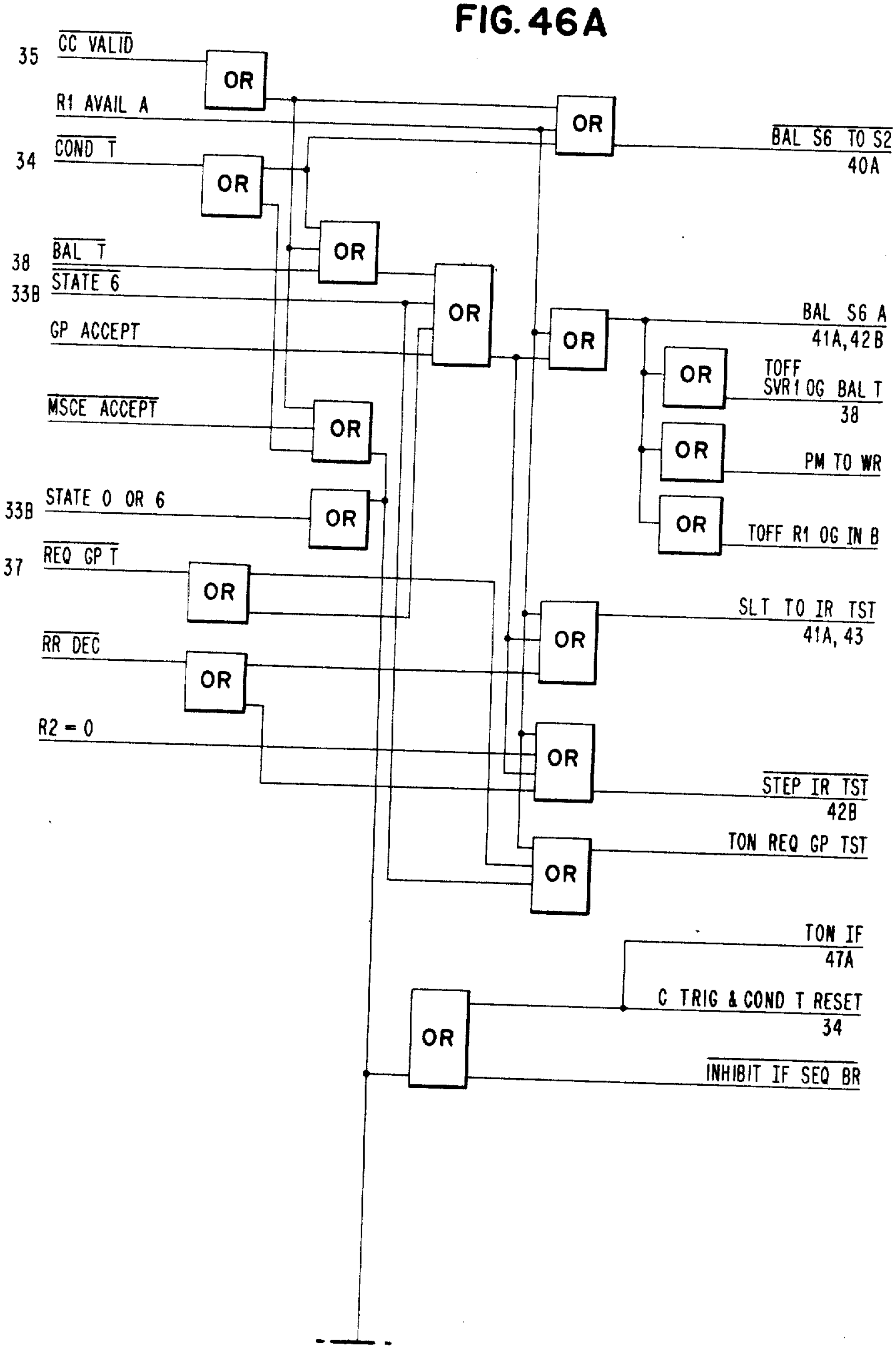
Figure 46B:
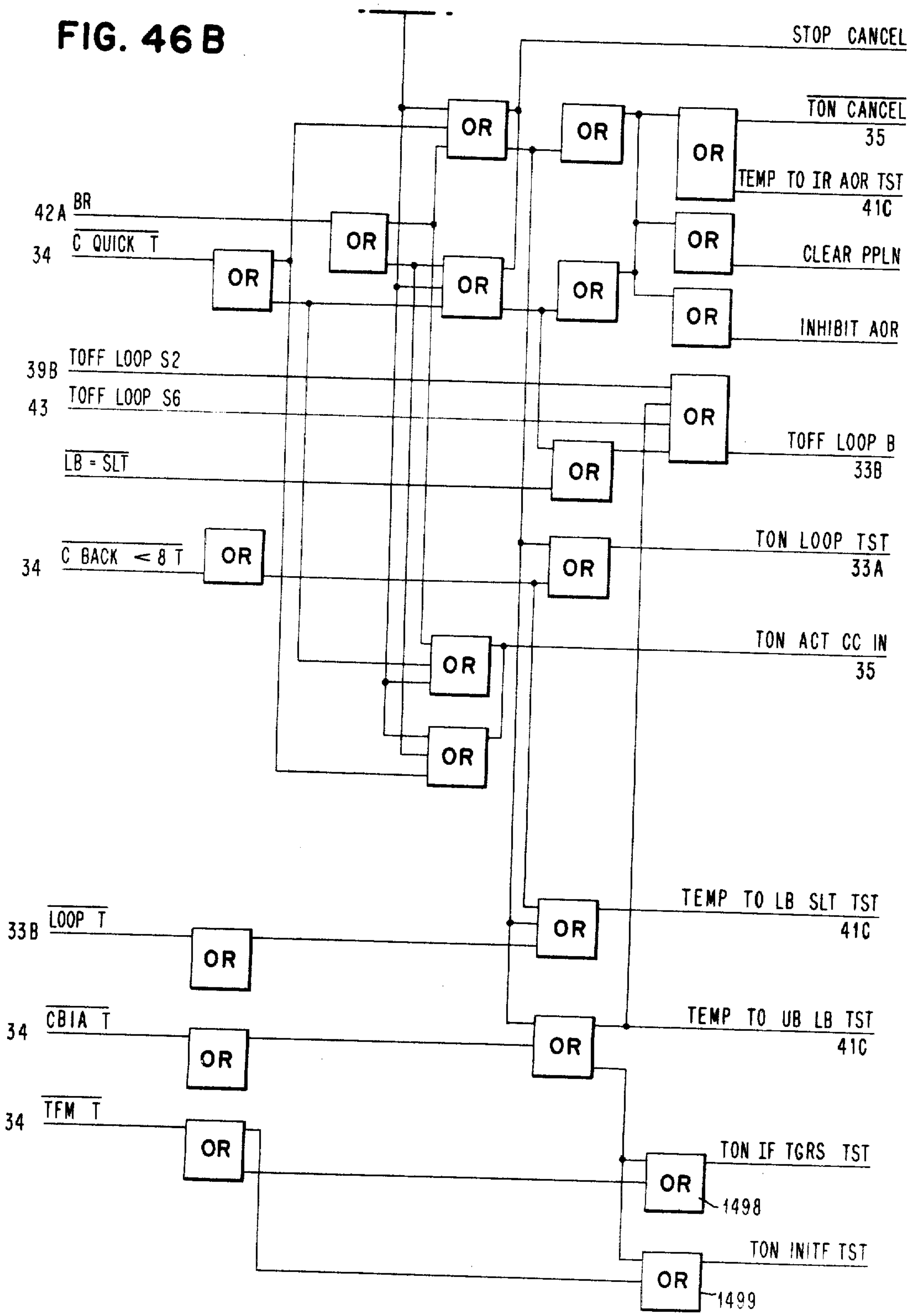

For FIGS. 46A and 46B, the PM TO WR signal opens the gates to send the Program Mask in PSW Buffer 1006 to the Working Register 177, the TOFF R1 OG INH B, resets the trigger which inhibits the outgating of the R1 Register to Adder 168 (Adder 168 is no longer full or WR 177 is available) and the TON REQ OP TST will Request Priority on the GPR addressing bus when a branch test is made. The CLEAN PPLN signal cancels the data stored in the Pipeline Stages 1098 and 1099. The INHIBIT AOR signal prevents the AO Register 1002 from outgating any further data from an Instruction Buffer 156 to the OP Register 159. The TON IF TGRS TST and TON INIT F TGRS are generated during a test for a branch instruction to turn on the Instruction Fetch and Initial Fetch Triggers, respectively, to thereby control a fetch of an instruction and to indicate that the fetches being made are the initial fetches required to start the fill of the instruction buffers 156 and thus have priority.

Figure 47A:
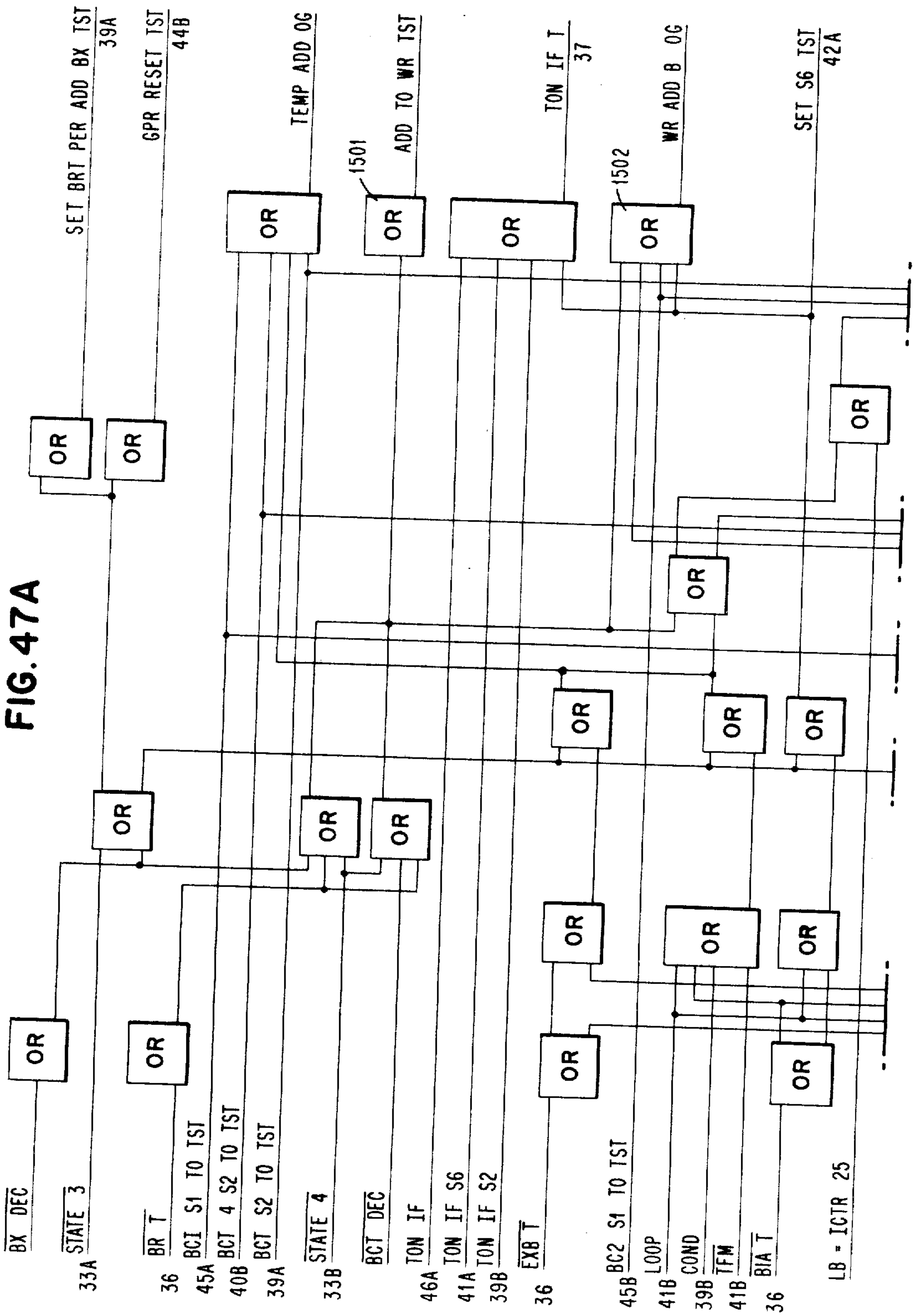
Figure 47B:
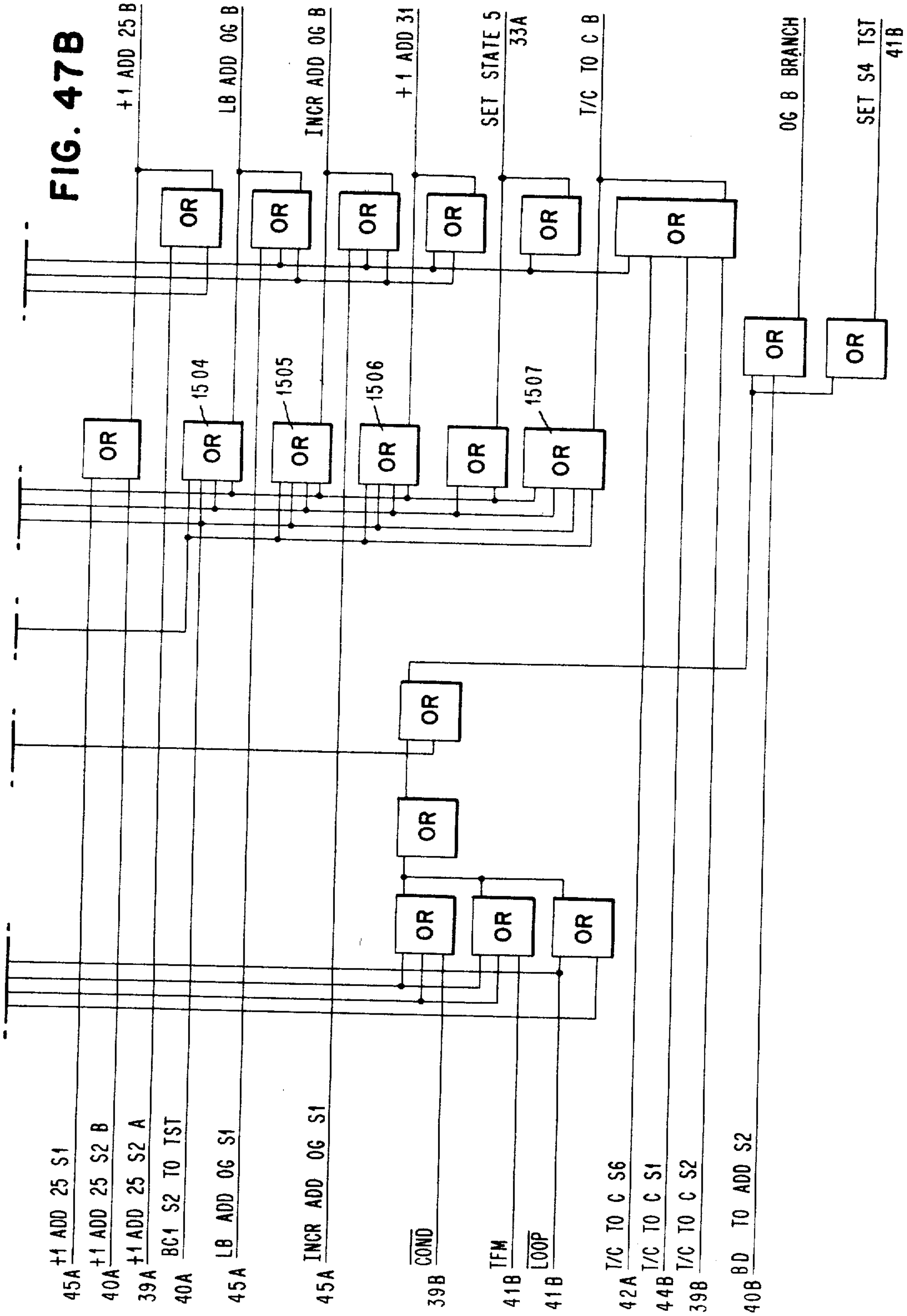

For the outputs of FIGS. 47A and 47B, the TEMP TO ADD OG signal outgates the Temporary Register 176 to Bus 1038 for transmission to the B Bus input to Adder 168. The ADD TO WR TST opens the gates during a test for branch cycle to transfer the data in Adder 168 to the Working Register 177 while the WR ADD B OG will open other gates from Working Register 177 to Bus 1036, and from Bus 1036 into the B input to Adder 168. The +1 ADD 25 B signal is one of the signals which can set the gate to Line 1011 to add a unit to bit position 25 of Adder 168 as required in reconstituting the present instruction address from the part of the address in LB 150, and the Instruction Buffer address data in I Register 148. The LB ADD OG B signal is one of the signals which will outgate the LB Register 150 to Bus 1009 for transmission to the A Bus input (bit positions 8–25) of Adder 168. The IR INCR ADD OG B can be set along with the above LB outgate signal to transfer the IR Incrementer 153 address data to Busses 1010 and 1015 into bit positions 26–31 of the A input of Adder 168 as is required for generating the address of the next instruction. The +1 ADD 31 signal sends a unit signal into the 31st bit position of Adder 168 to generate the address of the next byte when the present byte address is known at the input of Adder 168. The T/C TO C B signal sets the T/C side of Adder 168 to complement the input data as when subtracting the target address in the Working Register 177 from the present instruction address generated from the LB Register 150 and I Register 148 data inputs into the A Bus input of Adder 168. The OG B BRANCH signal will control the outgating of the Branch.

INPUT CONTROL SIGNALS

The input signals into the branch and loop mode control circuitry are different from the output signals generally in that the output signals are to control actions within the I Box 134, whereas the input signals are mostly indications of conditions of parts of the I Box 134, and may be used in more than one control circuit. Most of these inputs signals are continuing signals and each will remain in effect until the condition which they indicate changes. There are a few signals, however, which have an S0, S1 or S6 tag and these signals are present only when the I Box is in the state indicated. It should again be noted that the other tags such as WA, WB, TST, IF CONTLS etc. are indications that the signals for the same function may come from several different areas, and for hardware reasons, not logic reasons, such signals are functionally ORed in these controls. The "from" structure is in FIG. 10, unless otherwise noted.

The incoming signals are:

| Signal | Fig. No. | Description | From |
|---|---|---|---|
| AND BACK<8 | 34, 36 | Branch Address is back less than 8 double words from the branch instruction. | Adder 168. |
| BRT RESET WA | 36 | Reset the Branch Trigger | OP Decoder 166. |
| BRT RESET WB | 36 | do | Do. |
| BRT RESET TST | 36 | do | Do. |
| BCT ADD | 36 | The condition of the Adder 168 after the increment of the Branch on Count or Branch on Index instruction is added to the Adder. | Adder 168. |
| BX DEC | 39A, 42A, 44A | Branch on Index instruction | OP Decoder 166. |
| BAL DEC | 40A, 45A | Branch and Link instruction | Do. |
| BC DEC | 40A, 45A | Branch on condition instruction | Do. |
| BCT DEC | 40B, 42A, 44A | Branch on Count instruction | Do. |
| BOTH TEMP F TAGS OFF | 45A | The fetch outstanding tags for both Temporary Registers 157 are off, i.e., All outstanding fetches are returned. | Reg. 157. |
| ENABLE BR TRGS | 33B, 37 | A Branch Instruction is found and the branch control Triggers are to be enabled. | OP De Coder 166. |
| EXB T | 41A | The B Trigger of the Execute Triggers is set | Execute Control. |
| FXCC OF OUT | 35 | A valid instruction to set the condition Code is outstanding in the Fixed Point Unit. | Decoder 224, FIG. 6. |
| FLCC OP OUT | 35 | A valid instruction to set the condition code is outstanding in the Floating Point Unit. | Control 200, FIG. 5. |
| GP ACC T | 39, 42A, 43, 46A | The GPR 202 controls have granted the requested priority | FXPU 136, FIG. 6. |
| IR EQ SLCIR | 39A, 45B | The address in I Register 148 is equal to that in SLCIR 179 | Comp 181. |
| LB EQ IR INCR 25 | 39A, 40A, 45A, 47A | The bit in bit position 25 of LB Register 150 and that in IR Increment 152 are the same value. | EXCL OR 1007. |
| LB LE WR LE UB (both voltage levels are present) | 39A, 40A, 41B, 44A | The address in the Lower Bound Register 150 is less than or equal to the address in the Working Register 177 which in turn is less than or equal to the address in Upper Bound Register 147. | Comp 1041. |
| LB EQ SLT | 39B, 46B | The address in Lower Bound Register 150 is equal to the one in SLT 180. | Comp 1045. |

| Signal | Fig. No. | Description | From |
|---|---|---|---|
| LB EQ IR 25 | 45A | The Lower Bound address bit 25 is the same as the one in I Register 148. | EXCL OR 1012. |
| MSCE ACCP T | 40A, 44A, 46A | The MSCE 136 has accepted a fetch or store request | MSCE 136, FIG. 7. |
| OP STAGE CC BIT | 35 | The instruction in OP Stage 167 is to set a conditional code | OP Stage 167. |
| +1 ADD 28 T | 44A | The Add 1 Trigger for bit position 25 of Adder 168 is set | Gate 1011. |
| RR DEC | 39A, 41C, 45B, 46A | An instruction having an RR format is decoded | OP Decoder 166. |
| R2-X EQ Q | 40A, 46A | The R2 (or X) field of an instruction being decoded is all zeros. | Do. |
| R1 AVAIL | 42B, 43, 44A, 46A | The GPR designated in the R1 field of the instruction is available for use. | Select RUA 338, Select RUM 339, RUM and RUA counters 337, 335. |
| R3 AVAIL | 44A | The GPR designated in the R3 field of the instruction is available. | Select RUA 338, Select RUM 339, RUM and RUA counters 337, 335. |
| SET STATE (X) | 33A | Signals coming from external sources to set the indicated state triggers for use in the different instructions. | E Box 133, I Box 134 etc. |
| SIT | 33B | Store Interlock Trigger to indicate that a store instruction is being issued to an address whose old data is already in the buffers 155. | Comp. 1041. |
| SIS or STORE | 33B, 37 | Store may be into instruction stream or next instruction in OP Register 159. | Pipeline Stage 2, 1908. |
| SET BRT PER ADD BX S6 | 39A | Set the Branch Triggers in accordance with the condition of the Adder after the incrementing of the Branch of Index instruction. | OP Decoder 166. |
| SVIR TO IR | 39B | Ingate the address in Save IR Register 1120 over Bus 1008 into I Register 148. | I Box 134. |
| SLT TO IR | 41A, 43 | Ingate the address in SLT Register 180 over Bus 1008 into I Register 148. | Do. |
| TOFF LOOP (3 inputs) | 33B | These lines turn on or turn off as indicated, the triggers indicating Loop Mode, Execute, Branch on Index Low or Equal, Unconditional Branch, Quick Branch on Index, Quick Branch on Condition, Request for GPR Priority, the trigger indicating that the R1 address field indexes a double word and the trigger indicating that instruction fetches are being made. | Do. |
| TOFF EX B T | 36 | | |
| TON EX B T | 36 | | |
| TON BX LE T | 36 | | |
| TOFF BX LE T | 37 | | |
| TON BC UNCON | 37 | | |
| TON BXQ | 37 | | |
| TON BCQ | 37 | | |
| TON BCQ | 37 | | |
| TON REQ GP T (2 inputs) | 37 | | |
| TON R1 DBL SINK T | 37 | | |
| TOFF R1 DBL SINK T | 37 | | |
| TOFF IF T (3 inputs) | 37 | | |
| TON IF T (3 inputs) | 47 | | |
| TON SVIR OG EX | 38 | Signals during the Execute Instruction to outgate the Save IR Register 1120 to Bus 1008. | OP Decoder 166. |
| TOFF SVIR OG EX 38 | 38 | | |
| TEMP INIT | 41A | An initial fetch is being requested for a Temporary Buffer 157 | I Box 134. |
| TFM | 42A | A fetch has been made to a tepmorary buffer 157 | Do. |
| WR AVAIL | 39A, 40A, 44A | The Working Register 177 is available to receive the output of Adder 168. | Working Register 177. |
| WR LE IR | 39A, 41B, 44A | The address in Working Register 177 is less than or equal to that in I Register 148. | Comp 1053. |
| WR TO ADD A S6 | 40A | The value in Working Register 177 is to be gated into the A input of Adder 168. | I Box 134. |

In several figures the common lines Latch Clock and Trigger Clock are shown. These may be different phases of the system clock with the two trigger clock phases generated as in FIG. 33B. The Computer Reset signal is a manually controlled signal common to the system.

The input and output signals not referred to in the above listings are generated or used within the branch and loop controls of FIGS. 33A to 47B, and the figure of origin of input signals or figures of destination output signals are indicated adjacent the lead carrying the signal.

FIG. 31 is a detail view showing the type of latch circuit used herein. It comprises four NAND blocks, each of which is, in positive logic, or OR circuit driving an amplifier, or a current switching circuit. The block has a number of inputs and a pair of outputs, the lower output being in phase to the OR function of the inputs and the upper one being out of phase to the OR function. The circuit block is also equivalent to a negative AND circuit with the same output. Each output is driven by an emitter follower circuit to provide sufficient output power. A first and second circuit 1240 and 1241 each have the data line 1242 as an input with Circuit 1240 also having the + phase of the latch clock signal as an input. The third Circuit 1244 receives the − phase of the clock signal. All Circuits 1240, 1241, and 1242 have their out of phase outputs connected together in a dot OR configuration (common emitter load), the Lead 1245 of which is applied as an input to the fourth Circuit 1246. The out of phase output 1248 of circuit 1245 is returned as an input to circuits 1241 and 1244, and is also the latched data output of the same phase as the data input. The signal on the dot OR output lead 1245 is a faster response to an input data signal, but is of an opposite phase. In operation, a + data signal on line 1242 will cause the outputs of Circuits 1240 and 1241 to be negative, and at some later time the − clock input to Circuit 1244 will be positive. The outputs of the three Circuits 1240, 1241, and 1244 are then all negative, and Lead 1245 will now be at the negative level driving Circuit 1246 to turn its output 1248 positive which output will, when applied to Circuit Blocks 1241 and 1244, hold the output of these two blocks negative. This condition will hold so long as the data signal on line 1242 remains positive. When the data signal on line 1242 next becomes negative, only Block 1240 can change its output since Line 1248 holds Block 1241 and 1244 set with positive inputs and Block 1240 can raise its output to the positive level only when the +clock Line 1249 goes to its negative level. At this time the positive out of phase output of circuit Block 1240 will switch the Circuit 1248 to a negative output on lead 1248, which in conjunction with the negative data Line 1243 will switch the output of Circuit 1241 to positive to maintain Lead 1245 positive to generate a negative latch output signal on Lead 1248. This condition will be static so long as data Line 1242 remains negative.

When the data Lead 1242 again becomes positive, it turns the outputs of Circuits 1240 and 1241 negative, but until the −clock Line 1250 becomes positive, Circuit 1244 with a positive output will hold Lead 1245 positive. If the data Line 1242 changes its voltage level during the time that the +clock Line 1249 is positive, and −Clock Line 1250 is correspondingly negative, no output change will take place for each Circuit 1240, 1241, and 1244 will have one positive input. If, however, the +Clock Line 1249 is negative with Line 1250 positive, Circuit 1244 will always have a negative output and may be disregarded. A positive to negative data change will make both inputs to circuit 1240 negative raising its output to positive and making output Lead 1248 negative. For a negative to positive shift, both Circuits 1240 and 1241 will have their outputs shifted negative to raise the output Lead 1248 to positive. Thus, during the in phase part of a clock cycle, the latch circuit is held in whichever state it was in at the beginning of the phase, but during the out of phase part it can assume a state corresponding to the input data signal. Naturally, in using this latch circuit, it is expected that the data changes will be made during the in phase part of the clock cycle to cause an output change at the start of the out of phase part of the cycle, and that the data output will be used only after the circuit has had sufficient time to change to a new state.

The Trigger circuit of FIG. 32 is exactly the same as the Latch of FIG. 31 with an additional input 1252 into the first circuit Block 1253. The new Line 1252 is termed the Off input and will normally be at a positive voltage to allow the trigger to become set. The other inputs to Circuit 1253 are the On Input 1254 which will be pulsed from a negative to a positive level to set the trigger and −Clock line 1256. A second circuit 1257 also receives the On Input 1254 and a third Circuit 1258 receives an input from a +Clock Line 1260. The out of phase outputs of Blocks 1253, 1257, and 1258 are dot ORed on Line 1261 which is an input to Circuit Block 1262 whose out of phase output is returned as a feed back input 1264 to Blocks 1257 and 1258.

Assume that the trigger is in an On state with output 1264 at a positive level, holding the outputs of Blocks 1257 and 1258 at a negative level. If the Off line 1252 is at its normal positive level, the output of Block 1253 is also negative, resulting in the Dot OR Lead 1261 being negative to hold Block 1262 conducting and output 1264 positive. This configuration will be stable without regard to the Clock pulses. To turn the trigger off, a negative pulse is placed on Off Line 1252, which with the normal negative voltage on Line 1254 will turn off Block 1253 when the −Clock Line 1256 goes negative in the clock cycle. The Block 1253 now drives the OR Line 1261 positive to drop the output Line 1264 to negative. Now the normally negative On Line 1254 and Feedback 1264 combine at Block 1257 to hold OR Line 1257 positive, and the Trigger is in a stable reset state. It should be noted that the off signal on Line 1252 may be of any length above the minimum necessary to switch the trigger to the reset state, but must be present during the negative (in phase) part of the −clock cycle.

When the trigger is off, the +Clock line will be negative half of the time, and in conjunction with the Feedback Line 1264 will energize the Block 1258 to provide a positive output during these out of phase parts of the +clock signal, so the trigger cannot be changed during this phase. During the in phase part of the cycle, the Circuit Block 1257 is the only one holding the OR Line 1261 at the positive level. If during the in phase part of the clock cycle, the On Line 1254 is given a positive voltage pulse, the output of Block 1257 will go negative lowering the OR line voltage to the negative level to set the trigger to a positive output voltage on Line 1264. It will thus be seen that the trigger can be set by a positive pulse on Line 1254 or reset by a negative pulse on Line 1252 during the in phase part of a clock cycle and cannot be changed during the out of phase part of the clock cycle. A Computer Reset Line 1265 may be provided as an input to Block 1262, and will normally be at a negative level but can be pulsed positive to reset the trigger at any time. The forced negative output on Feedback Line 1264 and the normally negative input on Line 1254 force the output of Block 1257 positive to hold the trigger reset. For both Latch and trigger circuits, the in phase output of the fourth control Block is normally not otherwise used and may be connected to an indicator light on the maintenance operators panel to show the status of the circuit.

BRANCH CONTROL TRIGGERS

FIGS. 33A to 38 show the circuits and connections used to set and reset the triggers which control the branch instructions. The Latch Clock and Trigger Clock inputs are common to these figures but, except for noting that the + and − phases of the trigger clock are generated in FIG. 33B from a trigger clock input, and are distributed from there to the other figures, these inputs may be considered as solely for timing purposes and need not be further described. Also, it should be noted that the indication that an output signal goes to a particular input does not necessarily mean that the output is not used elsewhere in the I Box 134, although it will not normally be so used.

FIG. 33A has three triggers which are settable in combination to indicate any I Box state from zero to six. The Triggers are the S1 Trigger 1270, the S2 Trigger 1271, and the S4 Trigger 1272, each of which has an output which is at the negative level when the trigger is set. A circuit 1274 connected to the output of S1 Trigger 1270 generates an in phase and an out of phase S1 signal. Likewise a pair of Circuits 1275 and 1276, connected to the S2 Trigger 1271, and a Circuit 1278 connected to the output of the S4 Trigger 1272, generate the in phase and out of phase S2 and S4 signals with a second Circuit 1279 connected to Trigger 1272 generating a second out of phase S4 signal. It is assumed for these triggers that a negative voltage level is a significant signal, and that a Circuit Block may be considered as a −AND block so that it requires all negative input signals to generate a negative output signal at the in phase output, then the out of phase signal is a not signal. A −AND circuit 1280 receives the not S1, the not S2 and not S4, and will give a negative State 0 signal on in phase output Lead 1281 when none of the triggers are set. A −AND circuit Block 1282 receives the S1, the not S2 and the not S4 signals to give a negative State 1 signal on Line 1283. Another −AND circuit 1285 receives the not S1, the S2 and the not S4 signals as inputs and generates a state 2 signal on its output line 1286. The −AND 1287 is connected to the S1, the S2, and the not S4 signals to generate a state 3 signal on Line 1288. For a state 4 signal, the −AND Block 1290 receives the not S1, not S2 and the S4 signals as inputs and provides the state 4 signal on Line 1291. The state 5 and state 6 signals are similarly generated by Circuit Blocks 1292 and 1295, respectively, receiving the S1, not S2 and the S4 or the not S1, the S2 and the S4 signals to provide the state 5 and state 6 signals on their outputs 1293 and 1296. The out of phase outputs of the State 6 AND 1295 and the state 0 AND are dot ORed to provide on a Line 1297, a positive going signal which is positive when the state is either State 0 or State 6. The Triggers can also be set from the maintenance operators panel (MOP) to a State 7 in which all triggers are set. There is no —AND or output signals for this state since it is effectively a "null" state and no I Box processing can be going on.

The Triggers 1270, 1271, and 1272 can be turned on combinationally by a positive going signal on one of a plurality of Set State Lines at the left of FIG. 33A. Some of these Set State Lines come from outputs of the Branch and Loop Controls, FIGS. 33 to 47, but the majority are from other parts of I Box 134. All Set State Lines which are to set an odd numbered state output, i.e., States 1, 3, or 5 are inputs to one of three Circuit Blocks 1291, 1292, and 1293 which have their in phase outputs Dot ORed to form an input of a Circuit 1295 while the Set State 7 Input is fed directly to an input of Block 1295. An input signal on any line will drive the out of phase output of Block 1295 negative and this output will be supplied to a Latch 1296 which will time the effect of the input signal and provide a positive signal to turn on Trigger 1270.

In a similar manner the signals which can set the S2 Trigger 1271, i.e., the Set State 2, Set State 3 and Set State 6, are ORed in Blocks 1298 and 1299 which have their in phase outputs Dot ORed as an input to an OR 1301, which also receives the Set State 7 signal. The out of phase signal from Block 1301 is sent to a Latch Circuit 1302 where it is timed and issued as a positive signal to turn on S2 Trigger 1271. Likewise the signals whch can turn on the S4 Trigger 1272, i.e., the Set State 4, Set State 5 and Set State 6 signals are inputs to two Blocks 1303 and 1305 whose in phase ouputs are Dot ORed and are an input to Block 1306, which also receives the Set State 7 signal and whose out of phase output is sent to a Latch 1307 where it is timed and issued as a positive signal to turn on the S4 Trigger 1272.

As it is desired that all of the Triggers 1270, 1271, or 1272, when set as a result of a Set State signal, shall remain set until a new Set State signal changes the combination of Triggers, the in phase outputs of Blocks 1295, 1301, and 1306 are Dot ORed with the in phase output of a Block 1309 which has all of the Set State 0 lines as its inputs. The Dot OR circuit will then go positive when any Set State input receives a signal, and this signal as an input to a Latch 1310, will be timed and passed through the Latch 1310. The —ON output of the Latch 1310 is conected to the off input of each Trigger 1270, 1271 and 1272 to activate the reset input of each Trigger when any Set State signal is received. By examination of the Trigger circuit, FIG. 32, it will be seen that the Trigger circuit is set dominant so that if both a —Off and a +On signal is received the Trigger will give a set output which will be retained if both control signals change simultaneously, or the +On signal remains up after the —Off signal is up. Therefore, any Trigger which also receives a +On signal from its Latch 1296, 1302, or 1307 will stay set even though it is receiving a —Off signal and only those Triggers which receive the —Off signal alone will be reset off. When all Set State signals are off, the On and —Off signals to Triggers are returned to their ineffective state, but as above noted, this allows the Triggers to remain in their Set or Reset states.

To enable control over the Triggers 1270, 1271, and 1272, their clock signals are developed as the in phase and out of phase signals from a Circuit Block 1312 which has the —TRIGGER CLOCK, the —ENABLE BRANCH TRIGGERS and the +SIS or STORE signals as inputs so that the —TRIGGER CLOCK signals will be frozen at the out of phase state if either the —ENABLE BRANCH TRIGGERS signal is at its positive, non-significant level, or the SIS or STORE signal rises to its positive level. With the TRIGGER CLOCK signals so frozen, the S1, S2, and S4 Triggers cannot change their state.

The SIS OR STORE and the —TRIGGER CLOCK input signals are also inputs to a Circuit 1313 which passes clock signals to its +INHIBIT CLOCK and —INHIBIT CLOCK outputs unless the SIS OR STORE signal goes positive to freeze the clock signals in their out of phase state. These outputs prevent change in the Conditional Triggers of FIG. 34.

A Loop Mode Trigger 1315 has its +ON (Set) input driven by the +On output of a Latch 1316 and its —Off (Reset) input driven by the —On output of a Latch 1317. The out of phase output of a Circuit Block 1319 receiving all of the TON LOOP signals is the controlling input of Latch 1316, while the in phase output of a Block 1320 receiving all of the TOFF LOOP signals is the controlling input of Latch 1317, Since it is not desired to have the —ENABLE BRA TGRS nor the SIS OR STORE signals control the Loop Mode Trigger 1315, the —TRIGGER CLOCK signal is the sole input to a Block 1321, whose outputs are the clock signals for Trigger 1315 and are also sent to other machine triggers. All triggers can be reset by a COMPUTER RESET signal on a Line 1323 which is powered in a Block 1324, whose in phase output is sent to the Loop Mode Trigger to reset it and also combined in Block 1325 with an out of phase —SIT·—TGR CLK signal from Block 1326 to reset the S1, S2, and S4 Triggers on either COMPUTER RESET or the coincidence of a —SIT (Store Interlock Trigger) with a —TRIGGER CLOCK signal.

The Triggers of FIG. 34 are the TFM (Temporary Fetch Made) Trigger 1327, and a group of four conditional mode Triggers, C Quick Trigger 1328, for a Conditional Quick Loop, the C BIA Trigger 1329, for a Conditional Branch Into the Array of Buffer Registers 156, the C BACK <8 Trigger 1331, for a conditional Branch to an address less than eight double words back, and the COND Trigger 1332 for a Conditional Branch. The TFM Trigger 1327 has a turn on latch 1333 set by the —TON TFM T signal, and a turn off Latch 1334 for its controls with the turn off Latch 1334 being settable by any of the three inputs TOFF TFM S6, TON C BIA TOFF TFM, or CTRIG-COND T RESET to Block 1336, which controls the Latch 1334.

The thre Triggers C QUICK, C BIA, and COND are each settable by a Latch 1337, 1338 and 1339, respectively, with C QUICK Trigger 1328 being settable through Block 1341 by the TON COND-C QUICK-C BIA S1 signal, the C BIA Trigger 1329 being settable through Block 1342 by either the TON C BIA-T OFF TFM or the TON COND-C QUICK-C BIA S1 signals, and the COND Trigger 1332 being set through Latch 1339 controlled by Block 1343, having as inputs the TON COND-C QUICK C BIA S1 and the TON COND-C BACK <8 S2 signals. The C BACK <8 Trigger 1331 is directly settable by the out of phase output of a Block 1345, which receives the —ADD BACK <8 signal directly, and the —TON COND-C BACK <8 S2 through Block 1346.

The four Triggers 1328, 1329, 1331, and 1332 are reset by a common Latch 1347, which is set by the C TRIG-COND T RESET input or the triggers can be reset at any time by the Computer Reset signal through Block 1349 Dot ORed with a negative signal from Latch 1337 and combined with a negative trigger clock signal in Block 1350.

FIG. 35 provides two triggers and a latch circuit related to the validation or cancellation of conditionally issued instructions. The Cancel Trigger 1352 has its output driving a Circuit Block 1353, which has its in phase output distributed as a —CANCEL signal to the FXOS 201, the FLOS 184, and the MSCE 136, to cancel any conditionally issued instructions therein. The out of phase output of Block 1353 is fed back to a Latch 1354 to turn off Trigger 1352. Due to the clock timing intervals in the Latch 1354 and Trigger 1352, the —CANCEL signal will be transmitted for about one clock cycle. Trigger 1352 will be turned on by a —TON CANCEL signal passed through a Latch 1355 to the set input of Trigger 1352. The Activate Trigger 1357, Circuit Block 1358, Reset Latch 1359, and Set Latch 1360, from the same circuit to send an ACTIVATE signal to the FXOS 201 and the FLOS 184 to set any conditionally issued instructions to a valid and executable state. The Activate latch is turned on by a TON ACT CC IN signal which is inverted in a Circuit 1362. To save some time in the activation of fetches and stores in the MSCE 136, the ACTIVATE MSCE signal is taken from the in phase output of Block 1362, and inverted in a Block 1363, to generate a fast ACTIVATE MSCE signal which occurs sooner but is not precisely timed nor turned off as precisely as those from the ACTIVATE Trigger.

A —CC VALID signal to indicate that the setting of the condition code positions in the PSW Buffer 1006 of FIG. 10A is valid is generated by a pair of serially connected latches 1365 and 1366, which due to the serial connection and their different clock inputs, will generate an output —CC VALID signal at the same time as the Triggers 1352 and 1357. The —CC VALID signal is controlled by four inputs to a Circuit Block 1367, two of which signal that an instruction which is to set the condition code has been issued to the FXOS 201, or the FLOS 184. A third input of Block 1367 is the out of phase output of a Block 1369, which will signal whenever the OP Stage 167 contains a condition code setting instruction, except when the instruction is issued in the conditional mode. The fourth input is the OR from Block 1370 of the TON ACT CC IN signal from Block 1362, and the +ACTIVATE signal from Block 1358, the ORing providing a slightly longer signal than either of the input signals.

FIG. 36 details the normal branching control Triggers. The BR Trigger 1370 is set for all branch operations and generates the —BRT signal. Two latches 1371 and 1373 are provided to set and reset the trigger as in the above description of TFM Trigger 1327, FIG. 34. The BR Trigger will be set by the signals —$ET BRT PER ADD BCT and —BCT ADD inputs to Block 1374, or by signals —BXL ADD and —SET BRT PER ADD BX inputs to block 1375, or by signals —BXH ADD and —SET BRT PER ADD BX inputs to Block 1376. Only one of Blocks 1375 and 1376 is allowed to be effective, depending upon the setting of the BXLE Trigger, for if the Branch is to be on an index high condition, the condition of the adder with respect to a low or equal indication or the reverse situation should not be allowed to determine a branch. The out of phase output of each block will go positive when both input signals are present indicating that the branch is to be taken depending upon the condition of the Adder output, and that the adder output conditions for the branch are present. The Dot OR of the Block outputs is the control input for the set BRT Latch 1371. The Reset Latch is energized by the OR in Blocks 1378 and 1379 of the five BRT RESET signals and the TOFF EX B signal from the initial fetch controls.

Four other Triggers BIA 1381 (Branch address is In Array), BIA1 1382, (a similar indication), EX B 1383 (one of the triggers set on an EXecute instruction), and BXLE T 1348 (Branch on the IndeX value Lower than or equal to a comparand), are each settable through their Latches 1386, 1387, 1388, and 1389, respectively. The BIA Trigger 1381 will be set by the —TON BIA T S1 signal and the BIA1 Trigger will be set by the —TON BIA1 T S6 signal. The EX B Trigger 1383 will be set by the —TON EX/BT signal. The BXLE Trigger is slightly modified by having the +On and —Off inputs connected together. By reference to FIG. 32, it will be seen that this effect will set the Trigger when the input signal is positive, and will reset it when the signal goes negative. The control signal for the trigger is the OR from Block 1391 of the —TOFF BXLE T which will always reset the trigger and the set control signal which is the out of phase output of Block 1392 which receives the BXLE T signal and the TON BXLE T signal to hold the trigger on once it is set, and to set it if it is not already set.

A fifth trigger BACK <8 1393 is set to indicate that the branch address is less than eight double words back from the instruction being decoded, and that a program loop has been found which can be entirely contained within the Buffers 156. The Trigger 1393 is set directly by a TON BACK <8 T S1 signal through Block 1395. Another Block 1396 has its out of phase output Dot ORed with the in phase output of Block 1395, and since it receives the signals —ADD BACK <8 and —SET BACK <8 PER ADD S6, will also set the Trigger BACK <8 if the testing signal is present and the address is actually back less than eight double words. All Triggers 1370, 1381, 1382, 1383 and 1393 (not Trigger 1384) are reset by a signal from the Reset Latch 1373, whose output is also sent to FIG. 37 or the —RESET signal.

The circuits of FIG. 37 include six triggers which include the BC UNCON Trigger 1396, which will be set whenever a Branch on Condition instruction finds that the conditions for the branch have been met, the BXQ Trigger 1397 which is set when a Branch on Index instruction generates a quick loop, and the BCTQ Trigger 1399 which is set when a Branch on Condition instruction generates a quick loop. The REQ GP Trigger 1401 is set to request priority for the I Box in referencing the General Purpose Registers 202. The R1 DBL SINK Trigger 1402 is not particularly involved with the other branch control circuits since it indicates when a sink word requires successive references to adjacent GPR's 202. This requires that other I Box controls reissue a GPR Priority Request from Trigger 1401. The IF Trigger (Instruction Fetch) 1403 is set when instructions for the Buffer Registers 156 of the I Box are being fetched to buffers in the I Box 134.

The BC UNCON Trigger 1396 is set by a signal —TON BC UNCON T which passes through a Latch 1405. The Trigger is reset by a negative signal RESET from the Latch 1373 of FIG. 36. The BXQ Trigger 1397 is set by a signal from Latch 1406 which is controlled by the out of phase output of a Block 1407 which has the two signals —TON BXQ S0 and —TON BXQ S1 as its inputs. Another signal —TOFF BXQ S2 is applied through a Latch 1409 to turn off the BXQ Trigger 1397. As it is desirable to turn off the —BXQT signal rapidly, i.e., to switch it to the non-significant positive level, an input of a Block 1410 is also connected to the resetting output of Latch 1409. Block 1410 has its out of phase output Dot ORed to the —ON output of the Trigger 1397 and has the —TRIG CLK signal as another input. When the Latch 1409 output signal goes negative to reset Trigger 1397, this Block 1410 can respond rapidly to turn off the —BXQT signal.

The BCTQ Trigger has, with the exception of Block 1410, the same set and reset controls as BXQ Trigger 1397. The Trigger is set by the signals —TON BCTQ S0 and —TON BCTQ S1 through Block 1411 to set Latch 1413 and is reset by the —TOFF BCTQ S2 signal applied directly to the reset Latch 1414. Since both the Branch on Index and the Branch on Count instructions require access to a GPR 202, the four set signals for the BCTQ and BXQ triggers are ORed together in a Block 1415 whose output is ORed in another Block 1417 with three other TON REQ GPT signals. The out of phase output of Circuit Block 1417 is the control input to set Latch 1418 for Trigger 1401. The reset Latch 1419 for Trigger 1401 is controlled by the in phase output of a Circuit 1421, which receives two TOFF REQ GP T signals and a TON SVR1 INV signal. The out of phase output of Block 1421 is transmitted out as the —SV R1 INV signal. It will be remembered that the Save R1 Register 1049, FIG. 10, is checked every cycle to insure that a GPR 202 is not gated out through gates 1030 and 1032 to Adder 168, if new data had been stored therein in the preceding cycle, and has not yet returned to the inputs to gates 1030 and 1032. Reference is instead made to the Working Register 177 for the needed data. If, however, sufficient time has elapsed for data to be returned to the Gates 1030 and 1932, and what is more important, if Working Register 177 could have been changed in intervening cycles, the data in Save R1 Register 1049 is of no further value and should be marked invalid to prevent a possible erroneous operation.

The R1 DBL SINK Trigger 1402 has a set Latch 1422 and a reset Latch 1423 controlled respectively by the signals —TON R1 DBL SINK T and TOFF R1 DBL SINK T.

The IF (Instructions Fetch) Trigger 1403 also has a set Latch 1425 and a reset Latch 1426 with the out of phase output of a Circuit 1427 which receives three TOFF IF T signals connected to the reset Latch 1426, and the in phase output of a Block 1429 having four TON IF T signals as inputs, connected to the set Latch 1425. It is to be noted that for this Trigger 1403, the normal set and reset inputs have a reversed significance so that the Trigger output is positive when the Trigger is set. This is of no logical significance and the output signal is brought to the normal negative voltage level when on and given additional power in Circuit Block 1430, acting as an inverter.

The IF Trigger 1403 can be additionally reset by the presence of a —SIT signal transmitted to the out of phase output of a Block 1431, thereby preventing any instruction fetching when the Storage Interlock Trigger indicates that a store into the instruction stream is outstanding. The other Triggers of this FIG. 37 are resettable by the OR of the —SIT signal through Block 1431 and Block 1433, and the COMP RESET signal through Block 1434. Block 1435 performs similarly to Block 1312 of FIG. 33 to enable control of the Latch Clock circuit for the R1 DBL SINK and IF Triggers by the —ENABLE BRA TGRS and SIS OR STORE signals.

FIG. 38 shows the remaining group of four triggers for the branch and loop mode controls. These Triggers are the CANCEL OP REQUEST Trigger 1440, which is set when a request for a GPR priority if found to be unnecessary or unwanted, the SVR1 OG Trigger 1441 to gate out the data in Save R1 Register 1409, FIG. 10, the BAL Trigger 1442 set to indicate that a Branch and Link instruction is being performed, and the SVR1 INV Trigger 1443 which is set to indicate that the data in Save R1 Register 1049 is no longer of value. The Trigger 1440 is set by a signal on a direct input line SIT, FIG. 37, and the SVR1 INV Trigger is set through a set Latch 1445, controlled by a —TON SVR1 INV signal. Each of these triggers is to be reset at the first clock pulse after the setting signal is removed and for this purpose, a Circuit Block 1446 and 1447, respectively, is placed in the output line of the Trigger with the out of phase output of the Block 1446 or 1447 being fed back to the reset Latch 1449 or 1450 for the Trigger. As soon as either Trigger is turned on, the feed back circuit will energize the Latch 1449 or 1450 to send the reset signal. Since the Triggers are set dominant, this Off signal will not reset the Trigger until the set signal is removed.

Trigger 1441 has its set Latch 1451 activated by the out of phase output of a Block 1453 having the signals TON SVR1 OG EX and TON BAL T —SVR1 OG as inputs and having its reset Latch 1454 activated by the output of Circuit 1455, which has input signals T OFF SVR1 OG EX and T OFF SVR1 OG —BAL T. Trigger 1442 is similarly settable by signal TON BAL T —SVR1 OG through Circuit 1457, whose out of phase output sets the set Latch 1458 and is resettable by the OR of input signals TOFF SVR1 OG —BAL T and BRT RESET TST in Block 1459 which sets reset Latch 1460. All Triggers can be reset by the signal COMP RESET through Block 1462.

BRANCH INTERCONTROL CIRCUITS

The circuits detailed in FIGS 39A to 47B are the ones which combine the outputs of the Triggers and Latches of FIGS. 33A to 38 with external signals to generate the I Box control signals required for the branch instructions. The signals which are transmitted from these controls have already been described, but it will be noted that many signals are used internally in these controls and are not generally transmitted out of these drawings. For such signals, every signal received on a drawing from another figure of these control drawings, is marked with the figure of origin and every signal transmitted from a figure is marked with the figure or figures to which it is directed. It will be seen that in many instances, there is no logical distinction between output signals which have different names but are logically the same output. For example, in FIG. 39B, the output BX is shown as coming from a line which is the output of a Block in the upper half of the figure. The signal R3* OG is derived from the same line through a circuit 1464, and the signal T/C to C S2 is also from the output of Block 1463 through Block 1465. Logically, a single line could carry all three signals, but to have a single circuit block driving all of the signal transmission lines in parallel would result in a slow change of signal output. It is, therefore, preferred to utilize a duplication of hardware to attain an improvement in speed of operation.

Considering now the derivation of only the externally transmitted signals, on FIGS. 39A, and 39B, the IR INCR TO SVIR signal is derived as follows. The output of Block 1467 is the OR of —Block 1468 and —Block 1469. Block 1468 is the OR of —Block 1470 and —LB LE WR LE UB and —Block 1471. The input of Block 1471 is the —IR EQ SLCIR signal. The output of Block 1469 is the OR of —Block 1470 and Block 1471 and SIT. The output of Block 1470 is the OR of —Block 1472 and —Block 1474. The Block 1472 output is logically (—BXQ T)+(—STATE 1)+(—WR AVAIL) and the output of Block 1474 is logically, (—BCTQ T)+(—STATE 1)+(—WR AVAIL)

Combining and simplifying the terms, the IR INCR TO SVIR signal=STATE 1·WR AVAIL·(BXQ T +BCTQ T)·(LB LE WR LE UB)·[(—IR EQ SLCIR) +IR EQ SLCIR·(—SIT)]

which can be interpreted to mean that if an instruction being performed is either a Branch on Index or Branch on Count, and the quick loop trigger is set, the State 1 trigger is set, and the Working Register is available, then if the working register address is an address which is already in the buffer registers, and the instruction being decoded is not the branch instruction which set the quick loop state, or if the instruction is the one which set the quick loop state, then The Store Interlock Trigger is not set, the address of the next instruction to be decoded, i.e., the data in the IR Incrementer 153, shall be transmitted to Save IR Register 1120.

It is not believed necessary to so analyze each output signal, but briefly in FIGS. 39A and 39B, the R3* OG signal which outgates the odd numbered GPR 202 of the pair identified in the R3 field of the instruction, is derived from

WR AVAIL·[BXQ T·STATE 1 +STATE 2·BX DEC·(—BXQ)·(—BCTQ)]

Translated this means that if the Working Register 177 is available, the GPR 202 identified as R3* will be passed through the Gate 1032 if either the controls are in state one of a quick loop of a Branch on Index instruction, or are in state two of a Branch on Index instruction which is not in a quick loop. The —BCTQ signal herein is superfluous, but due to its normal signal level can cause no trouble since if the —BCTQ signal is present, the BX DEC signal will necessarily also be down so the output signal will be of the correct polarity.

The AOR QUICK INTRLK signal is logically (BCTQ T+STATE 0·BXQ T)·(—BRT)

and indicates that the AO Register 1002 is locked if the Branch Trigger 1370, FIG. 36, is not set during a Branch on Count, or State 0 of a Branch on Index instruction with the controls in a quick loop mode.

The SVIR to AOR signal transfers the Save IR Register 1120 to the AO Register 1002 when recovering from a conditionally started branch in loop mode, and is logically equal to (—BRT)·(BXQT·STATE 0
+STATE 2·GP ACCEPT·BCTQT)

Note that this signal is the same as the OP REG E S2 signal. The SVIR TO IR signal is the same as the SVIR TO AOR signal, with the additional facility of being also generated by either the SVIR TO IR A or SVIR TO IR B external signals.

The BX RECOVER signal controls recovery from the processing past the branch point of a Branch on Index instruction when it is found that the wrong branch path was assumed and is BXQ T·(—BR T) so the signal is generated when the controls are in a quick loop Branch on Index state and the Branch Trigger is reset.

Referring now to FIGS. 40A and 40B, it will be seen that the TON R1 OG IN B, the TON SVR1 OG —BAL T and the INGATE ILC signals are all the same, but are transmitted to different areas where different functions are performed. The TON R1 OG IN B signal gates the GPR designated by the R1 instruction field into the B Bus input to Adder 168, turns on the SVR1 OG Trigger 1441 to outgate the Save R1 Register 1049, turns on the BAL Trigger 1442, FIG. 38, and gates the instruction length field from the PSW Buffer 1006 into Working Register 177. The signal is derived as

BAL DEC·STATE 2·(—BXQ T)·(—BCTQ T)

and will be present in State 2 of a Branch and Link instruction if neither of the BXQ or BCTQ Triggers 1397 and 1399, respectively are set.

The WR TO ADD A OG transfers the data in Working Register 177 over Bus 1036 to the A input 170 of Adder 168, and is generated by the OR of the two WR TO ADD A S1 or WR TO ADD A S6 signals, or by a BX signal or by a

BIA T·(—LOOP)·BCT DEC·WR AVAIL·
BCTQ·STATE 2 signal or by a (—LB LEWR LE UB)·TFMT·BC DEC·
MSCE ACCPT·(—BC UNCON)·
(—BCTQ)·(—STATE 2)

signal. The last two signals provide for the signal in State 2 with Branch on Count quick loop set, but the loop mode not set and for the generation of the output signal when a temporary fetch has been made and accepted by MSCE in a Branch on Condition instruction. The branch address is not in the array and the instruction is not unconditional, otherwise the fetch would be to the buffers 156 in an initializing operation. This last signal is also transmitted out as the PPLN 2 F T2 signal to set a pipeline trigger for a fetch to #2 Temporary Buffer 157.

Another signal TON CBIA is generated as

STATE 2·(—BCTQ)·(—BC UNCON)·
MSCE ACCPT·BC DEC·LB LE WR LE UB which gives a conditional quick loop setting if the conditional target is already in the buffer array. The other external signal of FIG. 40, is the R2–X TO ADD S2 which controls the gating of the GPR 202 selected by the R2 or X instruction field on Bus 161 into Adder 168. This signal is

STATE 2·(—BCTQ)·WR AVAIL·BCT DEC·
(LOOP+BIA T)[COND+(—TFMT)]

indicating generation of the signal if the Working Register during available in State 2 of a Branch on Count instruction which is not yet a quick loop, but wherein the loop mode is set or the branch target is in the array in a conditional mode, or if no temporary buffer fetch has been made.

In FIGS. 41A–41C the first external signal noted is SET OP REG E which sets the empty tag trigger for OP Register 159 to stop any further instruction decoding. It will be noted that this signal is the OR of each of the inputs of four Circuit Blocks 1476, 1477, 1478, and 1480. These inputs are (1) SLT 180 to I Reg 148, State 0; (2) Temporary Buffers 157 initialized; (3) STL 180, State 1; (4) Set State 2 from State 2; (5) BC UNCON T·STATE 3·(—BIA)·(—TFM)·LB LE WR LE UB, i.e., an unconditional branch back to an address within the array for the first loop; (6) Set State 2 from State 2, locally same as (4); (7) Temporary Register 176 to I Register 148 on a branch test; (8) the OP Register 159 empty tag is on in state 2; (9) SLT 180 to I Register 148 on Branch Test; (10) BIA·BC UNCON T·STATE 3; (11) BC4; and 12, BX8. Signal 10 indicates that the branch is unconditional to a target address within the buffer array, and the controls are in State 3.

The T ON INIT F signal to turn on the initial fetch circuits is from the OR of BX6, BX4, BAL INIT and STATE 3·BC UNCON·(—TFM)·(—BIA)·(LB LE WR LE UB), i.e., a signal from Block 1480 meaning an unconditional branch to an address not in the buffer array, and for which no temporary fetches have been made. A further group of signals control the gating of data from the Working Register 177 to the LB Register 150, the UB Register 147, the SLT Register 180, the AO Register 1002, and the I Register 148. Each signal is the OR of a number of input signals and the controlling signals can be easily identified except those from Circuit Blocks 1481, 1482, and 1484. The signal from Block 1481 is STATE 3·BC UNCON T·LB LE WR LE

UB·(—BIA)·(—TFM)

the same as the output of Block 1480, except that now the branch is to an address in the buffer registers 156. The signal from Block 1482 is the same as that of Block 1481 ANDed with WR LE IR·(—EXB) and the signal from Block 1484 is the same as that of Block 1482 ANDed with a (—LOOP) signal.

Another group of signals controls the transfer of data from the Temporary Register 176 to the LB Register 150, the UB Register 147, the SLT Register 180, the AO Register 1002, and the I Register 148. These signals will be required when the working register has been used after it generated the branch address which has been retained in Register 176. As above noted, each of these signals is likewise the OR of a number of input signals, most of which are inputs to the figure. The input from Circuit 1485 is BC UNCON T·STATE 3·(—BIA)·TFM, i.e., the fetches have been made to the temporary buffers 157 in State 3 of an unconditional branch. The signal from Block 1486 is BC UNCON T·STATE 3·BIA·EX B·(—LOOP) and the output of Block 1488 is BC UNCON T·STATE 3·BIA·(—EX B)·BACK <8, i.e., the unconditional branch address is in the array and either the instruction is the target of an Execute instruction and loop mode is not set, or the instruction is not the target of an Execute and the target is in the array. The output of Block 1489 is simply BC UNCON T·STATE 3·BIA indicating that the unconditional branch is back to an instruction in the array. The last external signal transfers the address from the I Register to the SLCIR 179, to enable the branch point of a loop to be located.

FIGS. 42A and 42B show the outputs R3 OG S6, TON IF TRGS S6 and STEP IR. The R3 OG S6 output controls the gating of the GPR 202 selected by the R3 instruction field to the Adder 168. It is generated as the AND signal (BRT+CONDT)·BX DEC·[STATE 5+STATE 4·(—BRT)] from Block 1490.

The —TON BIA 1 S6 signal from Block 1490 is the OR of the (—STATE 5)+(—BR)

+(—BCTDEC)·(—BXDEC)

signal from Block 1492, the input —LB LE WR LE UB and the [(—LOP)+(—EXB)]·[LOOP

+TFM·(—CONDT)]

signal from Block 1492. The TON IF TRGS S6 is either BC14 or the output of Block 1493 which is STATE 5·BR T·(BCT DEC+BX

DEC)·TFM·(—CONDT)·(—LOOP)

which sets the initial fetch trigger when the temporary fetches have been made in a Branch on Count or Branch on Index instruction, if the controls are not already in a Loop or Conditional mode. The STEP IR signal from the branch controls is an OR of the signal of BX14, STEP IR S2, STEP IR TST·RI AVAIL, with the signal (BRT+CONDT)·GP ACCPT·(BCT DEC+BX

DEC)·(STATE

4+STATE 5+STATE 6·REQ GP T·(—CONDT) which is broadly after the GP Priority has been granted in a Branch on Count or Branch on Index instruction.

FIG. 43 has the pair of signals —SLT TO AOR and SLT TO IR which are from opposite polarity outputs of their circuit blocks. Each is set to its significant voltage level by the OR or SLT TO IR S0, the SLT S1 and the SET S2 32 signals. In addition to this control, the SLT TO IR signal can be bet set by any one of the SLT TO IR TST, the BC4 or the S6·BIA·BIAIT·BR·GP ACCPT signals through Block 1496. The —RESET SLCX signal resets the SLCX Register 1044 when leaving a loop mode state and is generated by a Block 1497 and is logically (—RESET B S2)·(—BC2)·(—BC3)·
[—BC4+(—B·NOT X)]·[—S6+(—BIA)·
(—BIA1)+(—BR)+(—GPACCPT)]

FIGS. 44A and 44B show a group of miscellaneous signals used in the fetching for the Temporary Buffer Registers 157. The TON +1 ADD 28 signal determines the entry of a unit into bit position 28 of the Adder 168 to be added to the address in W Register 177 to generate the second address along the branch path. The TON F —DPP3 signal turns on the fetch trigger and the D state of the 3rd stage of the pipeline. The TON F TAG T1-SINK PP3 and TON F TAG T2-SINK PP3 turn on the fetch tags for Temporary Buffers 176 #1 and #2, respectively, and send the sink address of the selected Temporary Buffer to the 3rd stage of the pipeline for transmittal to the MSCE. The ADD TO TEMP signal opens the gate from Adder 168 to Temporary Register 176 to enable retention of a branch address when it is necessary to utilize the W Register 177 for other functions. In FIG. 44B, the function of the R1 ADD OG and R3 OG S1 signals is to gate out the selected GPR through the gates 1030 or 1032 to the inputs of Adder 168. The ADD to WR signal transfers the output of Adder 168 into the W Register 177 for retention. The HOT 1 RESET and GPR RESET signals are used in recovering from a conditionally started branch when it is found that the branch is not to be taken and turn off all unit input to the Adder 168 and all gate control triggers in the outgating controls 1095 and 1096.

Figure 45A:
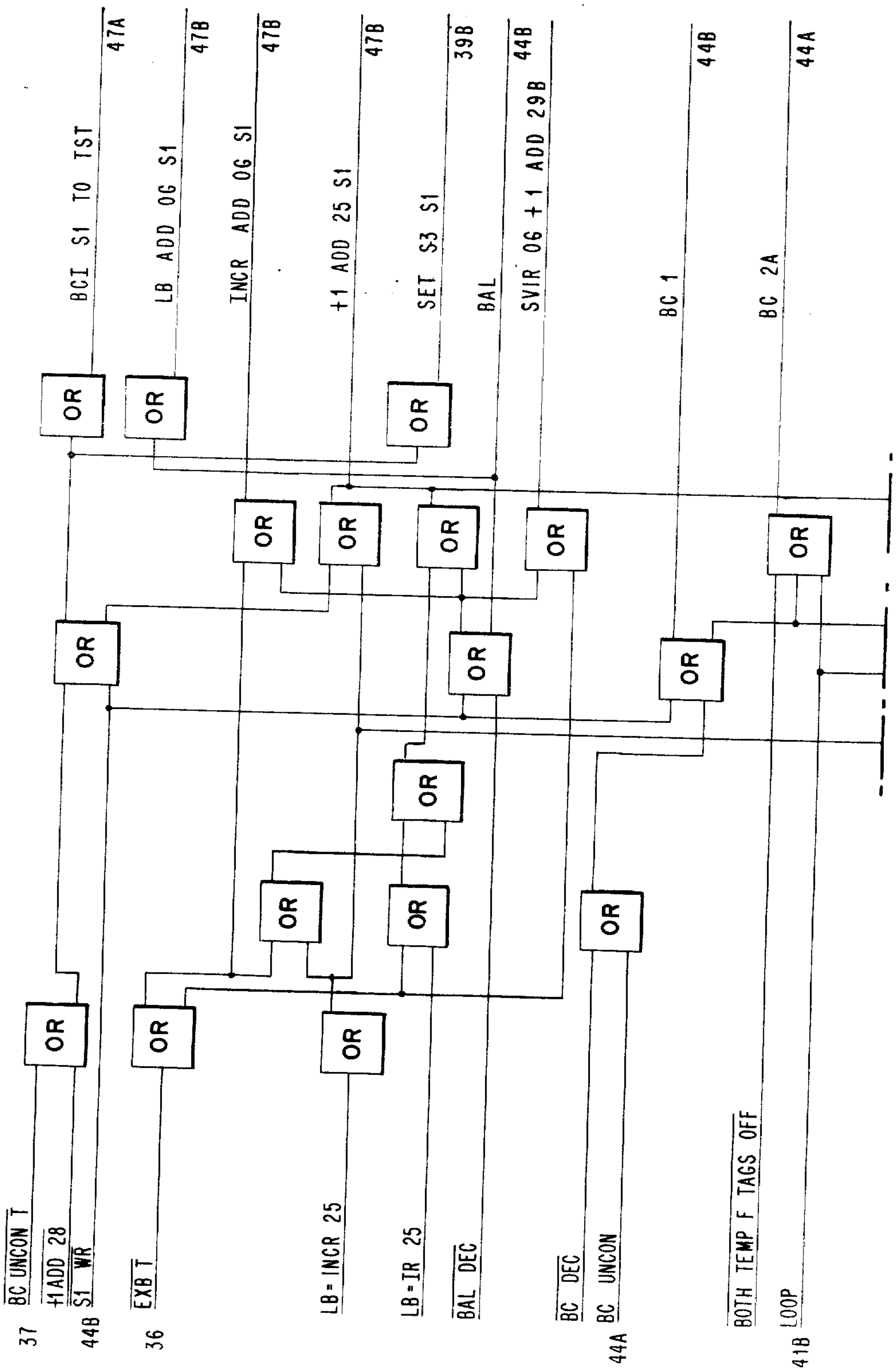
Figure 45B:
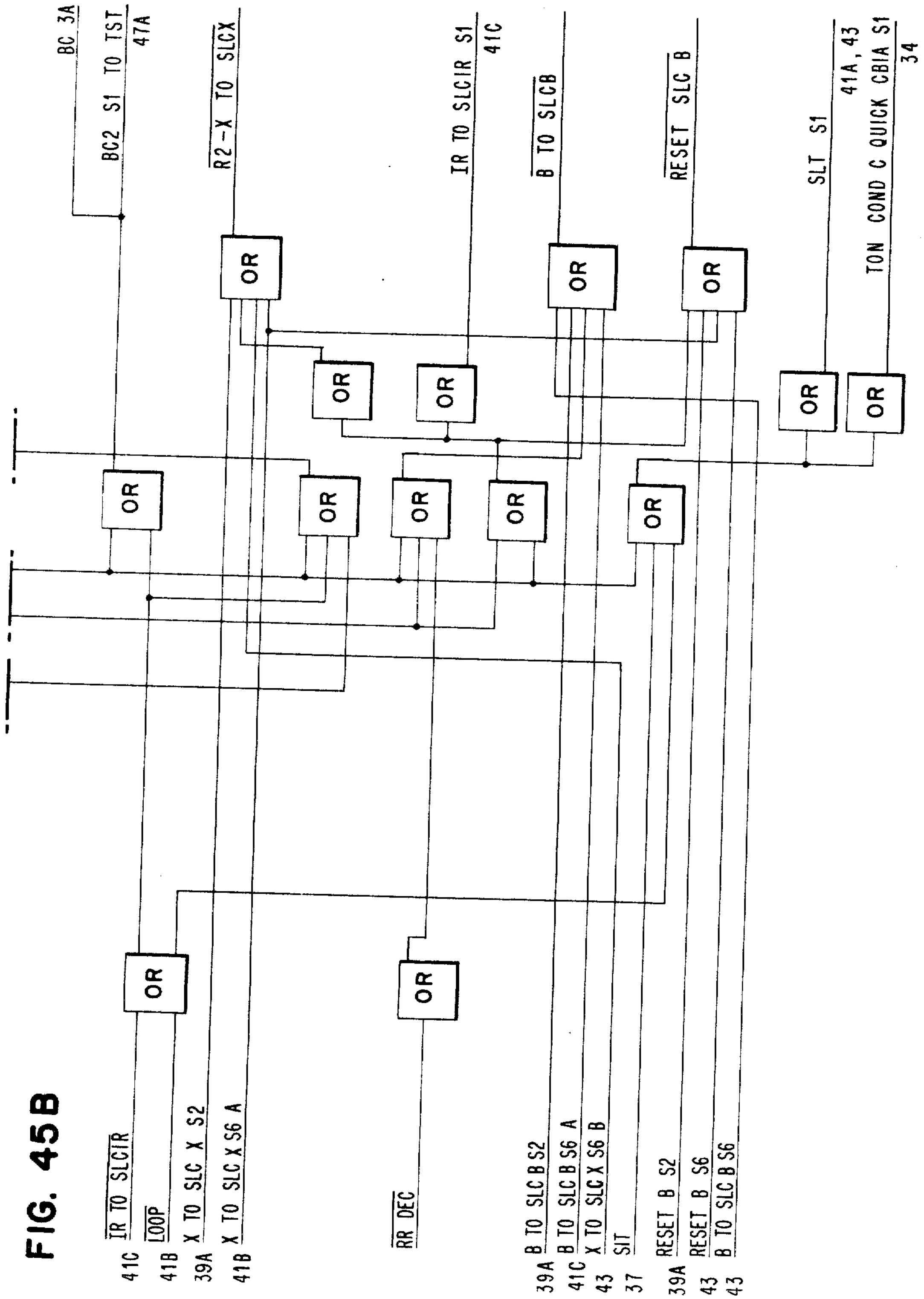

The circuits of FIGS. 45A and 45B generate the control signal SVIR OG—+1 ADD 29 which has the dual function of outgating the Save IR Register 1120 to Bus 1015 for transmittal to the A Bus input to Address 168, and also sets a trigger to actuate the hot one input to bit position 29 of the left input of Adder 168 to generate the next instruction address after that stored in the Save IR Register 1120. This address is to be stored in the PSW Buffer 1006 when the target of an Execute instruction is a Branch and Link instruction. Logically, the signal is EXB·BAL DEC·S1·WR AVAIL.

The —(R2–X TO SLCX) signal gates into the SLCX Register 1044, the part of the Bus 161 which contains the identification of the GPR 202 specified as the R2 or X register for the instruction being decoded. This data is needed for every loop mode branch. Logically, the signal is —[X TO SLCX S2+X TO SLCX S6A+X TO SLCX S6B+LOOP+BC UNCON+(—BC DEC)

+(—S1·WR)]

The —(B TO SLCB) signal is similar to the preceding one but is for the designation of the GPR 202 which is specified as the base register for the loop forming branch instruction. The logical description of this signal is —[B TO SLCB S2+B TO SLCB S6A+B TO SLCB S6B+LOOP+(—BCDEC)+(—S1 WR)+BC UNCON] which is the same as the preceding signal but for the B register instead of the X register.

The —RESET SLCB signal sets the SLC B Register 1042 to zero when the GPR designation therein is of no further value as when leaving loop mode. The signal is generated logically as —[RESET B S2+RESET B S6+X TO SLCX S6A+(—LOOP)·(—BC UNCON)·BC DEC·S1·WR].

FIGS. 46A–47B show a number of circuits for the branch test, Branch and Link State 6, Branch on Index States 3 and 4, and Branch on Count State 4. The external signal PM to WR gates the Program Mask portion of PSW Buffer 1006 to the Working Register 177, when the link data is to be stored in a Branch and Link instruction. The signal is derived as [R1 AVAIL·GP ACCPT·REQ GPT·STATE 6·BALT·(—CONDT)·CC VALID]. The signal TOFF R1 OG IN B turns off the Trigger in the OG controls 1095 which enables selection of a gate 1032 for the B Bus 174 input to Adder 168, and is derived exactly the same as to the PM TO WR signal above.

The TON REQ GP TST signal is passed externally to test the external controls which set the REQ GP Trigger 1401, FIG. 37. The signal is logically R1

AVAIL·(—REQ GPT)·STATE 6·(—CONDT)·CC

VALID·BALT).

The —INHIB SEQ BR will prevent the initial fetch sequencing for a branch operation. It is a positive signal at most times and is an effective negative signal for the conditions [STATE 0 OR 6·(—CONDT)·(—MSCE ACCPT)·(—CC VALID)].

The STOP CANCEL signal is [CONDT·MSCE ACCPT·STATE 0 OR 6·CC VALID·(C

QUICK)·(—BR)+(—C QUICK)·BR]

and thus holds up cancellation of conditionally issued instructions while in conditional mode, and a new branch is detected.

The CLEAN PPLN signal allows the pipeline of instructions to be cleared before further processing continues, and is logically identical to the STOP CANCEL signal above. The INHIBIT AOR holds up on the gating of new instructions to the OP Register 159, and is also the same as the two preceding signals.

The signals TON IF TGRS TST and TON INIT F TST are alternates depending upon the state of the TFM Trigger. When the other input signal (CBIA)+(—BR)+C QUICK+(—STATE 0 OR

6)+(—MSCE ACCPT)+(CONDT)+(—CC VALID)

to Blocks 1498 and 1499 is negative, the first signal will be sent if TFM Trigger 1327 is set and the second will be sent if the TFM Trigger 1327 is not set.

In FIGS. 47A and 47B, the TEMP TO ADD B·OG signal transfers the data in Temporary Register 176 to the B Bus 174 into Adder 168 for generation of a subsequent address or a test of the generated address for setting a quick loop. The signal is (BCT S2 TO TST+BC1 S1 TO TST+BCT 4 S2 TO TST+BX DEC[EXBT·LOOP +(−LOOP)·(−COND)·(−BIAT)·TFM]

The test signal ADD TO WR TST gates the output of Adder 168 into the Working Register 177 and is generated in Block 1501 as (BIA T·(−LOOP)·BX DEC·STATE 3+(BCT DEC+BX DEC)·BRAT·STATE 4).

The Block 1502 generates the signal WR TO ADD BOG which gates the W Register 177 into the B Bus input to Adder 168. It is the OR of the same signals generating the ADD TO WR TST signal above with the BC2 S1 TO TST and BC1 S2 TO TST input signals.

The signals LB ADD OG, IR INCR ADD OG, +1 ADD 31 and T/C TO C all have a common input from the Blocks 1504, 1505, 1506 and 1507, all of which receive the same inputs and also have the common input BCT S2 TO TST. An input BC1 S2 TO TST is common to all except the T/C TO C signal. Thus the common signal to all is (BCT S2 TO TST+BC1 S2 TO TST+BC1 S1 TO TST+BCT4 S2 TO TST+[BX DEC·STATE 3·EX BT+BX DEC·STATE 3·(−BIAT)·(−CONDT)·(−LOOP)]

Further controls on LB TO ADD OG are BC2 S1 TO TST and LB TO ADD OG S1. For IR INCR ADD OG the additional controls are BC2 S1 TO TST and IR INCR ADD S1 and for +1 ADD 31 the only additional control is BC2 S1 TO TST. The T/C TO C signal is also generated by the T/C TO C S1, the T/C TO S2 and the T/C TO C S6 inputs.

Another signal +1 ADD 25 is generated as +1 ADD 25 S1++1 ADD 25S2B++1 ADD 25S2A+(−LB EQ IR INCB25)·[(−BXDEC)+(−STATE 3)+(−EXBT)]·[(−BXDEC)+(−STATE 3)+BIAT+COND+LOOP+(−TFM)], and is used with the above group of signals in generating the next instruction word address, or in determining the R3* address, or if the branch address is back less than eight double words and similar operations.

The OG B BRANCH signal gates the GPR 202 designated in a branch instruction as the base register of the branch address out to the Adder 168. It is developed as B–D TO ADD S2+(−BX DEC)·(−STATE 3)·(−BIA T)·(LOOP)·[COND+(−TFM)+LOOP·EXB].

It is believed that the foregoing description of the output signals of the branch and loop controls will be sufficient to indicate the functions performed by these controls, and the manner in which other sections of the I Box 134 are controlled. The signals used internally in these controls are identified as to their place of origin and use, and in view of the above analysis of the externally used signals, it is thought that the derivation of these internal signals can be carried out without difficulty. For the input signals not generated in the branch and loop controls, the majority are from hardware shown mainly in FIG. 10, or the FXPU 143, FIG. 6, or the FLPU 142, FIG. 5, and their generation is described in the part of the specification pertaining to those figures or other detailed parts thereof. For those few external signals not so described, their effect is fully described herein and their origin and reasons for generation will be clear from the flow charts for the instructions performed in the Instruction Unit 134.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system having a main storage for storing instructions each identified by a unique address, an instruction unit for fetching said instructions from main storage and decoding them for execution, and means for executing said instructions, said instruction unit including a control unit comprising:

(a) a plurality of buffer registers for receiving and holding a sequence of a limited number of instructions fetched from storage;

(b) first means for sequentially receiving instructions from said buffer registers and decoding each instruction for execution thereof, said first means including branch detection means for detecting a branch instruction for branching to a target instruction;

(c) addressing means responsive to said branch detection means for providing the address of the target instruction when a branch instruction is detected;

(d) loop condition means responsive to said addressing means for determining if an instruction loop, beginning with said target instruction and ending with said branch instruction, is containable within said buffer registers, and providing an output indicative thereof;

(e) selectively actuated second means operative when actuated to operate said control unit in a loop mode whereby an instruction loop in said buffer registers can be repetitively decoded and executed without having to refetch any instruction from storage;

(f) quick loop condition means responsive to said addressing means for determining if the target instruction is already in said buffer registers and providing an output indicative thereof;

(g) third means, responsive to said output of said quick loop condition means, for actuating said second means;

(h) fourth means, responsive to said third means and to the presence and absence of said outputs from said loop condition means and said quick loop condition means respectively, for initializing said instruction unit by clearing said buffer registers and by fetching and loading said target instruction and sufficient further instructions to complete said instruction loop in said buffer registers;

(i) and fifth means for actuating said second means when said fourth means has loaded said instruction loop in said buffer registers.

2. Acontrol unit of the type described in claim 1 wherein a branch instruction may be a branch-on-condition instruction, including:

means normally operative under the assumption that the condition will not be satisfied for continuing the fetching and loading of said buffer registers and decoding the instructions therein;

and means, operative when said selectively actuated means is actuated, for preventing replacement in said buffer registers of an instruction of said instruction loop and for decoding subsequent instructions from said buffer on the assumption that the branching condition will be satisfied.

3. A control unit in accordance with claim 1 wherein:

said addressing means includes sixth means for generating the address of said target instruction from information at least partly obtained from said branch instruction;

and said control unit further comprises:

means for storing the address of the target instruction;

and means responsive to the address stored in said last-mentioned means, when said control unit is operating in loop mode, to branch to the target instruction and to inhibit said fifth means from regenerating the address of the target instruction.

4. A control unit in accordance with claim 3 wherein: said sixth means utilizes data to generate the address of the target instruction which data might be altered during execution of the instruction loop;
and said control unit further comprises:
means operative when said control unit is in the loop mode to detect any alteration of said data,
and means responsive to said last-mentioned means for deactuating said second means when said data is altered.

5. A control unit in accordance with claim 4 wherein said data is stored in a general purpose register in the system and said control unit further comprises:
means for monitoring said control unit to detect operations that change said data;
and means responsive to said last means to deactuate said second means when such an operation is detected.

6. In a data processing system having a main storage for storing a program comprising a plurality of instructions each identified by an address, means for executing said instructions and an instruction unit for fetching said instructions from storage, decoding said instructions and issuing decoded instructions to said execution means for execution thereof, said program comprising a plurality of a first type of instructions that are processed in sequence and at least one branch instruction that allows further instructions to be processed along a branch path beginning with a target instruction or along a no branch path begining with the next instruction in sequence, in accordance with branch or no branch conditions established by a previously issued instruction, which conditions may or may not be determined at the earliest time a branch can be taken, said instruction unit comprising:
a plurality of first buffer registers for receiving and holding a sequence of a limited number of instructions fetched from storage;
first means for detecting the decoding of said branch instruction;
second means repsonsive to said first means and operative to indicate that said target instruction is located backward in the sequence of instructions so as to define an instruction loop, including said branch instruction and said target instruction, which loop is contained within said buffer registers;
selectively actuated control means operative when actuated to operate said instruction unit in a loop mode whereby an instruction loop in said buffer registers is repetitively decoded and executed so long as said branch conidition causes a branch to said target instruction;
condition indicating means settable when said conditions become determined;
third means operatively connected for actuating said control means when a branch condition is determined and said second means has determined that said target instruction is in said buffer registers;

and fourth means operative, when said condition indicating means has not yet been set at the time said branch instruction is detected, for conditionally issuing decoded instructions along said no branch path when said control means is deactuated and along said branch path when said control means is actuated.

7. The invention as set out in claim 6 including:
fifth means, responsive to said first means, for determining whether said target instruction is located backward in the sequence of instructions so as to define an instruction loop which is containable within said buffer registers and including a loop mode indicator settable to indicate that the instruction loop is so containable;
sixth means, responsive to said fifth means and to said condition indicating means, for loading an instruction loop in said buffer registers, when said second means fails to indicate that said target instruction is in any of said buffer registers;
and seventh means for actuating said control means when said sixth means has loaded said loop in said buffer registers.

8. The invention as set out in claim 7 including:
seventh means operative when the loop mode indicator is set to store the address of the branch instruction;
a second storage means to retain the address of the target instruction of the branch instruction;
address comparing means to compare the address of any subsequently decoded branch instruction with the address stored in said seventh means; and
loop closing means effective upon an equal address comparison to next decode said branch target instruction.

9. The invention as set forth in claim 8 including:
an address generating device responsive to data from said branch instruction and from sources within the system, for generating the target address of the target instruction;
means to retain an identification of each of said sources used in said address generating device;
means to compare such identification with the identification of each such data source utilized in another subsequent instruction operation to thereby detect operations which could alter the data sources for said generated branch target address; and
means acting upon an equality comparison of said comparing means to reset said loop mode indicator.

References Cited

UNITED STATES PATENTS

| | | | |
|---|---|---|---|
| Re. 26,087 | 9/1966 | Dunwell et al. | |
| 3,386,084 | 5/1968 | Nelson. | |
| 3,156,897 | 11/1964 | Bahnsen et al. | 340—172.5 |
| 2,202,969 | 8/1965 | Dunwell et al. | 340—172.5 |
| 3,290,648 | 12/1966 | Smeltzer | 340—172.5 |
| 3,307,150 | 2/1967 | Bartlett | 340—172.5 |

ROBERT C. BAILEY, Primary Examiner
HARVEY E. SPRINGBORN, Assistant Examiner